(12) United States Patent
Noonan

(10) Patent No.: US 8,136,268 B2
(45) Date of Patent: Mar. 20, 2012

(54) WHEELED SHOVELS

(75) Inventor: Mark Noonan, New Canaan, CT (US)

(73) Assignee: Snow Solutions LLC, New Canaan, CT (US)

( * ) Notice: Subject to any disclaimer, the term of this patent is extended or adjusted under 35 U.S.C. 154(b) by 0 days.

(21) Appl. No.: 12/728,884

(22) Filed: Mar. 22, 2010

(65) Prior Publication Data

US 2010/0192423 A1 Aug. 5, 2010

Related U.S. Application Data

(63) Continuation of application No. 11/495,916, filed on Jul. 27, 2006, now Pat. No. 7,681,336, which is a continuation-in-part of application No. 10/808,841, filed on Mar. 25, 2004, now Pat. No. 7,111,418, said application No. 11/495,916 is a continuation-in-part of application No. 29/234,046, filed on Jul. 13, 2005, now Pat. No. Des. 543,807, and a continuation-in-part of application No. 29/240,981, filed on Oct. 20, 2005, now Pat. No. Des. 555,565, and a continuation-in-part of application No. 29/240,982, filed on Oct. 20, 2005, now Pat. No. Des. 546,144.

(60) Provisional application No. 60/539,066, filed on Jan. 26, 2004, provisional application No. 60/711,798, filed on Aug. 26, 2005, provisional application No. 60/784,899, filed on Mar. 22, 2006.

(51) Int. Cl.
*E01H 5/02* (2006.01)

(52) U.S. Cl. ......................................................... 37/265

(58) Field of Classification Search .................... 37/265, 37/284, 285, 264, 278, 272; 294/54.4, 57
See application file for complete search history.

(56) References Cited

U.S. PATENT DOCUMENTS

| 237,410 A | 2/1881 | Rouse |
| 328,633 A | 10/1885 | Angell |

(Continued)

FOREIGN PATENT DOCUMENTS

CA 2501109 3/2005

(Continued)

OTHER PUBLICATIONS

Field Corn Planter, http://etc.usf.edu/clipart/4200/4213/planter.sub.—5.htm, Mar. 11, 2005, 2 pages.

(Continued)

*Primary Examiner* — Robert Pezzuto

(74) *Attorney, Agent, or Firm* — Harness, Dickey & Pierce, P.L.C.

(57) ABSTRACT

Various exemplary embodiments are provided of wheeled shovels. In one exemplary embodiment, a wheeled shovel generally includes a wheel assembly having an axle and a wheel. The wheeled shovel also includes a frame having an upper portion and a lower portion. The frame may be disposed relative to the axle such that the axle is operable as a fulcrum about which the frame may pivot. A handle may be disposed at about the upper portion of the frame. A shovel blade may be disposed at about the lower portion of the frame. The wheel assembly, frame, handle, and shovel blade may be cooperatively configured so as to enable the wheeled shovel to throw a load of material generally upwardly and forwardly away from the shovel blade in response to a sufficient force applied to the handle for pivoting the frame relative to the axle with a recoil generated through the fulcrum at the axle.

22 Claims, 107 Drawing Sheets

U.S. PATENT DOCUMENTS

| | | | |
|---|---|---|---|
| 490,829 A | 1/1893 | Lavigne |
| 617,830 A | 1/1899 | Herran |
| 909,521 A | 1/1909 | Bearinger |
| 998,517 A | 7/1911 | Humm |
| RE13,626 E | 10/1913 | Overman |
| 1,236,921 A | 8/1917 | Fraser |
| 1,422,050 A | 7/1922 | Greenberg |
| 1,514,076 A | 11/1924 | Brown |
| 1,683,732 A | 9/1928 | Selin |
| 2,432,780 A | 12/1947 | Mader |
| 2,441,449 A | 5/1948 | Shaw |
| 2,460,560 A | 2/1949 | Williams |
| 2,470,217 A | 5/1949 | McLoughlin |
| 2,520,606 A | 8/1950 | McLoughlin |
| 2,590,143 A | 3/1952 | Adams, Jr. et al. |
| 2,629,624 A | 2/1953 | Nelles |
| 2,715,786 A | 8/1955 | Dorko |
| 2,720,043 A | 10/1955 | Chamberlin |
| 2,811,792 A | 11/1957 | Cork, Jr. |
| 2,846,785 A | 8/1958 | Underwood |
| 2,852,872 A | 9/1958 | Benz |
| 2,852,873 A | 9/1958 | Benz |
| 2,863,232 A | 12/1958 | Steinbach et al. |
| 2,867,827 A | 1/1959 | Gantz |
| 2,930,152 A | 3/1960 | Pipkin |
| D190,820 S | 7/1961 | O'Connor |
| 3,019,056 A | 1/1962 | Keilman |
| 3,078,604 A | 2/1963 | Neuman |
| 3,097,541 A | 7/1963 | Kindig |
| 3,107,446 A | 10/1963 | Messinger |
| 3,136,574 A | 6/1964 | Pasquale |
| 3,222,699 A | 12/1965 | Zeisig |
| 3,343,807 A | 9/1967 | Moraski |
| 3,452,798 A | 7/1969 | Ravreby |
| 3,468,041 A | 9/1969 | Mattson et al. |
| 3,469,326 A | 9/1969 | Malickson |
| 3,475,838 A | 11/1969 | Hagen et at |
| 3,526,979 A | 9/1970 | Ladewski |
| 3,594,932 A | 7/1971 | Eriksson |
| 3,643,356 A | 2/1972 | Gohl |
| 3,695,728 A | 10/1972 | Haussels |
| 3,748,761 A | 7/1973 | Chetwynde |
| 3,751,058 A | 8/1973 | Larsen |
| 3,985,392 A | 10/1976 | Bergmann et al. |
| 4,046,184 A | 9/1977 | Diehl |
| 4,055,354 A | 10/1977 | Sharpe |
| 4,153,287 A | 5/1979 | Towsend |
| 4,161,073 A | 7/1979 | Oakes |
| 4,179,828 A | 12/1979 | Brunty |
| 4,214,385 A | 7/1980 | Baranowski et al. |
| 4,224,751 A | 9/1980 | Schoemann et al. |
| 4,231,604 A | 11/1980 | Obergfell |
| D262,259 S | 12/1981 | Terpening |
| 4,302,894 A | 12/1981 | Emma |
| 4,345,633 A | 8/1982 | Gilmore |
| 4,607,860 A | 8/1986 | Vogel |
| 4,690,447 A | 9/1987 | Adams |
| 4,704,758 A | 11/1987 | Hoffman |
| 4,818,034 A | 4/1989 | Djerf |
| 4,858,348 A | 8/1989 | Lundy |
| 4,865,373 A | 9/1989 | Hudson |
| 4,910,893 A | 3/1990 | Asay |
| D314,318 S | 2/1991 | Uimonen |
| 5,018,282 A | 5/1991 | Hong |
| 5,048,206 A | 9/1991 | Jones |
| 5,054,278 A | 10/1991 | Thorndike |
| 5,074,064 A | 12/1991 | Nickels |
| 5,117,530 A | 6/1992 | Rank |
| 5,123,187 A | 6/1992 | Zamaria |
| 5,159,769 A | 11/1992 | Odorisio |
| 5,279,102 A | 1/1994 | Foster |
| 5,487,530 A | 1/1996 | McCullough |
| 5,499,852 A | 3/1996 | Seigendall |
| 5,511,327 A | 4/1996 | Jurkowski et al. |
| 5,551,763 A | 9/1996 | Alsman |
| D375,235 S | 11/1996 | Spear et al. |
| D376,965 S | 12/1996 | Spear et al. |
| 5,581,915 A | 12/1996 | Lobato |
| 5,613,354 A | 3/1997 | Foster |
| 5,727,799 A | 3/1998 | DiSario |
| 5,762,405 A | 6/1998 | Dempsey |
| 5,782,518 A | 7/1998 | Scruggs |
| 5,782,540 A | 7/1998 | Camfield et al. |
| 5,810,408 A | 9/1998 | Armstrong |
| 5,826,948 A | 10/1998 | Schroeder et al. |
| 5,918,921 A | 7/1999 | Samuelson |
| D415,663 S | 10/1999 | Whitehead et al. |
| 5,970,692 A | 10/1999 | Foster |
| 6,050,576 A | 4/2000 | Tanner et al. |
| 6,053,548 A | 4/2000 | Bowles, Jr. |
| 6,139,040 A | 10/2000 | Dempsey |
| 6,163,986 A | 12/2000 | Townsend |
| 6,237,975 B1 | 5/2001 | Drobot |
| 6,286,572 B1 | 9/2001 | Chen |
| 6,334,640 B1 | 1/2002 | Werner et al. |
| 6,364,424 B1 | 4/2002 | Lashlee et al. |
| 6,398,313 B1 | 6/2002 | Lew |
| D459,641 S | 7/2002 | Guneysu |
| 6,415,588 B1 | 7/2002 | Kao |
| 6,428,114 B1 | 8/2002 | Sebode |
| 6,457,757 B2 | 10/2002 | Hendrick |
| 6,474,007 B1 | 11/2002 | Sueshige et al. |
| 6,523,839 B2 | 2/2003 | Simmons et al. |
| 6,643,958 B1 | 11/2003 | Krejci |
| 6,675,507 B2 | 1/2004 | Petruzzelli |
| 6,701,913 B1 | 3/2004 | LeDuc et al. |
| 6,726,292 B1 | 4/2004 | Schroeder et al. |
| 6,735,887 B1 | 5/2004 | Muzzammel |
| 6,922,920 B1 | 8/2005 | Stratz |
| D523,710 S | 6/2006 | Noonan |
| D525,093 S | 7/2006 | Noonan et al. |
| 7,100,313 B2 | 9/2006 | Scherer |
| 7,111,418 B2 | 9/2006 | Noonan |
| D543,807 S | 6/2007 | Noonan et al. |
| D546,144 S | 7/2007 | Noonan et al. |
| D555,565 S | 11/2007 | Noonan |
| 7,305,779 B1 | 12/2007 | Purvis |
| D568,122 S | 5/2008 | Noonan |
| 7,631,443 B2 | 12/2009 | Noonan |
| 7,681,336 B2 | 3/2010 | Noonan |
| 2005/0160632 A1 | 7/2005 | Williams |
| 2005/0160633 A1 | 7/2005 | Noonan |
| 2007/0013198 A1 | 1/2007 | Brazeau |
| 2007/0227048 A1 | 10/2007 | Adinata |
| 2009/0139116 A1 | 6/2009 | Noonan |

FOREIGN PATENT DOCUMENTS

| | | |
|---|---|---|
| CN | 200510059163.8 | 3/2005 |
| EP | 1 580 322 | 3/2005 |
| EP | EM000729942-0001 | 7/2007 |
| EP | EM000729942-0002 | 7/2007 |
| FR | 865426 | 5/1941 |
| JP | 2005-087306 | 3/2005 |
| WO | WO 2005/098142 | 10/2005 |
| WO | WO 2007/025183 | 3/2007 |
| WO | WO 2009/070418 | 6/2009 |
| WO | WO 2009/070419 | 6/2009 |

OTHER PUBLICATIONS

European Search Report for co-pending European application No. EP 05 25 1730 which also lists Mark Noonan as an inventor and includes a priority claim to U.S. Appl. No. 10/808,841, now U.S. Patent 7,111,418 which is related to the instant application through a priority claim; 3 pages, Jan. 30, 2006.

Two Photographs of Wovel.RTM. Wheeled Shovel, Jan. 2005.

European Examination Report for EP 05 25 1730 which lists Mark Noonan as an inventor and includes a priority claim to U.S. Appl. No. 10/808,841, now U.S. Patent 7,111,418 which is related to the instant application through a priority claim; 4 pages, Feb. 11, 2009.

China Office Action from co-pending China application No. 200510059163.8, Publication No. CN1699696, which also lists Mark Noonan as an inventor and includes a priority claim to U.S. Appl. No. 10/808,841, now U.S. Patent 7,111,418 which is related to the instant application through a priority claim, 6 pages, Jan. 9, 2009.

US Office Action from co-pending U.S. Appl. No. 11/955,892 (now allowed and published as US2009/0139116) which is related to the instant application through a priority claim, 16 pages, Oct. 16, 2009.

Notice of Allowance from co-pending U.S. Appl. No. 11/955,892 (now US2009/0139116) which is related to the instant application through a priority claim, 6 pages Jan. 11, 2010.

International Search Report and Written Opinion from PCT/US2008/082363 (now WO 2009/070418), which also lists Mark Noonan as an inventor 12 pages, dated Jan. 6, 2009.

International Search Report and Written Opinion from PCT/US2008/082364 (now WO 2009/070419), which also lists Mark Noonan as an inventor 8 pages, dated Dec. 22, 2008.

International Search Report and Written Opinion from PCT/US2006/033311 (now WO 2007/025183), which also lists Mark Noonan as an inventor, 12 pages, dated May 15, 2008.

Notice of Allowance from European patent application No. 0525730.7 which is related to the instant application through a priority claim; dated Jan. 3, 2011, 5 pages.

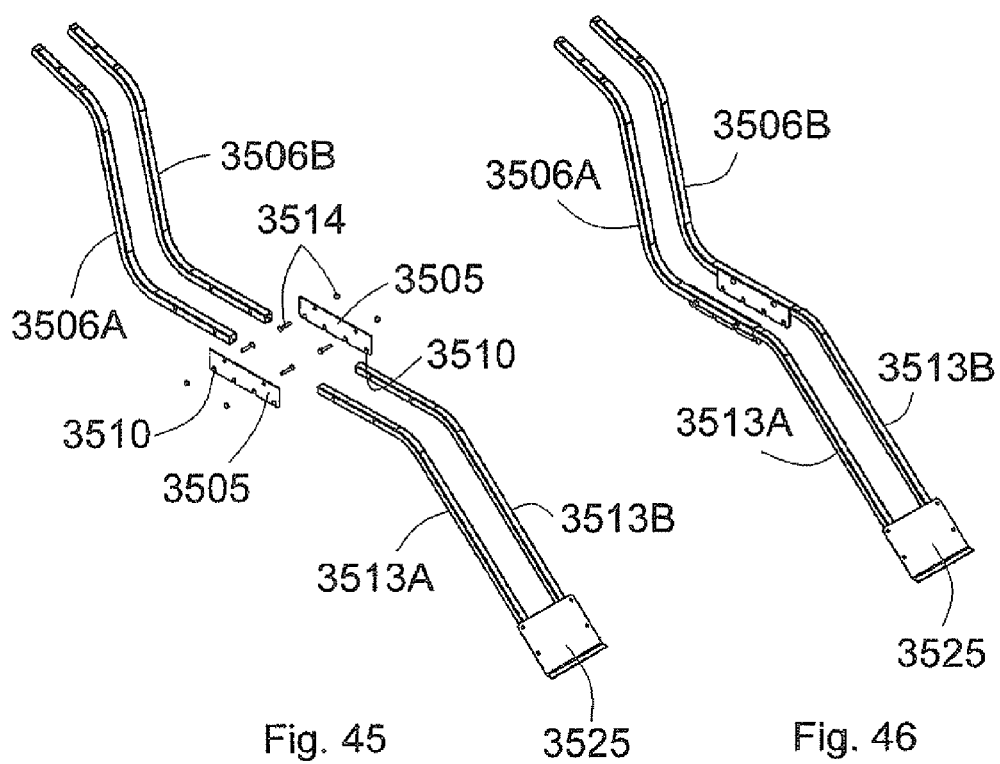

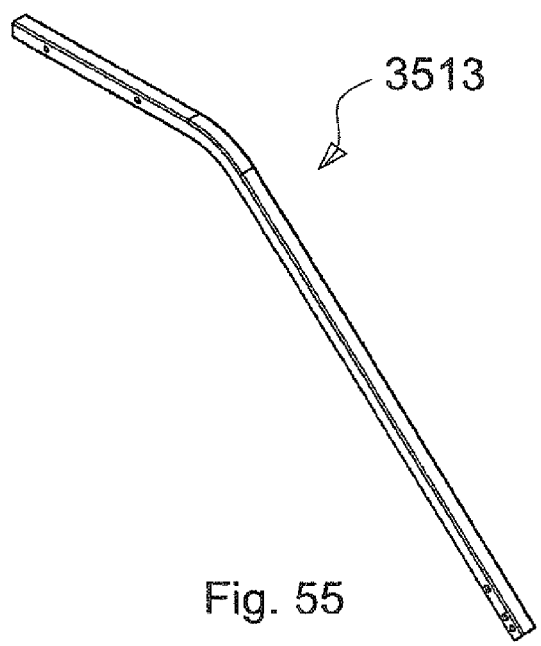
Fig. 55
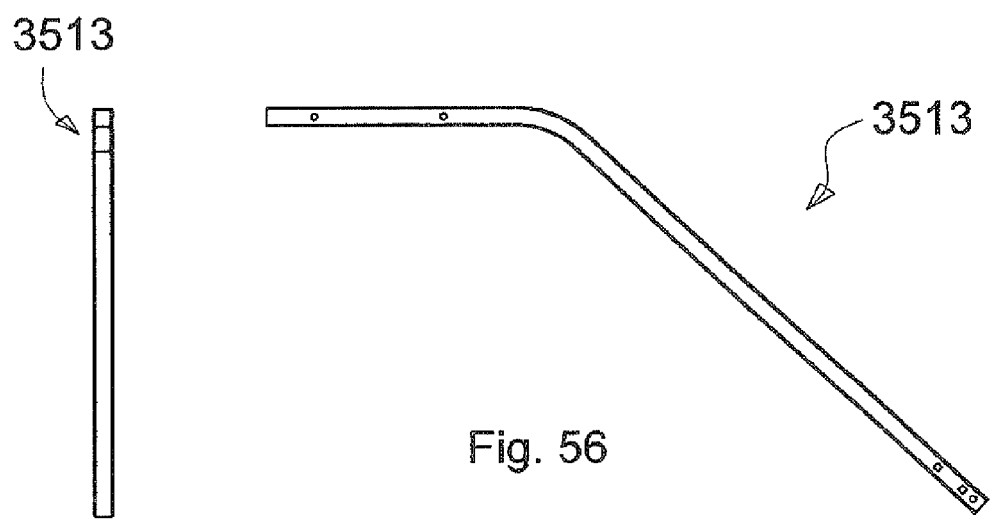
Fig. 56
Fig. 57

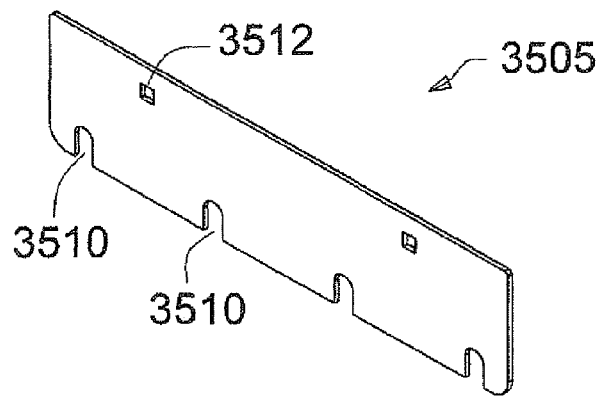
Fig. 64
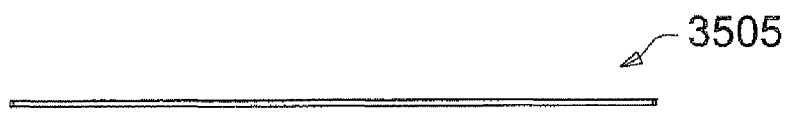
Fig. 66
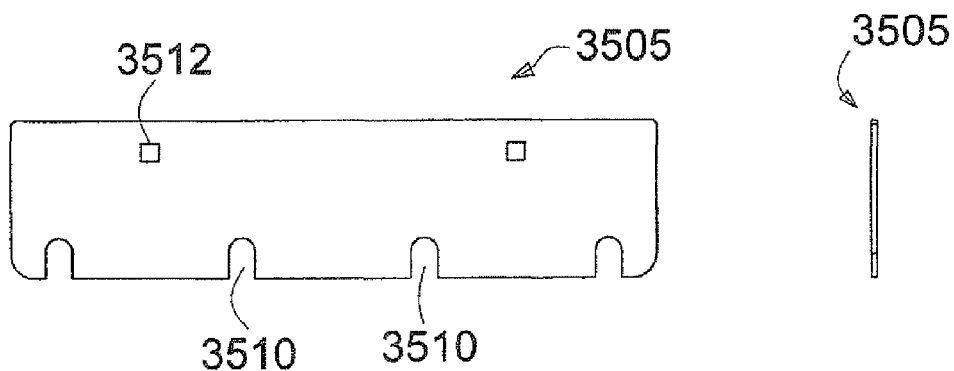
Fig. 65
Fig. 67

WHEELED SHOVELS

CROSS-REFERENCE TO RELATED APPLICATIONS

This application is a continuation of U.S. patent application Ser. No. 11/495,916 filed Jul. 27, 2006 (issuing as U.S. Pat. No. 7,681,336, on Mar. 23, 2010).

In turn, U.S. patent application Ser. No. 11/495,916 is a continuation-in-part of the following four applications:
  (1) U.S. patent application Ser. No. 10/808,841 filed Mar. 25, 2004 (now U.S. Pat. No. 7,111,418 issued Sep. 26, 2006), which, in turn, claims the benefit of U.S. Provisional Patent Application No. 60/539,066 filed Jan. 26, 2004; and
  (2) U.S. Design patent application No. 29/234,046 filed Jul. 13, 2005 (now U.S. Design Pat. D543,807 issued Jun. 5, 2007); and
  (3) U.S. Design patent application No. 29/240,981 filed Oct. 20, 2005 (now U.S. Design Pat. D555,565 issued Nov. 20, 2007); and
  (4) U.S. Design patent application No. 29/240,982 filed Oct. 20, 2005 (now U.S. Design Pat. D546,144 issued Jul. 10, 2007).

U.S. patent application Ser. No. 11/495,916 also claimed the benefit of the following three applications:
  (1) U.S. Provisional Patent Application No. 60/711,798 filed Aug. 26, 2005; and
  (2) U.S. Provisional Patent Application No. 60/784,899 filed Mar. 22, 2006; and
  (3) PCT International Patent Application No. PCT/US2005/009347 filed Mar. 22, 2005.

The disclosures of the above applications are incorporated herein by reference.

FIELD

The present disclosure generally relates (but not exclusively) to manually-operated wheeled shovels.

BACKGROUND

The statements in this background section merely provide background information related to the present disclosure and may not constitute prior art.

Numerous manual wheeled vehicles have been in use to assist in transporting materials from one place to another. The age old wheelbarrow is, of course, well known but doesn't employ leverage. However, aside from transporting alone, loading onto and unloading of materials from a vehicle easily and with minimum stress and strain to the human body have required different approaches. This has been true for shoveling or plowing snow, including wet and heavy slushy snow.

Generally, there are two common types of snow shovels. One type involves lifting and throwing of the snow, and the other involves pushing of the snow like plowing. In general, snow shovels are typically sold by stores only during select periods of time (e.g., during winter, immediately after a snowfall, etc.) and must be stored. Additionally, a user will typically only use a snow shovel at select times and must store the snow shovel when not in use. Snow shovels, however, are typically irregular in shape and can often be difficult to easily store. And, while some snow shovels may include arrangements for collapsing or folding a portion of their structure or removing a long handle portion, existing structures often require considerable and often irregular storage arrangements.

SUMMARY

According to various aspects of the present disclosure, there are provided various exemplary embodiments of wheeled shovels. Other aspects relate to components of wheeled shovels. Further aspects relate to methods of using wheeled shovels. Additional aspects relate to methods of making wheeled shovels and/or the components thereof.

In one exemplary embodiment, a wheeled shovel generally includes a wheel assembly having an axle and a wheel. The wheeled shovel also includes a frame having an upper portion and a lower portion. The frame is disposed relative to the axle such that the axle is operable as a fulcrum about which the frame may pivot. A handle is disposed at about the upper portion of the frame. A shovel blade is disposed at about the lower portion of the frame. The wheel assembly, frame, handle, and shovel blade are cooperatively configured so as to enable the wheeled shovel to throw a load of material generally upwardly and forwardly away from the shovel blade in response to a sufficient force applied to the handle for pivoting the frame relative to the axle with a recoil generated through the fulcrum at the axle.

In another exemplary embodiment, a wheeled shovel generally includes a wheel assembly having an axle and a wheel. The wheeled shovel also includes a driving member having an upper portion, a middle portion, and a lower portion. The middle portion is adjacent the axle. The axle has longitudinal adjustability relative to the middle portion, which can allow selective adjustment to the axle longitudinal positioning without substantially changing the axle height relative to a horizontal surface supporting the wheeled shovel.

In another exemplary embodiment, a wheeled shovel generally includes a wheel assembly having an axle and a wheel. The wheeled shovel also includes a frame having an upper portion and a lower portion. The frame is disposed relative to the axle such that the axle is operable as a fulcrum about which the frame can pivot. A shovel blade is disposed at about the lower portion of the frame. The frame and the shovel blade are cooperatively configured to provide a shovel blade angle of attack, relative to a normal to the acceleration of the snow being thrown by the wheeled shovel, less than the angle of repose of the snow being thrown by the wheeled shovel. This, in turn, can inhibit the sliding of snow off the shovel blade during the throwing motion.

In another exemplary embodiment, a collapsible wheeled shovel generally includes a wheel assembly having an axle and a wheel. The wheeled shovel also includes a frame having an upper frame portion and a lower frame portion. A handle is disposed at about the upper frame portion. A shovel blade is disposed at about the lower frame portion. At least one linking member, adjacent the axle, hingedly connects the upper frame portion to the lower frame portion such that the upper frame portion is pivotably movable relative to the lower frame portion between at least a closed, collapsed configuration and an open, ready-for-use configuration. In the closed, collapsed configuration, the upper frame portion is alongside the lower frame portion such that the handle is adjacent the shovel blade. In the open, ready-for-use configuration, the upper frame portion is generally upwardly and rearwardly from the lower frame portion such that the handle is above and rearward of the shovel blade.

In another exemplary embodiment, a wheeled shovel generally includes a wheel assembly having an axle and a wheel. The wheeled shovel also includes a frame having an upper portion and a lower portion. The frame is disposed relative to the axle such that the axle is operable as a fulcrum about which the frame can pivot. A handle is disposed at about the upper portion of the frame. A shovel blade is disposed at about the lower portion of the frame. The handle position is adjustable through an extendable and rotatable connection to the frame such that the handle can be slidably pulled out, slidably pushed in, and rotated relative to the frame for attachment to the frame at two or more different handle positions. The extendable and rotatable connection allows selective adjustment of at least one or more of the handle height, handle length, and leverage ratio of the wheeled shovel without substantially changing the axle height relative to a horizontal surface supporting the wheeled shovel. This also allows the wheeled shovel to be tailored for a particular user or conditions.

Further aspects and features of the present disclosure will become apparent from the detailed description provided hereinafter. In addition, any one or more aspects of the present disclosure may be implemented individually or in any combination with any one or more of the other aspects of the present disclosure. It should be understood that the detailed description and specific examples, while indicating exemplary embodiments of the present disclosure, are intended for purposes of illustration only and are not intended to limit the scope of the present disclosure.

DRAWINGS

The drawings described herein are for illustration purposes only and are not intended to limit the scope of the present disclosure in any way.

Figure 11A:
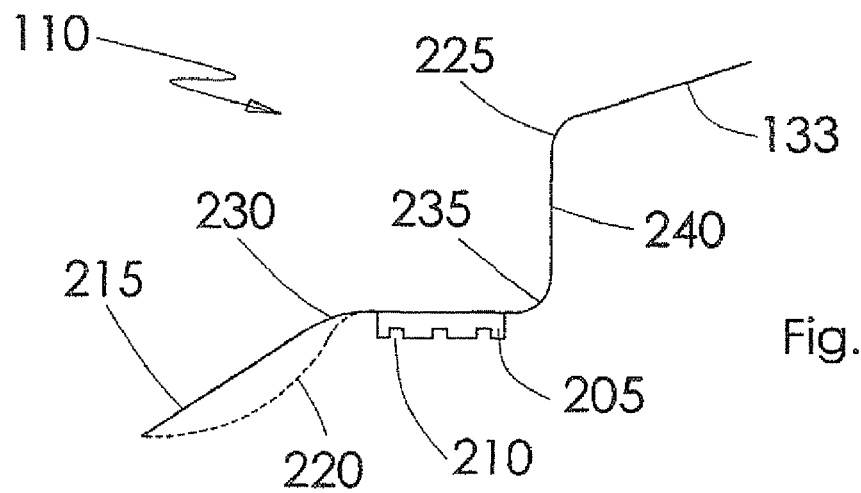
Figure 11B:
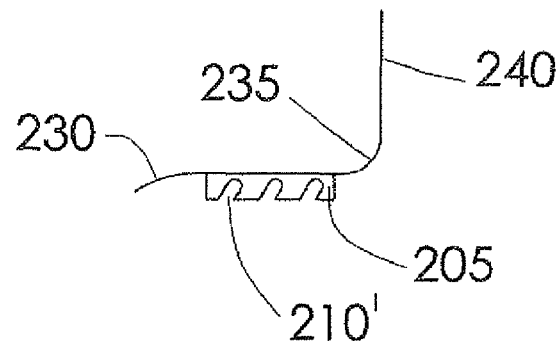
Figure 11C:
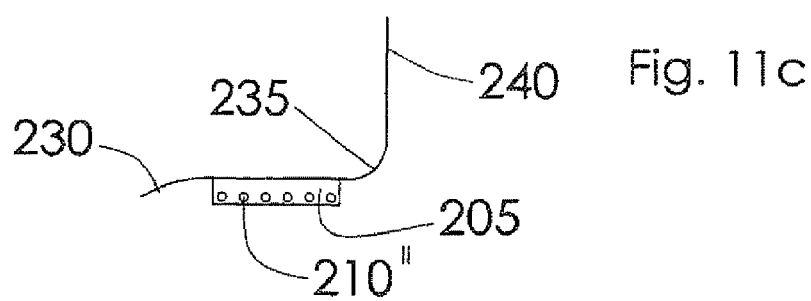
Figure 12:
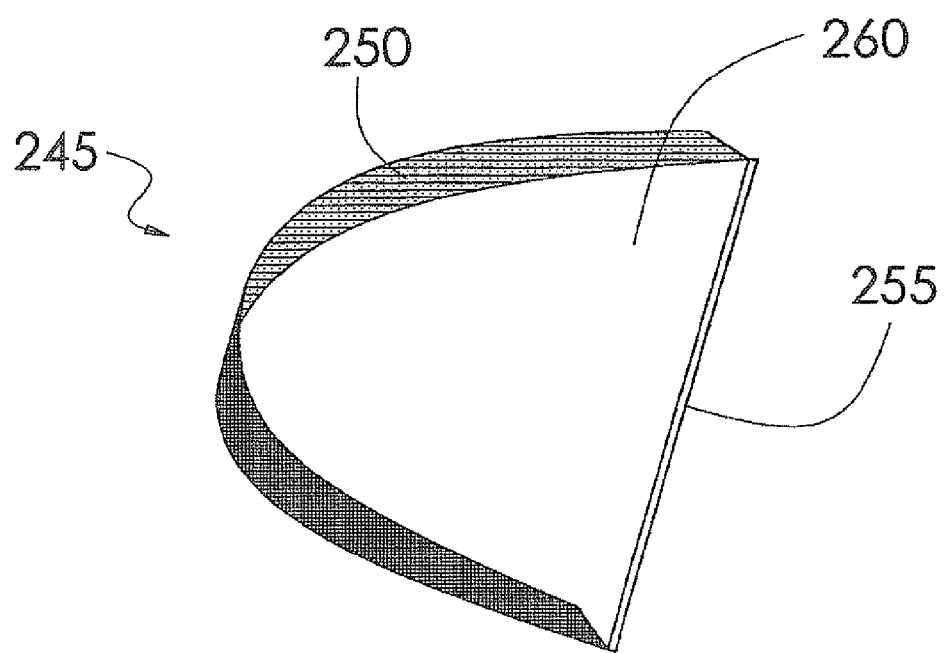
Figure 13:
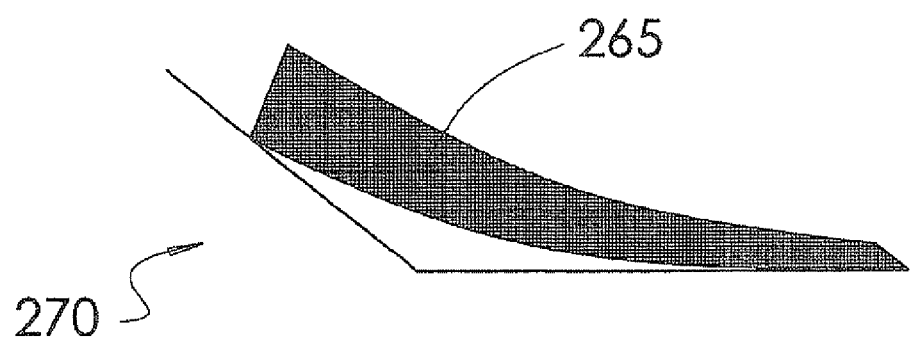
Figure 14:
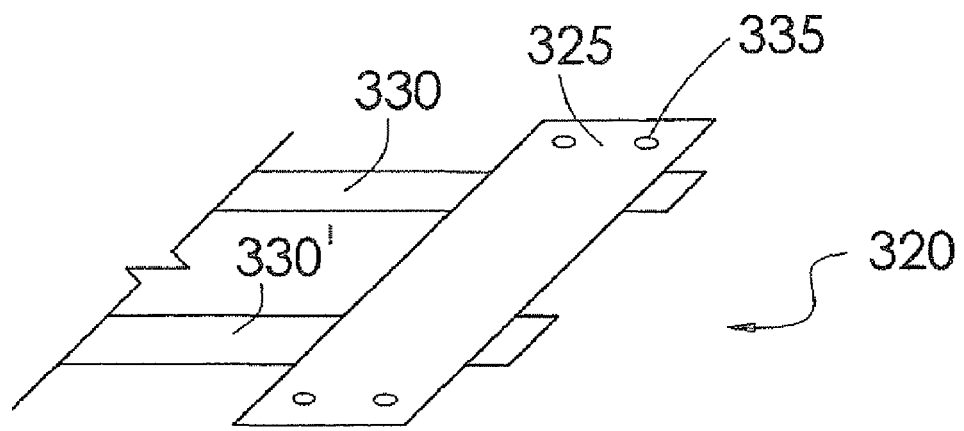
Figure 15:
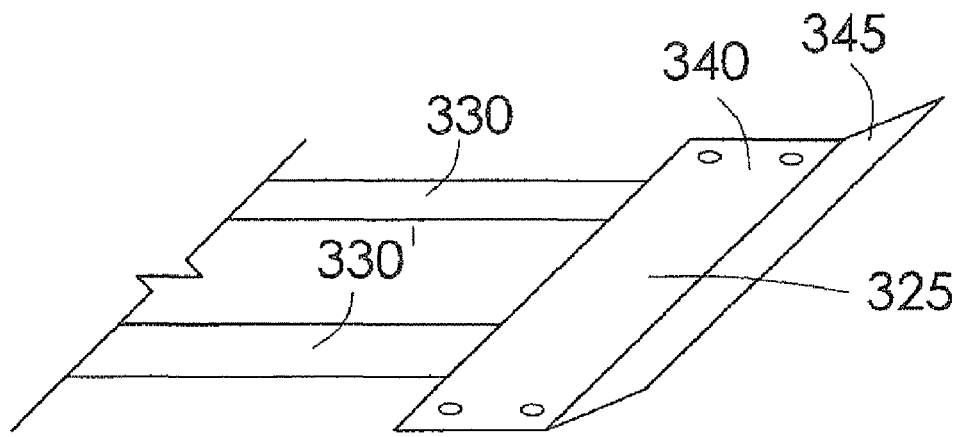
Figure 16:
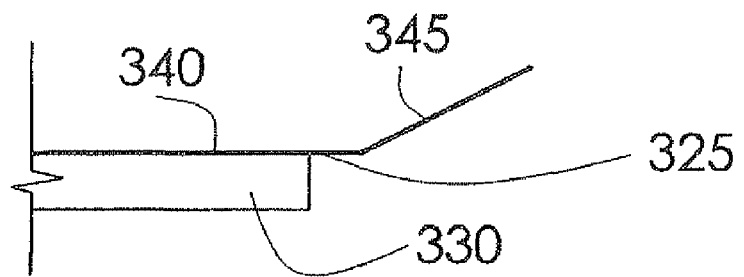
Figure 17:
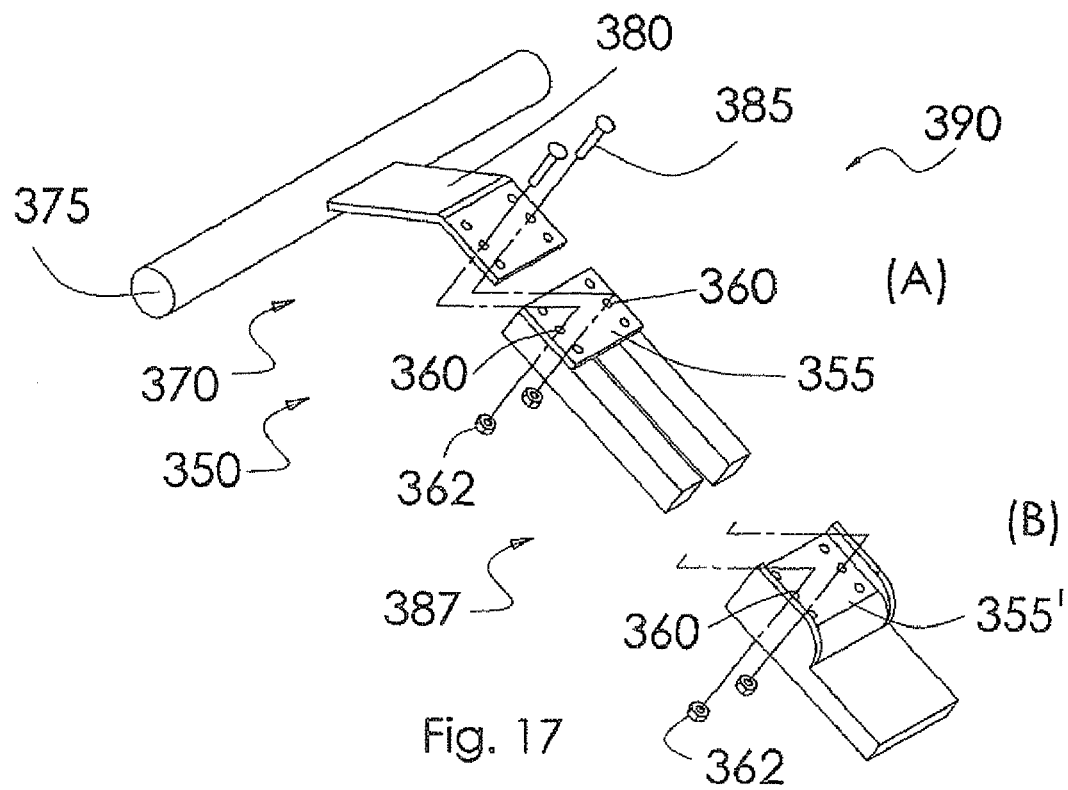
Figure 18:
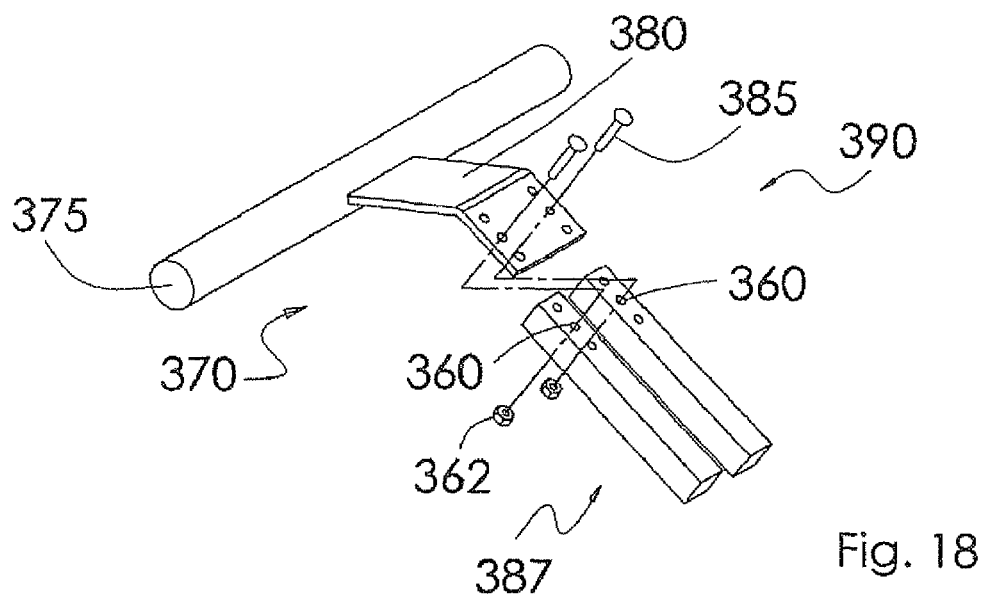
Figure 19:
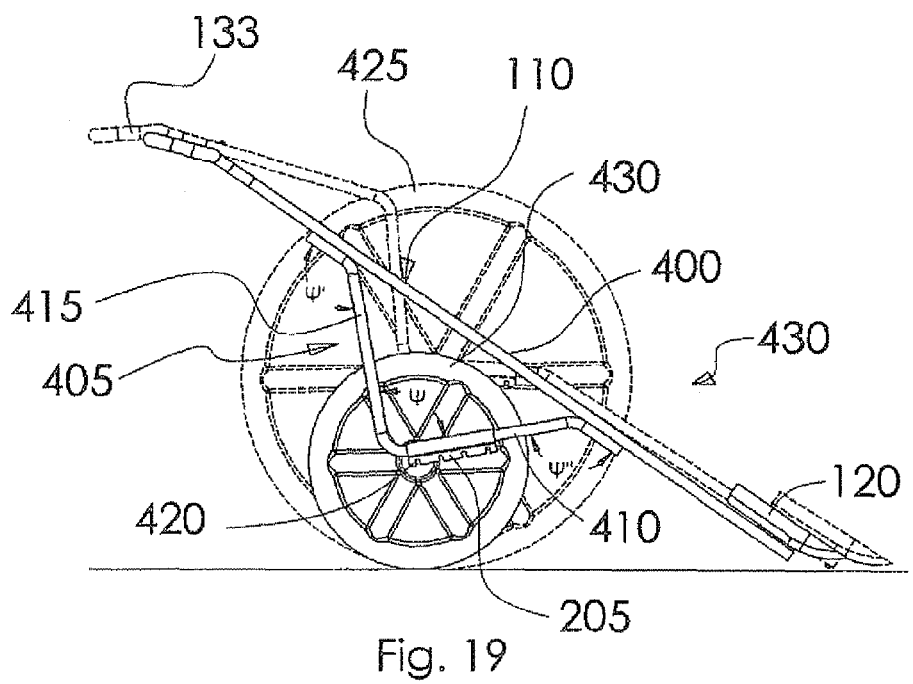
Figure 20:
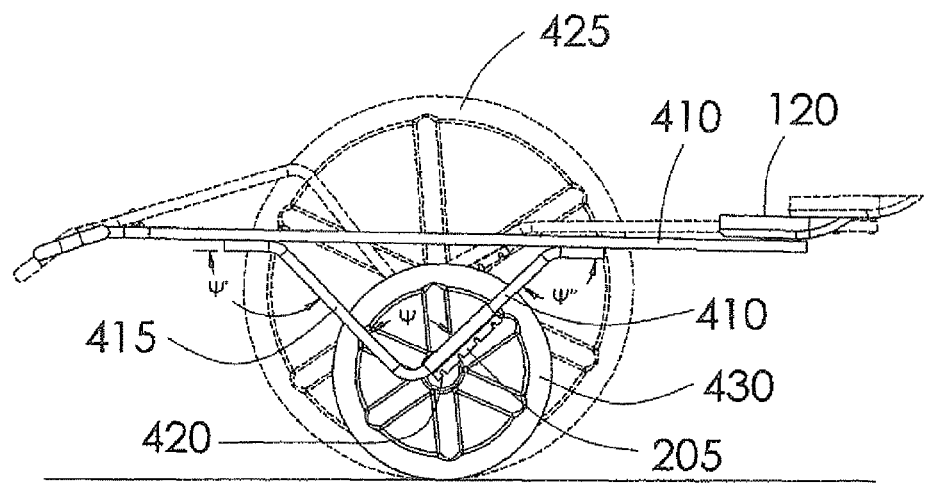
Figure 21:
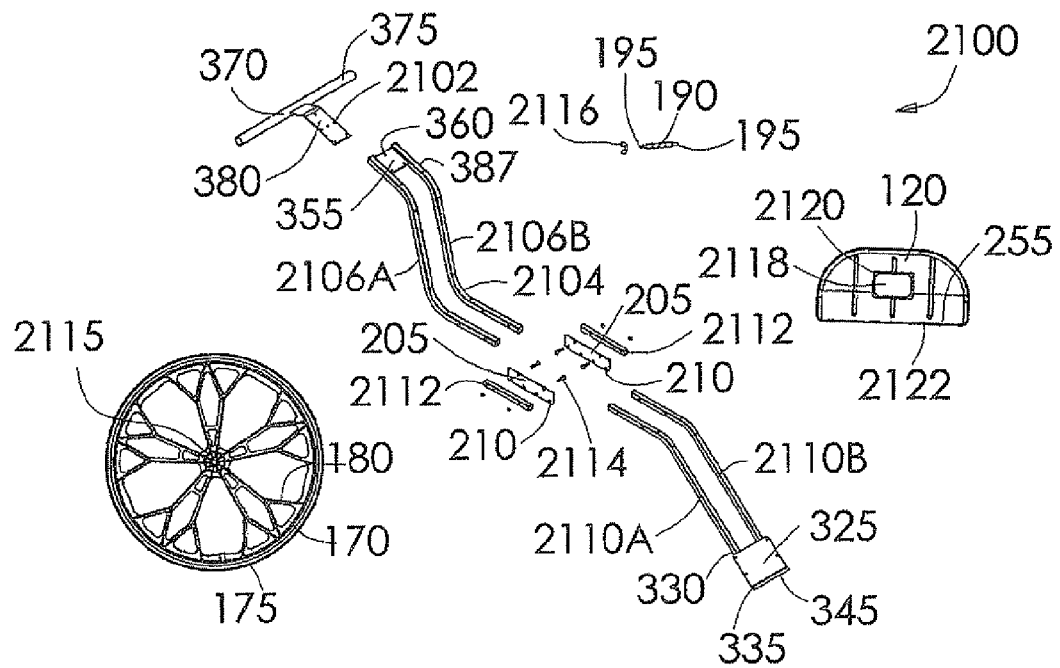
Figure 23:
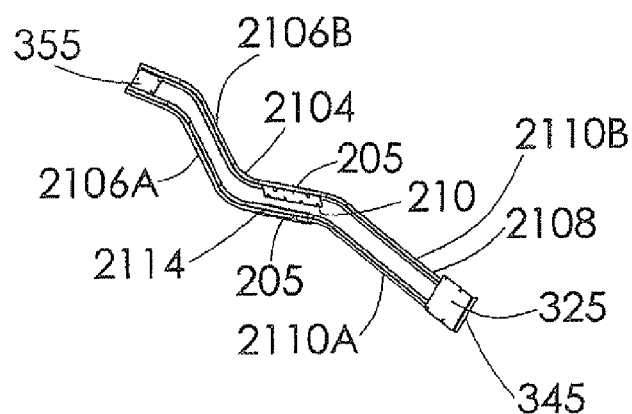
Figure 22:
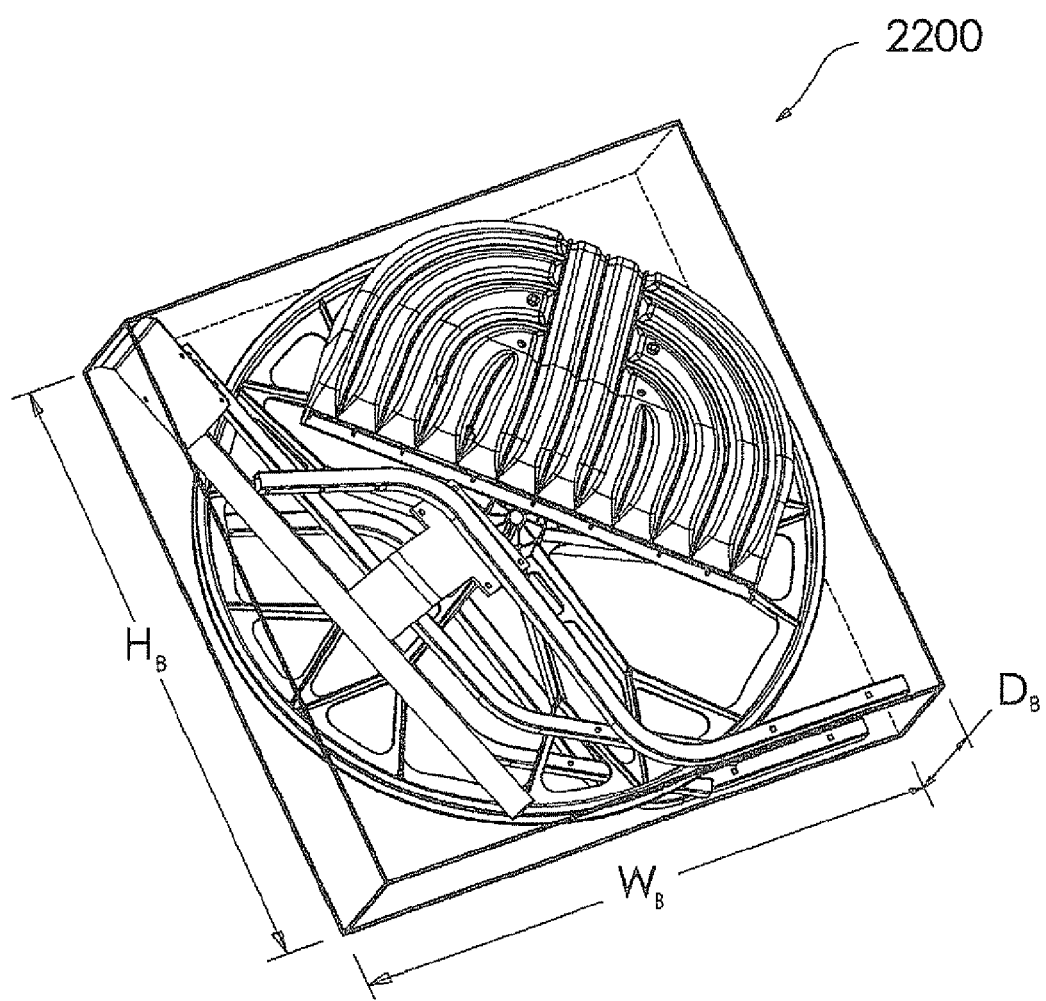
Figure 24:
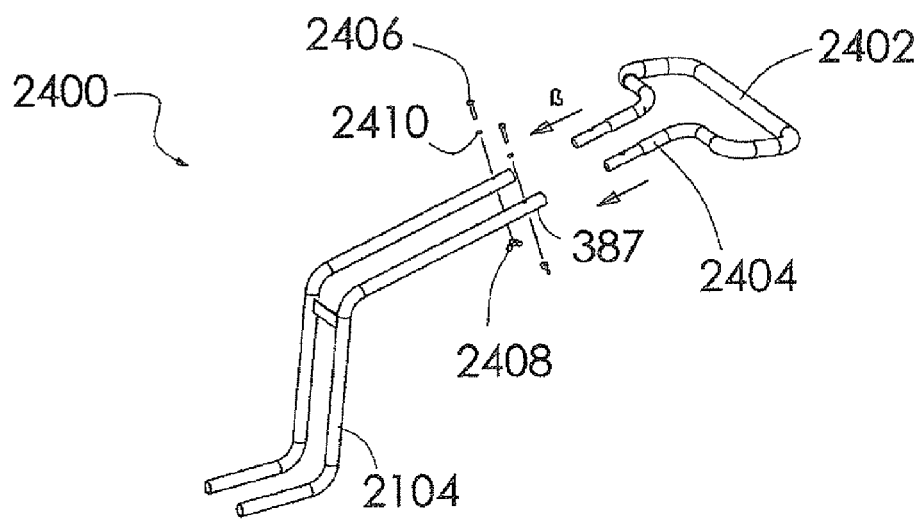
Figure 25:
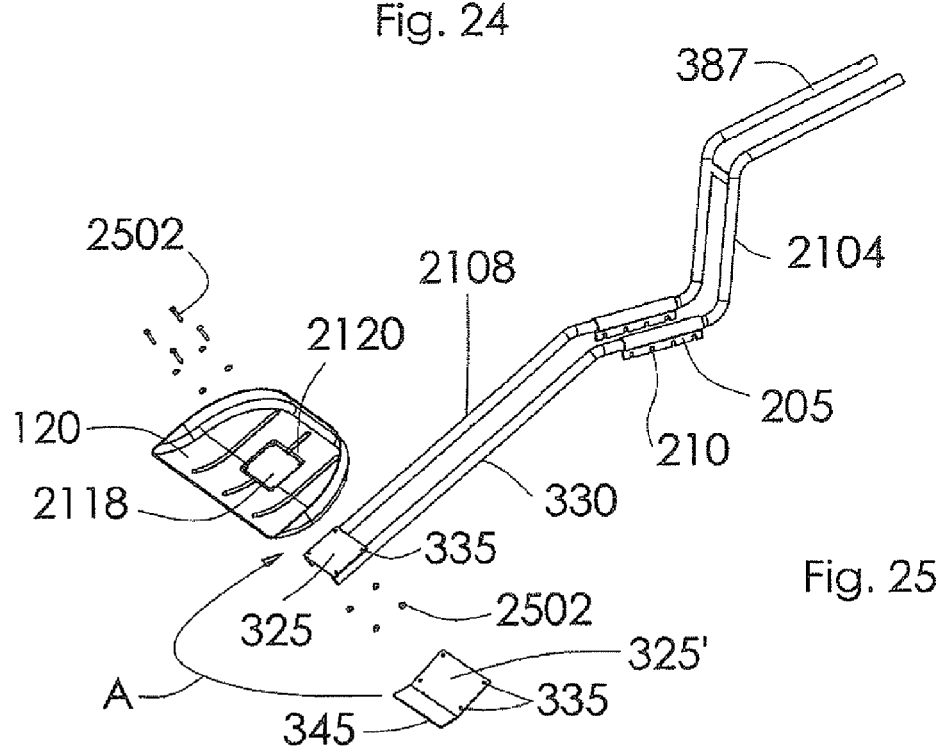
Figure 26:
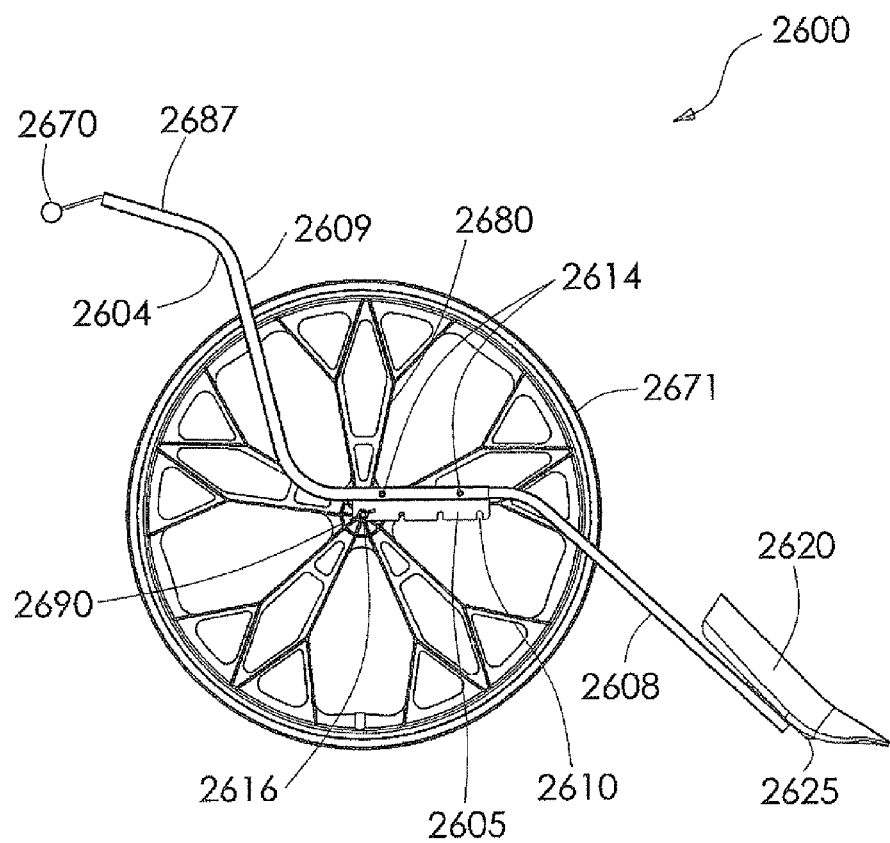
Figure 27:
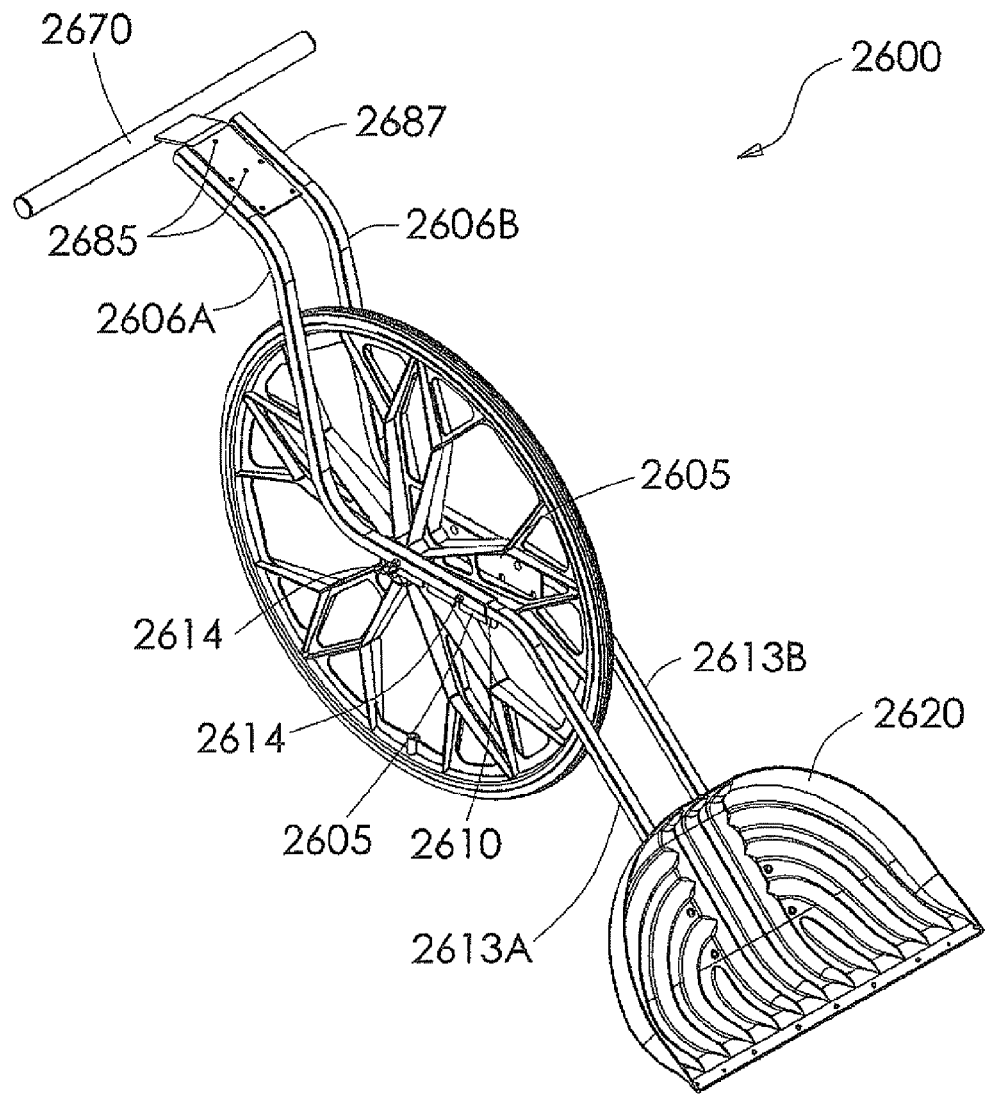
Figure 28:
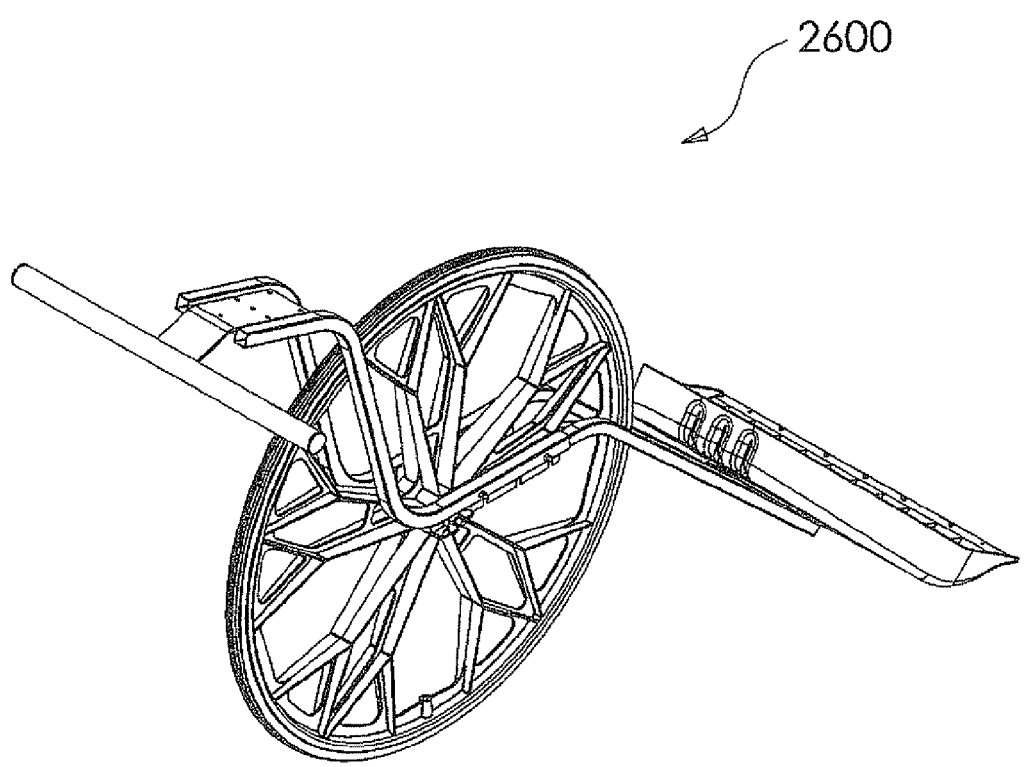
Figure 29:
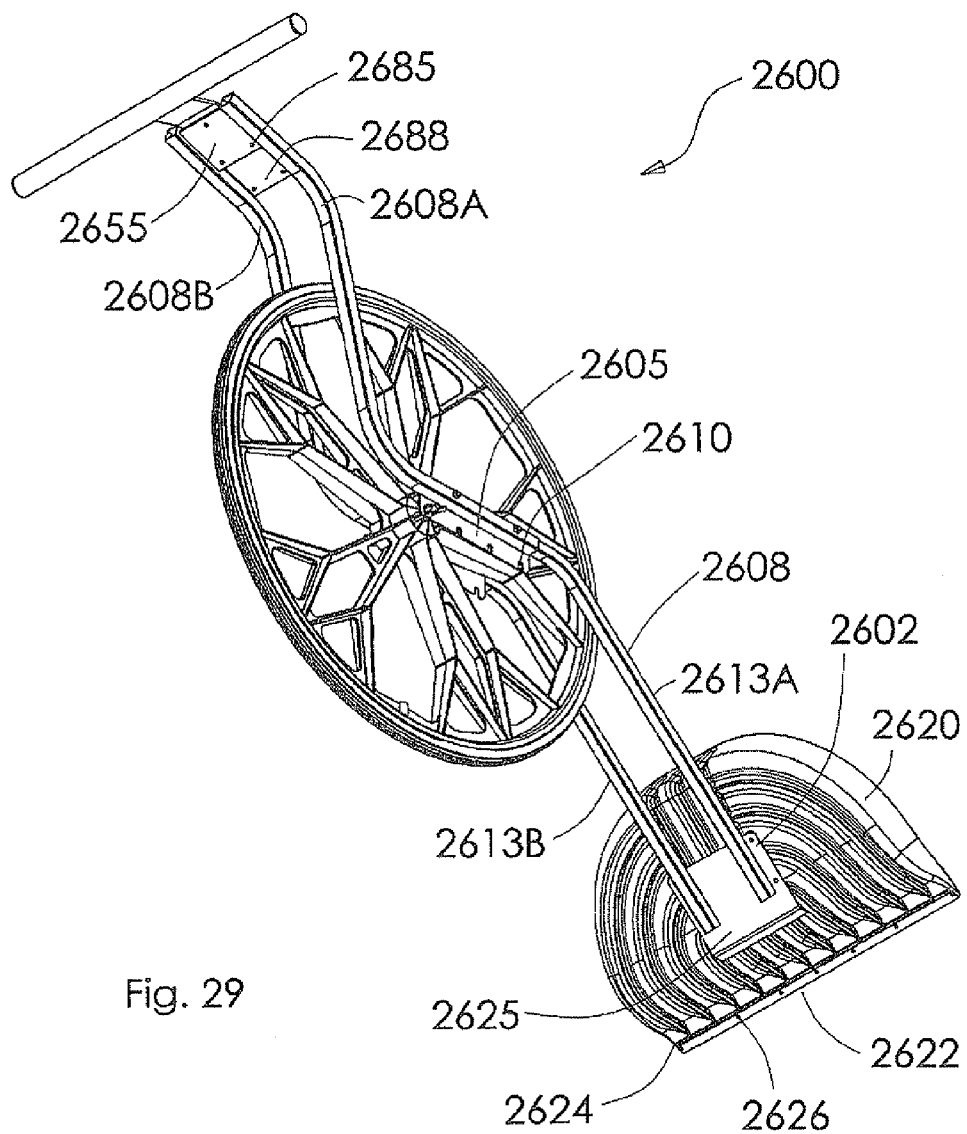
Figure 30:
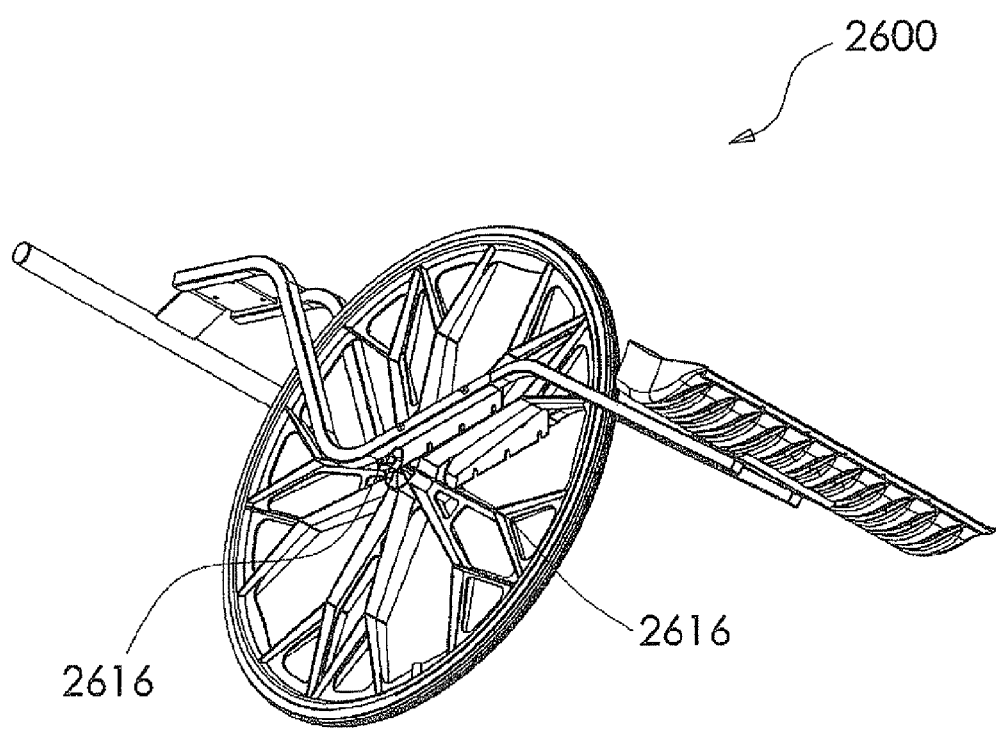
Figure 31:
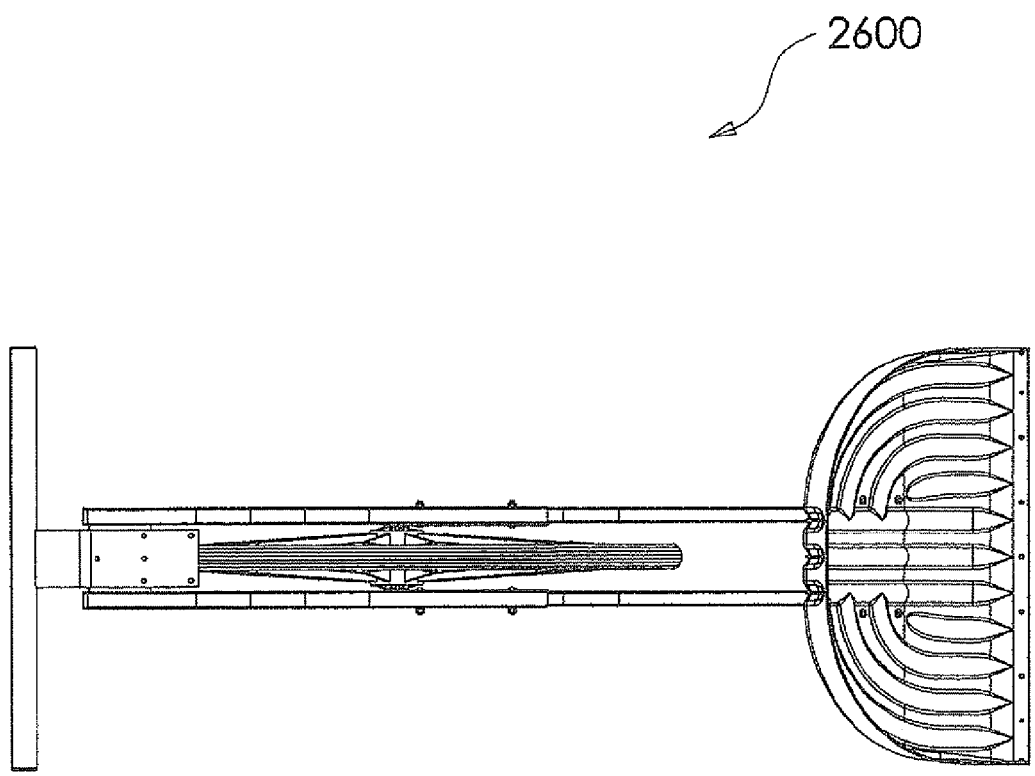
Figure 32:
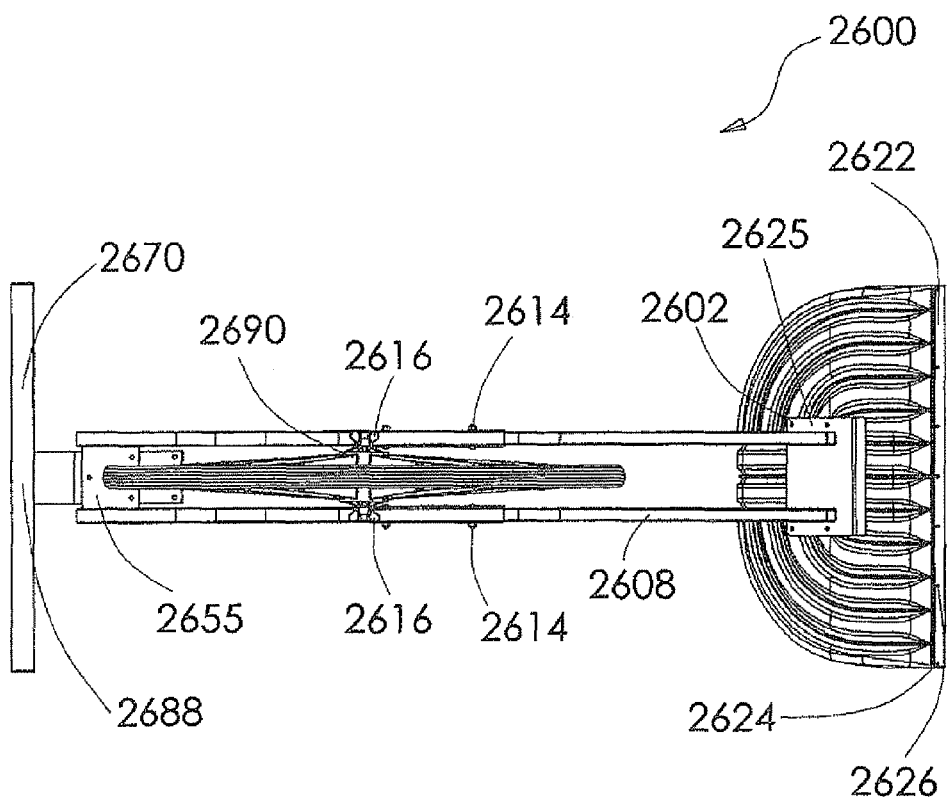
Figure 33:
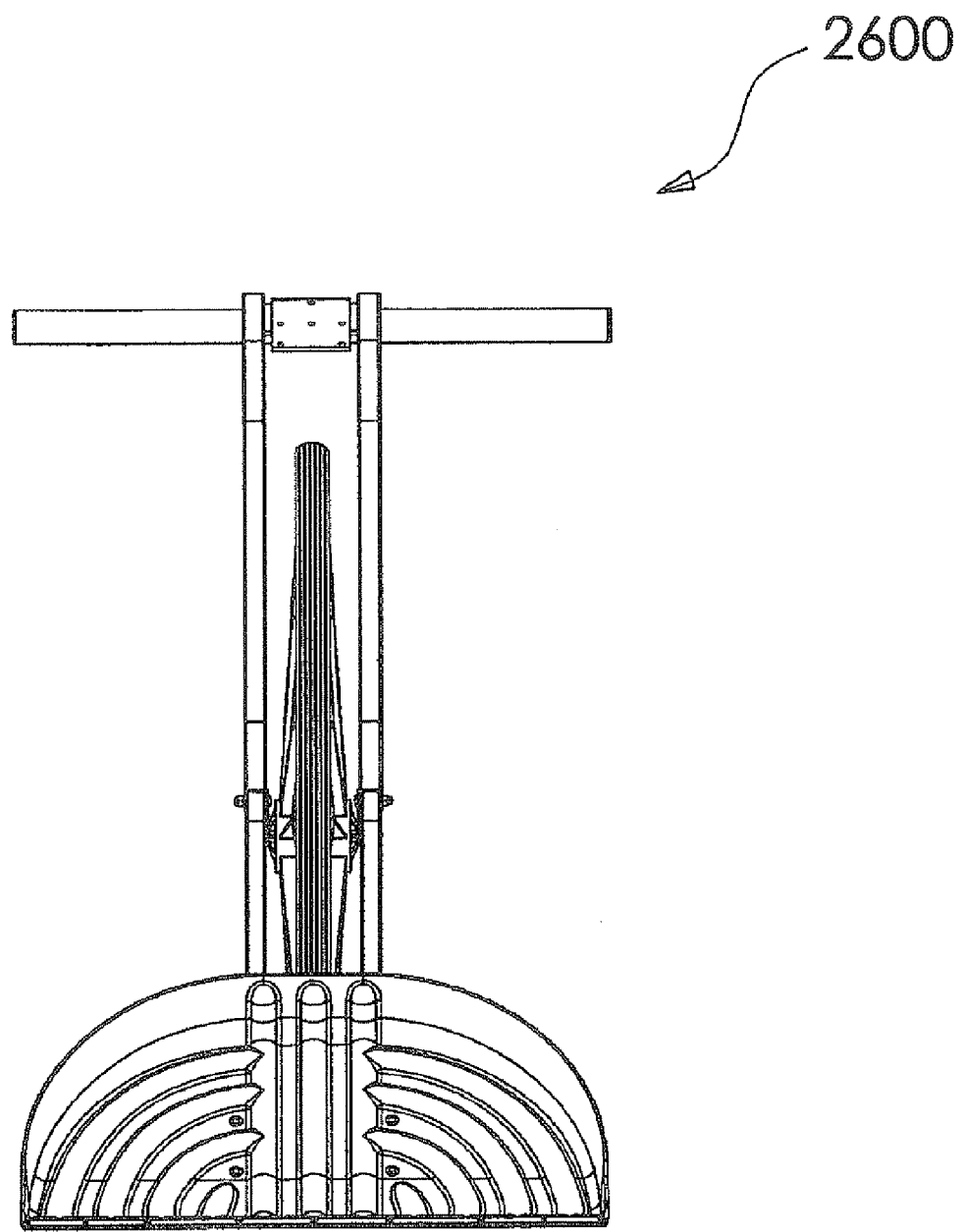
Figure 34:
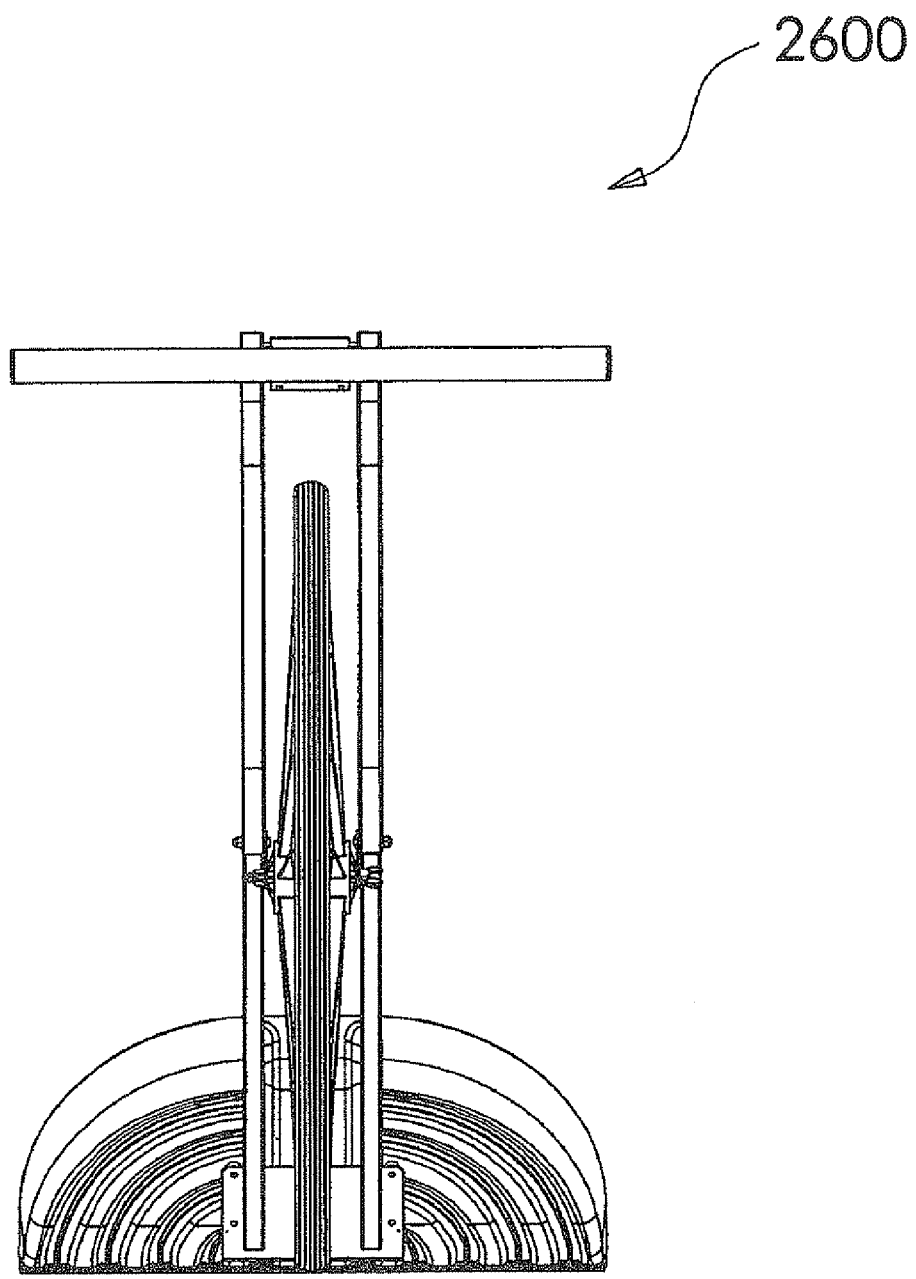
Figure 35:
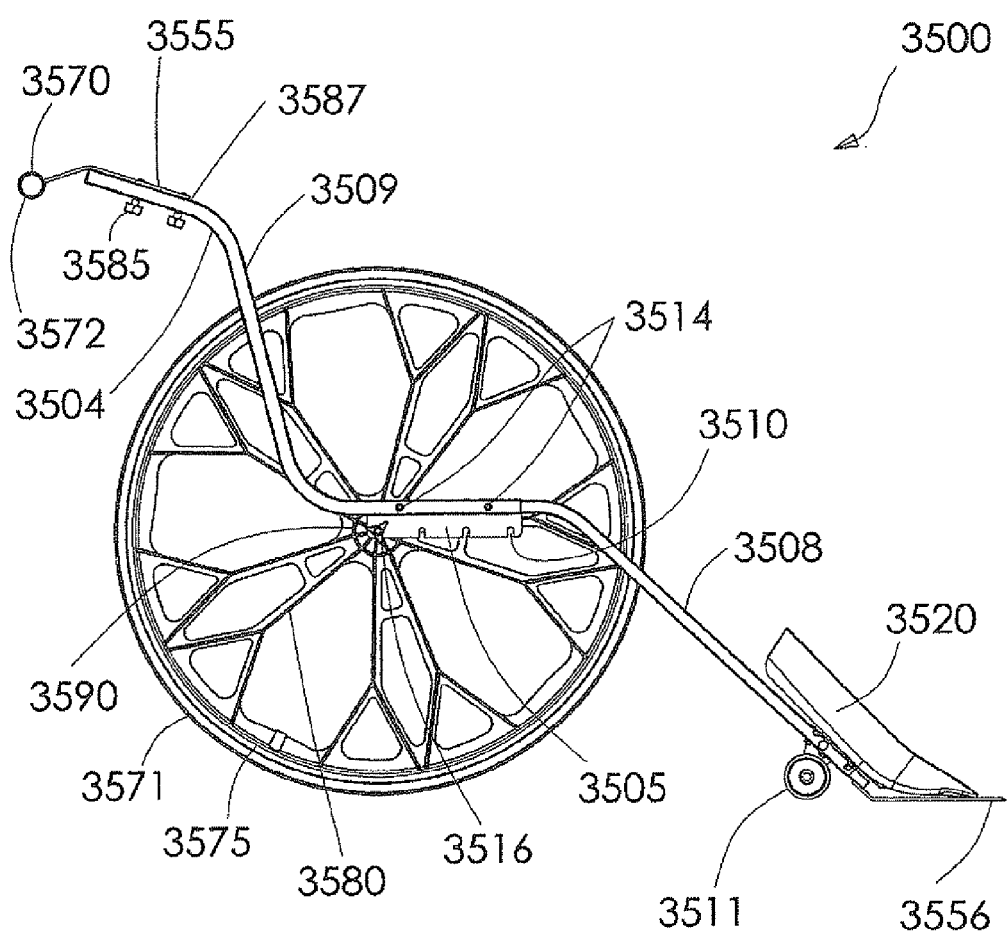
Figure 36:
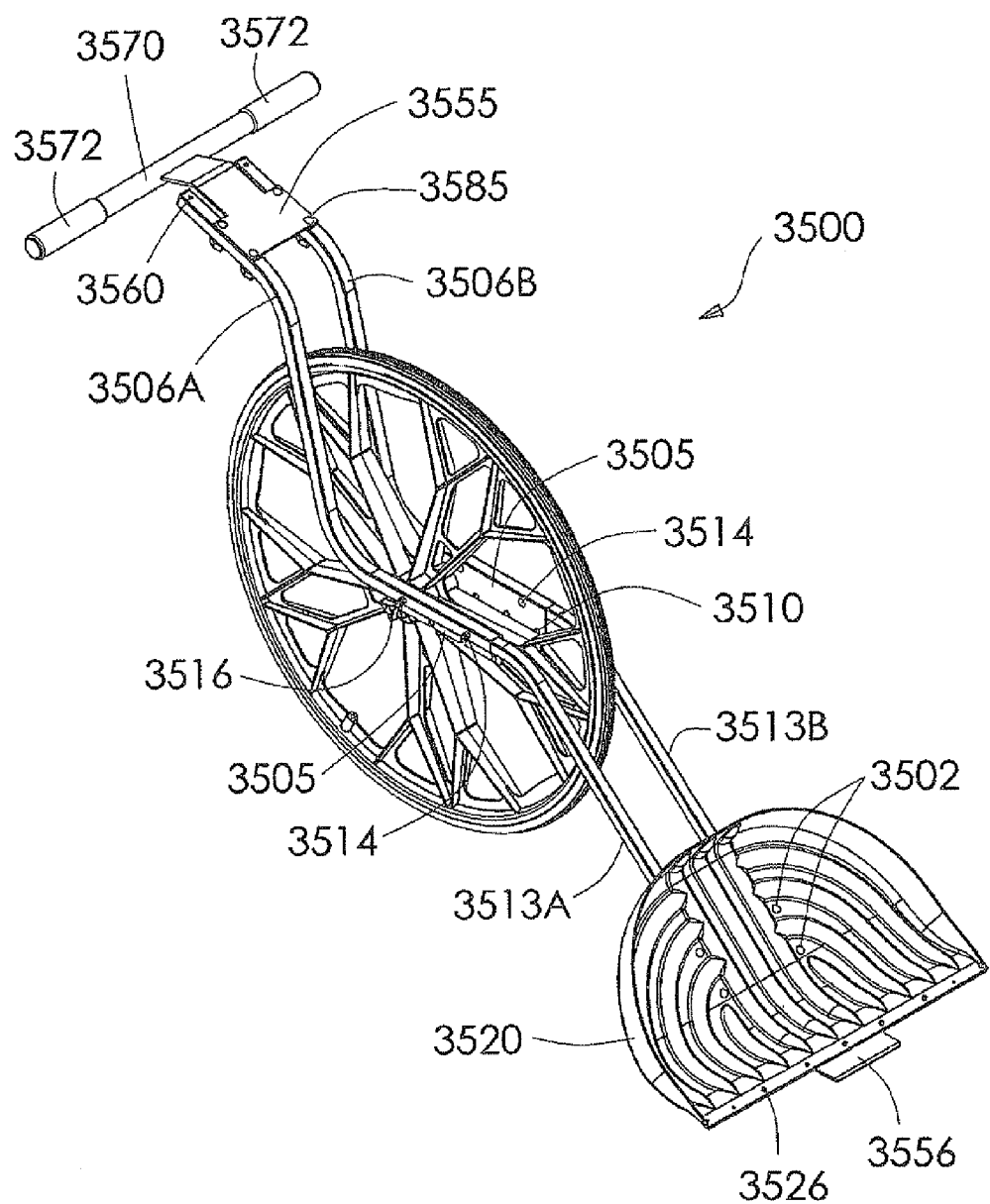
Figure 37:
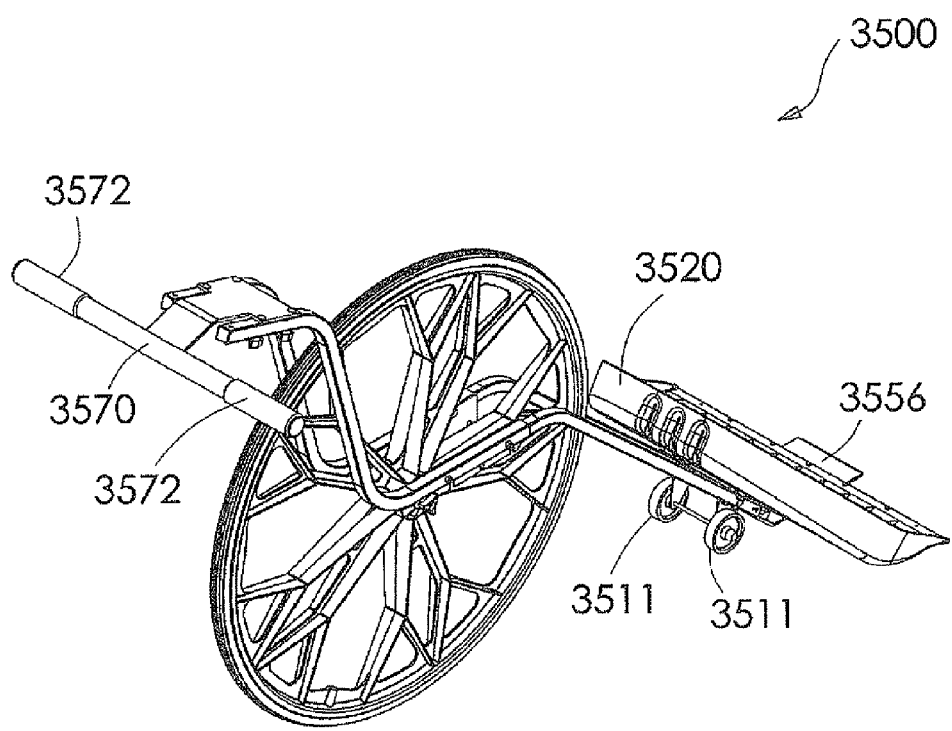
Figure 38:
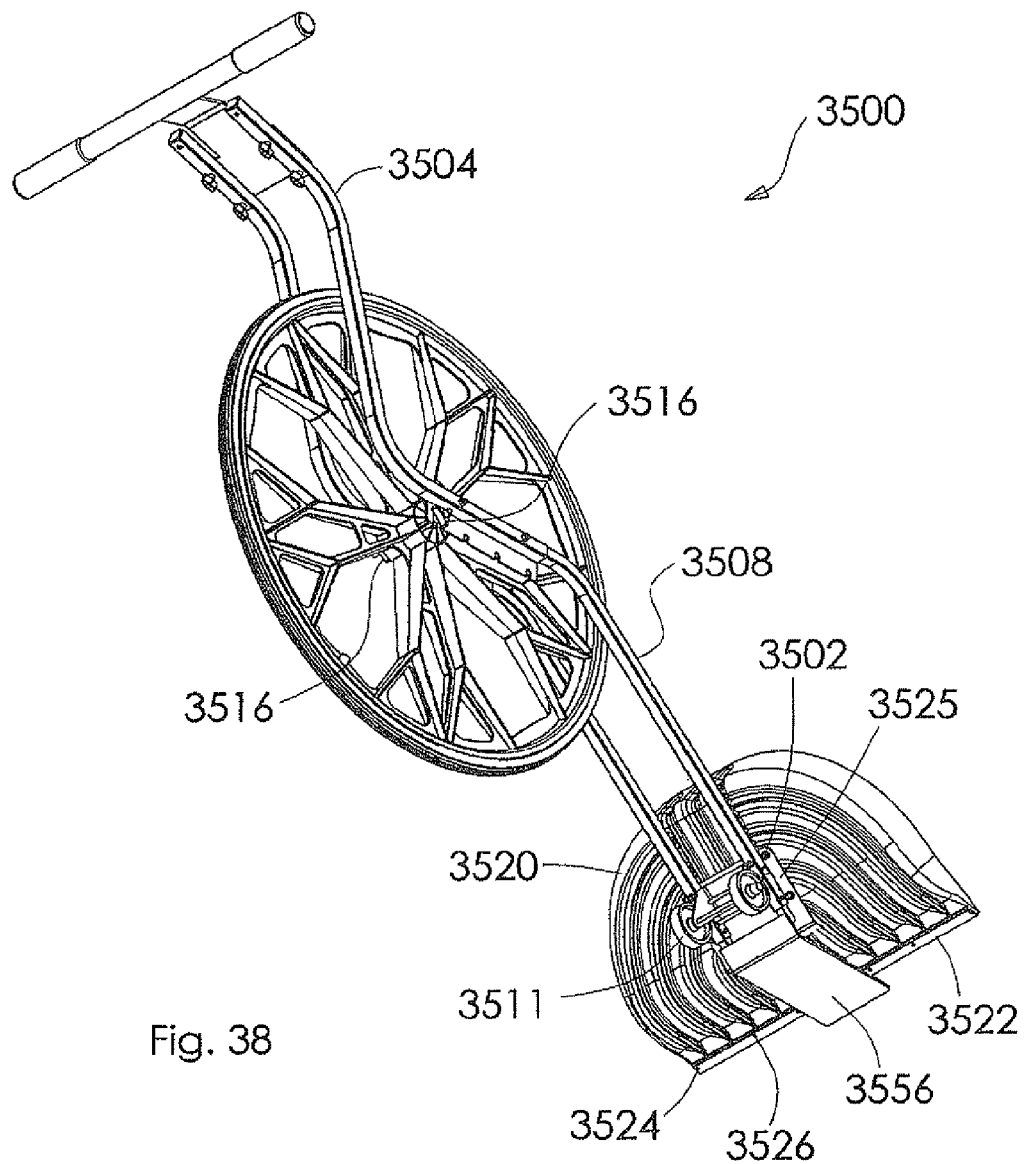
Figure 39:
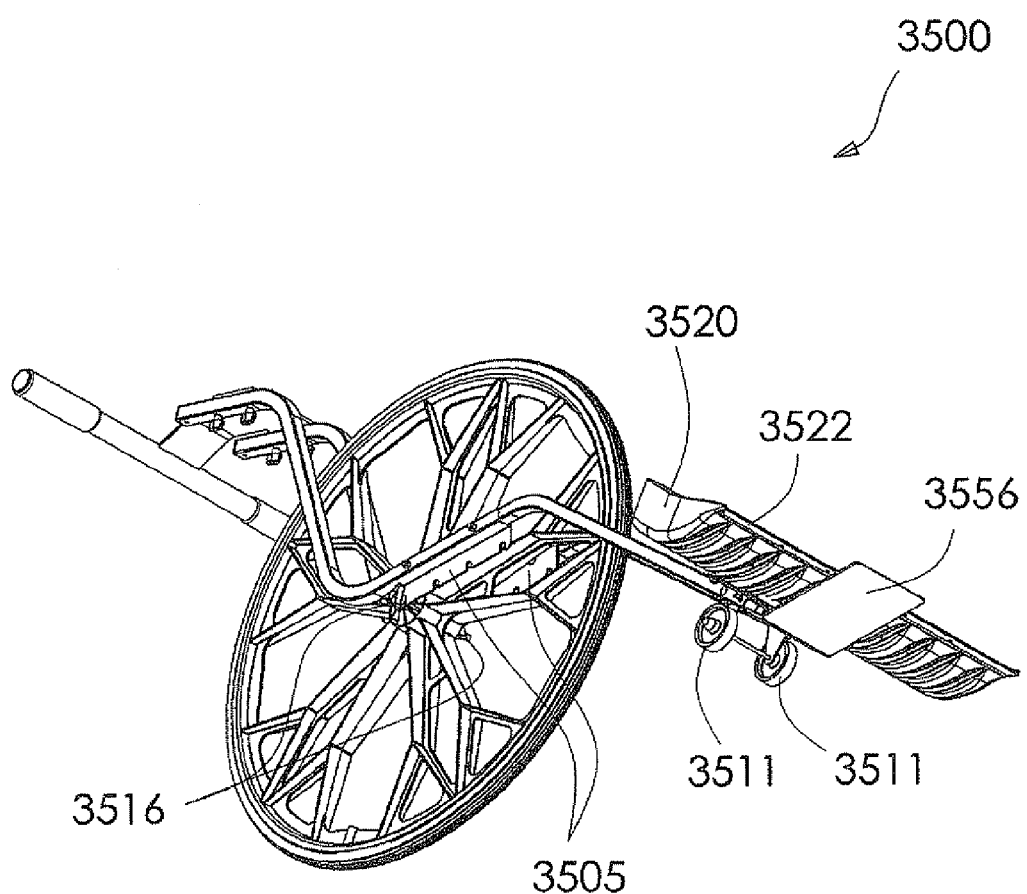
Figure 40:
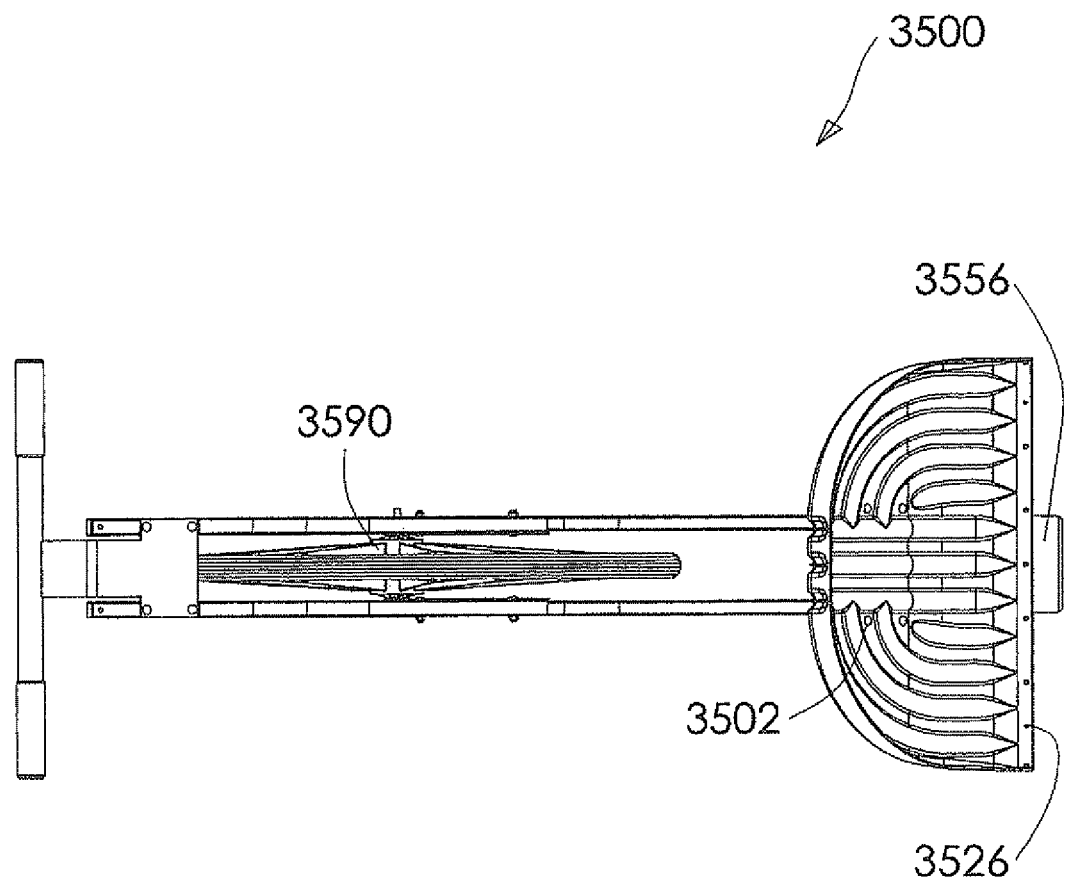
Figure 41:
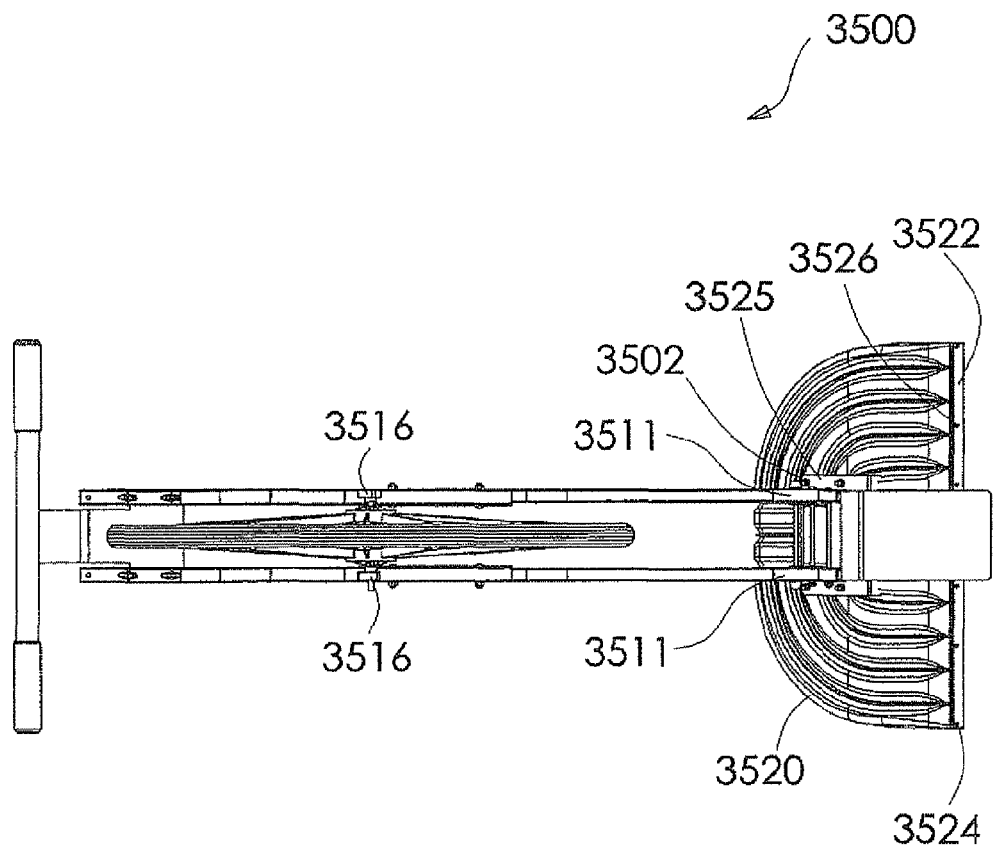
Figure 42:
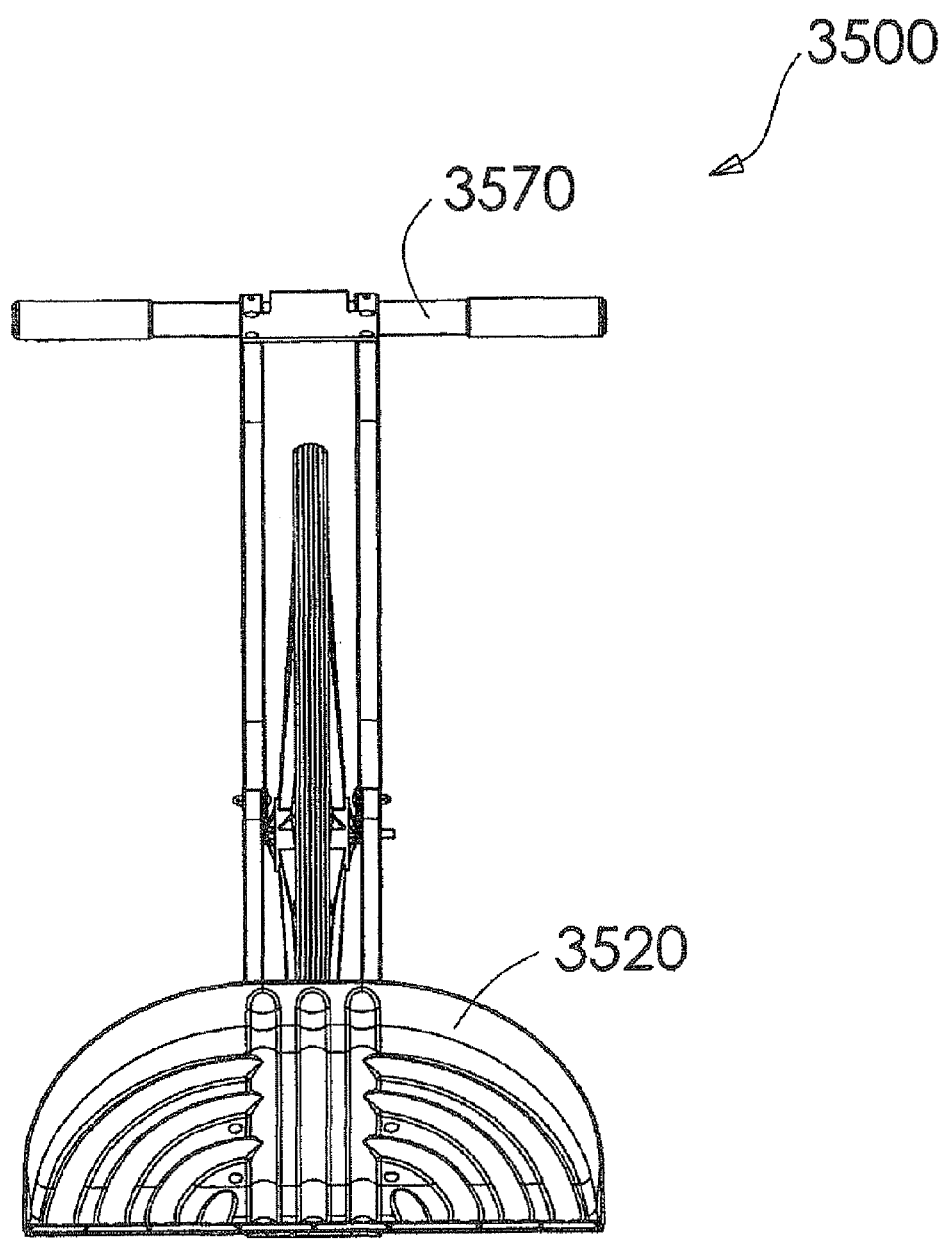
Figure 43:
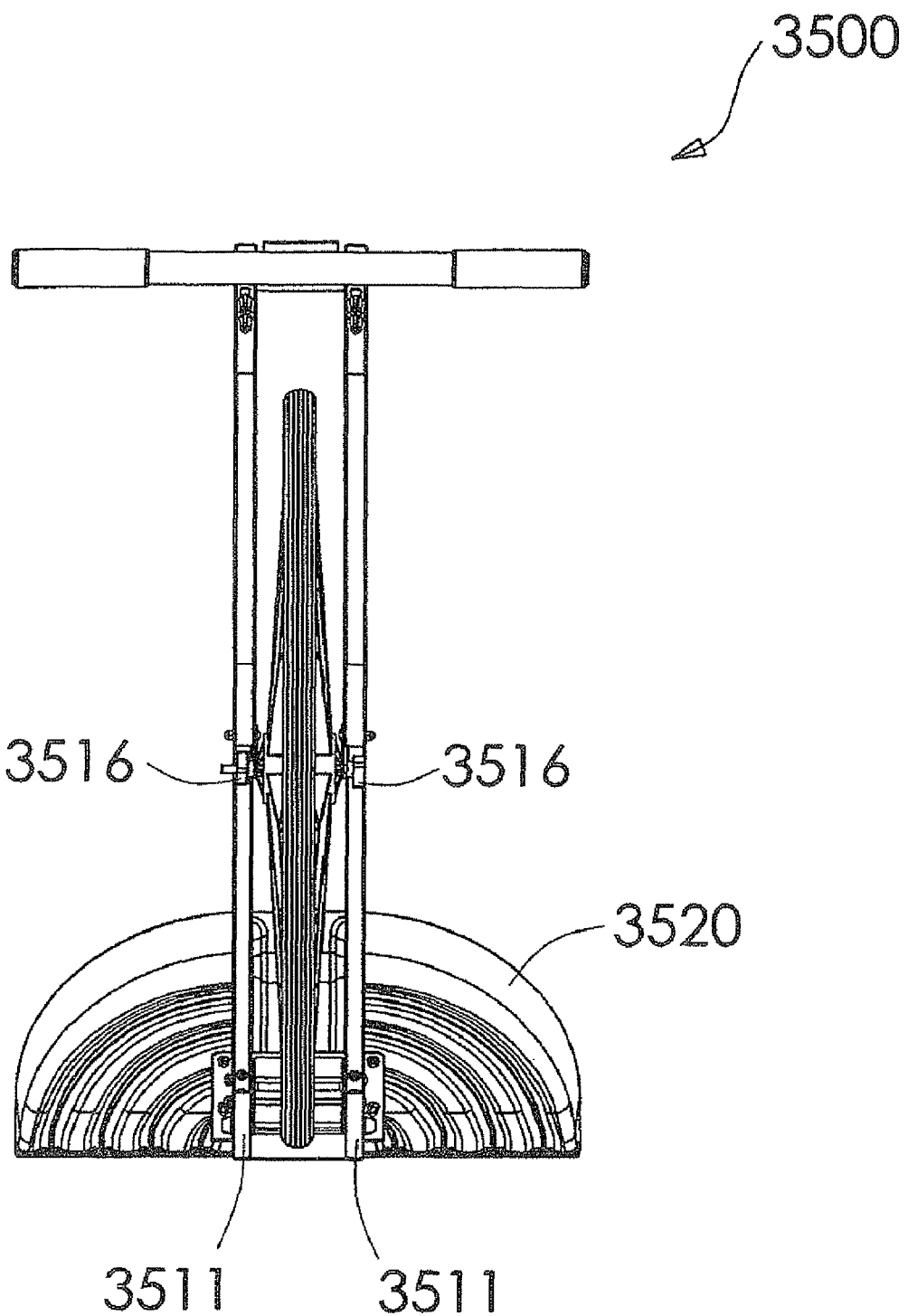
Figure 44:
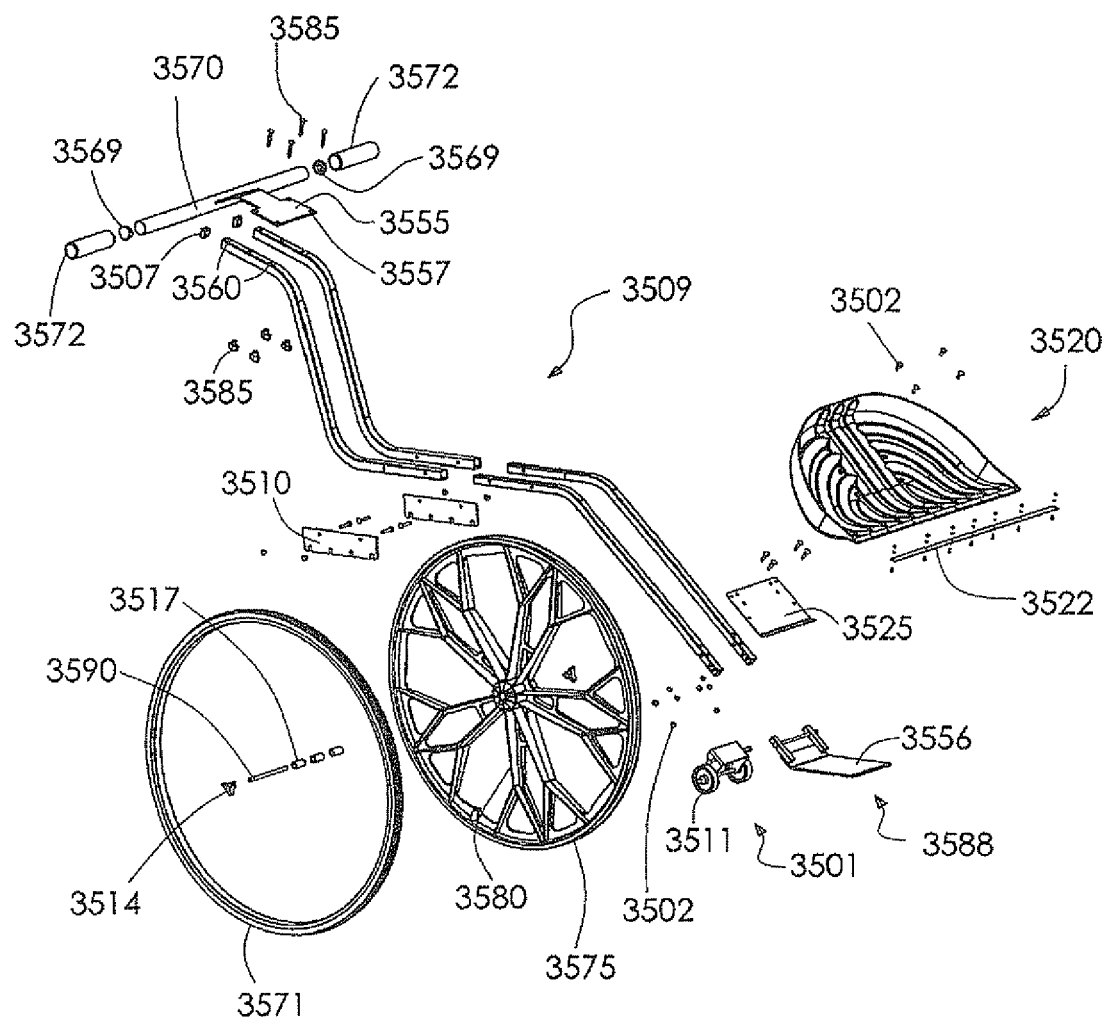
Figure 48:
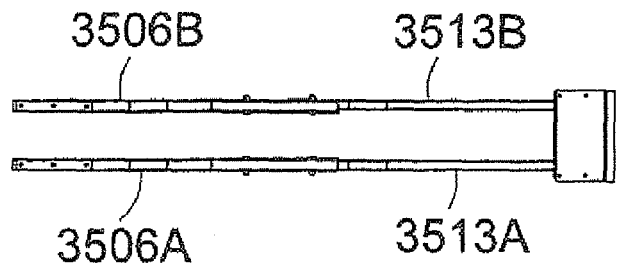
Figure 47:
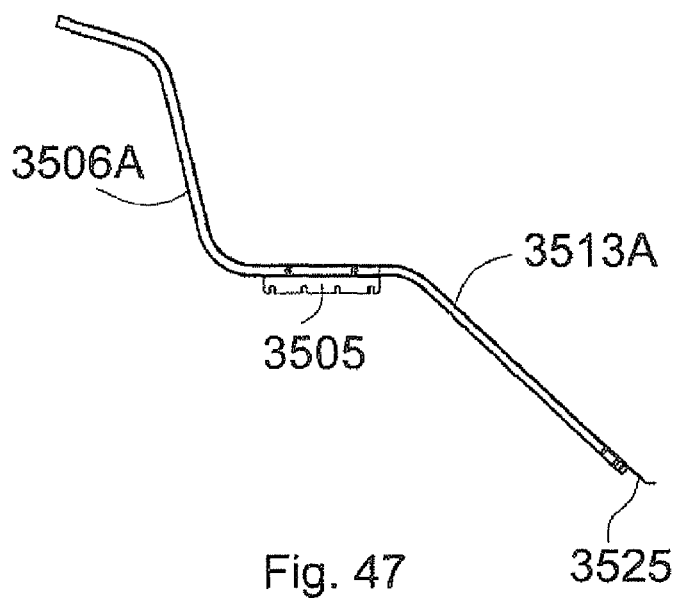
Figure 49:
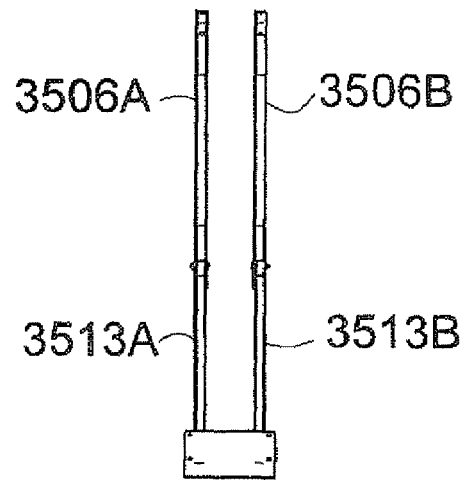
Figure 50:
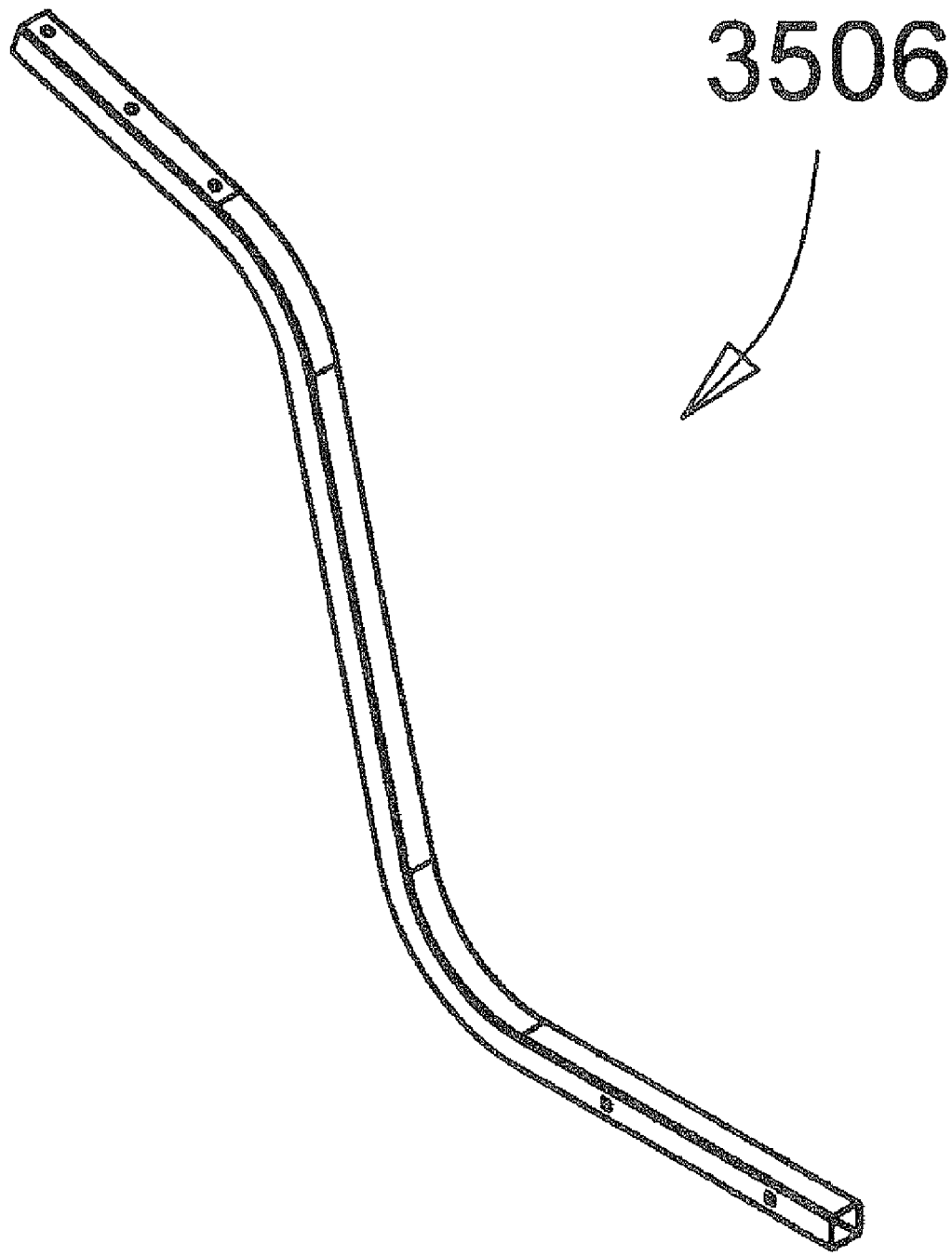
Figure 52:
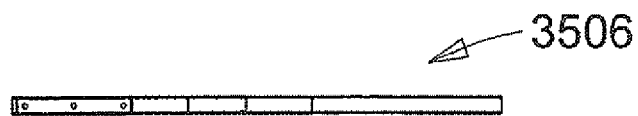
Figure 51:
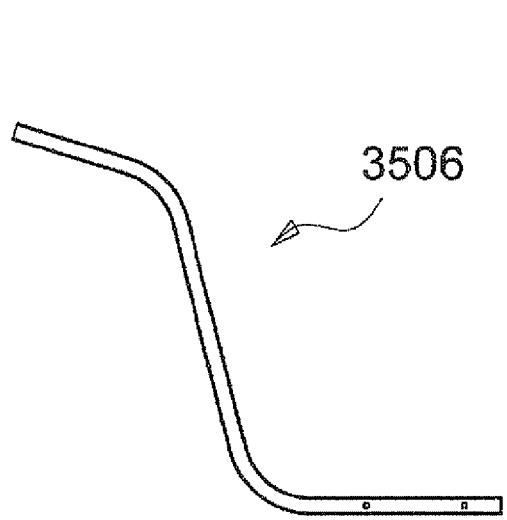
Figure 53:
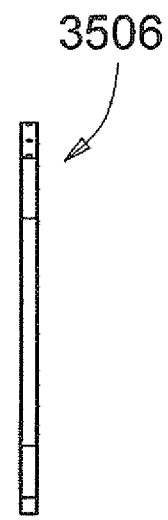
Figure 54:
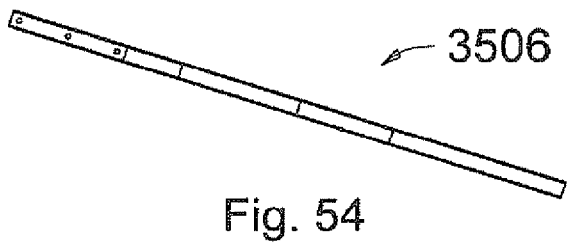
Figure 58:
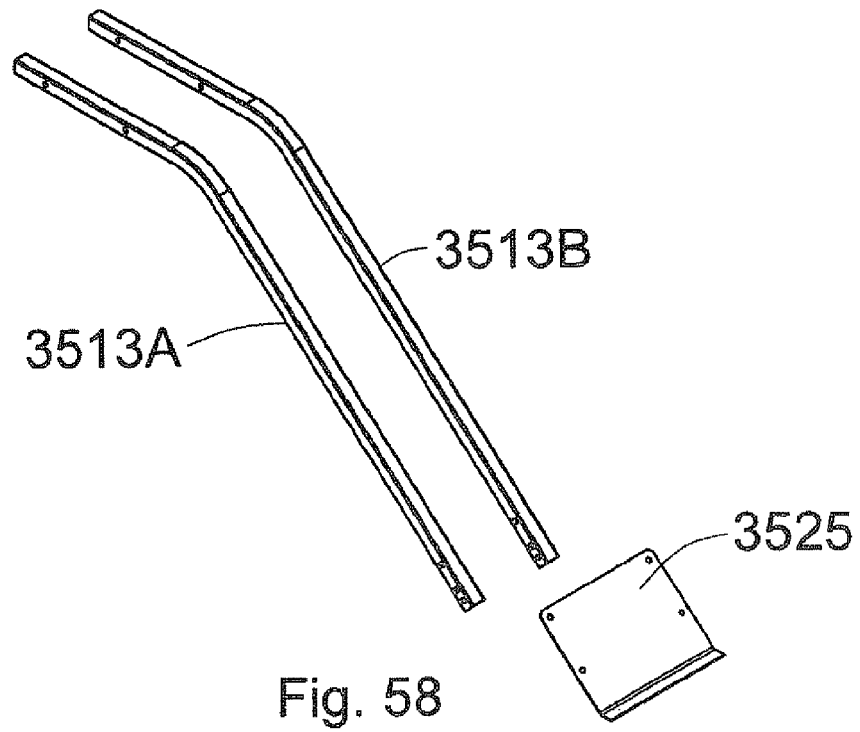
Figure 59:
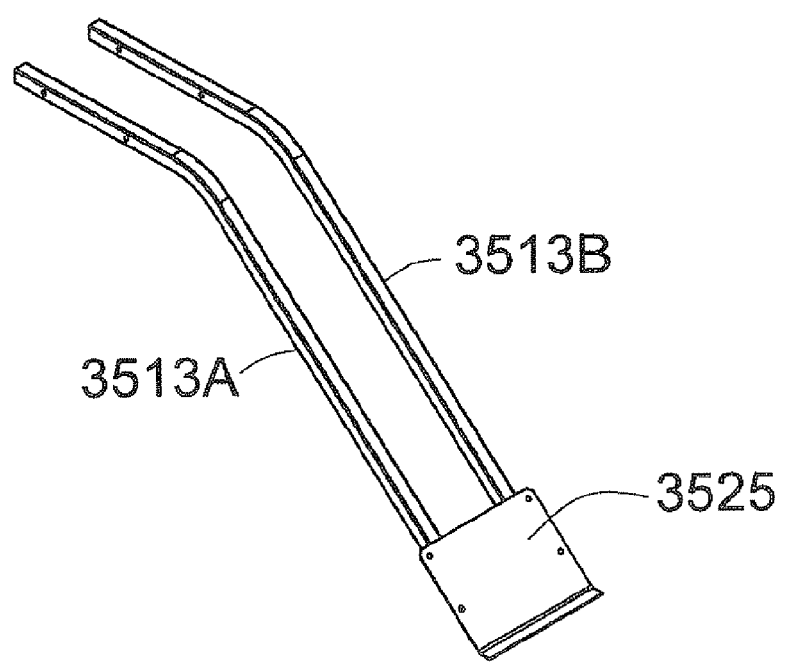
Figure 61:
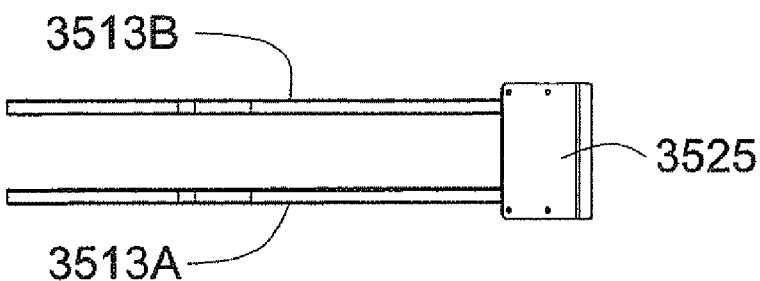
Figure 60:
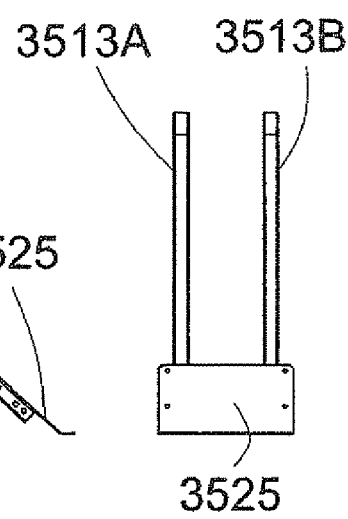
Figure 62:
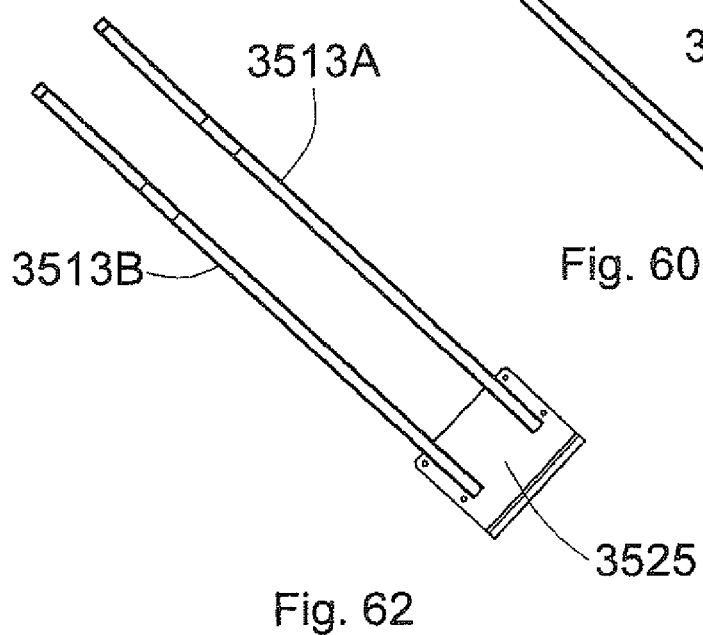
Figure 63:
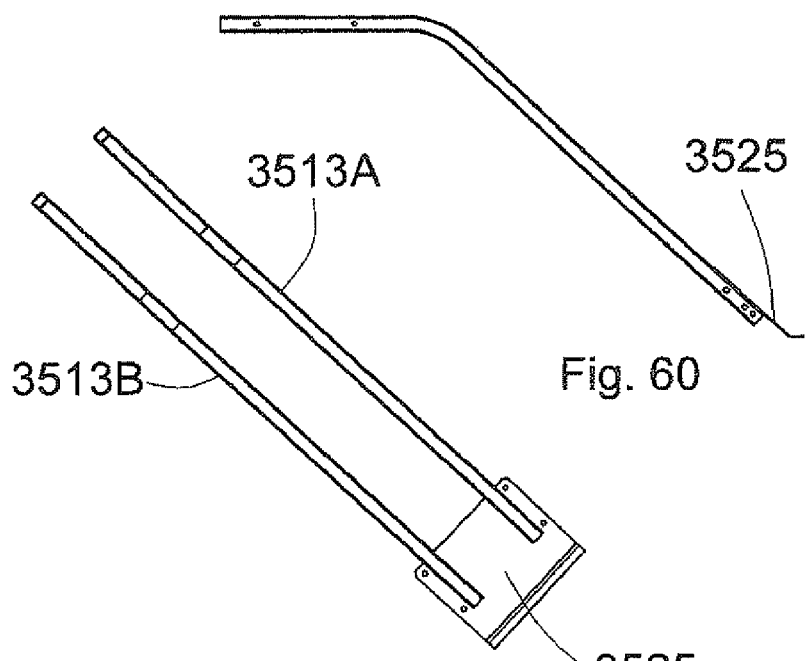
Figure 68:
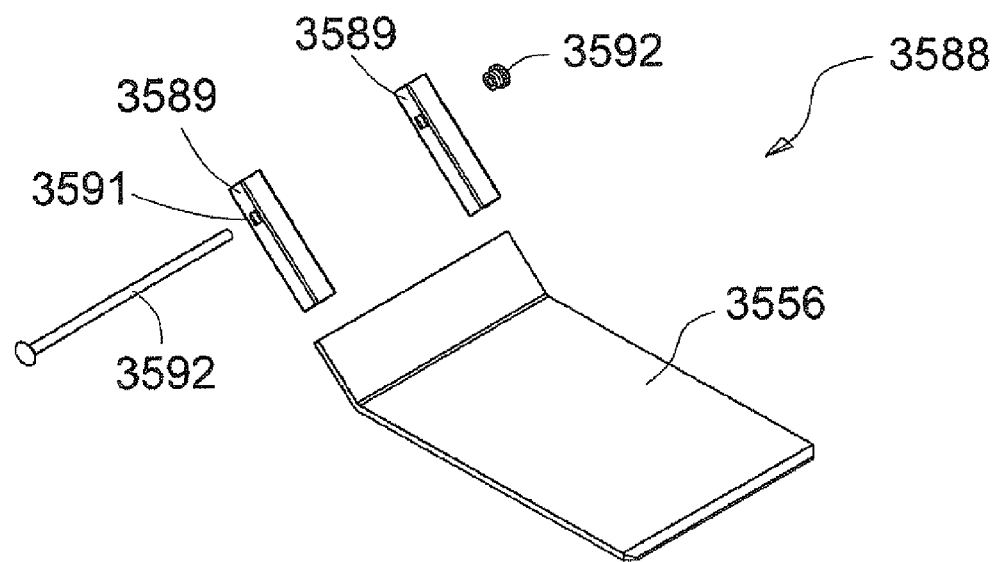
Figure 69:
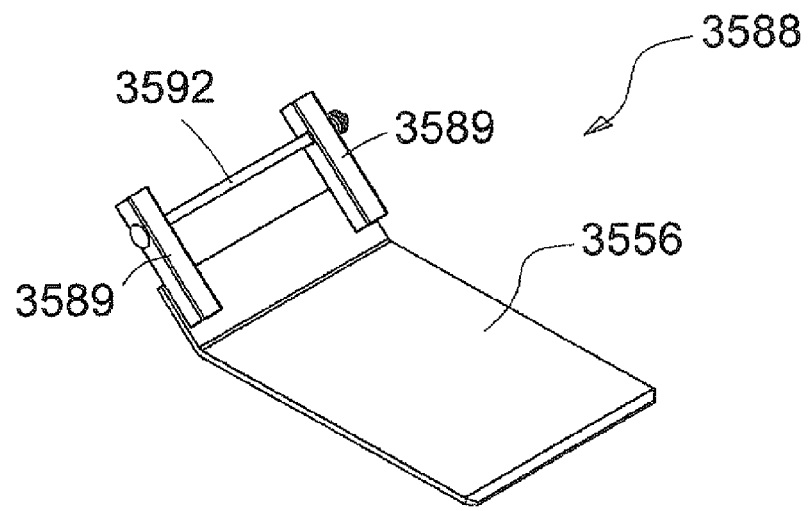
Figure 71:
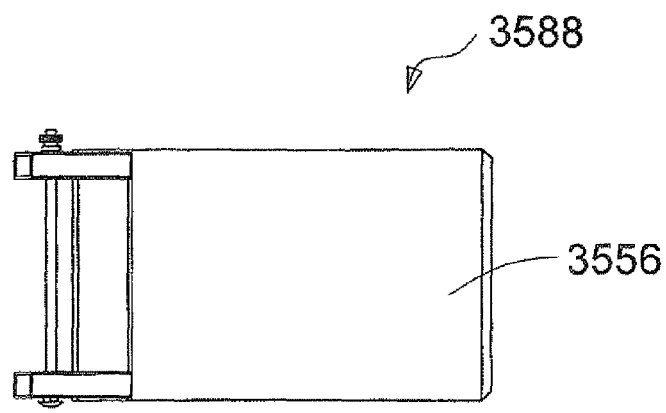
Figures 70, 72:
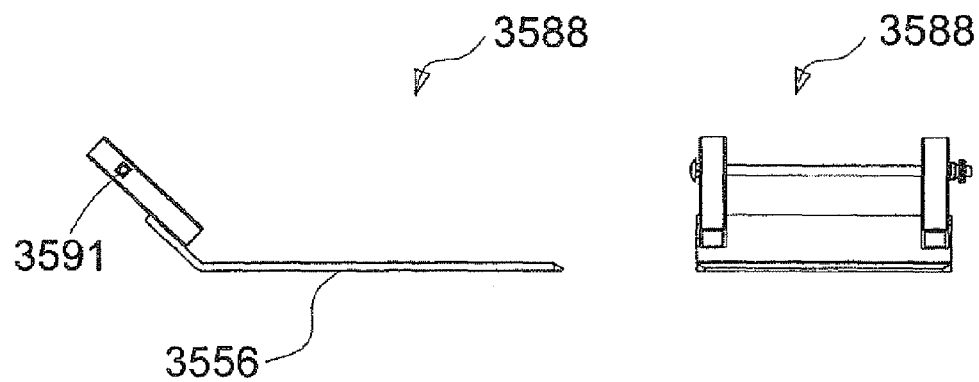
Figure 73:
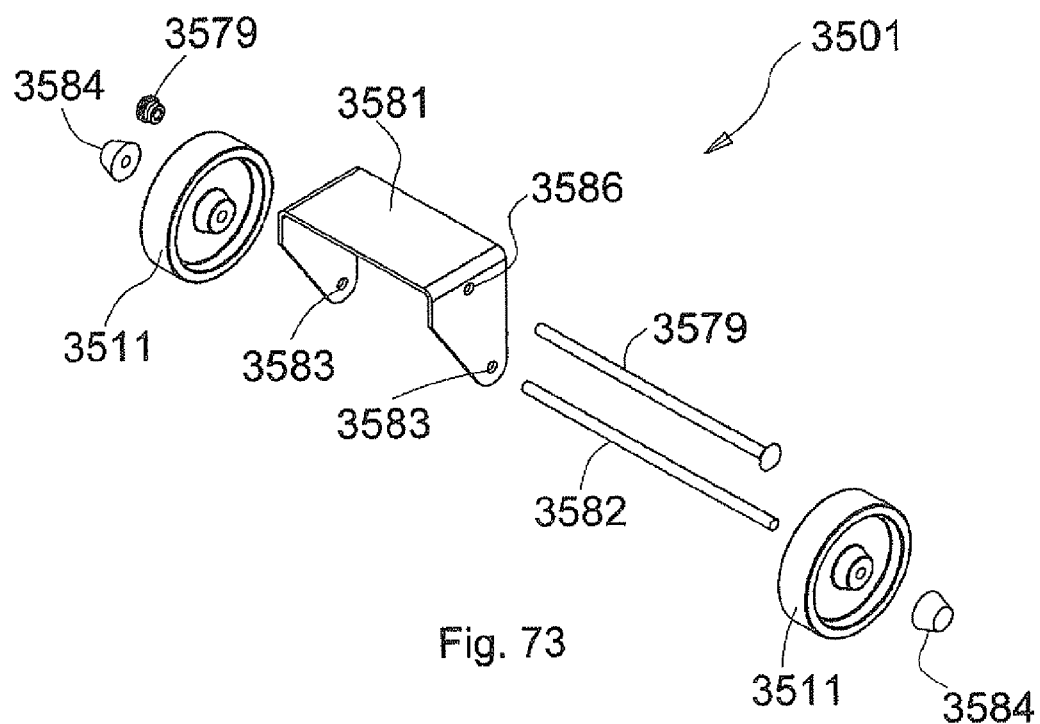
Figure 74:
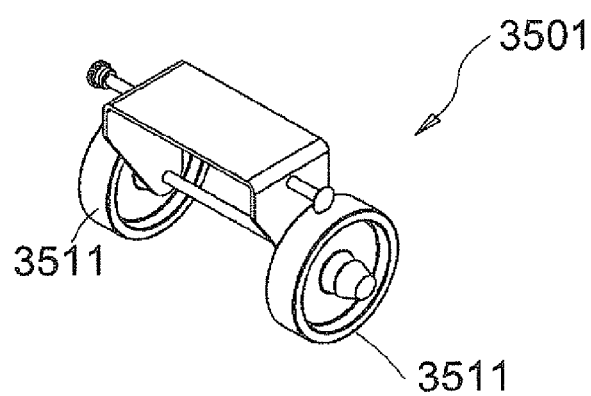
Figure 75:
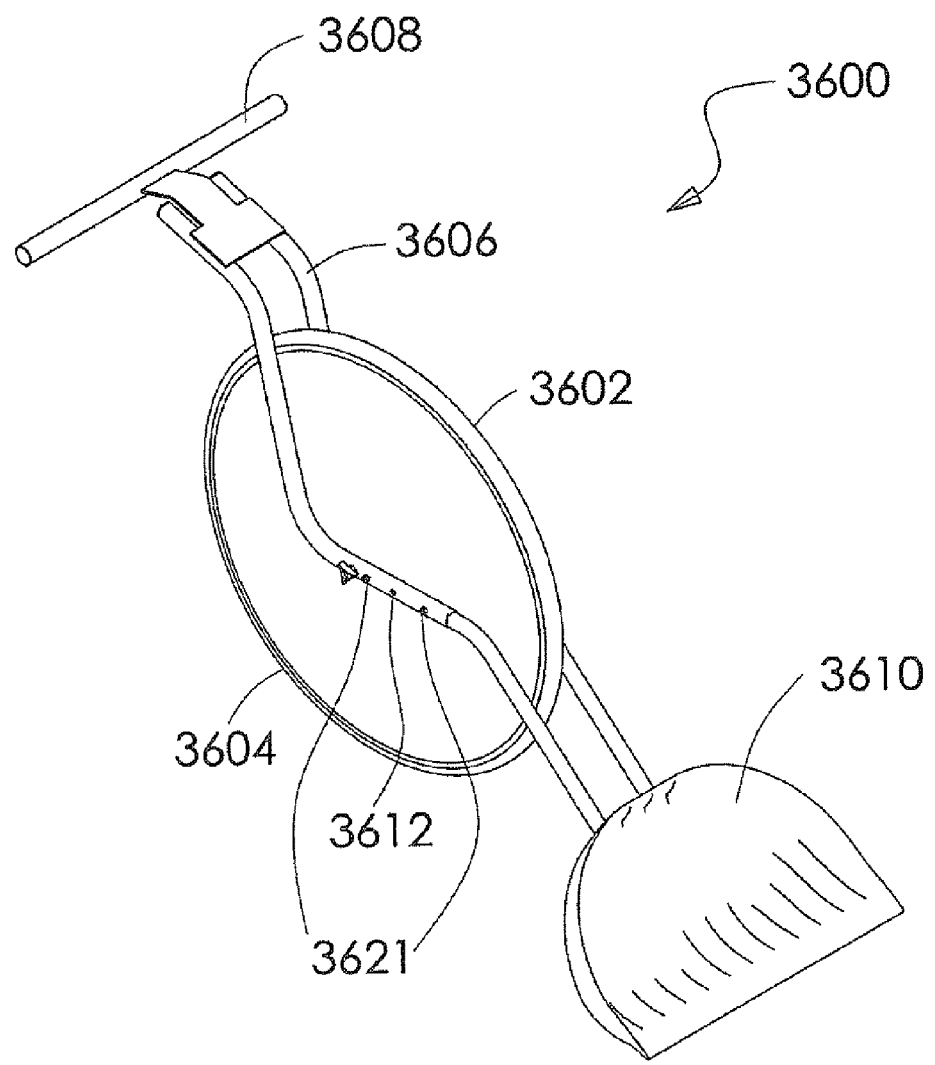
Figure 76:
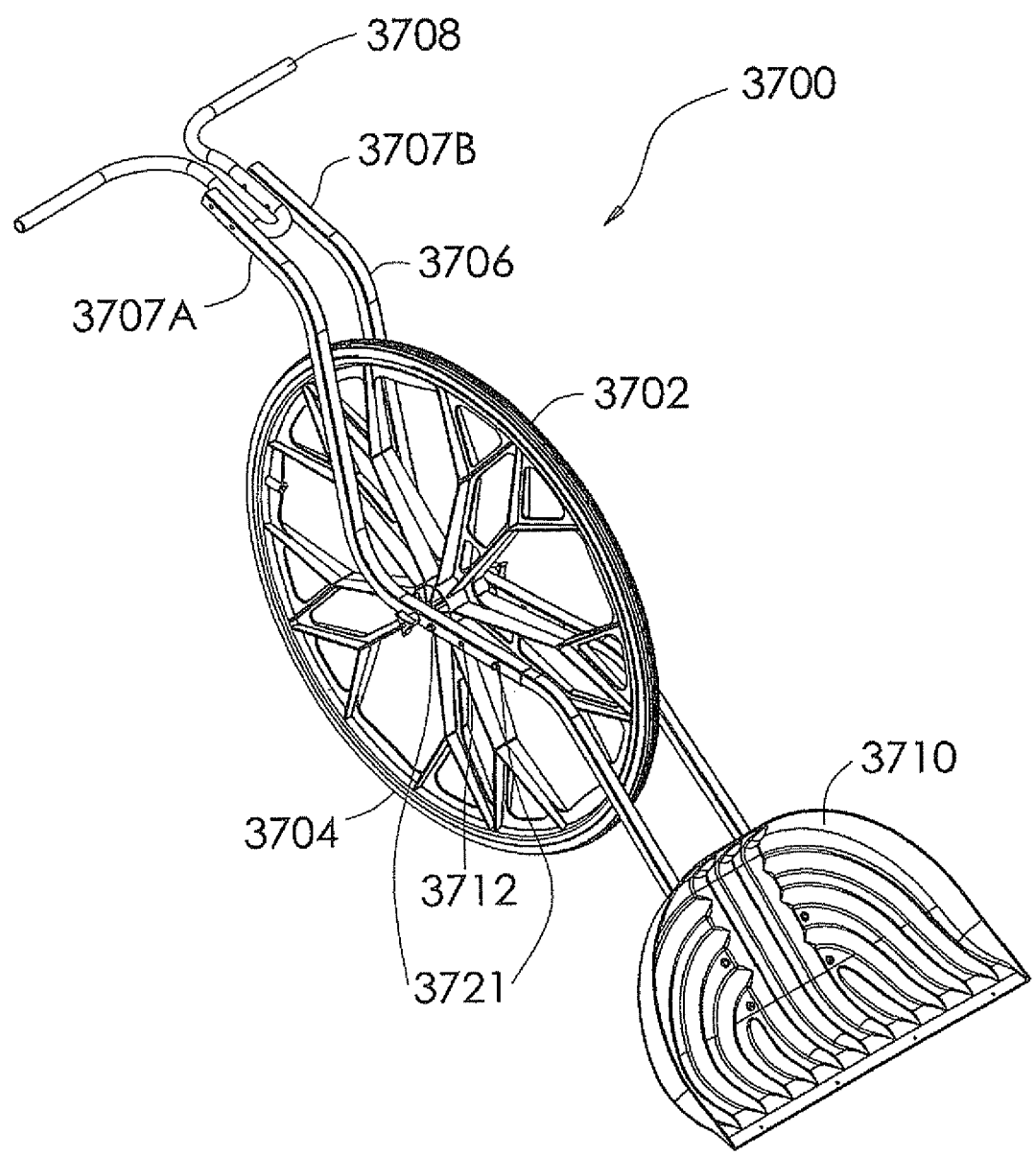
Figure 77:
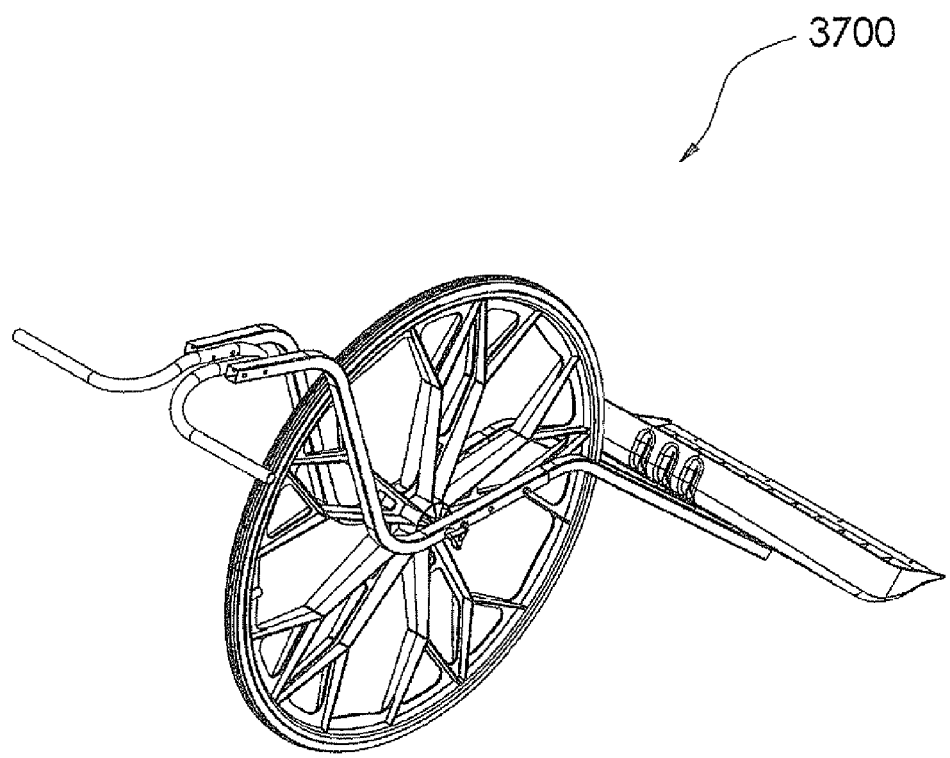
Figure 78:
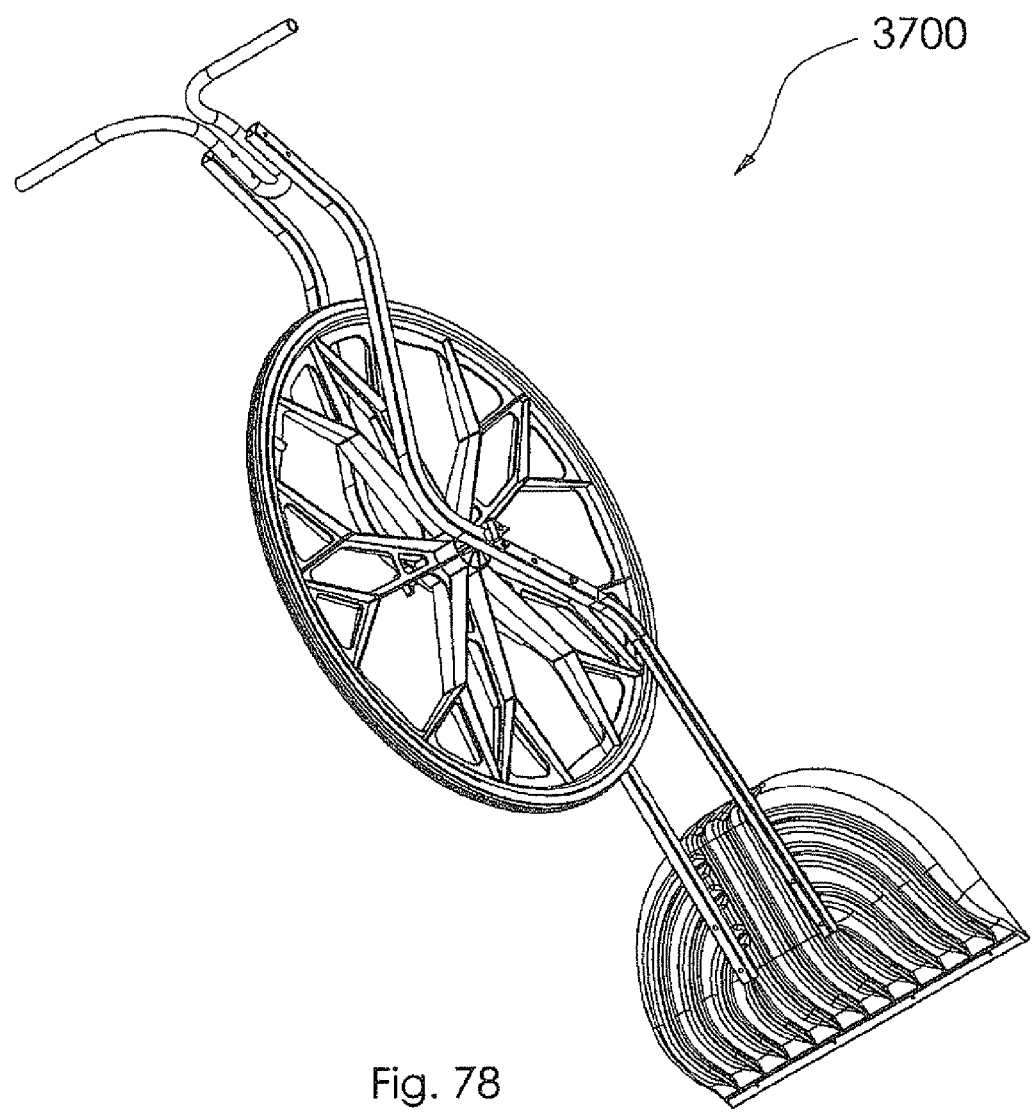
Figure 79:
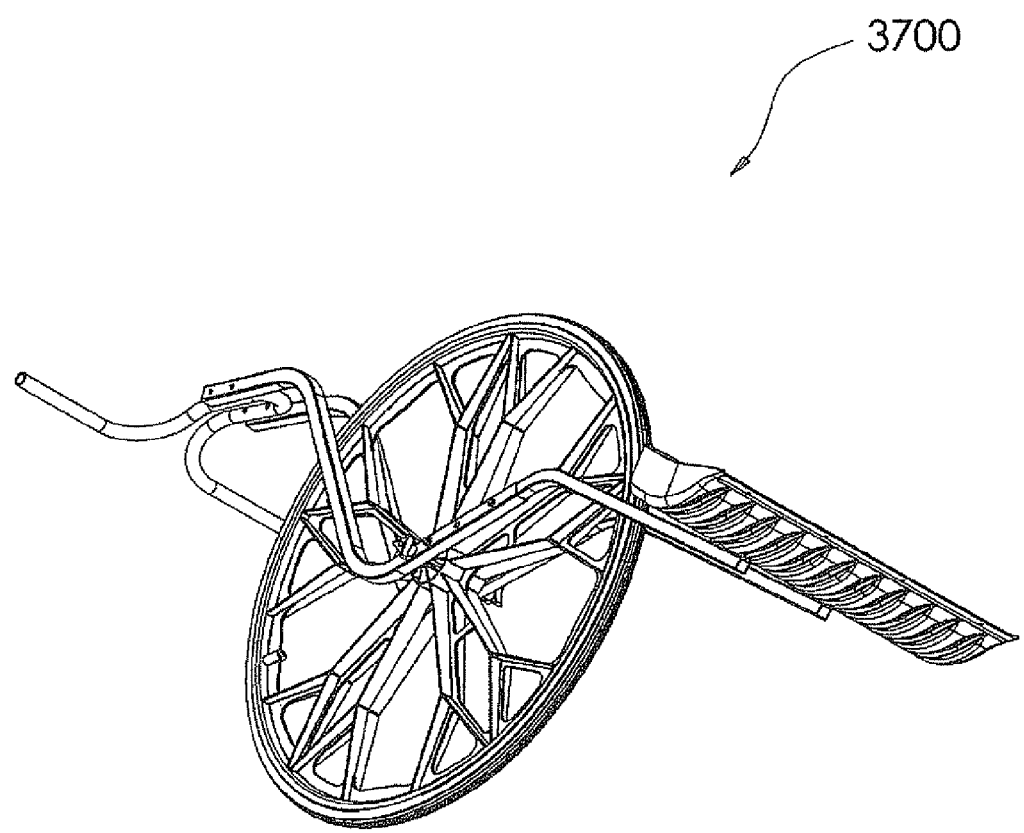
Figure 80:
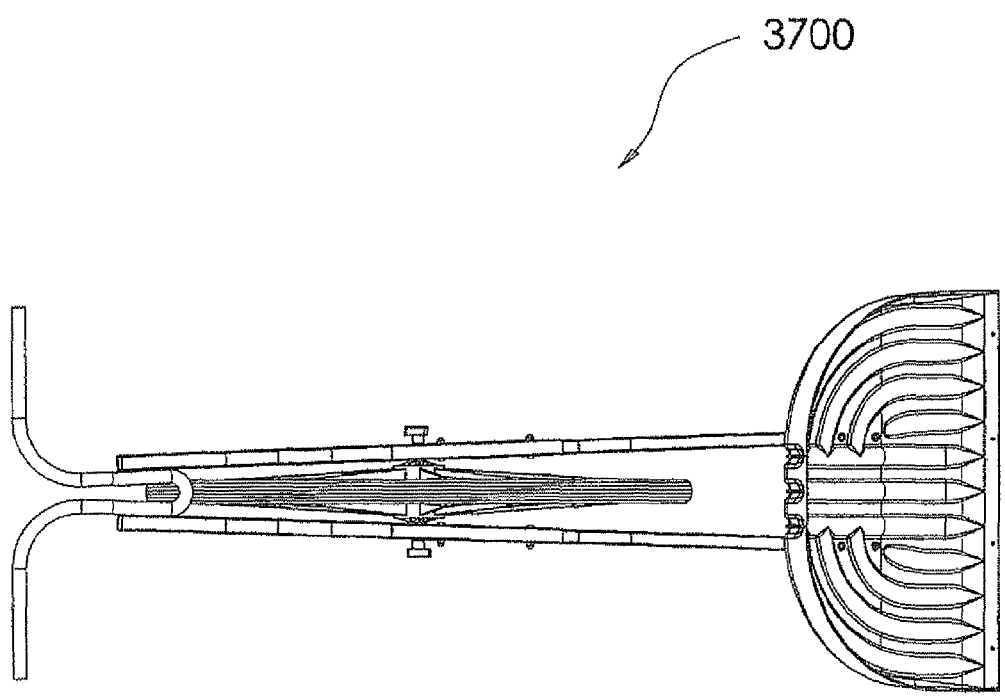
Figure 81:
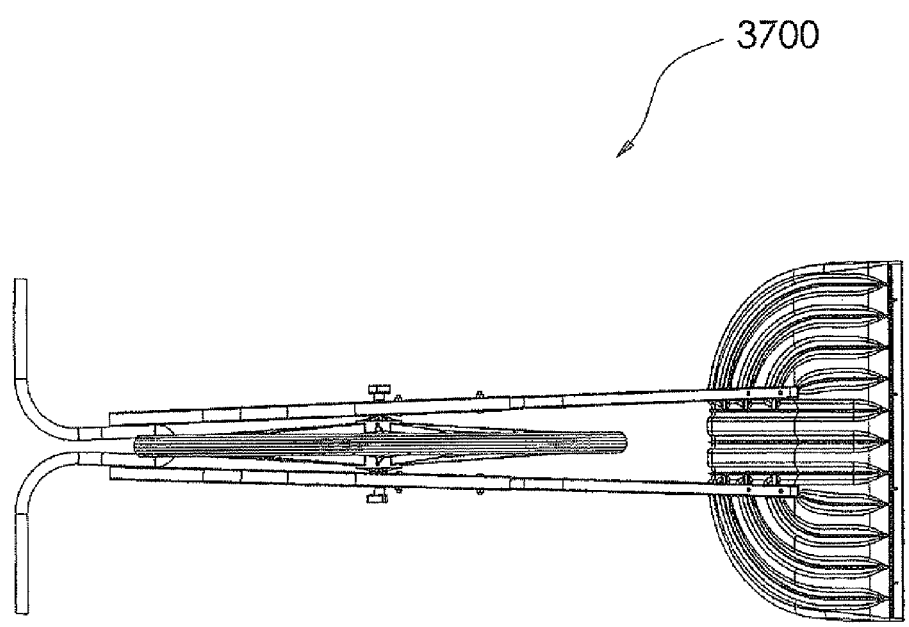
Figure 82:
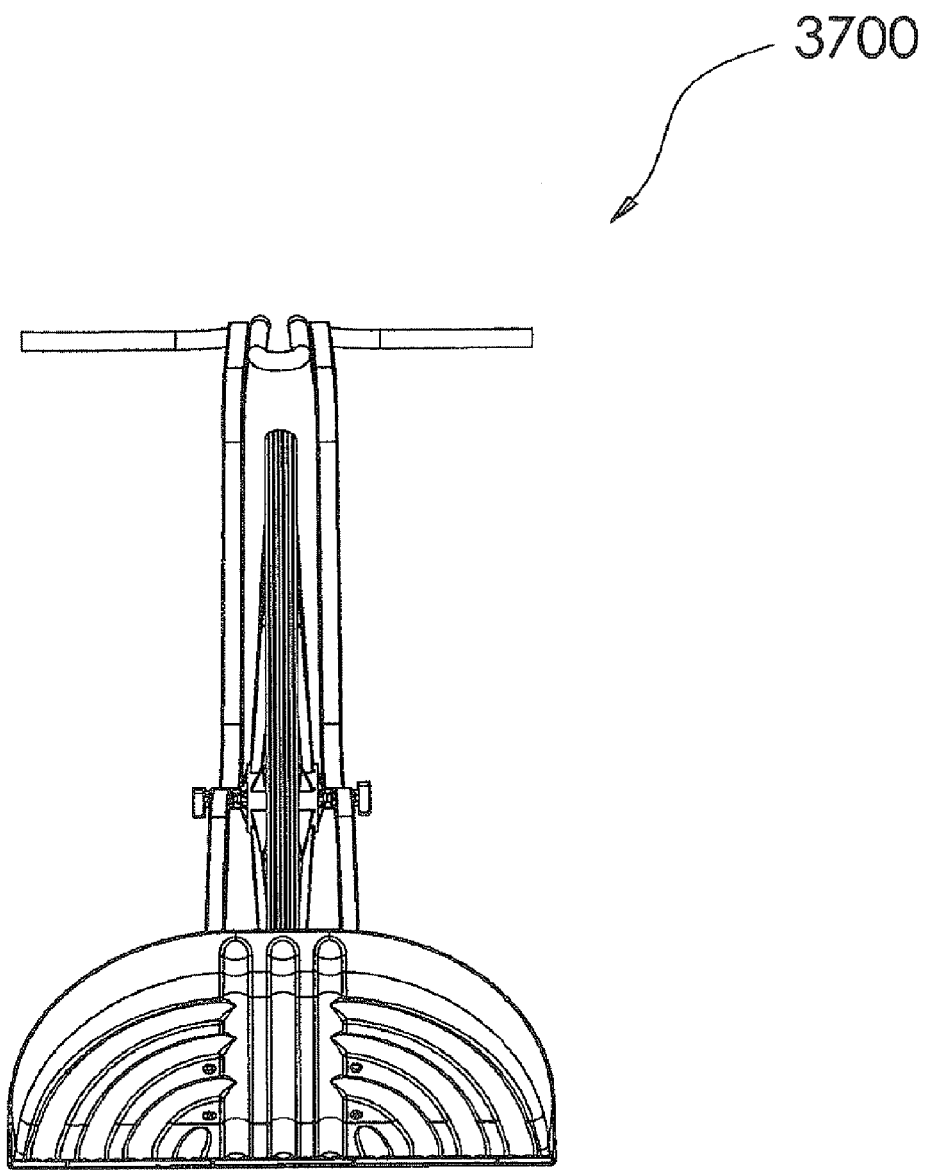
Figure 83:
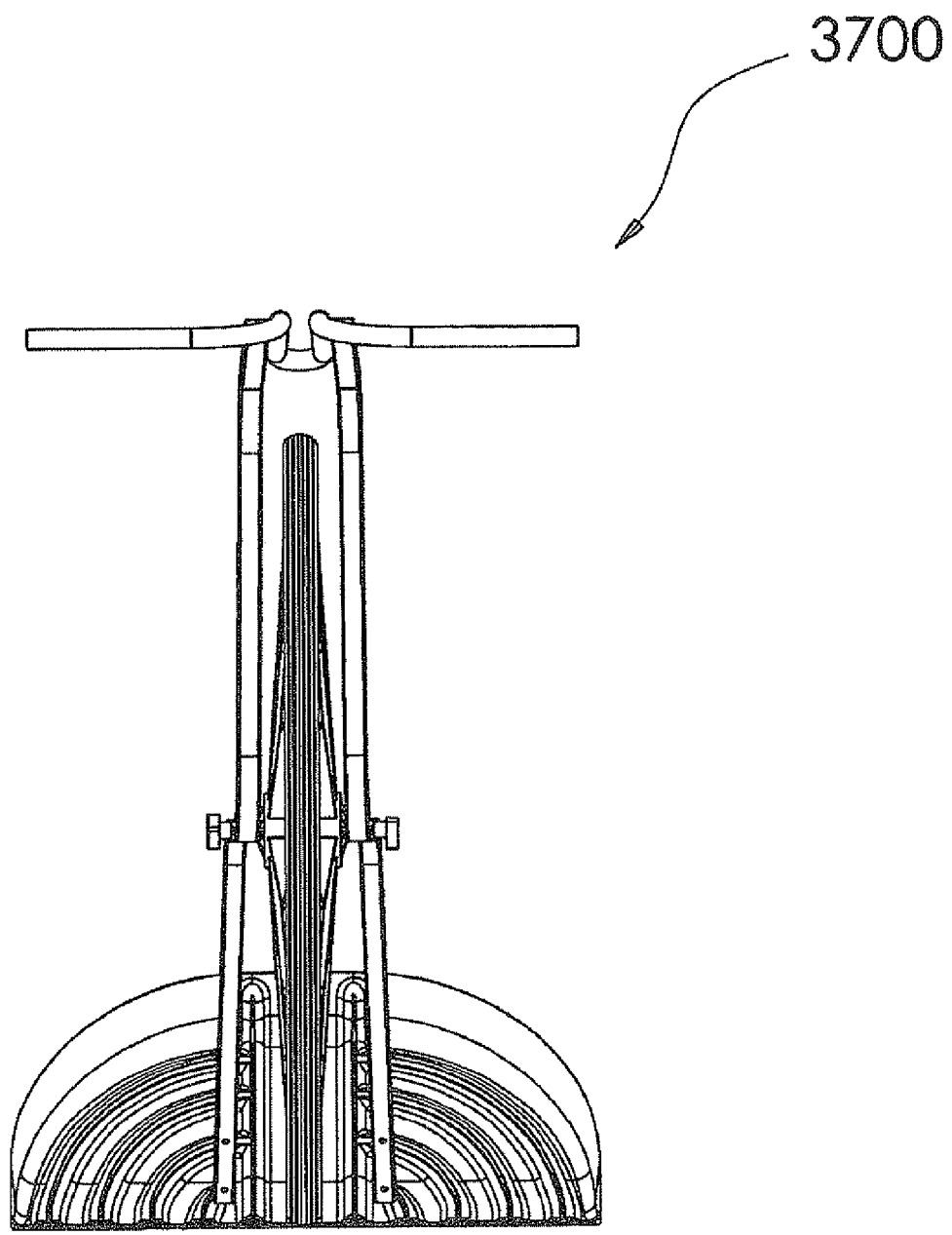
Figure 84:
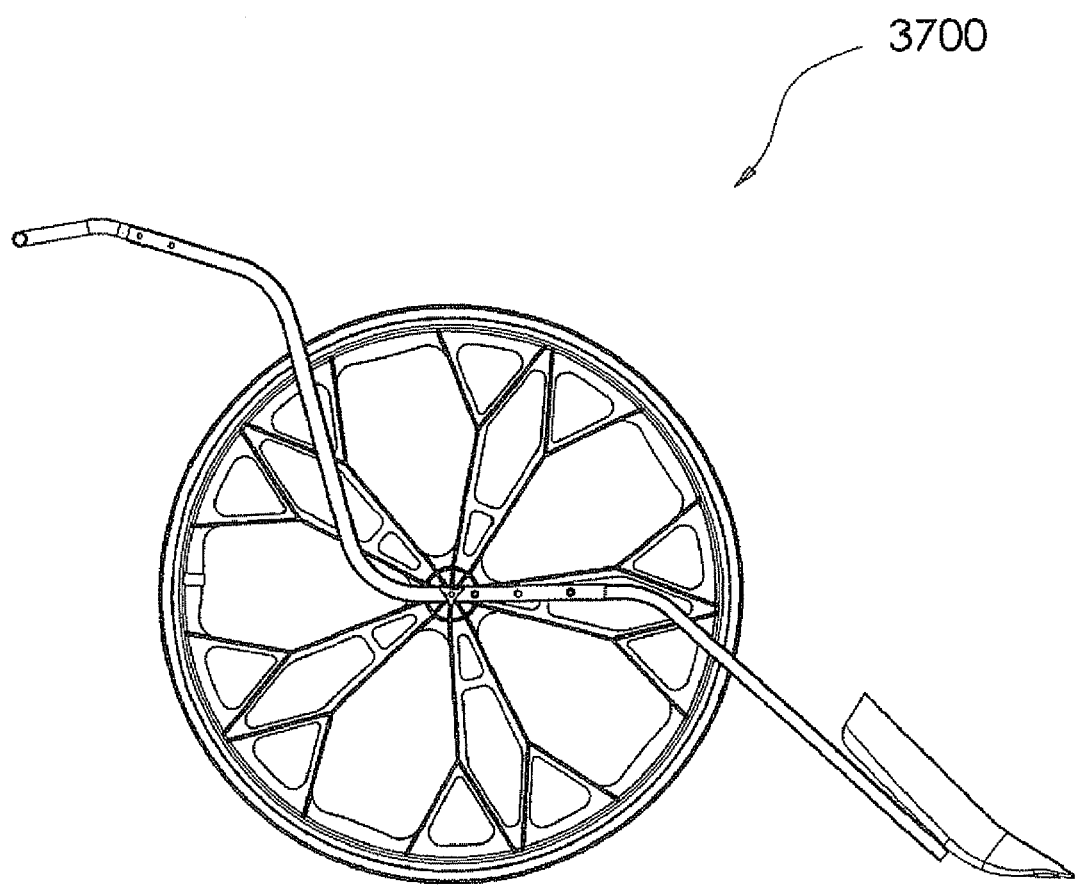
Figure 85:
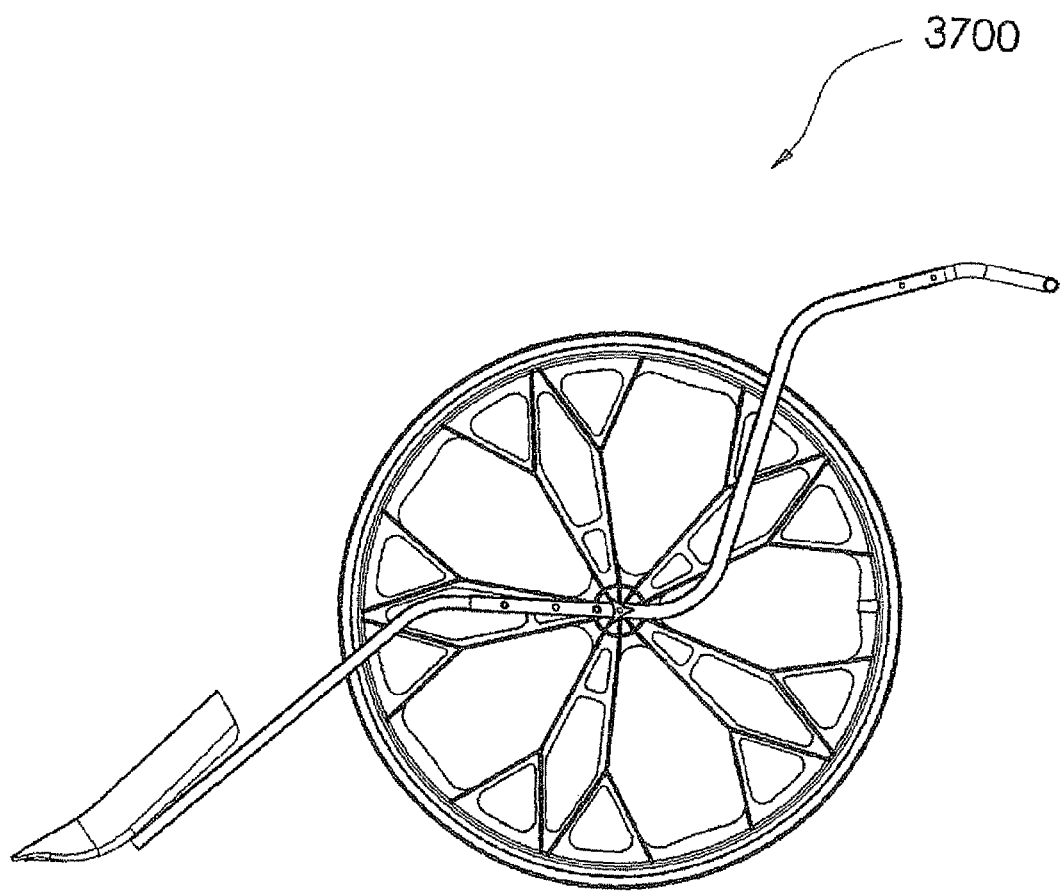
Figure 86:
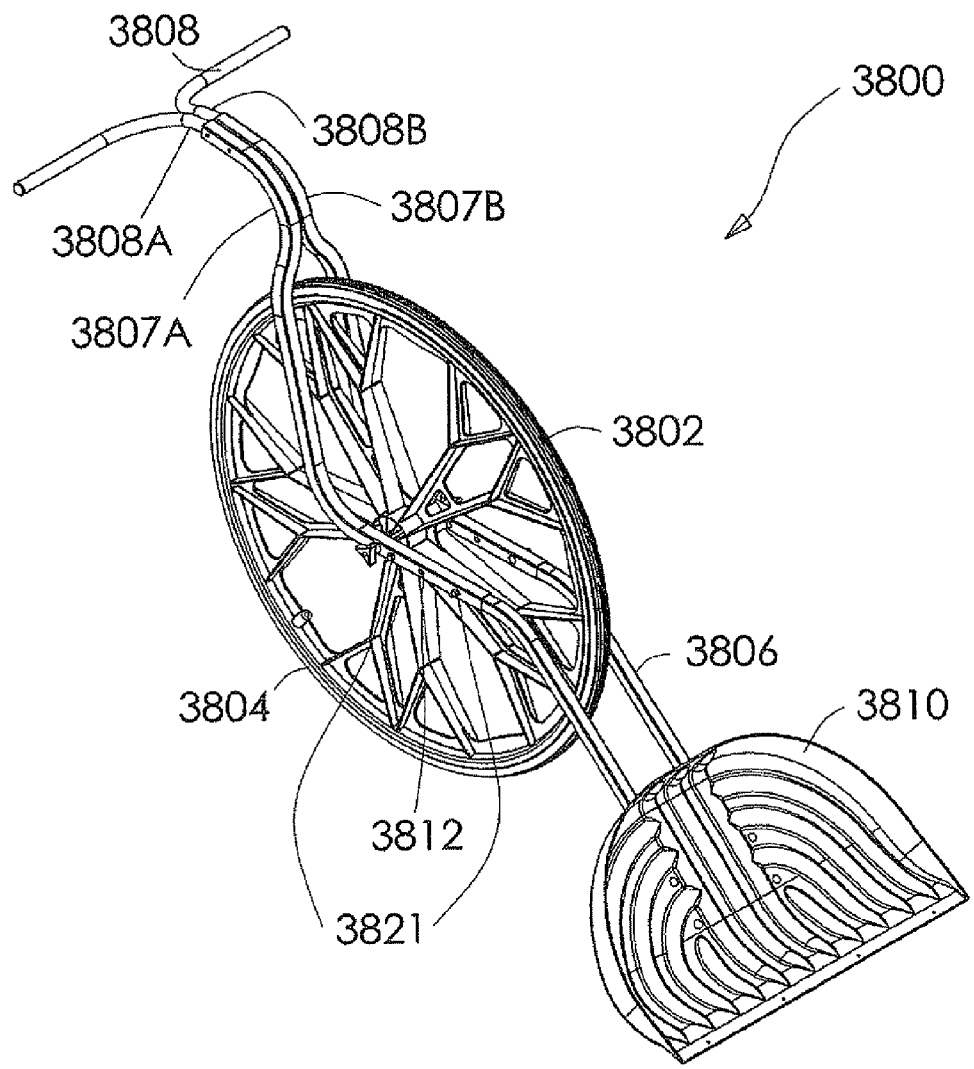
Figure 87:
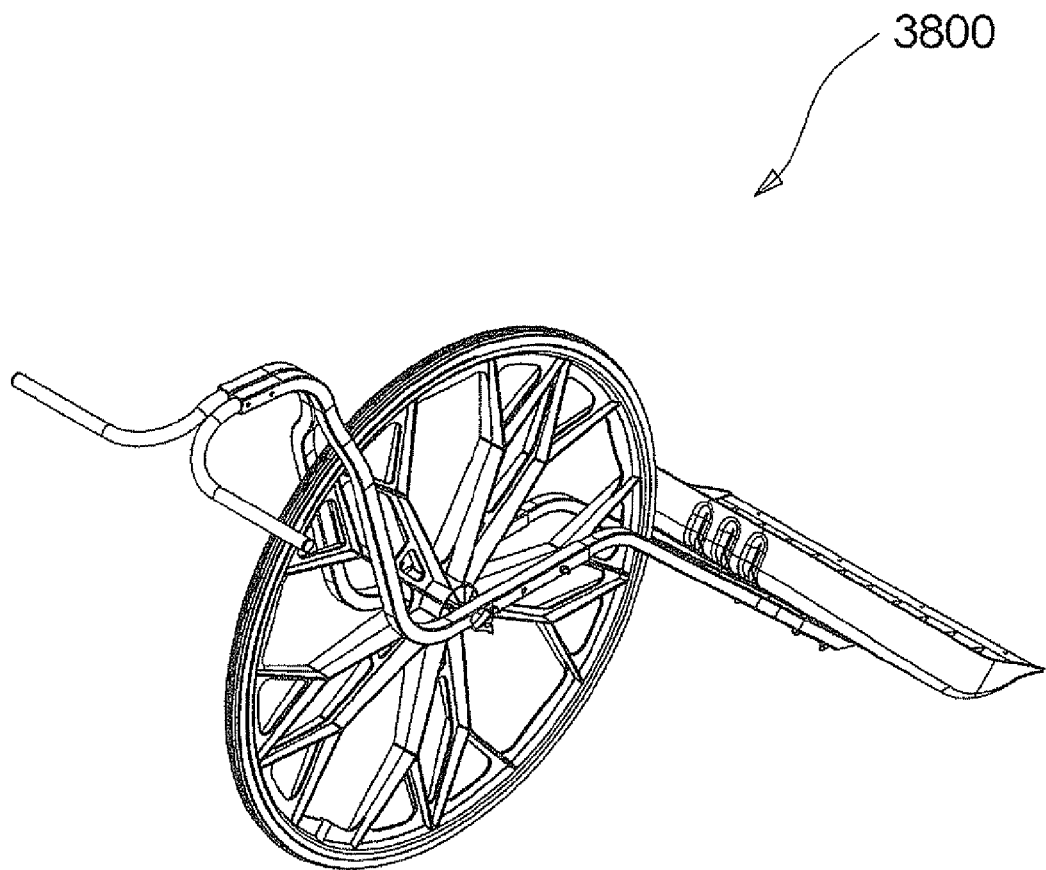
Figure 88:
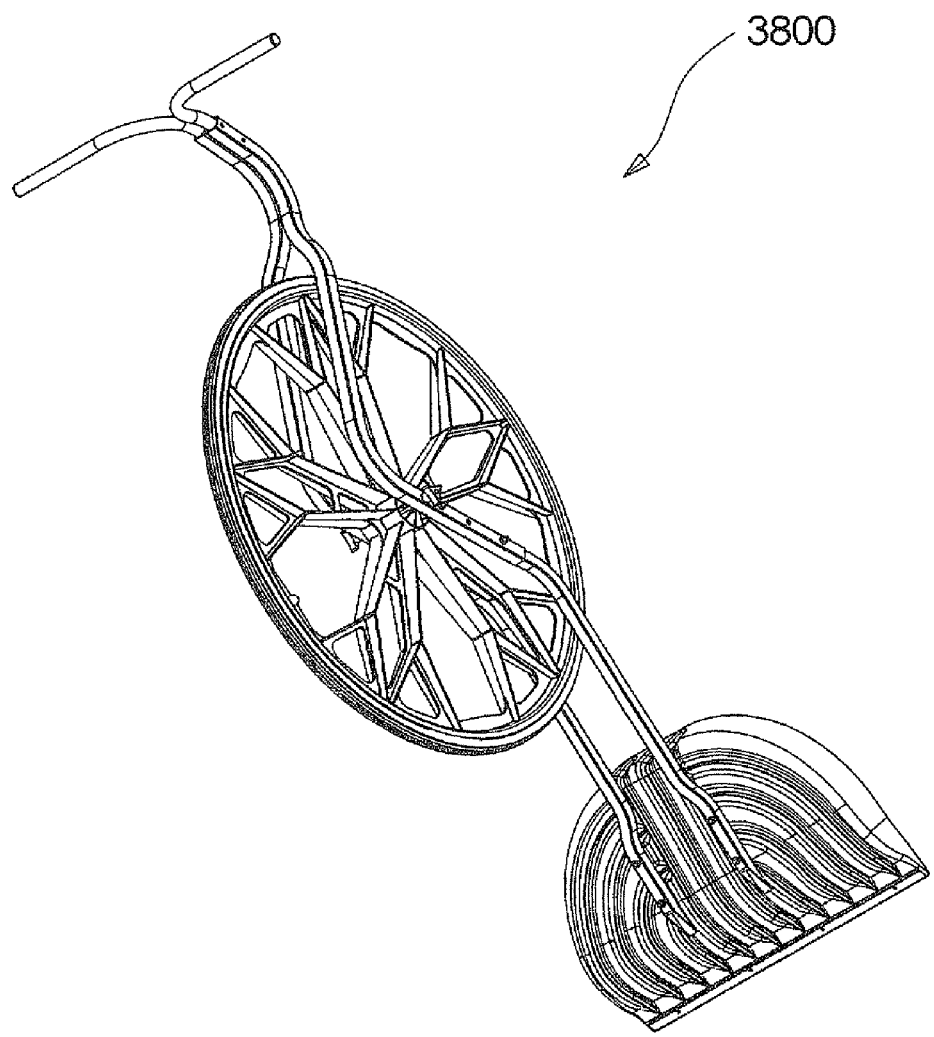
Figure 89:
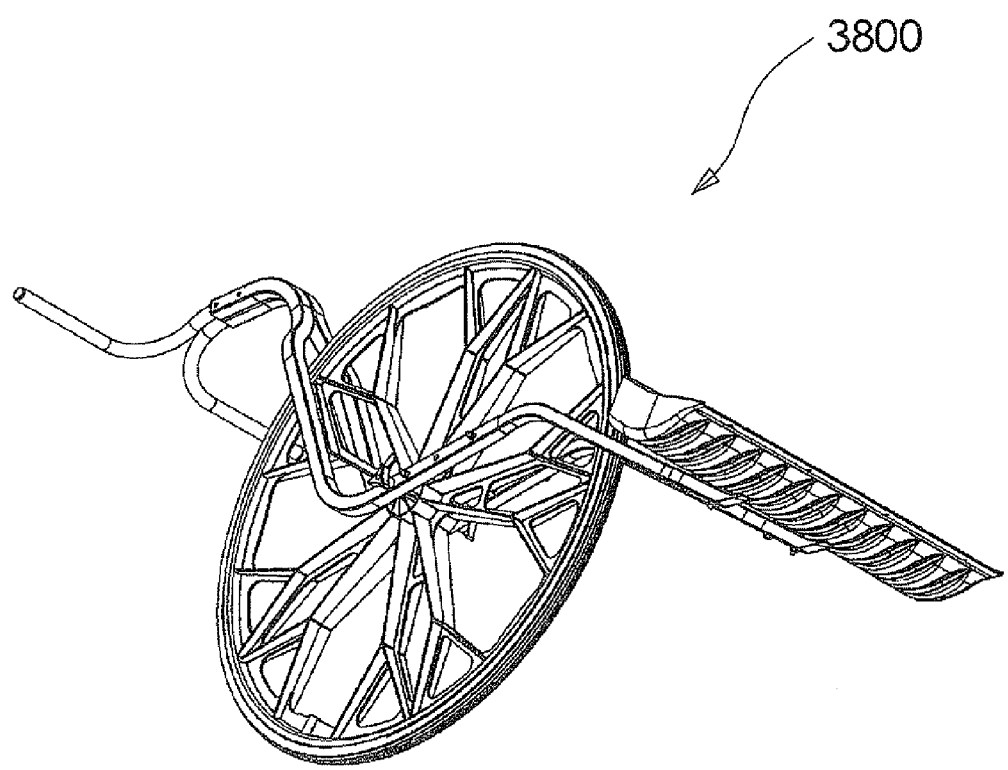
Figure 90:
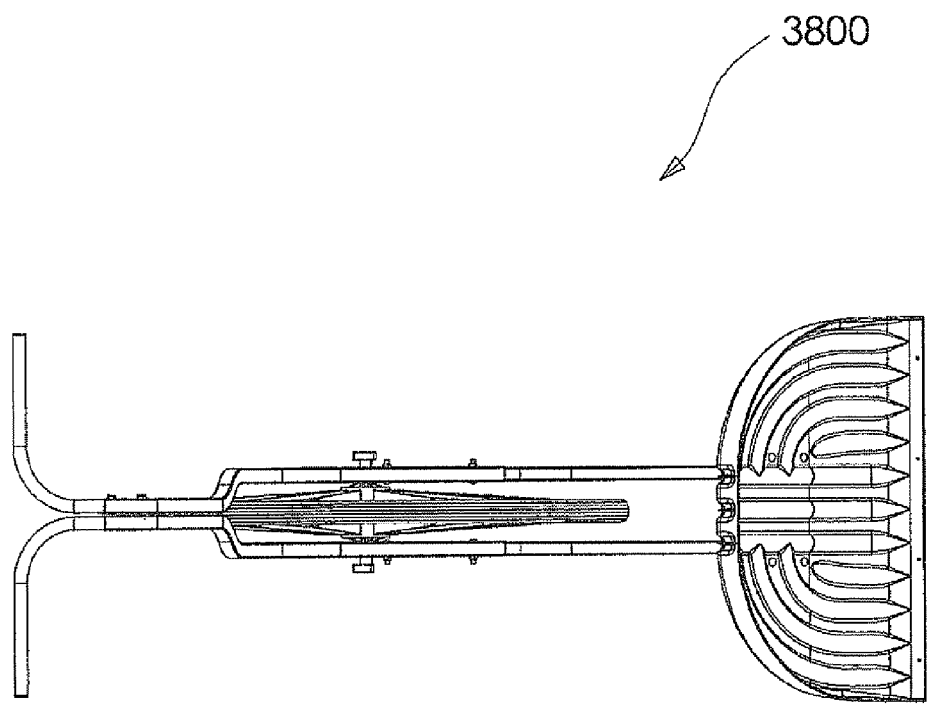
Figure 91:
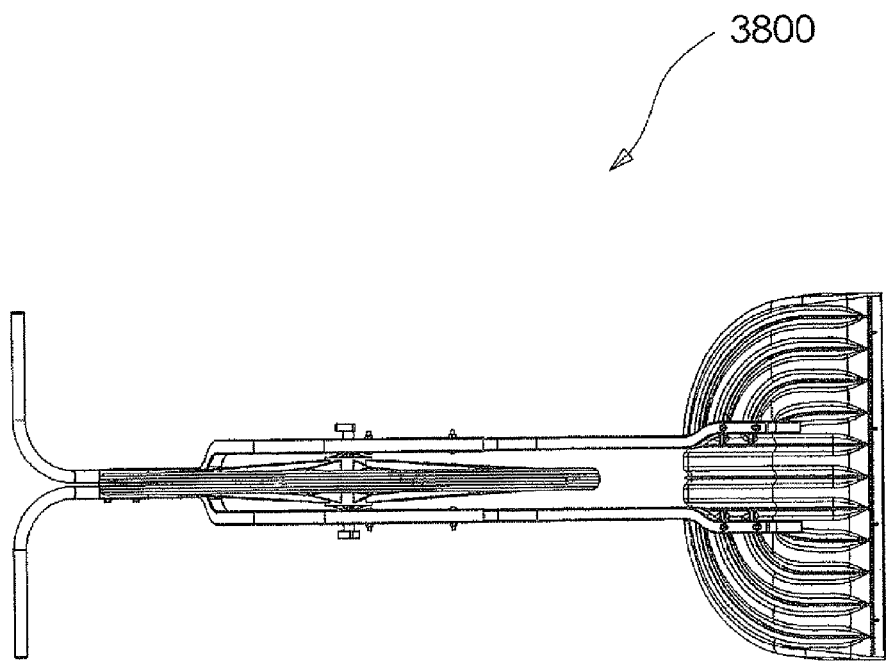
Figure 92:
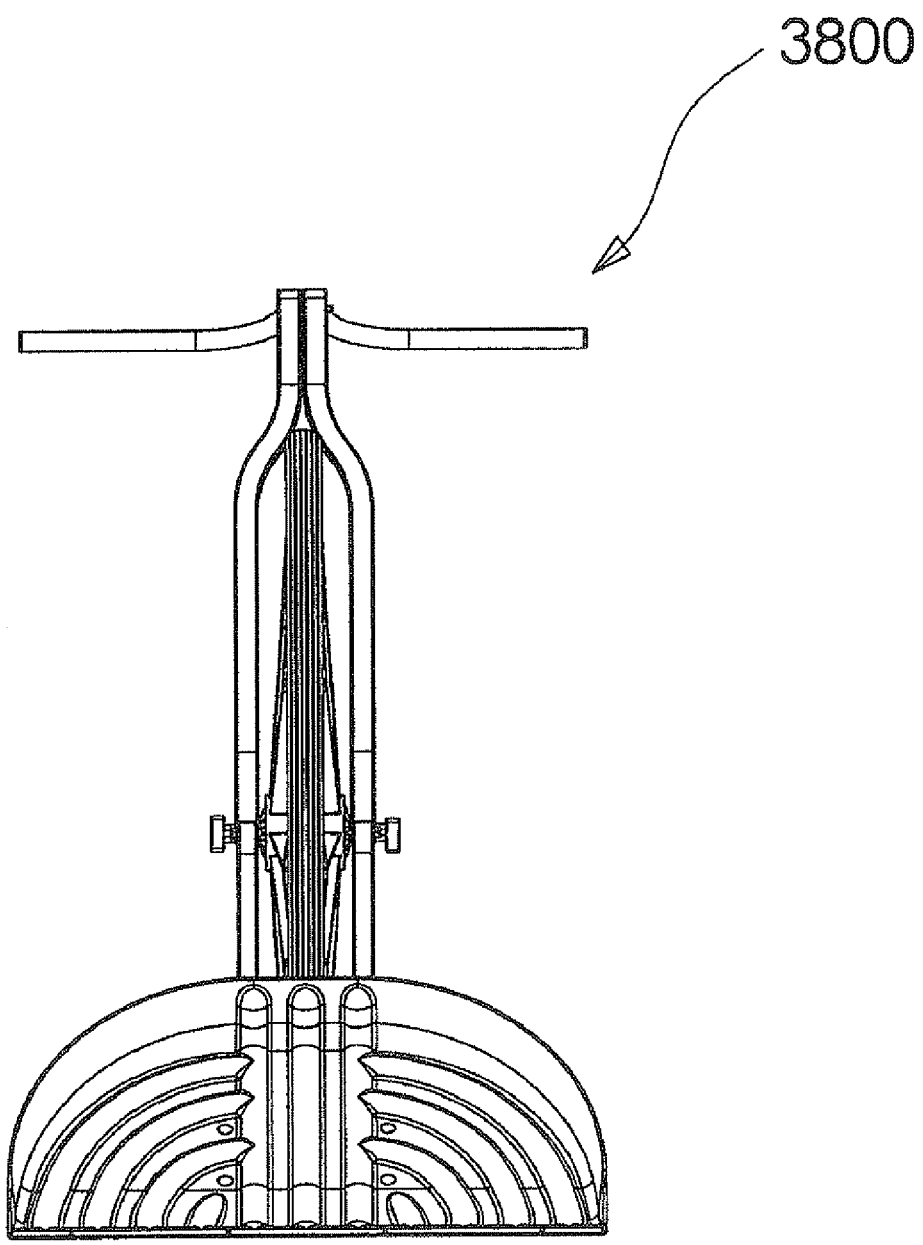
Figure 93:
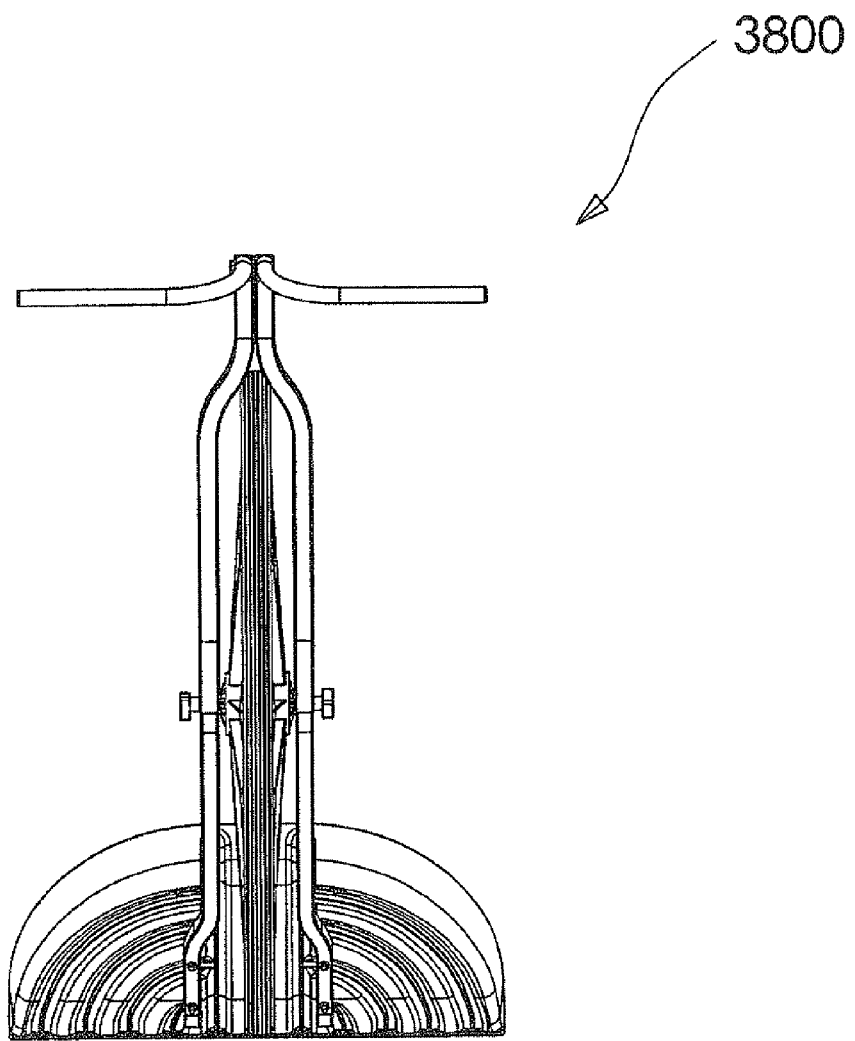
Figure 94:
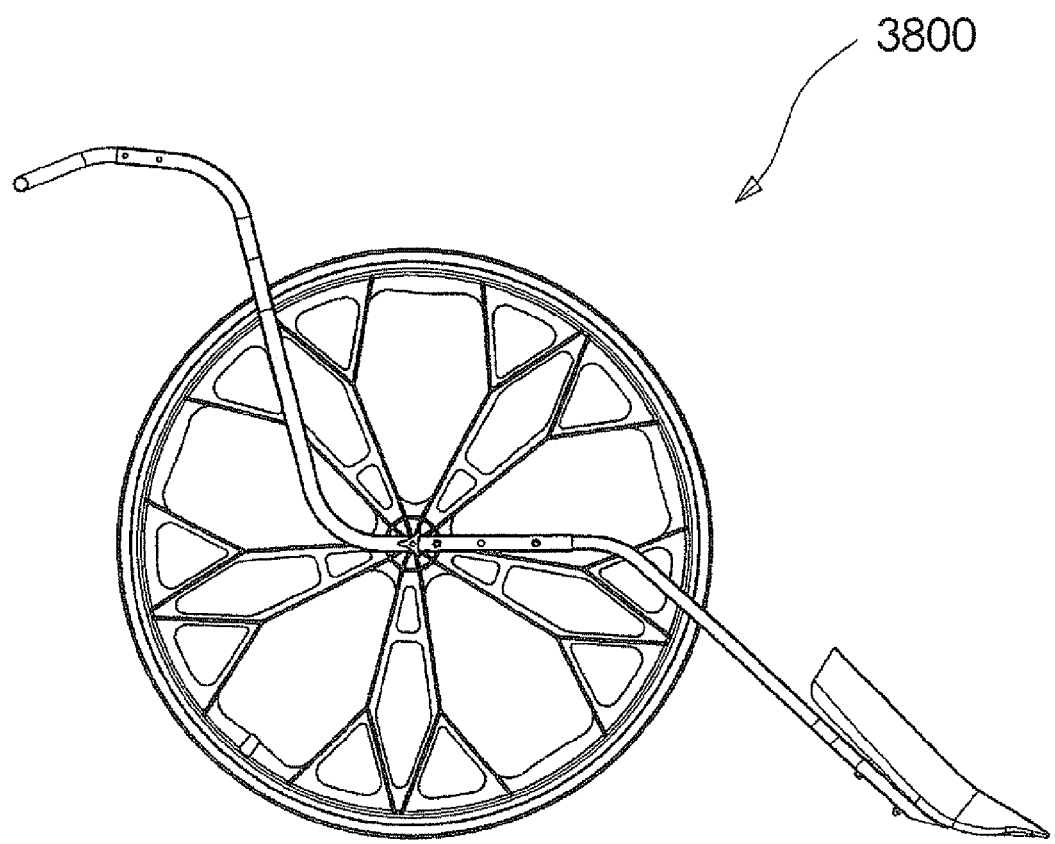
Figure 95:
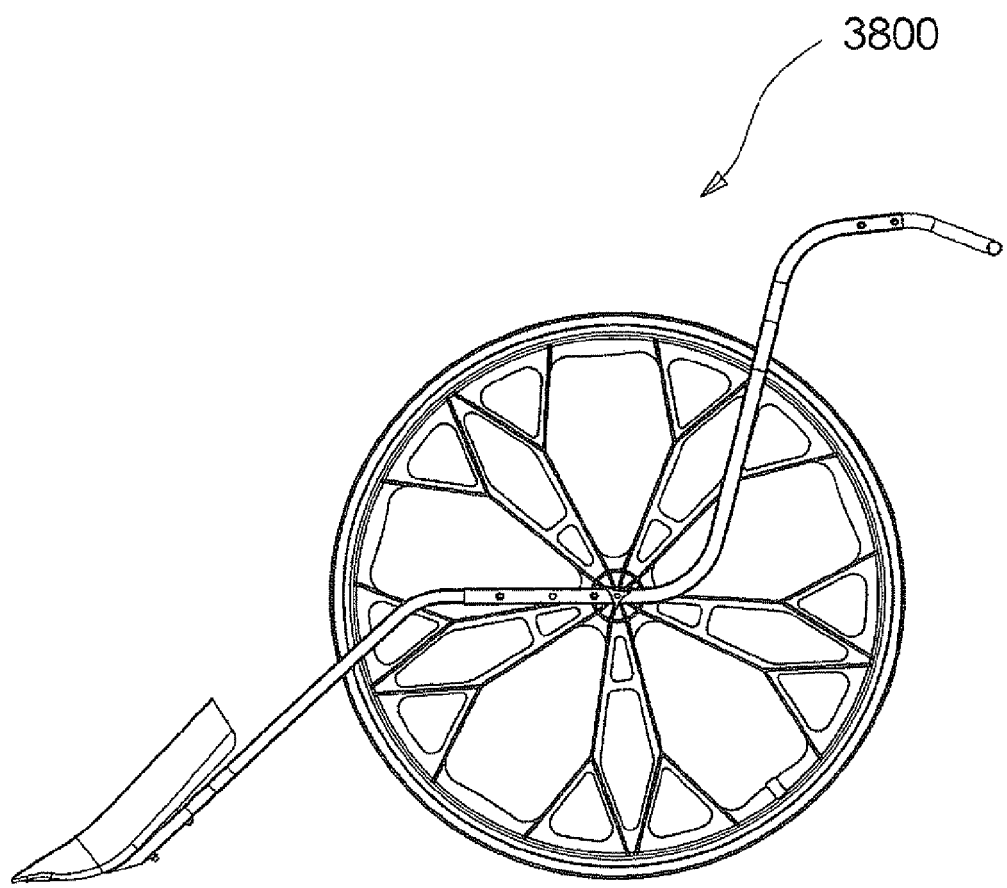
Figure 96:
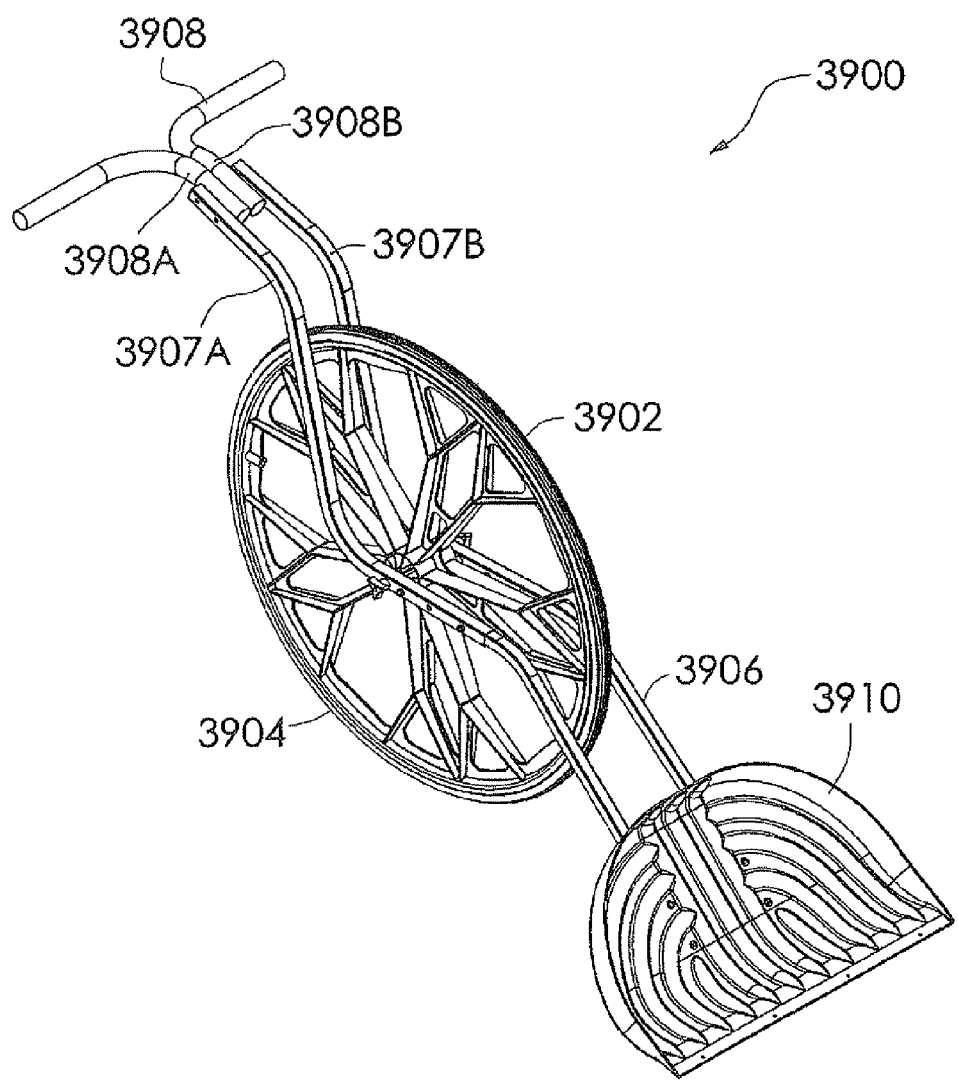
Figure 97:
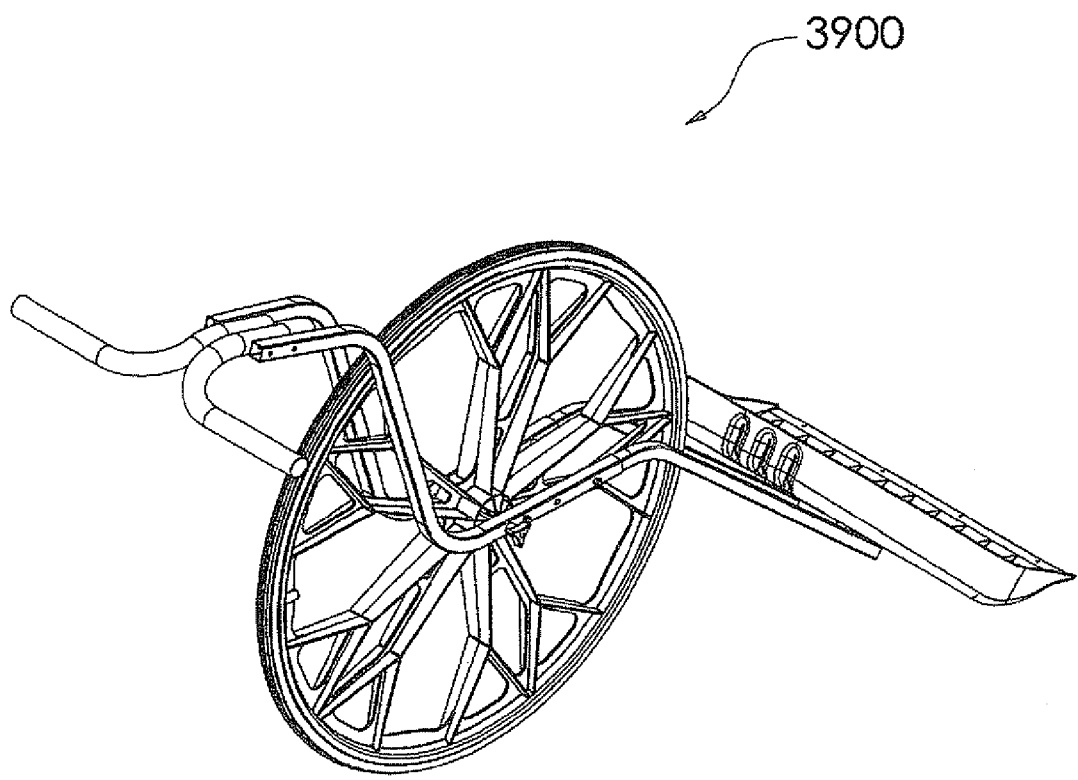
Figure 98:
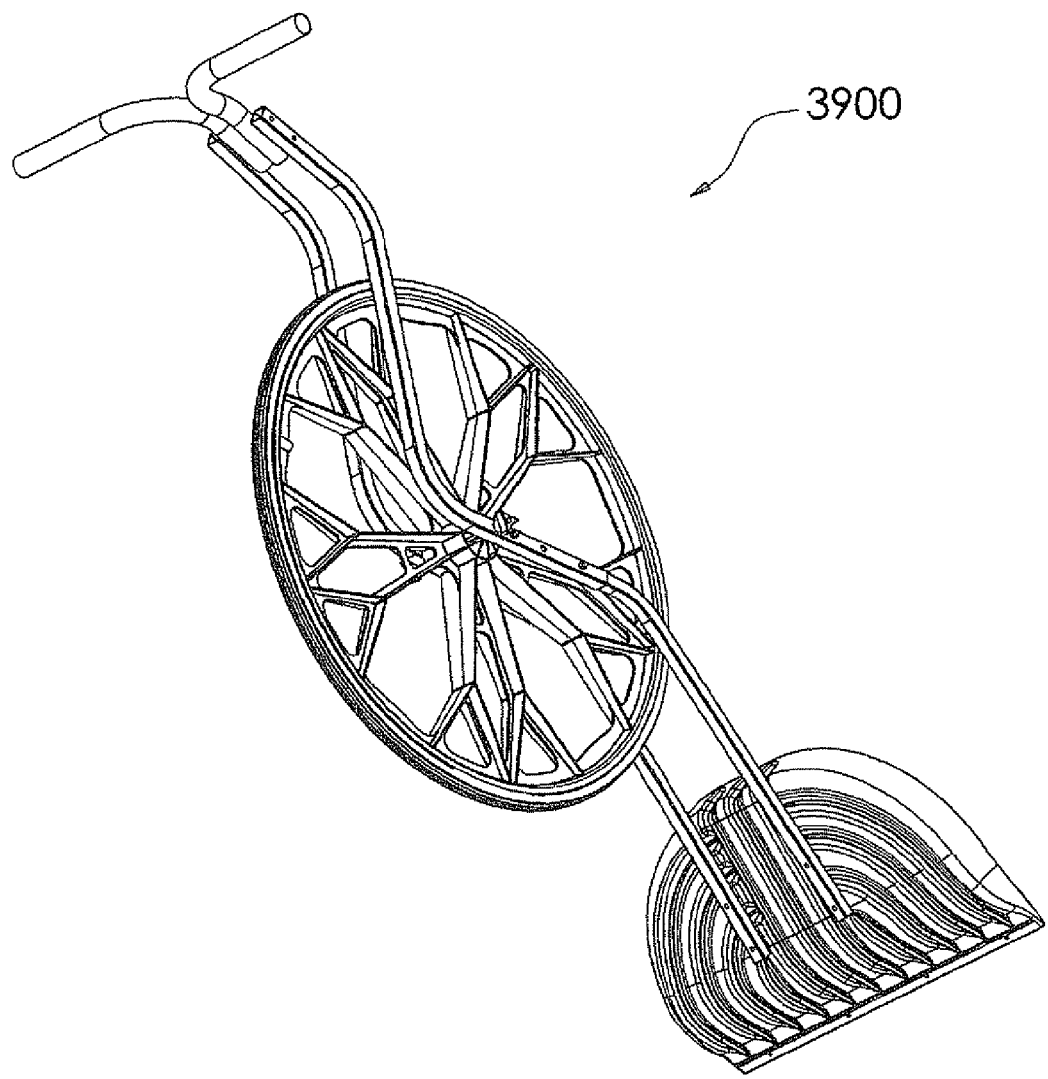
Figure 99:
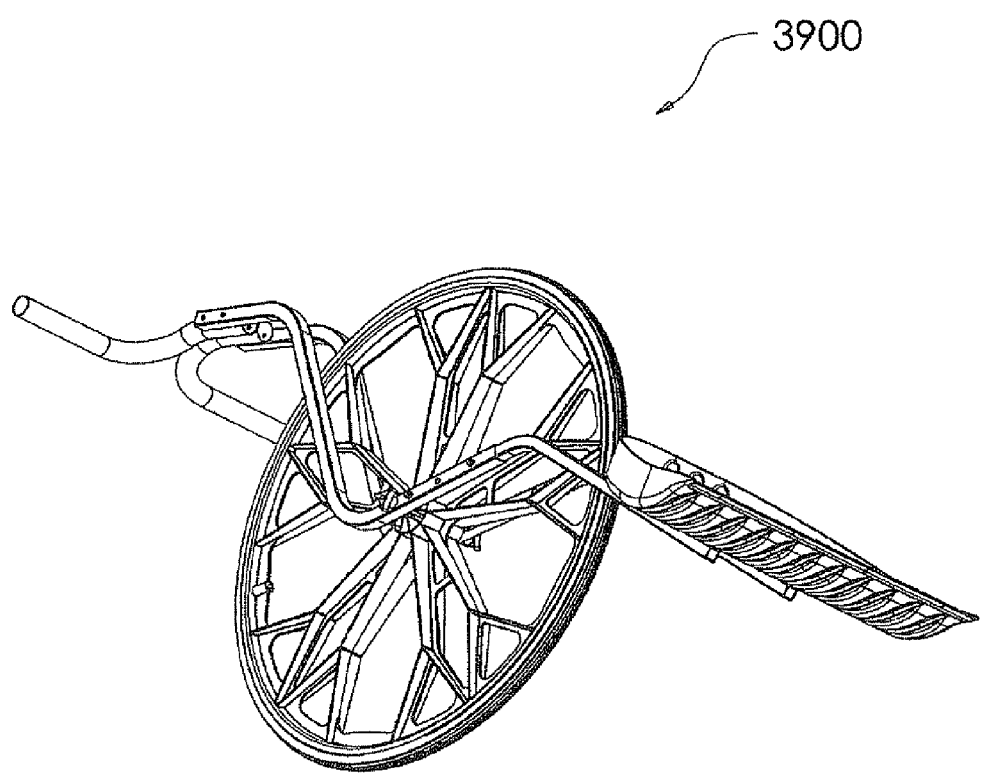
Figure 100:
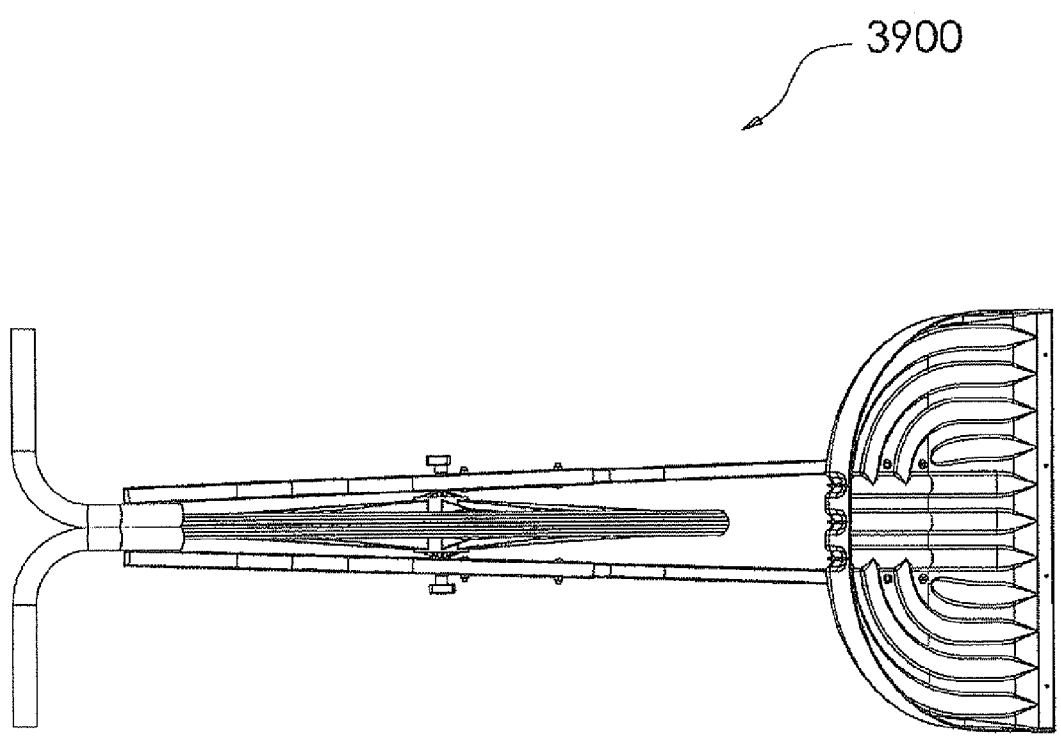
Figure 101:
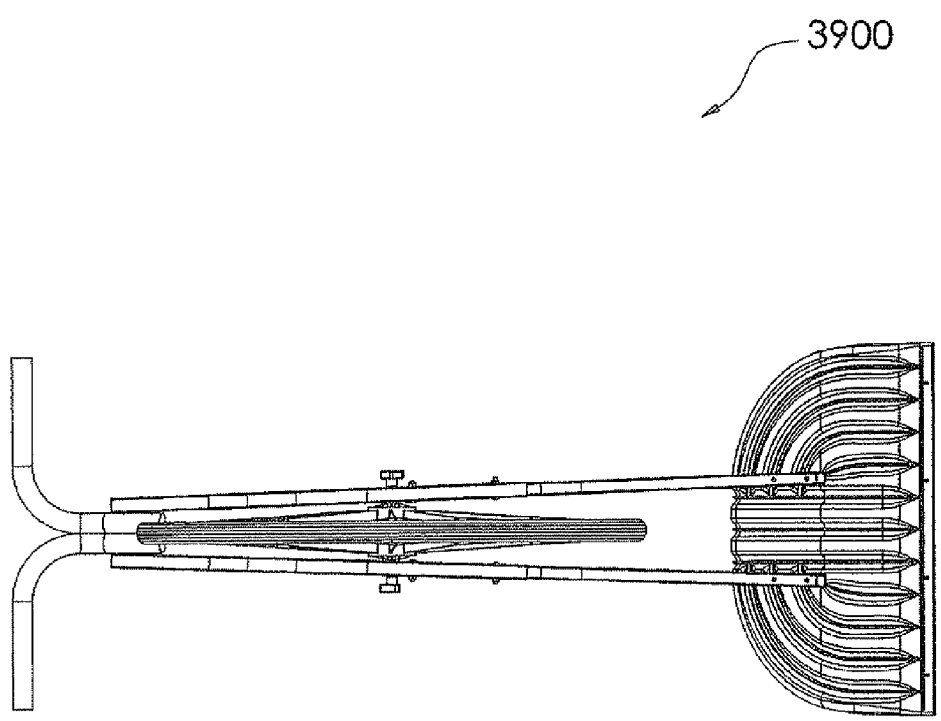
Figure 102:
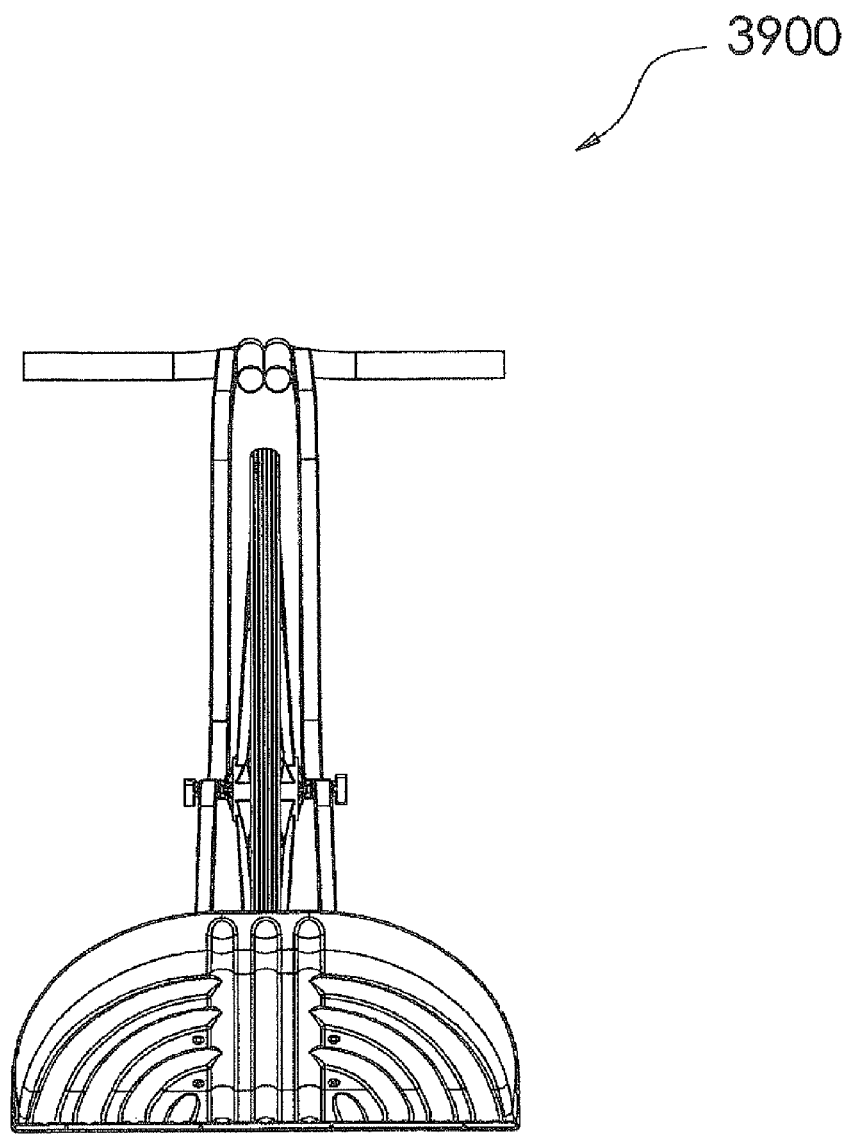
Figure 103:
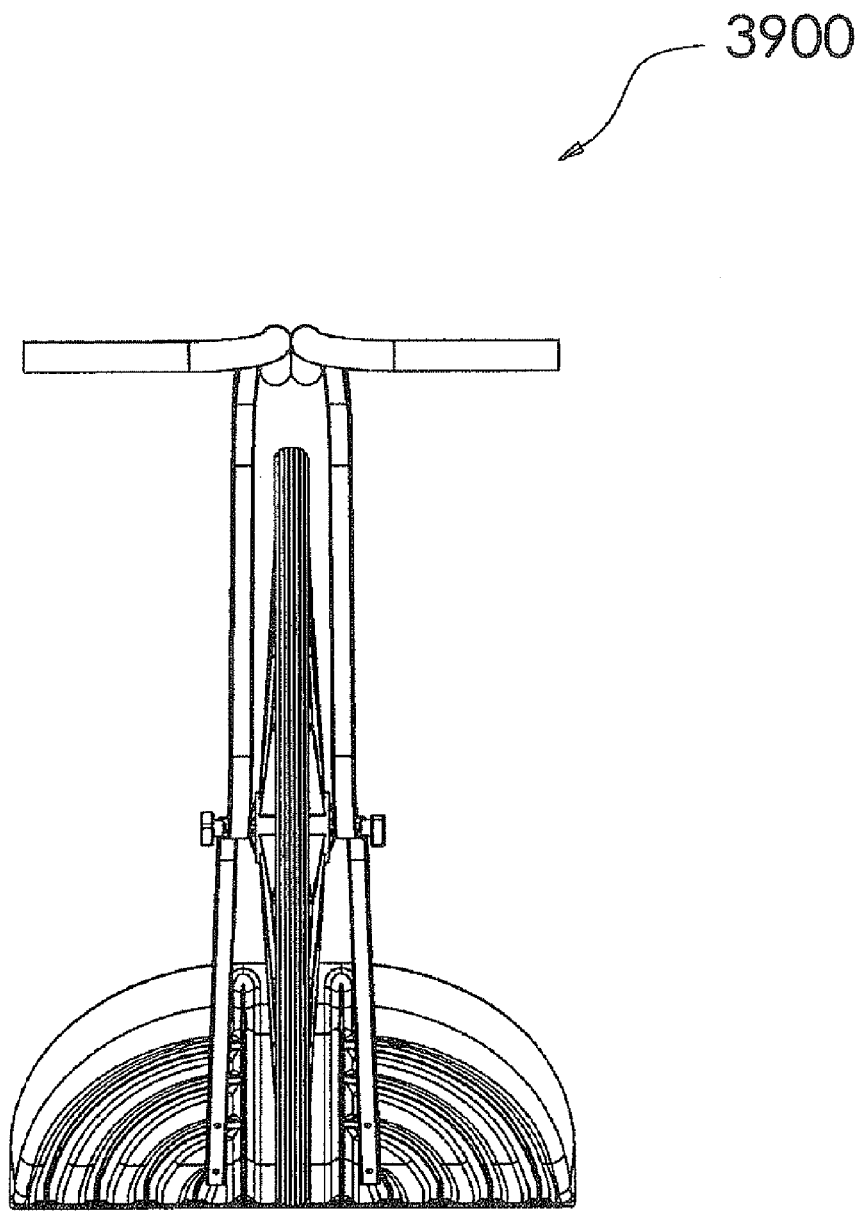
Figure 104:
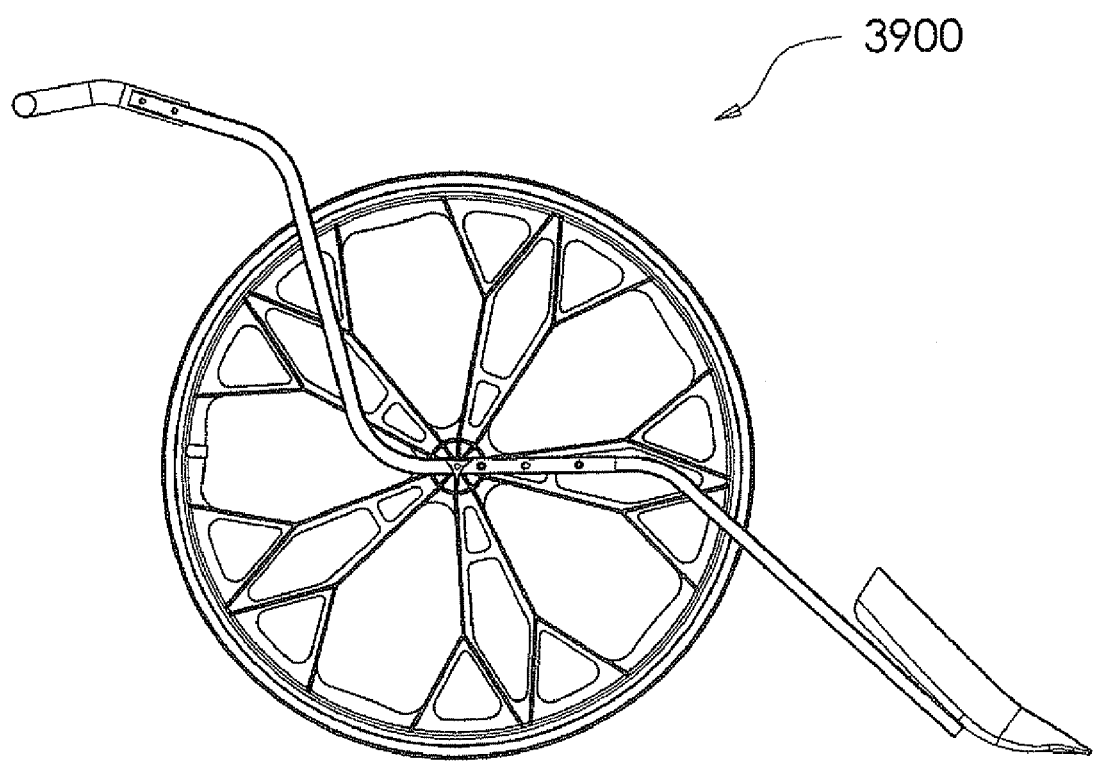
Figure 105:
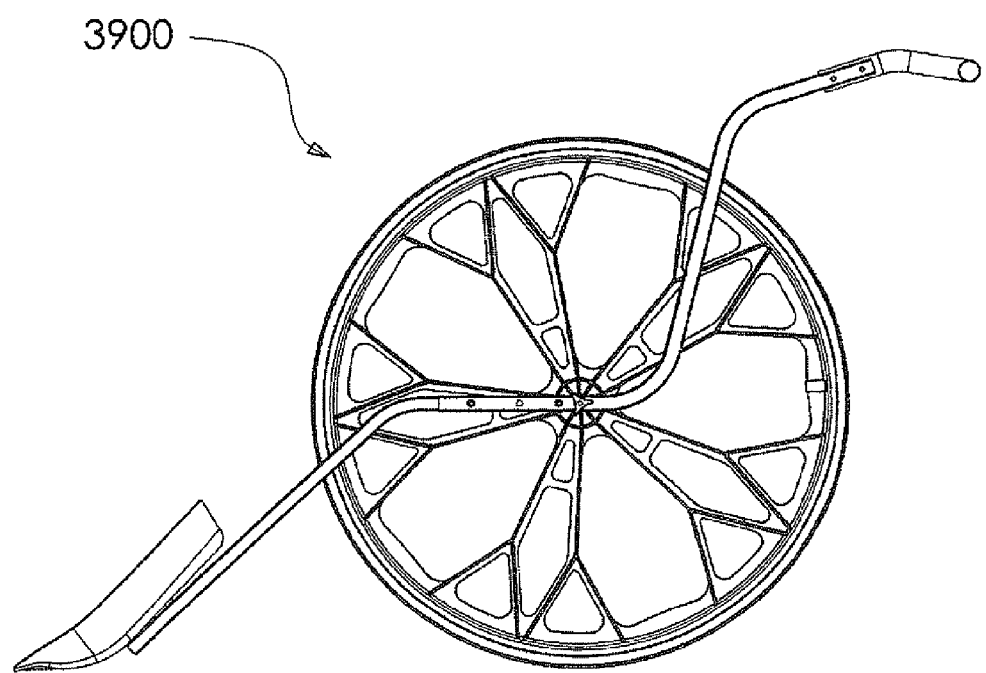
Figure 106:
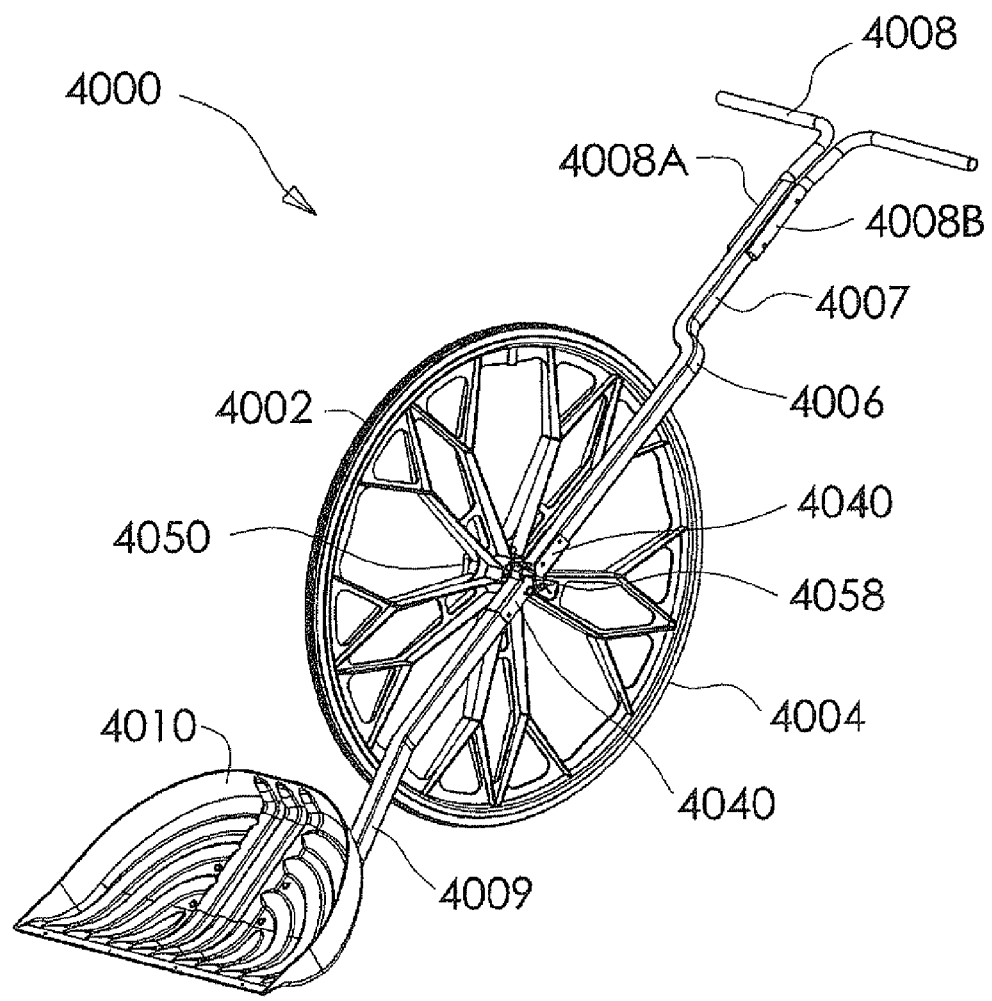
Figure 107:
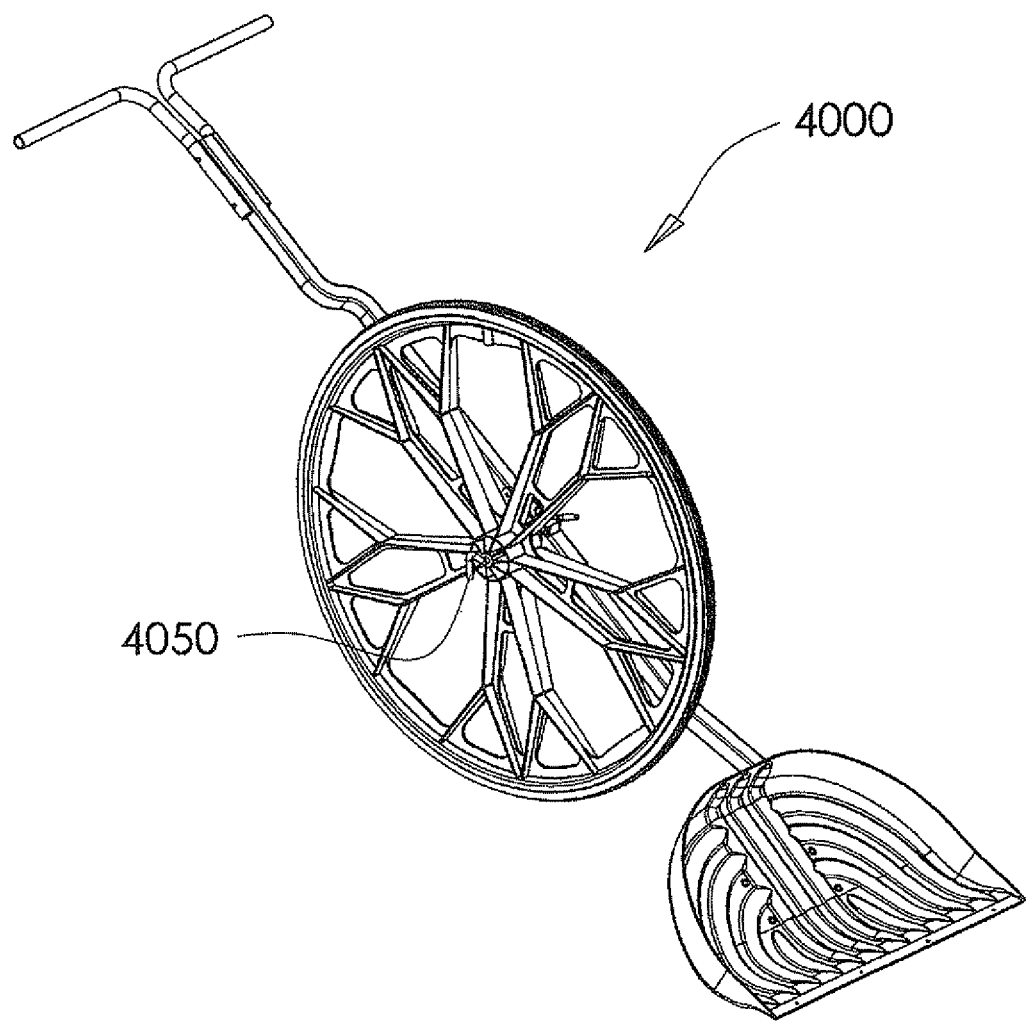
Figure 108:
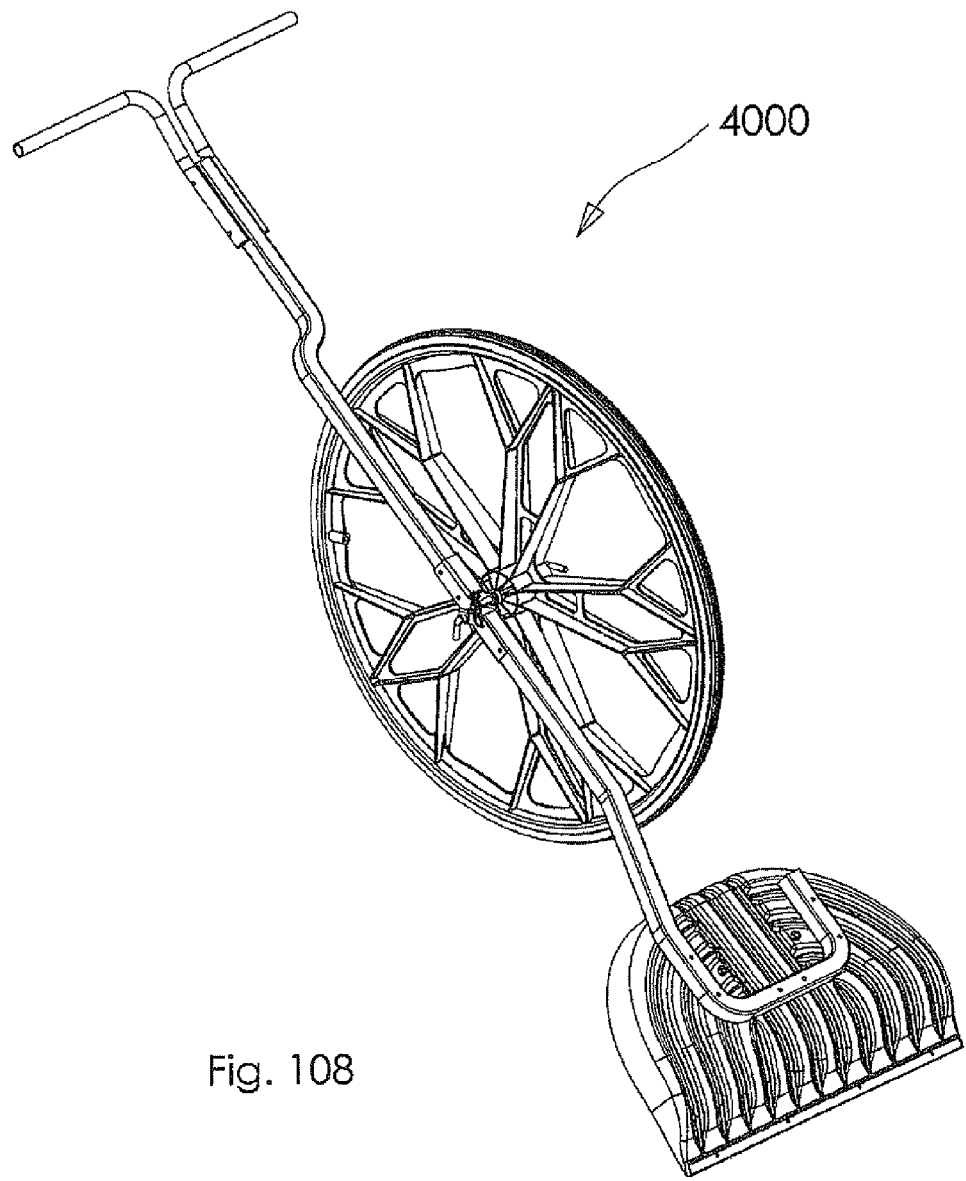
Figure 109:
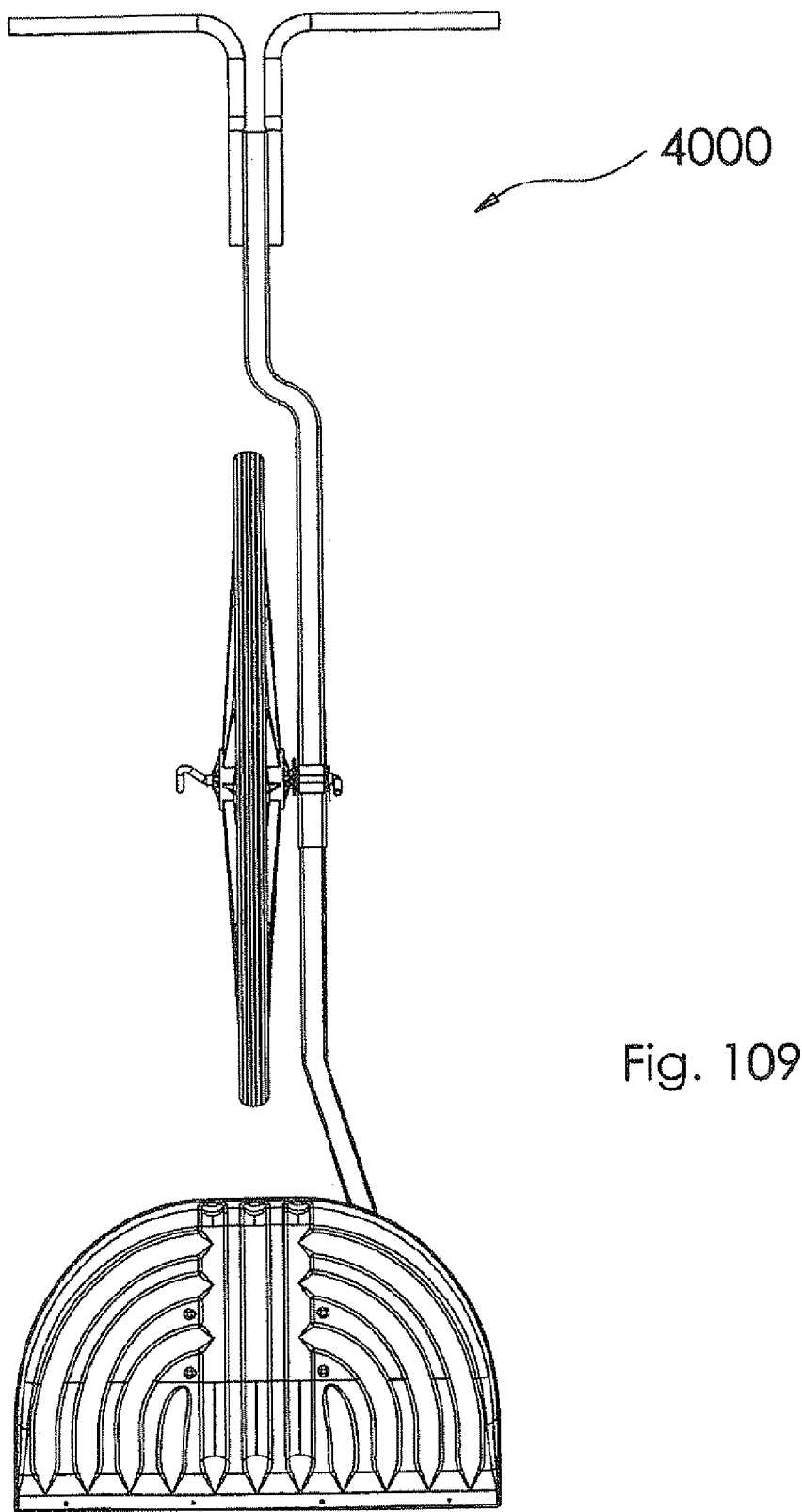
Figure 110:
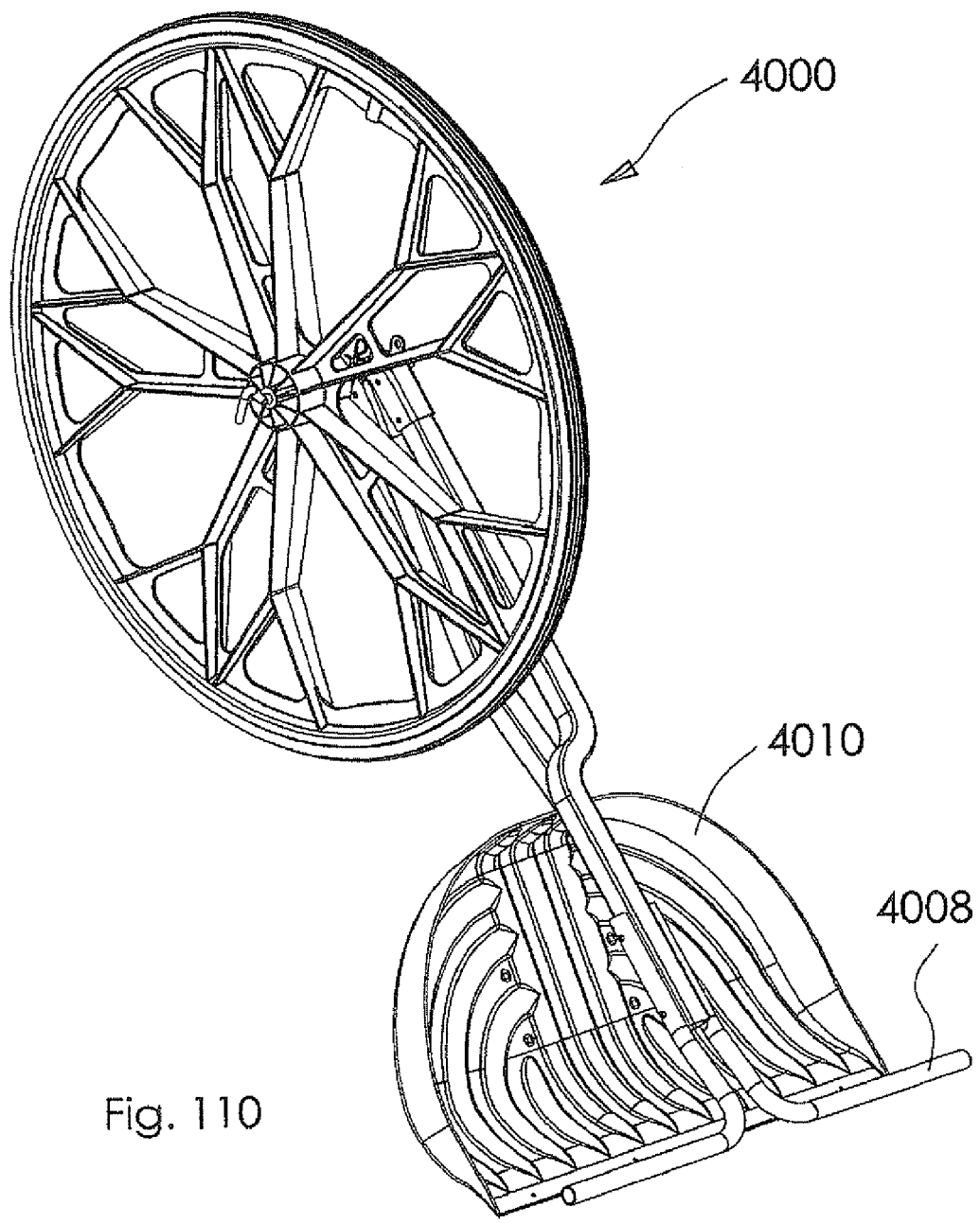
Figure 111:
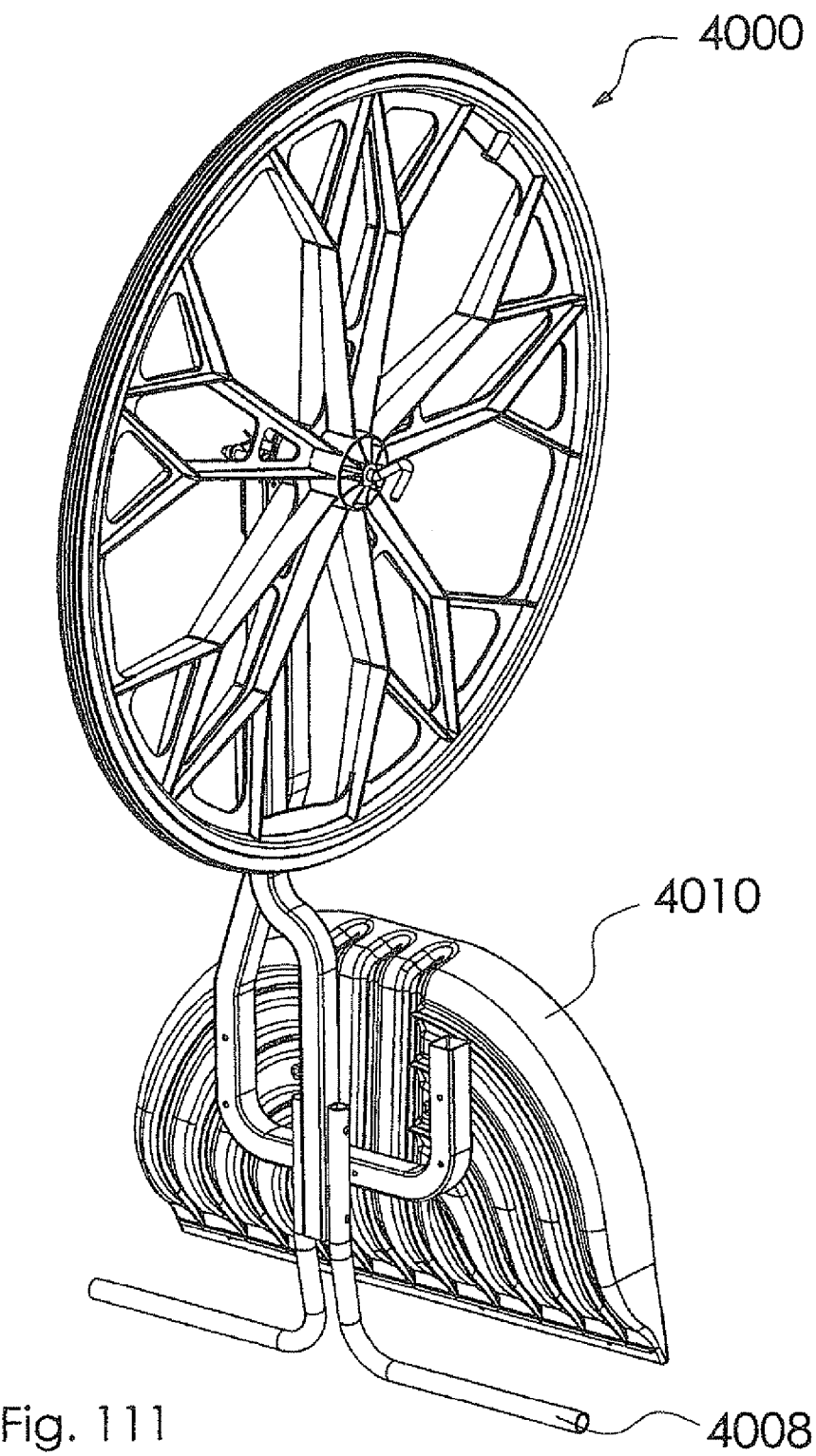
Figure 112:
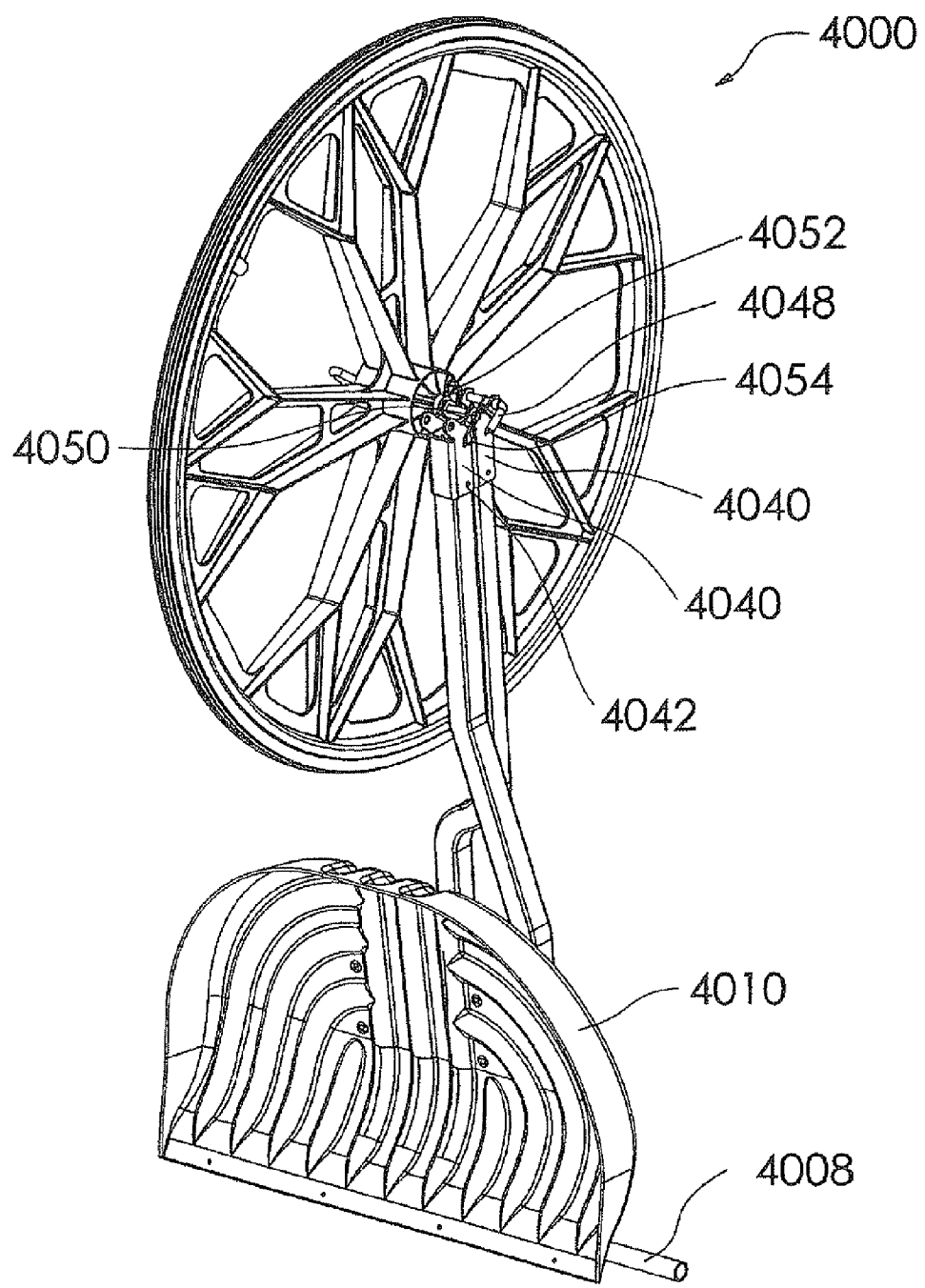
Figure 113:
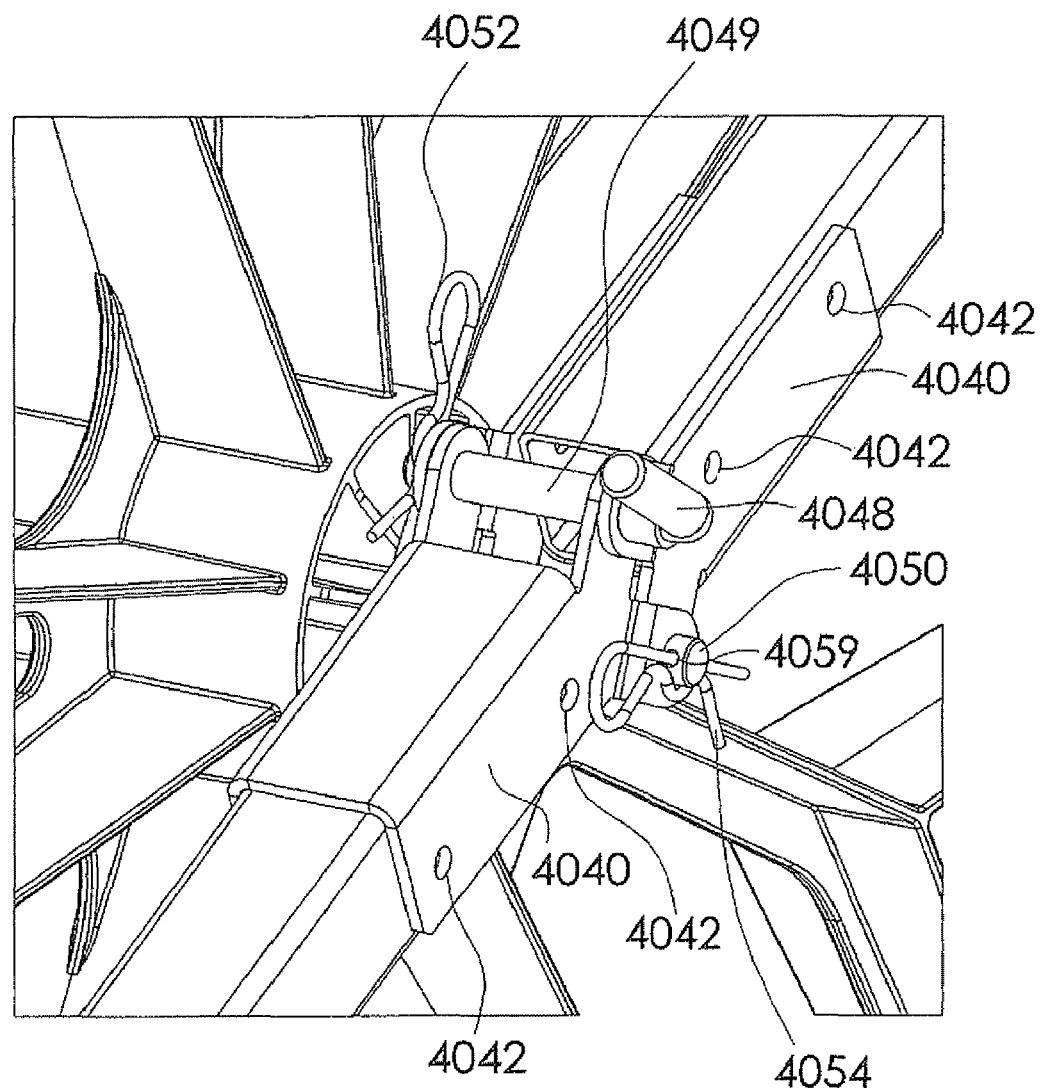
Figure 114:
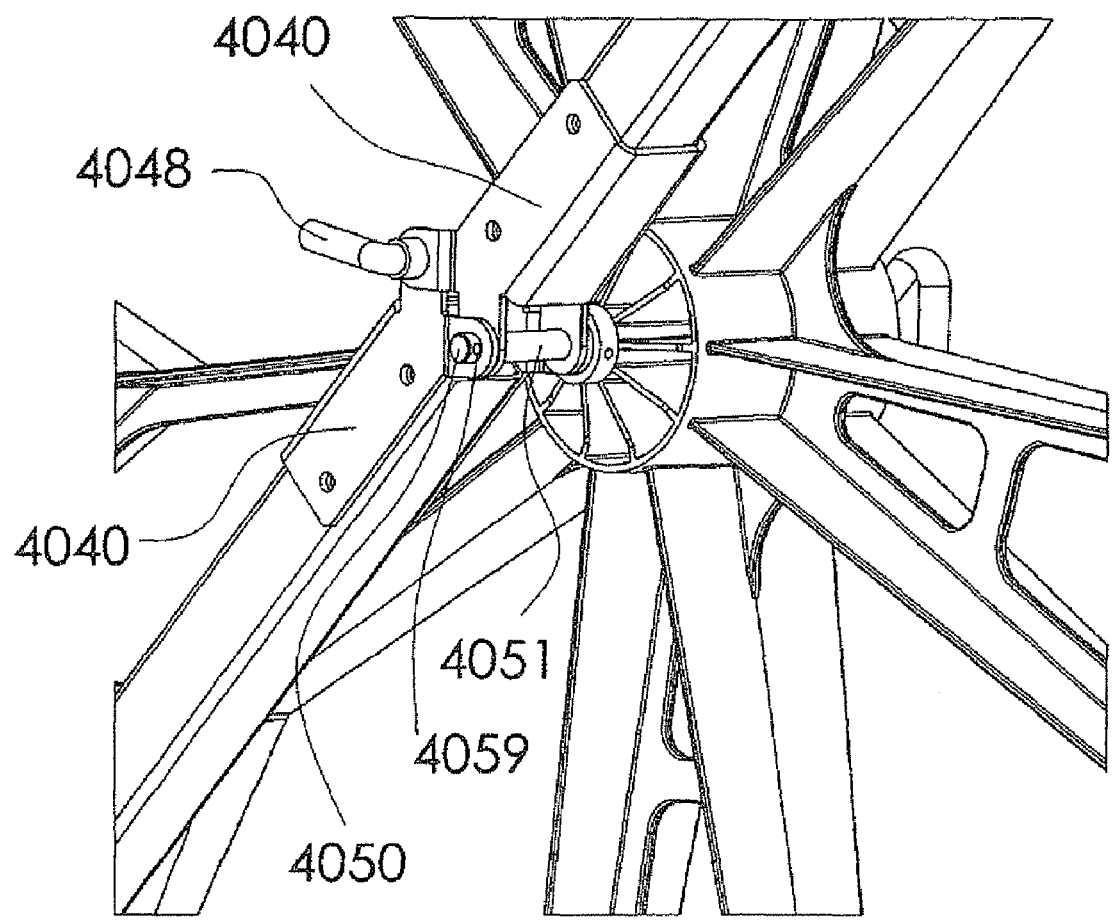
Figure 115:
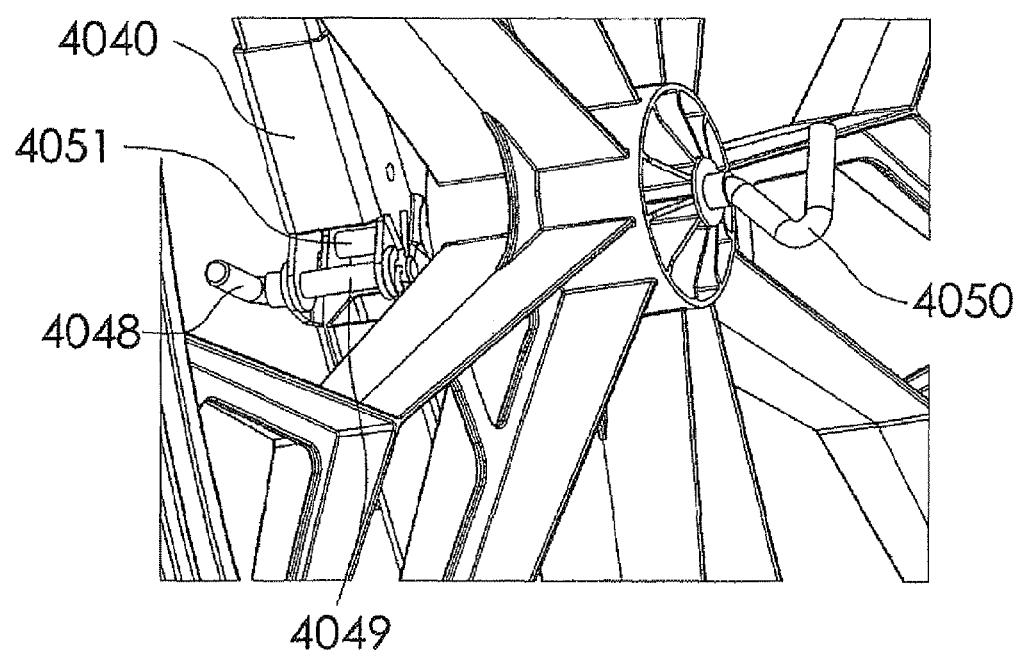
Figure 116:
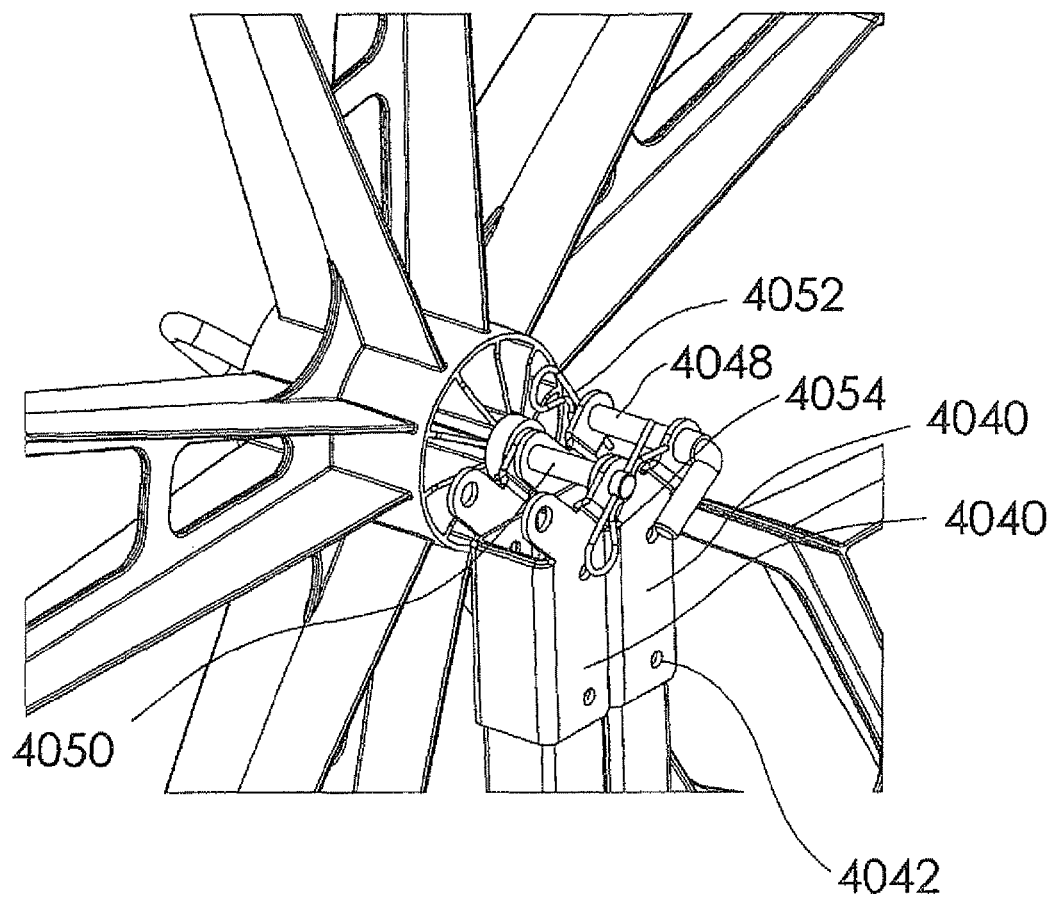
Figure 117:
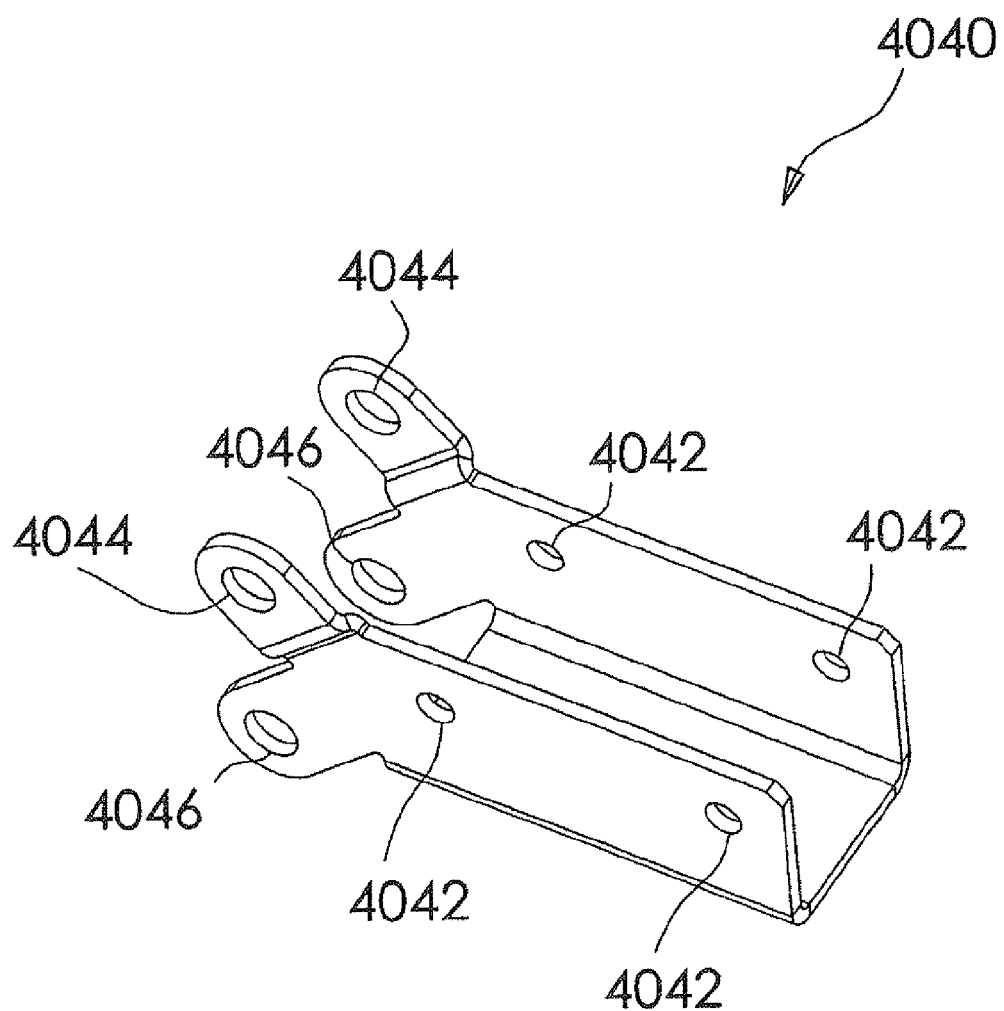
Figure 118:
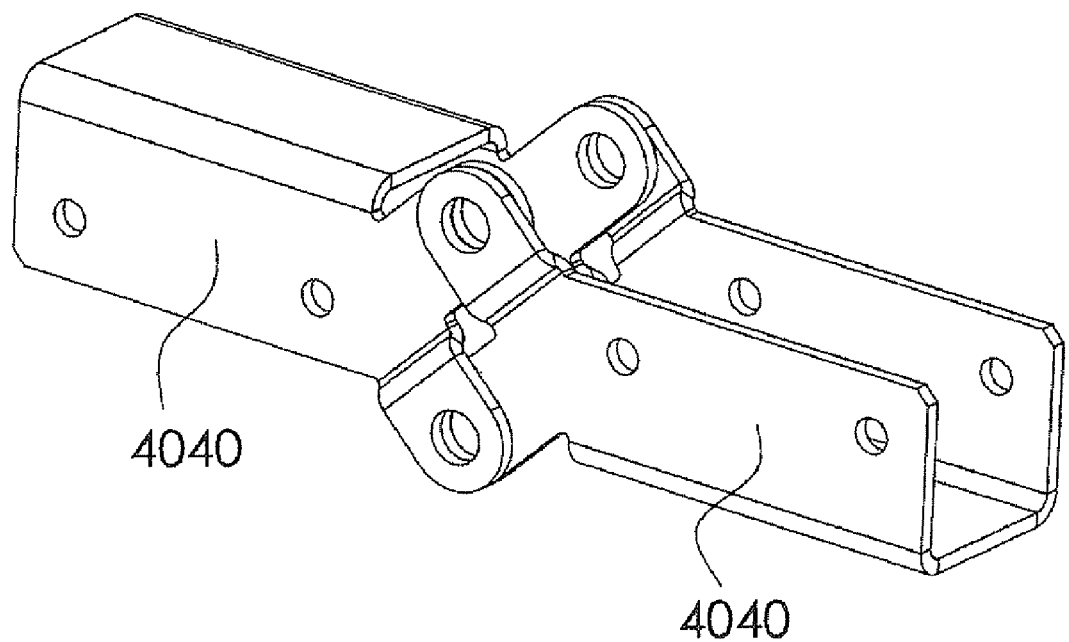
Figure 119:
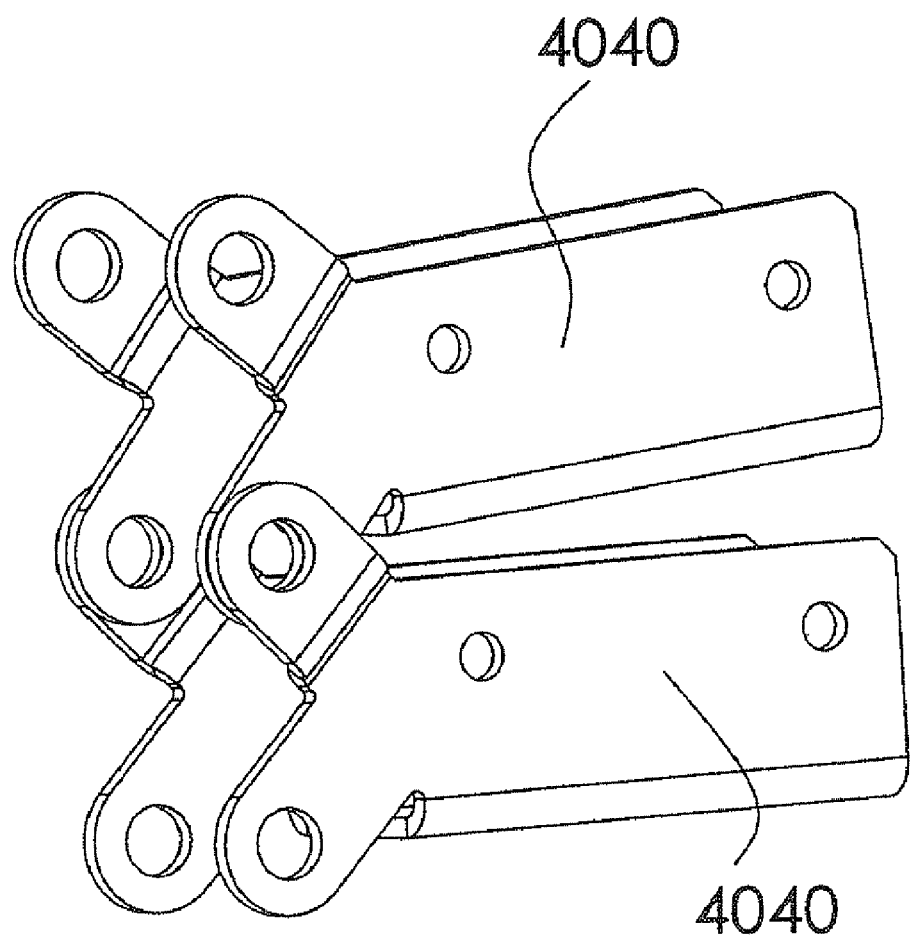
Figure 120:
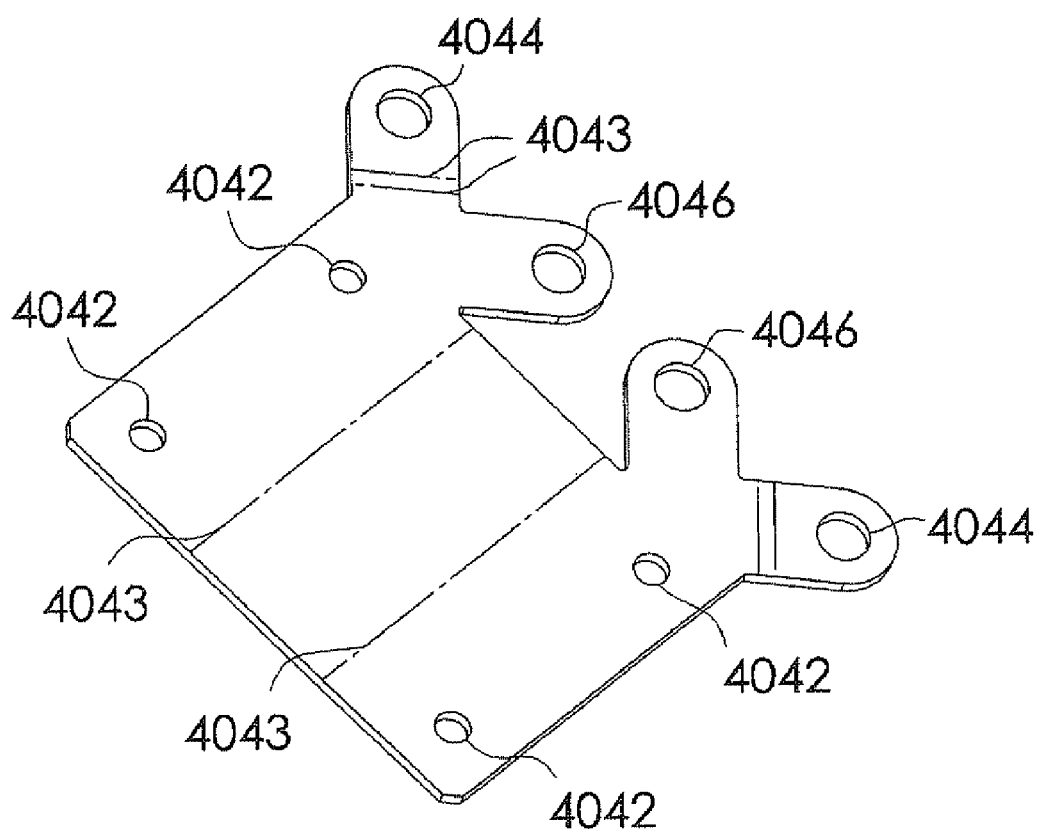
Figure 121:
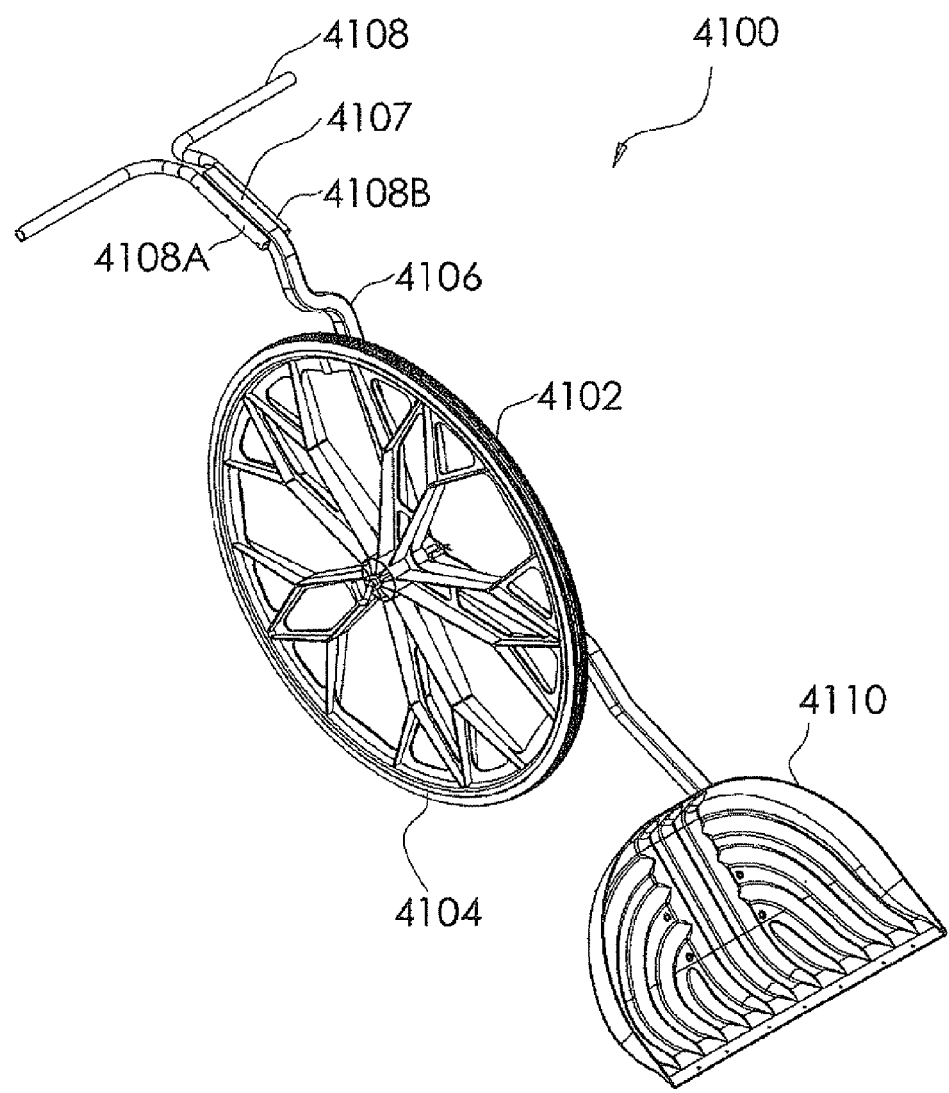
Figure 122:
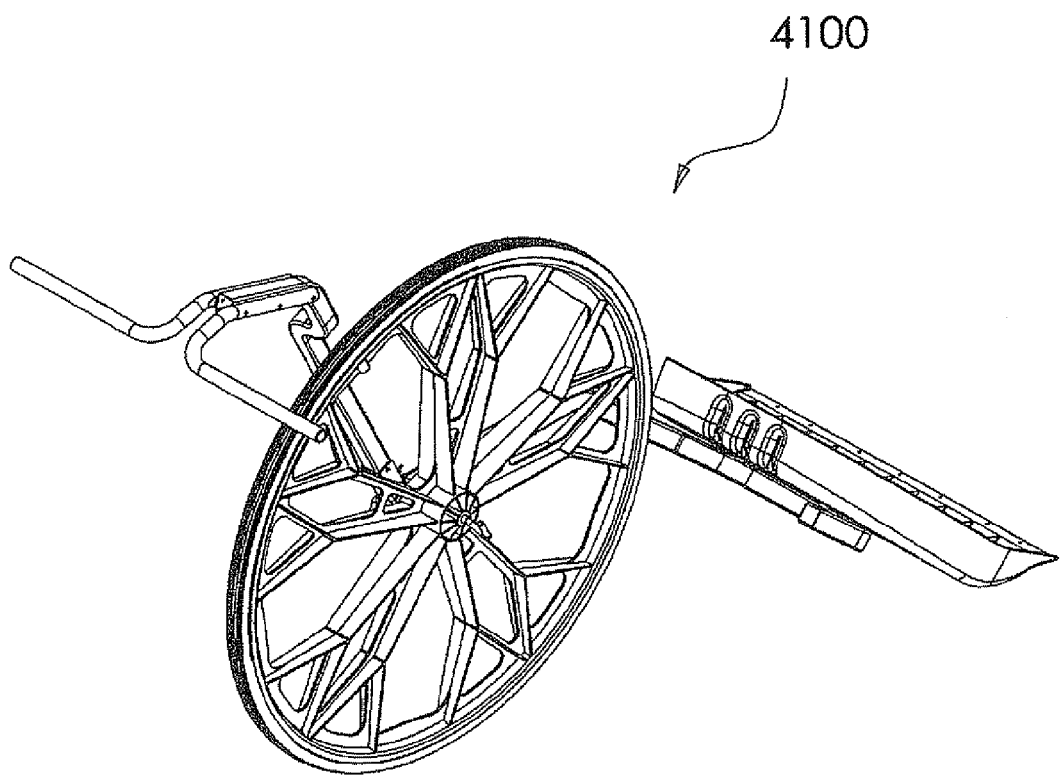
Figure 123:
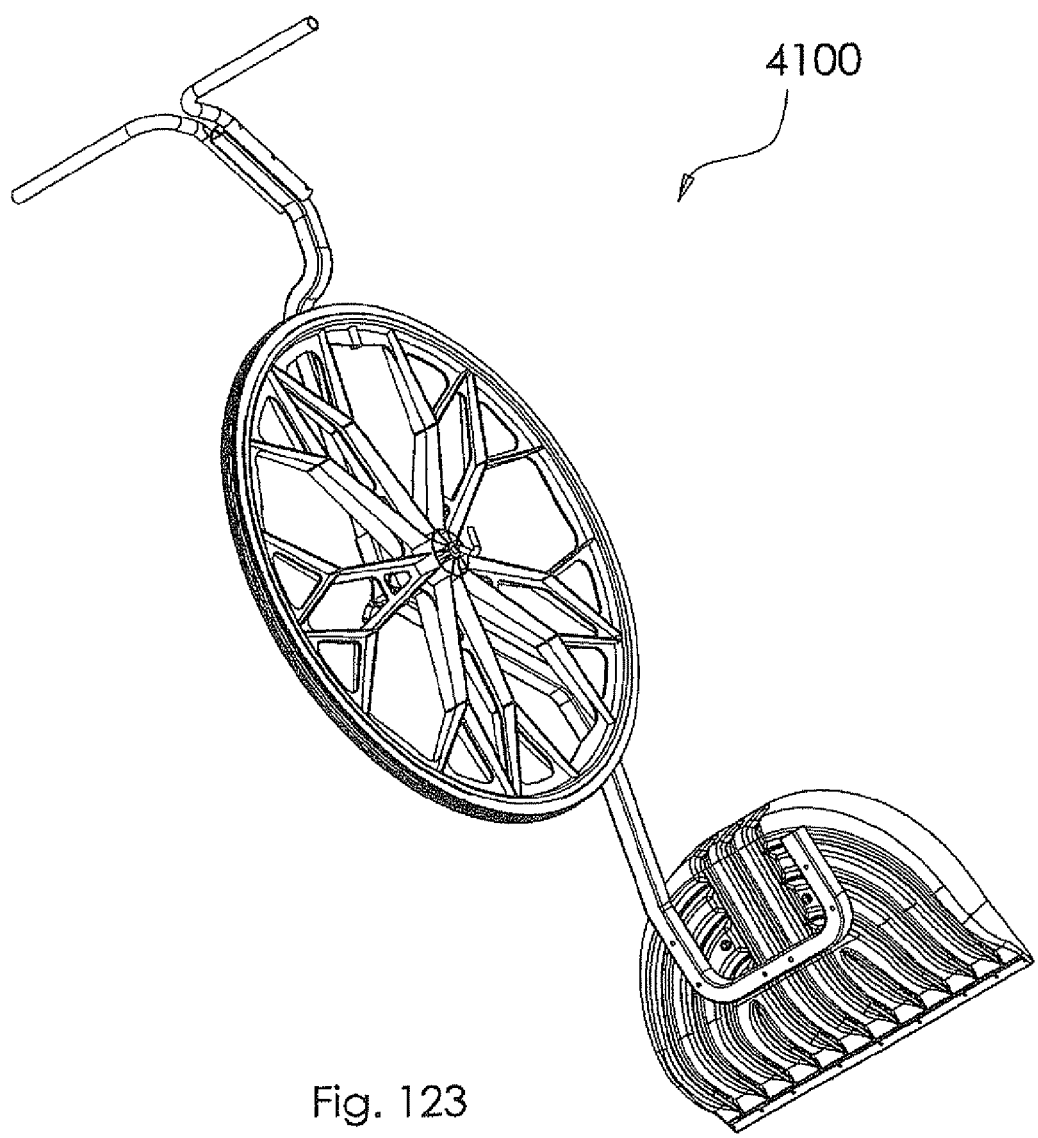
Figure 124:
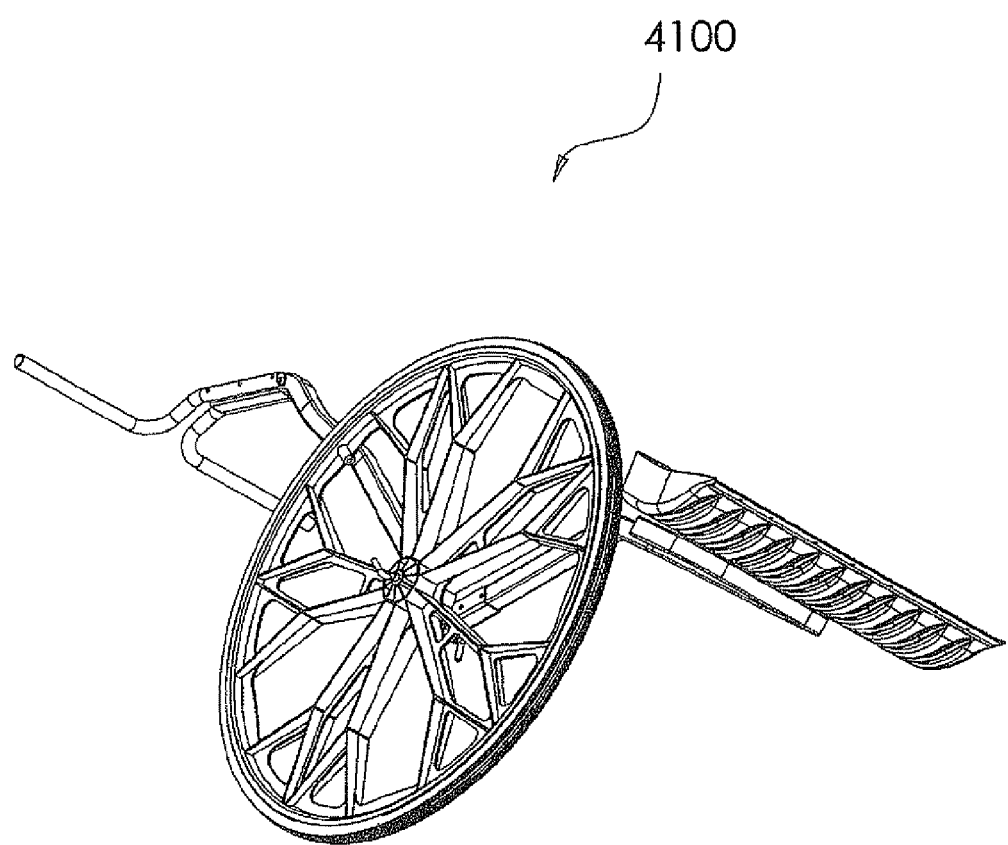
Figure 125:
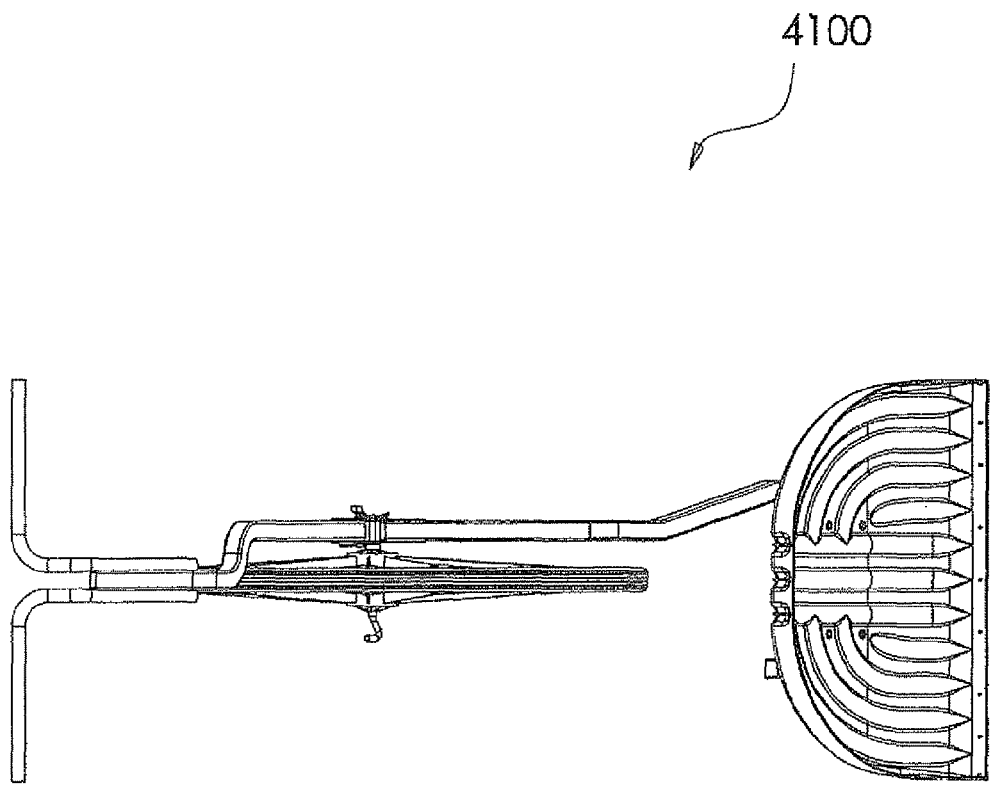
Figure 126:
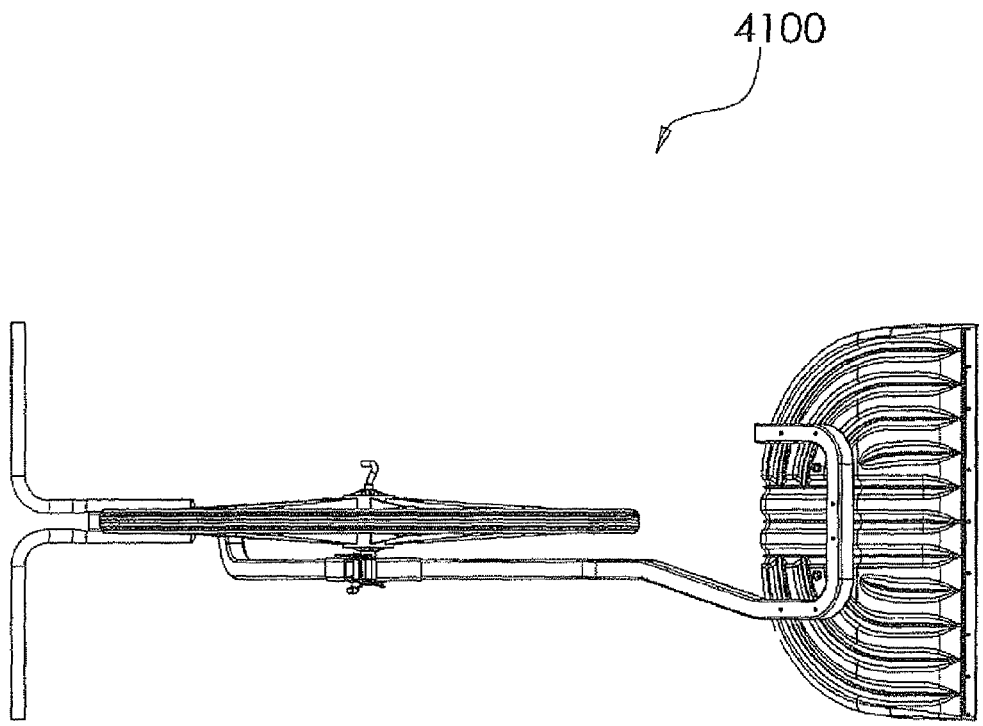
Figure 127:
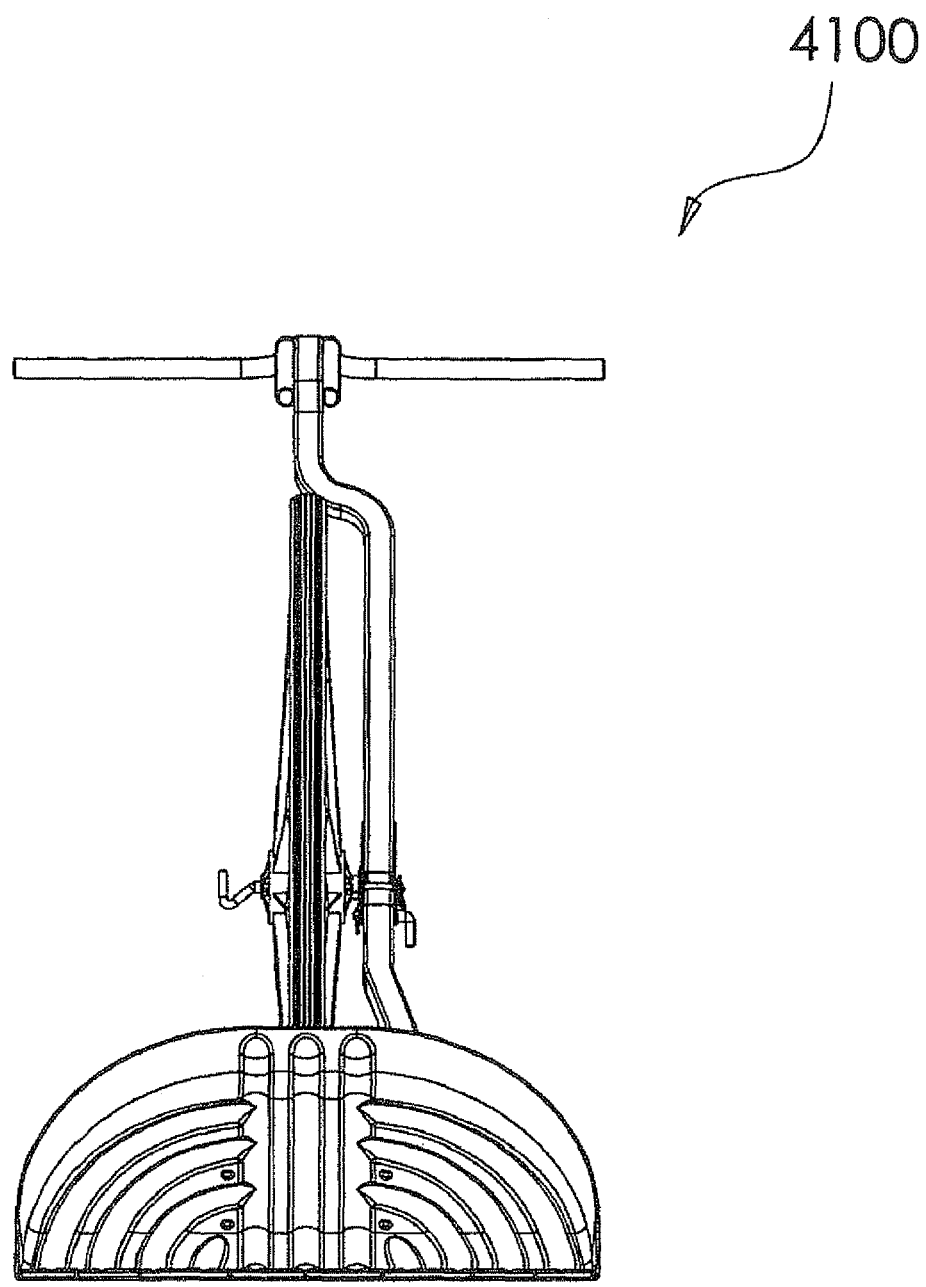
Figure 128:
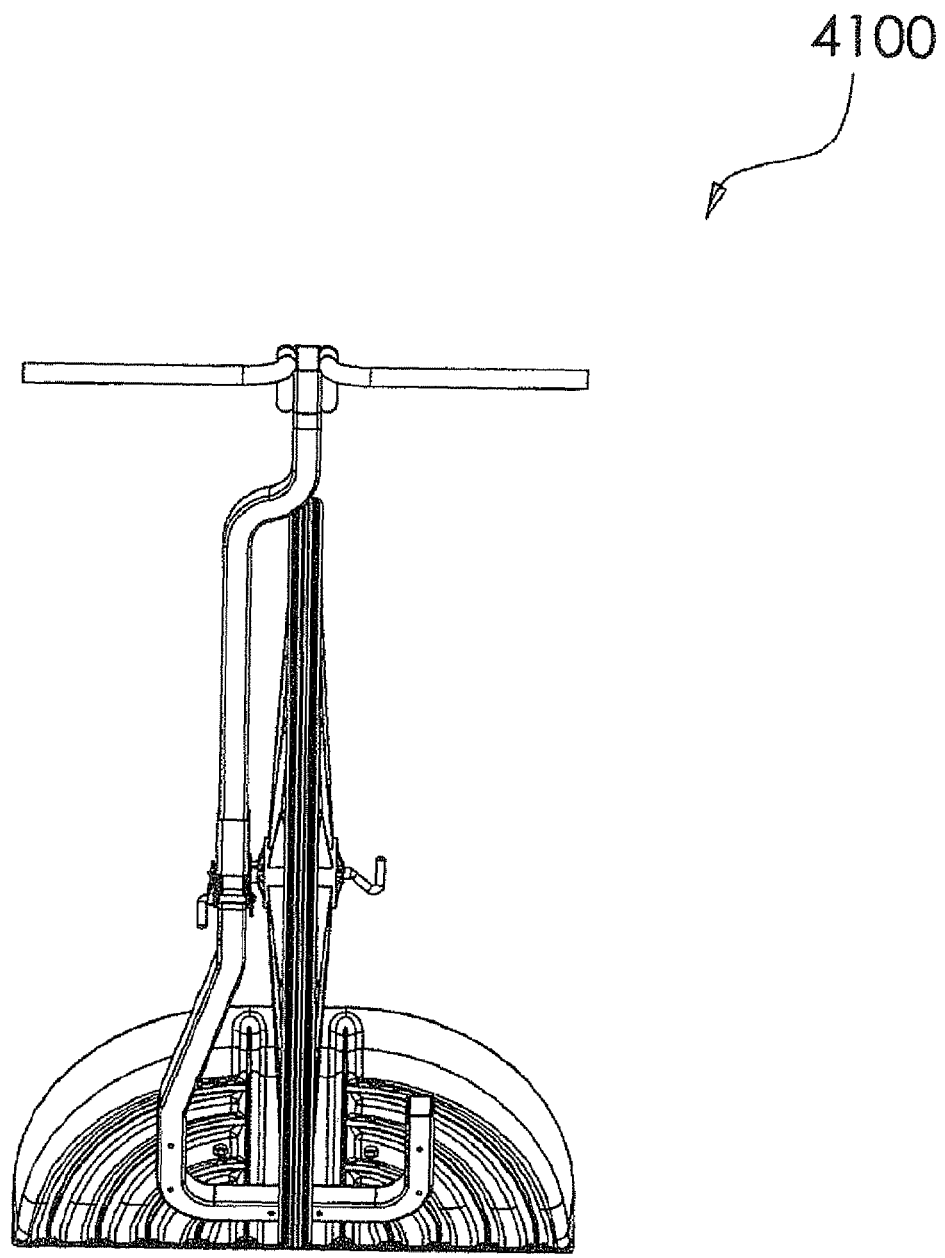
Figure 129:
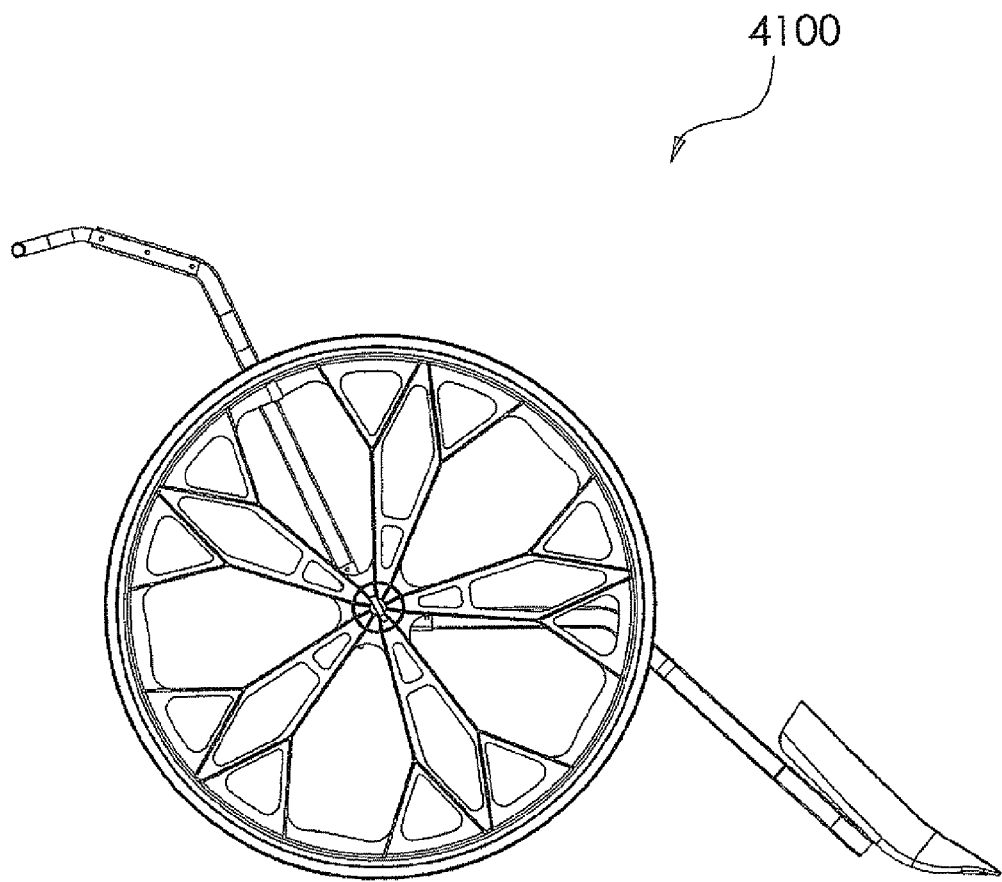
Figure 130:
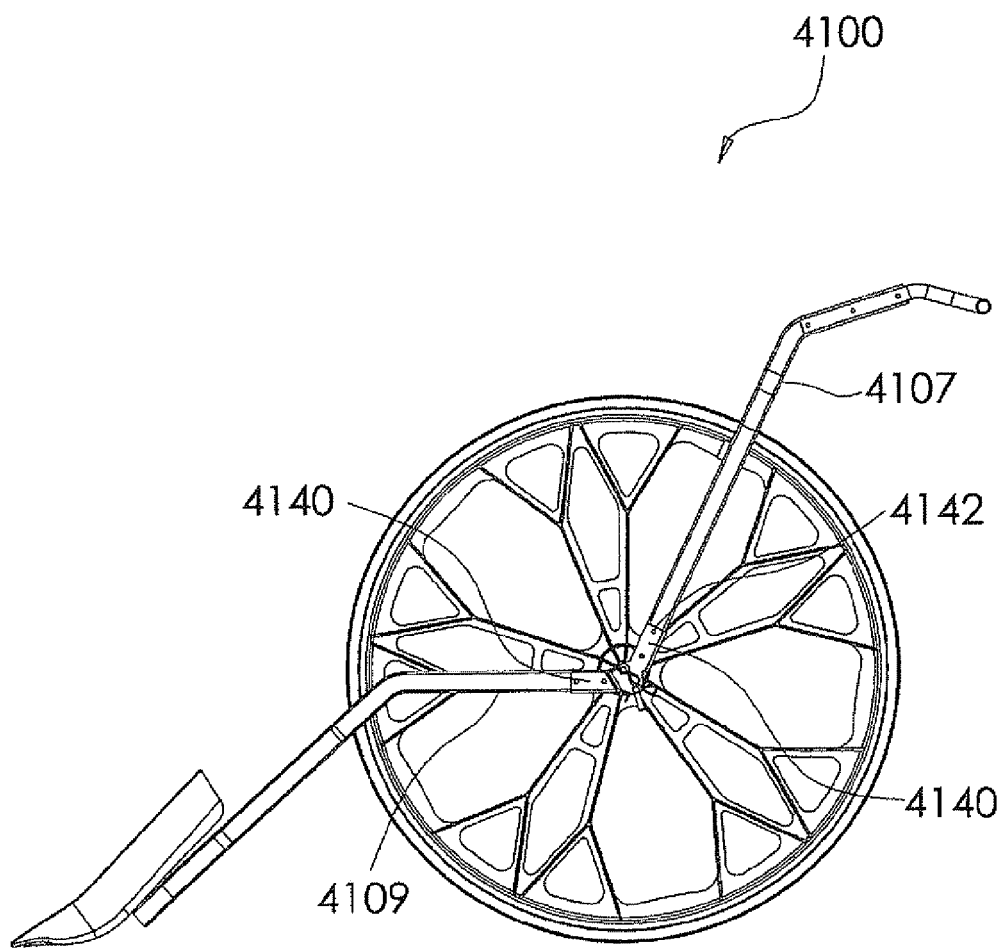
Figure 131:
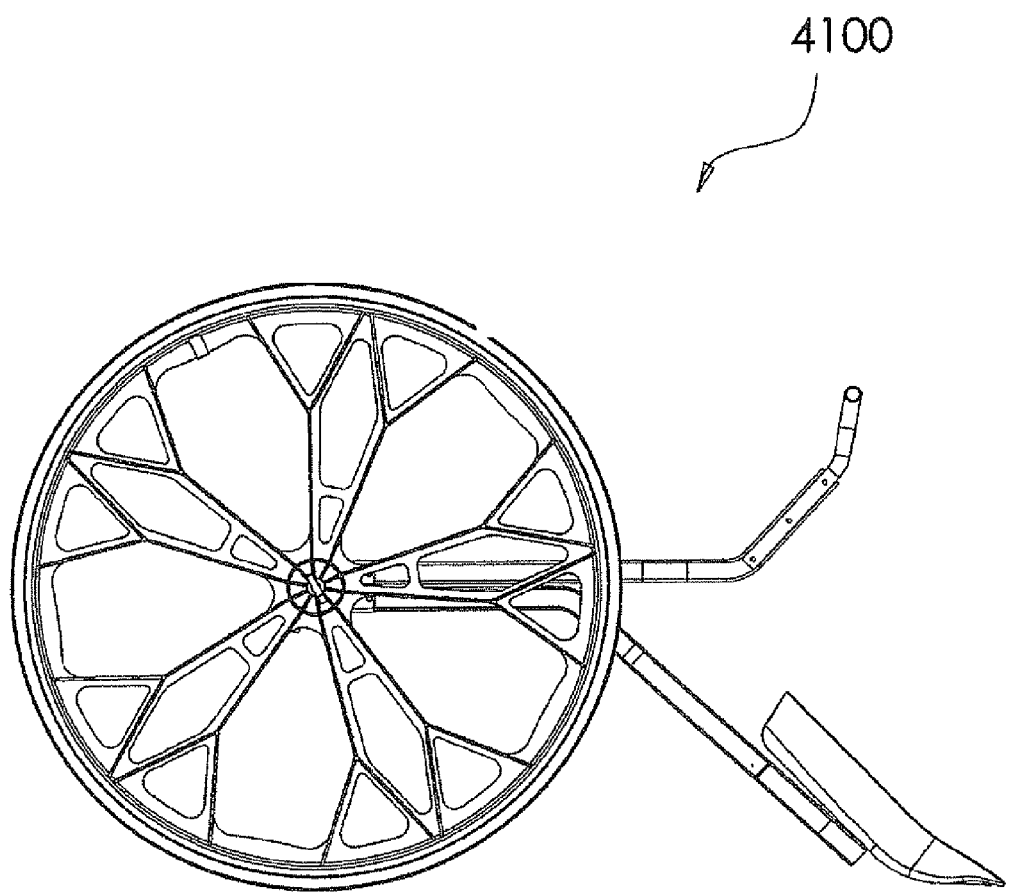
Figure 132:
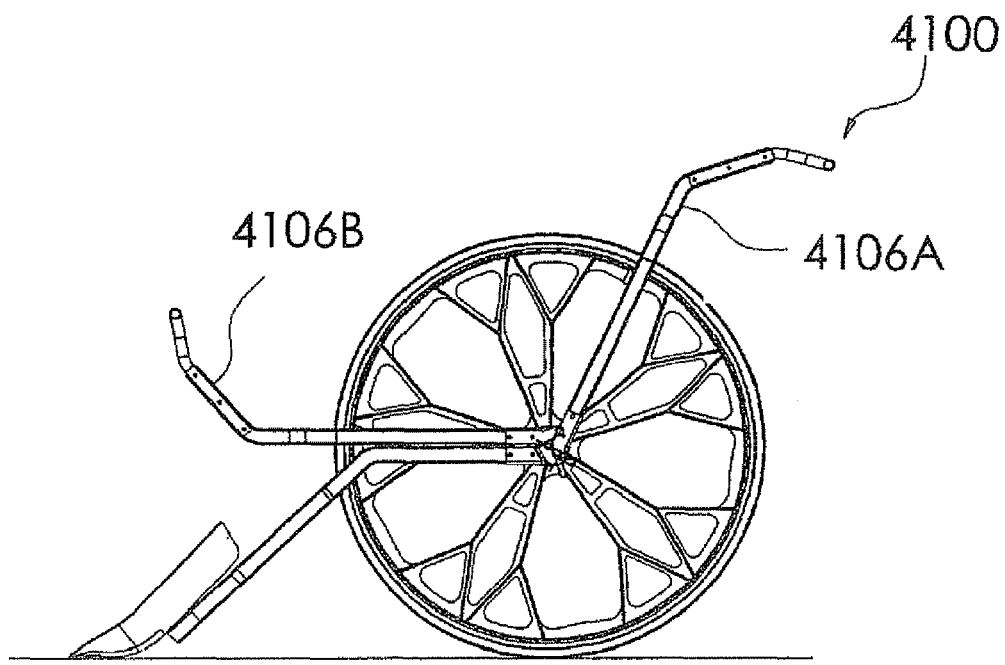
Figure 133:
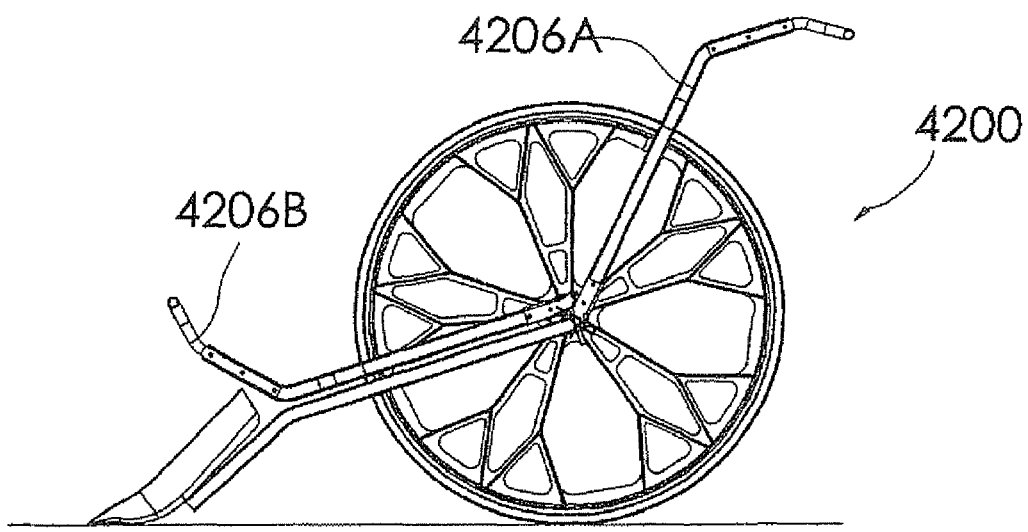
Figure 134:
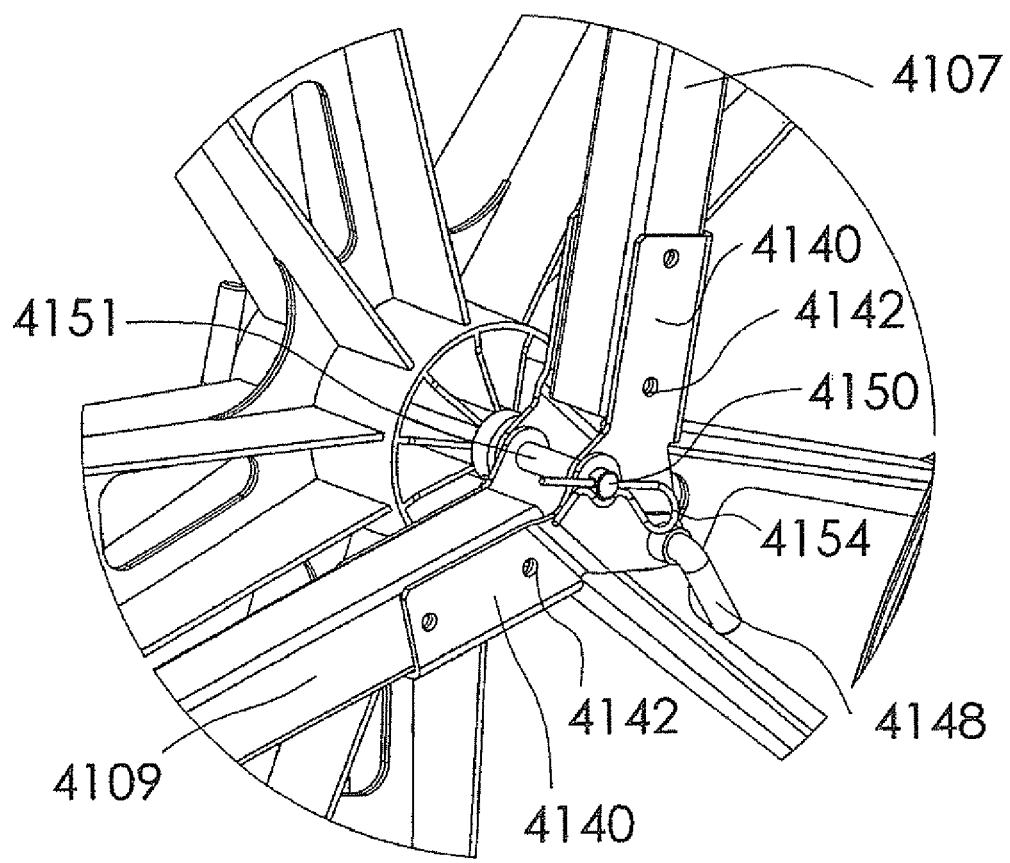
Figure 135:
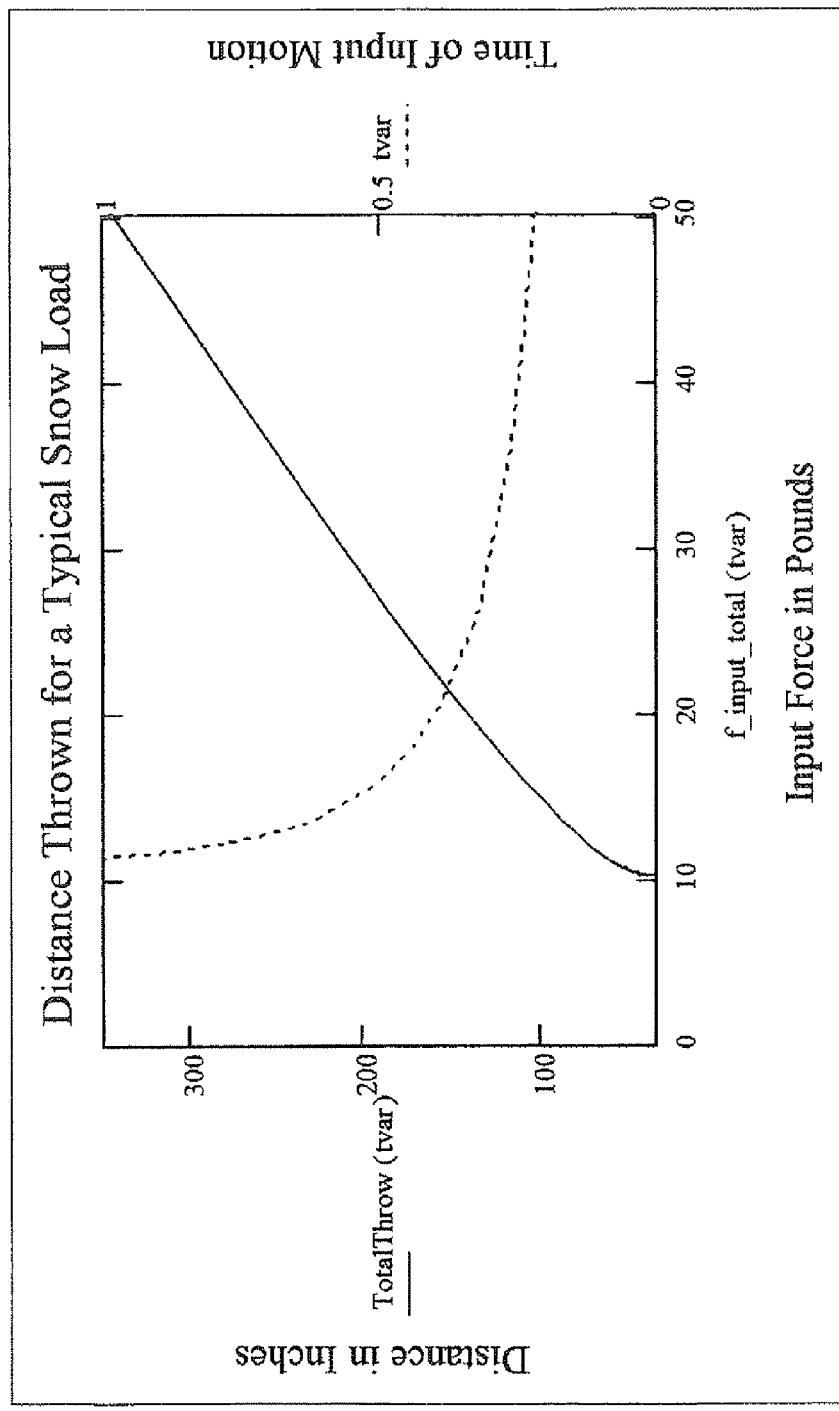
Figure 136:
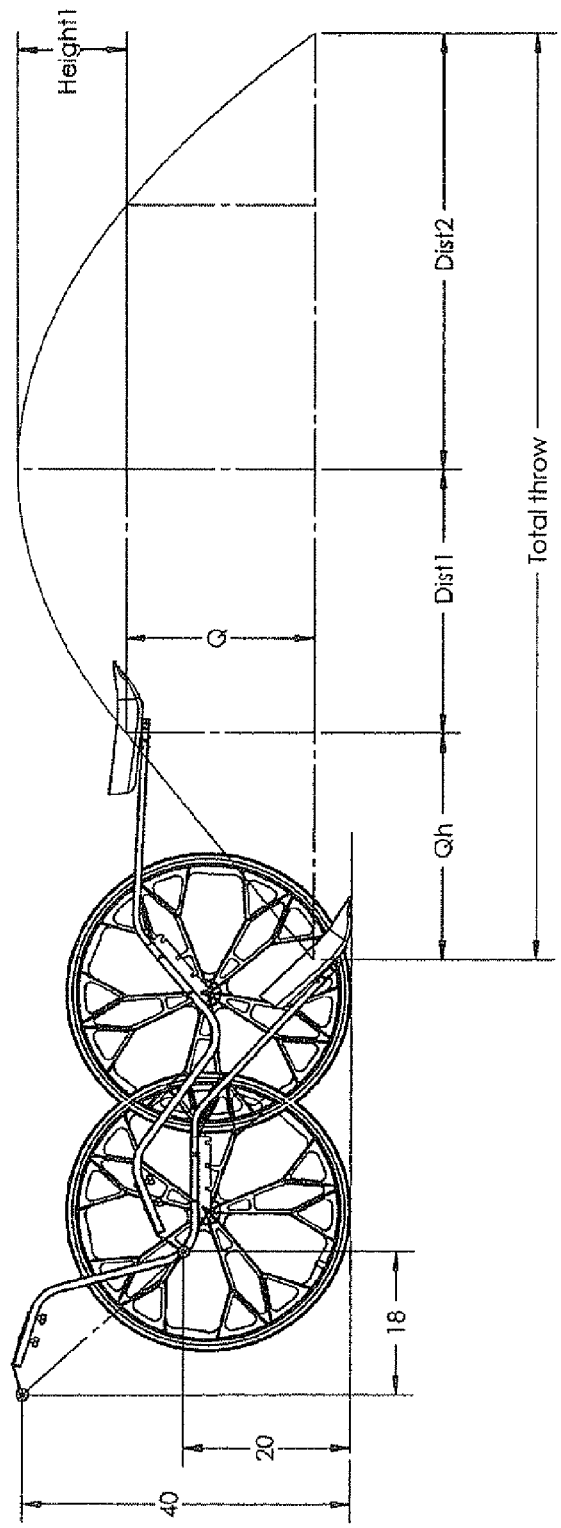
Figure 137:
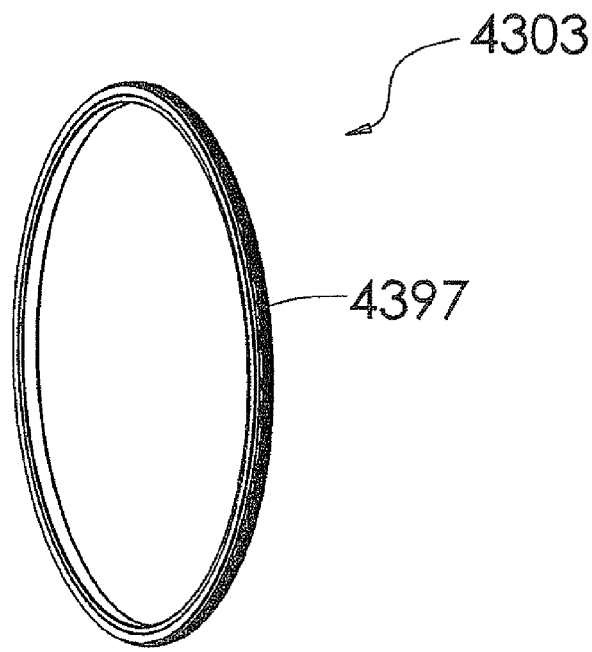
Figure 138:
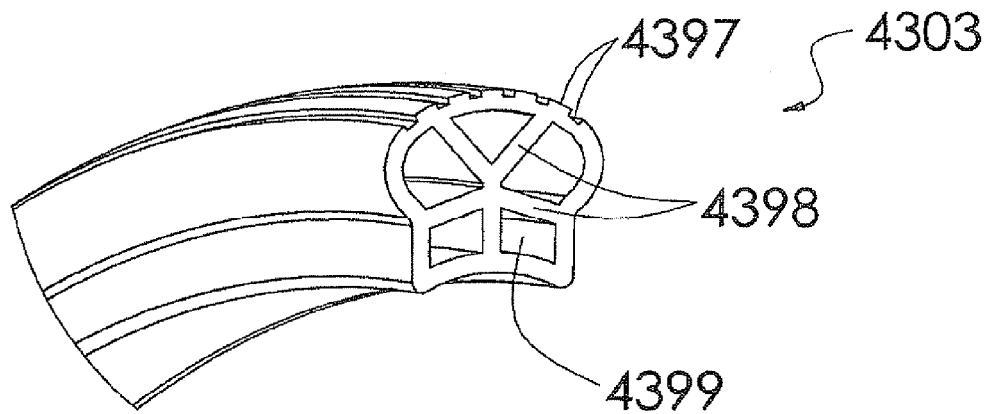
Figure 139:
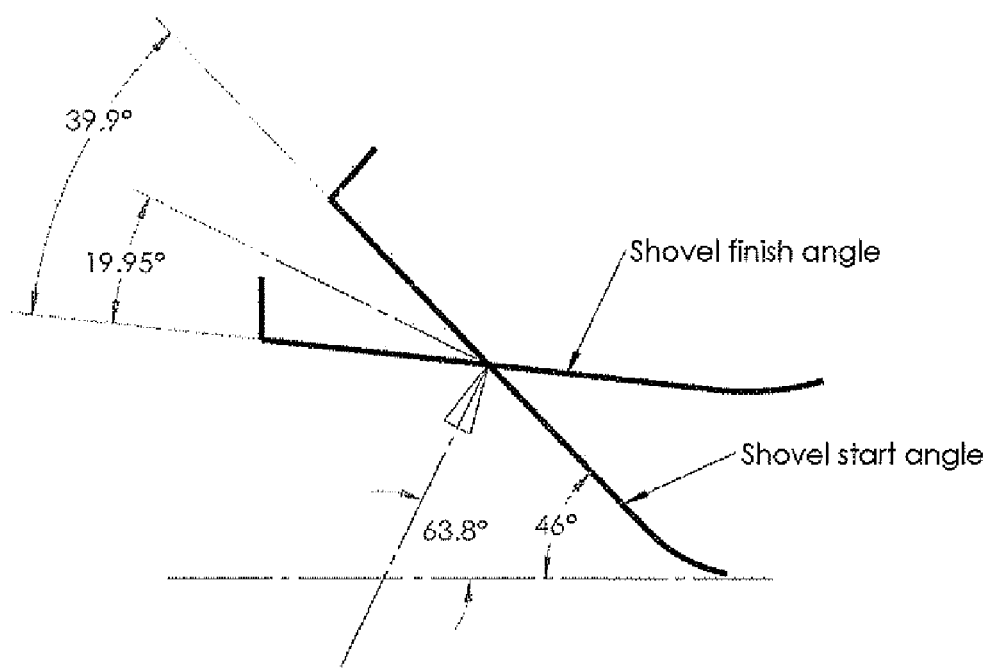

FIGS. 11a, 11b, and 11c are side views of exemplary driving members each having an adjustable notched element according to an exemplary embodiment;

FIG. 12 is a top view of a shovel blade having arced walls according to an exemplary embodiment;

FIG. 13 is a side view of the angled shovel blade shown in FIG. 12;

FIG. 14 is a top view of an assembly that can be used for attaching a shovel blade to a driving member, wherein the assembly includes an attachment plate shown adjoining two elements of the driving member according to an exemplary embodiment;

FIG. 15 is a top view of an assembly that can be used for attaching a shovel blade to a driving member, wherein the assembly includes an angled attachment plate shown adjoining two elements of the driving member according to an exemplary embodiment;

FIG. 16 is a side view of the assembly with the angled attachment plate shown in FIG. 15;

FIG. 17 is a perspective view of an adjustable handle assembly according to an exemplary embodiment;

FIG. 18 is a perspective view of another adjustable handle assembly according to an exemplary embodiment;

FIG. 19 is a side view illustrating a wheeled shovel with a smaller wheel juxtaposed for comparison with a wheeled shovel having a larger wheel, with both wheeled shovels illustrated in a pre-load position according to various exemplary embodiments;

FIG. 20 is a side view of the wheeled shovels shown in FIG. 19 but illustrating both wheeled shovels in an unload position after the handle has been pushed down to propel the shovel blade and load thereon to an upward trajectory according to various exemplary embodiments;

FIG. 21 is a perspective view of a kit and its various components for assembling a wheeled shovel according to an exemplary embodiment;

FIG. 22 is a view illustrating a wheeled shovel kit packaged within a container according to an exemplary embodiment;

FIG. 23 is a perspective view of a frame assembled from the wheeled shovel kit shown in FIG. 21 according to an exemplary embodiment;

FIG. 24 is an exploded perspective view showing operations for assembling a handle to an upper section of a frame from a wheeled shovel kit according to an exemplary embodiment;

FIG. 25 is an exploded perspective view showing operations for assembling a shovel blade to a frame with an attachment plate from a wheeled shovel kit according to an exemplary embodiment;

FIG. 26 is a side view of a wheeled shovel, which may be assembled from a wheeled shovel kit, according to an exemplary embodiment;

FIG. 27 is an upper perspective view of the wheeled shovel shown in FIG. 26;

FIG. 28 is another upper perspective view of the wheeled shovel shown in FIG. 26;

FIG. 29 is a lower perspective view of the wheeled shovel shown in FIG. 26;

FIG. 30 is another lower perspective view of the wheeled shovel shown in FIG. 26;

FIG. 31 is a top view of the wheeled shovel shown in FIG. 26;

FIG. 32 is a bottom view of the wheeled shovel shown in FIG. 26;

FIG. 33 is a front view of the wheeled shovel shown in FIG. 26;

FIG. 34 is a rear view of the wheeled shovel shown in FIG. 26;

FIG. 35 is a side view of a wheeled shovel, which may be assembled from a wheeled shovel kit, according to an exemplary embodiment;

FIG. 36 is an upper perspective view of the wheeled shovel shown in FIG. 35;

FIG. 37 is another upper perspective view of the wheeled shovel shown in FIG. 35;

FIG. 38 is a lower perspective view of the wheeled shovel shown in FIG. 35;

FIG. 39 is another lower perspective view of the wheeled shovel shown in FIG. 35;

FIG. 40 is a top view of the wheeled shovel shown in FIG. 35;

FIG. 41 is a bottom view of the wheeled shovel shown in FIG. 35;

FIG. 42 is a front view of the wheeled shovel shown in FIG. 35;

FIG. 43 is a rear view of the wheeled shovel shown in FIG. 35;

FIG. 44 is an exploded perspective view of various components that may be assembled into the wheeled shovel shown in FIGS. 35 through 43 according to an exemplary embodiment;

FIG. 45 is an exploded perspective view of various frame components that may be assembled into the frame shown in FIG. 44;

FIG. 46 is a perspective view of a frame assembled from the components shown in FIG. 45;

FIG. 47 is a side view of the frame shown in FIG. 46;

FIG. 48 is a top view of the frame shown in FIG. 46;

FIG. 49 is a front view of the frame shown in FIG. 46;

FIG. 50 is a perspective view of one of the two upper frame members shown in FIG. 45;

FIG. 51 is a side view of the upper frame members shown in FIG. 50;

FIG. 52 is a top view of the upper frame member shown in FIG. 50;

FIG. 53 is a front view of the upper frame member shown in FIG. 50;

FIG. 54 is a bottom view of the upper frame member shown in FIG. 50;

FIG. 55 is a perspective view of one of the two lower frame members shown in FIG. 45;

FIG. 56 is a side view of lower frame member shown in FIG. 55;

FIG. 57 is a rear view of the lower frame member shown in FIG. 55;

FIG. 58 is an exploded perspective view showing two lower frame members and a shovel attachment plate shown in FIG. 44;

FIG. 59 is a perspective view showing the lower frame members and the shovel attachment plate shown in FIG. 58 after the shovel attachment plate has been attached to the lower frame members;

FIG. 60 is side view of the lower frame assembly shown in FIG. 59;

FIG. 61 is top view of the lower frame assembly shown in FIG. 59;

FIG. 62 is bottom view of the lower frame assembly shown in FIG. 59;

FIG. 63 is front view of the lower frame assembly shown in FIG. 59;

FIG. 64 is a perspective view of an axle receiver having four axle receiving cavities as shown in FIGS. 44 and 45;

FIG. 65 is a side view of the axle receiver shown in FIG. 64;

FIG. 66 is a top view of the axle receiver shown in FIG. 64;

FIG. 67 is a front view of the axle receiver shown in FIG. 64;

FIG. 68 is an exploded perspective view of various components that may be assembled into the chipper plate assembly shown in FIG. 44;

FIG. 69 is a perspective view of a chipper plate assembly assembled from the components shown in FIG. 68;

FIG. 70 is a side view of the chipper plate assembly shown in FIG. 69 with the nut and knob removed from an end portion of the carriage bolt;

FIG. 71 is a top view of the chipper plate assembly shown in FIG. 69;

FIG. 72 is a front view of the chipper plate assembly shown in FIG. 69;

FIG. 73 is an exploded perspective view of various components that may be assembled into the wheel bracket assembly shown in FIG. 44;

FIG. 74 is a perspective view of a wheel bracket assembly assembled from the components shown in FIG. 73;

FIG. 75 is an upper perspective view of a wheeled shovel according to an exemplary embodiment;

FIG. 76 is an upper perspective view of a wheeled shovel according to another exemplary embodiment;

FIG. 77 is another upper perspective view of the wheeled shovel shown in FIG. 76;

FIG. 78 is a lower perspective view of the wheeled shovel shown in FIG. 76;

FIG. 79 is another lower perspective view of the wheeled shovel shown in FIG. 76;

FIG. 80 is a top plan view of the wheeled shovel shown in FIG. 76;

FIG. 81 is a bottom plan view of the wheeled shovel shown in FIG. 76;

FIG. 82 is a front elevation view of the wheeled shovel shown in FIG. 76;

FIG. 83 is a rear elevation view of the wheeled shovel shown in FIG. 76;

FIG. 84 is a right elevation view of the wheeled shovel shown in FIG. 76;

FIG. 85 is a left elevation view of the wheeled shovel shown in FIG. 76;

FIG. 86 is an upper perspective view of a wheeled shovel according to another exemplary embodiment;

FIG. 87 is another upper perspective view of the wheeled shovel shown in FIG. 86;

FIG. 88 is a lower perspective view of the wheeled shovel shown in FIG. 86;

FIG. 89 is another lower perspective view of the wheeled shovel shown in FIG. 86;

FIG. 90 is a top plan view of the wheeled shovel shown in FIG. 86;

FIG. 91 is a bottom plan view of the wheeled shovel shown in FIG. 86;

FIG. 92 is a front elevation view of the wheeled shovel shown in FIG. 86;

FIG. 93 is a rear elevation view of the wheeled shovel shown in FIG. 86;

FIG. 94 is a right elevation view of the wheeled shovel shown in FIG. 86;

FIG. 95 is a left elevation view of the wheeled shovel shown in FIG. 86;

FIG. 96 is an upper perspective view of a wheeled shovel according to another exemplary embodiment;

FIG. 97 is another upper perspective view of the wheeled shovel shown in FIG. 96;

FIG. 98 is a lower perspective view of the wheeled shovel shown in FIG. 96;

FIG. 99 is another lower perspective view of the wheeled shovel shown in FIG. 96;

FIG. 100 is a top plan view of the wheeled shovel shown in FIG. 96;

FIG. 101 is a bottom plan view of the wheeled shovel shown in FIG. 96;

FIG. 102 is a front elevation view of the wheeled shovel shown in FIG. 96;

FIG. 103 is a rear elevation view of the wheeled shovel shown in FIG. 96;

FIG. 104 is a right elevation view of the wheeled shovel shown in FIG. 96;

FIG. 105 is a left elevation view of the wheeled shovel shown in FIG. 96;

FIG. 106 is a perspective view of a wheeled shovel according to another exemplary embodiment;

FIG. 107 is another upper perspective view of the wheeled shovel shown in FIG. 106;

FIG. 108 is a lower perspective view of the wheeled shovel shown in FIG. 106;

FIG. 109 is a front elevation view of the wheeled shovel shown in FIG. 106;

FIG. 110 is a perspective view of the wheeled shovel shown in FIG. 106 and illustrating the wheeled shovel in a closed or folded configuration in which the handle is disposed forward of the shovel blade;

FIG. 111 is a perspective view of the wheeled shovel shown in FIG. 106 and illustrating the wheeled shovel in a closed or folded configuration in which the handle is disposed rearward of the shovel blade;

FIG. 112 is a front perspective view of the wheeled shovel shown in FIG. 111;

FIG. 113 is a perspective view illustrating quick release connectors having pins, where the quick release connectors can be used with the wheeled shovel shown in FIG. 106 for releasably engaging the frame linking members shown in FIGS. 117 through 119 to one another and for releasably engaging the wheel to the frame of the wheeled shovel;

FIG. 114 is a perspective view illustrating the quick release connectors shown in FIG. 113 without pins for clarity;

FIG. 115 is a perspective view illustrating the quick release connectors shown in FIG. 114 from the other side of the wheel;

FIG. 116 is a partial perspective view of the wheeled shovel shown in FIG. 106 and illustrating the two frame linking members in a closed or folded configuration;

FIG. 117 is a perspective view of a frame linking member shown in FIG. 106;

FIG. 118 is a perspective view illustrating two frame linking members as shown in FIG. 106 in an open, unfolded, or ready-for-use configuration;

FIG. 119 is a perspective view illustrating the two frame linking members shown in FIG. 118 in a closed or folded configuration;

FIG. 120 is a plan view of an unfolded frame linking member, which may be folded to form the frame linking member shown in 117 according to an exemplary embodiment;

FIG. 121 is an upper perspective view of a wheeled shovel according to another exemplary embodiment;

FIG. 122 is another upper perspective view of the wheeled shovel shown in FIG. 121;

FIG. 123 is a lower perspective view of the wheeled shovel shown in FIG. 121;

FIG. 124 is another lower perspective view of the wheeled shovel shown in FIG. 121;

FIG. 125 is a top plan view of the wheeled shovel shown in FIG. 121;

FIG. 126 is a bottom plan view of the wheeled shovel shown in FIG. 121;

FIG. 127 is a front elevation view of the wheeled shovel shown in FIG. 121;

FIG. 128 is a rear elevation view of the wheeled shovel shown in FIG. 121;

FIG. 129 is a right elevation view of the wheeled shovel shown in FIG. 121;

FIG. 130 is a left elevation view of the wheeled shovel shown in FIG. 121;

FIG. 131 is a right elevation view of the wheeled shovel shown in FIG. 121 and illustrating the wheeled shovel in a closed or folded configuration;

FIG. 132 is a left elevation view of the wheeled shovel shown in FIG. 121 in an open, ready-for-use configuration and also illustrating the wheeled shovel's closed, folded, or collapsed configuration;

FIG. 133 is a left elevation view of a wheeled shovel according to another exemplary embodiment shown in an open, ready-for-use configuration and also illustrating the wheeled shovel's closed or folded configuration;

FIG. 134 is a perspective view illustrating quick release connectors having pins, where the quick release connectors can be used with the wheeled shovel shown in FIG. 121 or 133 for releasably engaging frame linking members to one another and for releasably engaging the wheel to the frame of the wheeled shovel;

FIG. 135 is an exemplary line graph of the distance snow was thrown versus input force for the exemplary embodiment of the wheeled shovel shown in FIG. 136;

FIG. 136 is a view illustrating the exemplary wheeled shovel used for creating the line graph shown in FIG. 135;

FIG. 137 is a perspective view of an exemplary extruded tire that can be used with a wheeled shovel according to exemplary embodiments; and FIG. 138 is a partial cross-sectional view showing the interior construction of the exemplary extruded tire shown in FIG. 137 and FIG. 139 is a view illustrating an example of a shovel blade having an angle of attack of 46 degrees according to exemplary embodiments.

DETAILED DESCRIPTION

The following description is merely exemplary in nature and is in no way intended to limit the present disclosure, application, or uses.

According to various aspects of the present disclosure, there are provided various exemplary embodiments of wheeled shovels, which can be used for picking up, transport, and disposal of materials (e.g., snow, etc.) in an efficient and effective manner. Other aspects relate to components of wheeled shovels. Further aspects relate to methods of using wheeled shovels. Additional aspects relate to methods of making wheeled shovels and/or the components thereof.

In one exemplary embodiment, a wheeled shovel generally includes a wheel assembly having an axle and a wheel. The wheeled shovel also includes a frame having an upper portion and a lower portion. The frame is disposed relative to the axle such that the axle is operable as a fulcrum about which the frame may pivot. A handle is disposed at about the upper portion of the frame. A shovel blade is disposed at about the lower portion of the frame. The wheel assembly, frame, handle, and shovel blade are cooperatively configured so as to enable the wheeled shovel to throw a load of material generally upwardly and forwardly away from the shovel blade in response to a sufficient force applied to the handle for pivoting the frame relative to the axle with a recoil generated through the fulcrum at the axle.

In another exemplary embodiment, a wheeled shovel generally includes a wheel assembly having an axle and a wheel. The wheeled shovel also includes a driving member having an upper portion, a middle portion, and a lower portion. The middle portion is adjacent the axle. The axle has longitudinal adjustability relative to the middle portion, which can allow selective adjustment to the axle longitudinal positioning without substantially changing the axle height relative to a horizontal surface supporting the wheeled shovel.

In another exemplary embodiment, a wheeled shovel generally includes a wheel assembly having an axle and a wheel. The wheeled shovel also includes a frame having an upper portion and a lower portion. The frame is disposed relative to the axle such that the axle is operable as a fulcrum about which the frame can pivot. A shovel blade is disposed at about the lower portion of the frame. The frame and the shovel blade are cooperatively configured to provide a shovel blade angle of attack, relative to a normal to the acceleration of the snow being thrown by the wheeled shovel, less than the angle of repose of the snow being thrown by the wheeled shovel. This, in turn, can inhibit the sliding of snow off the shovel blade during the throwing motion.

In another exemplary embodiment, a collapsible wheeled shovel generally includes a wheel assembly having an axle and a wheel. The wheeled shovel also includes a frame having an upper frame portion and a lower frame portion. A handle is disposed at about the upper frame portion. A shovel blade is disposed at about the lower frame portion. At least one linking member, adjacent the axle, hingedly connects the upper frame portion to the lower frame portion such that the upper frame portion is pivotably movable relative to the lower frame portion between at least a closed, collapsed configuration and an open, ready-for-use configuration. In the closed, collapsed configuration, the upper frame portion is alongside the lower frame portion such that the handle is adjacent the shovel blade. In the open, ready-for-use configuration, the upper frame portion is generally upwardly and rearwardly from the lower frame portion such that the handle is above and rearward of the shovel blade.

In another exemplary embodiment, a wheeled shovel generally includes a wheel assembly having an axle and a wheel. The wheeled shovel also includes a frame having an upper portion and a lower portion. The frame is disposed relative to the axle such that the axle is operable as a fulcrum about which the frame can pivot. A handle is disposed at about the upper portion of the frame. A shovel blade is disposed at about the lower portion of the frame. The handle position is adjustable through an extendable and rotatable connection to the frame such that the handle can be slidably pulled out, slidably pushed in, and rotated relative to the frame for attachment to the frame at two or more different handle positions. The extendable and rotatable connection allows selective adjustment of at least one or more of the handle height, handle length, and leverage ratio of the wheeled shovel without substantially changing the axle height relative to a horizontal surface supporting the wheeled shovel. This also allows the wheeled shovel to be tailored for a particular user or conditions.

As recognized herein, there is a need for snow shovels capable of lifting, throwing, and pushing snow like a plow. Accordingly, there is described and shown herein various embodiments of wheeled shovels that can be manually operated for plowing as well as for lifting and throwing snow with ease and with less effort. Also recognized herein are benefits relating to transportation and storage of wheeled shovels in that various embodiments provide wheeled shovels that can be shipped and later stored in unassembled (or partially unassembled) compact configurations, shapes, and sizes. As such, it is recognized that it can be beneficial for wheeled shovels to be sold as a kit in a relatively small and standard package, such as a cardboard box. The packaging (e.g., boxes, etc.) can provide for improved space-saving and cost-effective storage of a wheeled shovel before retail sale to the end-user, and/or after the retail sale for storing a wheeled shovel when not in use (with or without the packaging or box).

Various aspects disclosed herein relate generally to wheeled shovels configured for moving and disposing of materials. Other aspects relate generally to methods relating to using, assembling, disassembling, packaging, and/or shipping wheeled shovels. Still further aspects relate to kits including components capable of being assembled into a wheeled shovel, and methods that generally include receiving such a kit, and assembling the components within the kit into a wheeled shovel.

Any one or more aspects disclosed herein may be implemented individually or in any combination with any one or more of the other disclosed aspects.

Figure 1:
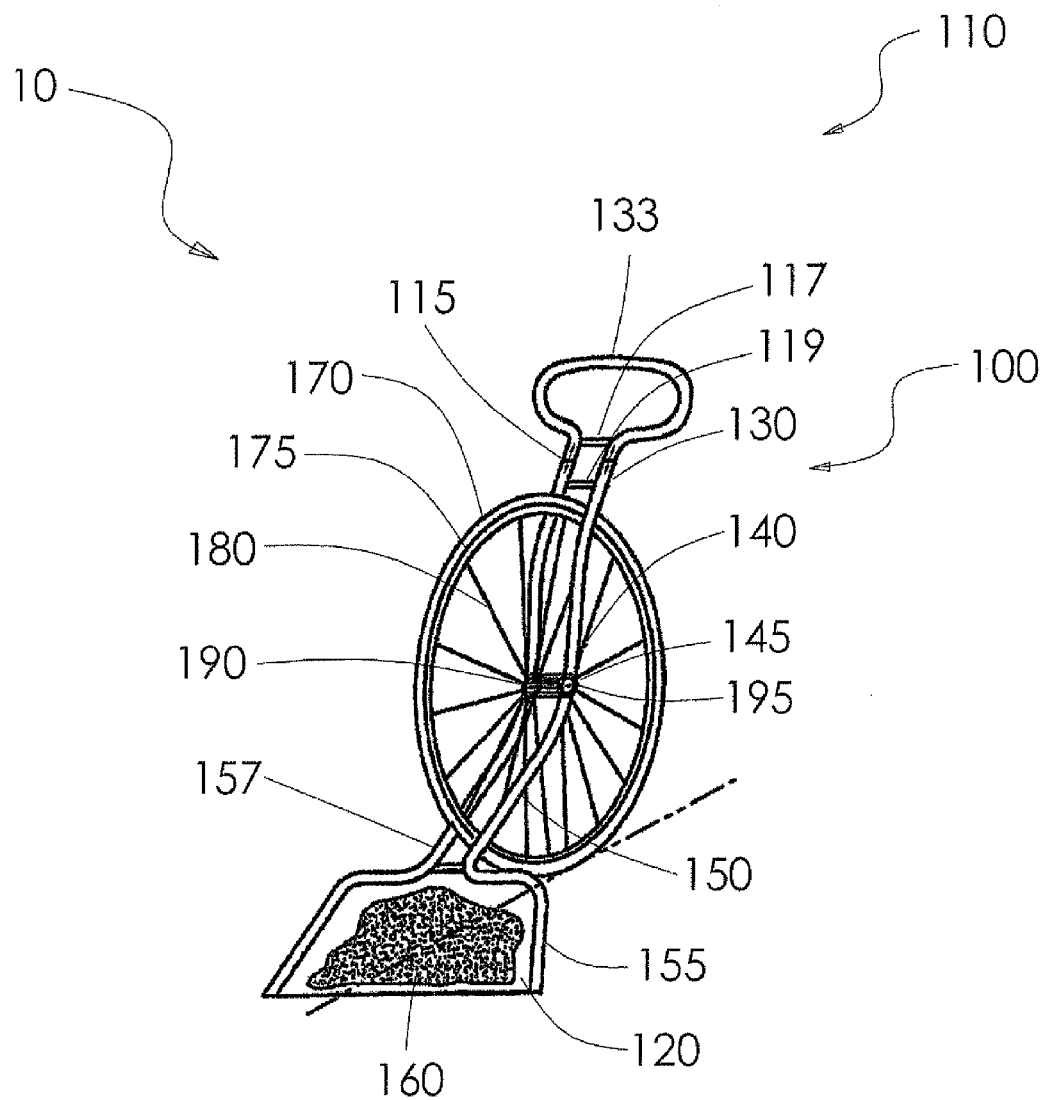
FIG. 1 is a perspective view of a wheeled shovel showing a relatively large wheel and a driving member having a handle at one end and a shovel blade at the other, for picking up, transporting, throwing, and/or disposing materials, such as snow, according to an exemplary embodiment.

FIG. 1 illustrates an exemplary embodiment of a wheeled shovel 10 having a wheel assembly 100 including a wheel 170, a driving member 110, such as a frame that can include a frame having a substantially U-shaped driving member, a handle 133 disposed at the upper end of the driving member 110, and a shovel blade 120 attached to its open end. The driving member 110 is mounted onto axle 190 of the wheel 170. The wheel 170 and the blade 120 are incorporated into the driving member 110 in a manner such that the blade 120 rests on the ground in its normal position. An operator uses the handle 133 to move the shovel 10 in any direction by rolling the wheel 170 on the ground. The operator also uses the handle 133 to guide the shovel 10 in shoving into the blade 120 material lying along the blade's path. The operator then lifts the shovel blade 120 off the ground to pick up a load of material, followed by further lifting to balance the load at a comfortable walking posture. The operator then moves generally forward to the desired destination. At the desired destination and while continuing to move generally forward, the operator then presses on the handle 133 with a quick downward body and/or arm motion to propel the load away from the shovel 10. The operator can dispose of the material straight ahead by directing the shovel 10 in the direction of the motion of the wheeled shovel 10. Alternatively, the operator can also dispose of the material generally to the side of the wheeled shovel. In which case, the operator would direct or steer the snow shovel (with the wheel generally upright) to point at least partially to the side as the handle is pushed downwardly (or just prior thereto) so that when the load is lifted and thrown the load will project to the side out of the path of shoveling.

The large wheel assembly 100 shown in FIG. 1 (as further described below and depicted in FIG. 3 relative to human dimensions) enables a user to lift the blade 120 and snow thereon above the unshoveled snow height and travel over the unshoveled snow or other rough surface without compressing unshoveled areas to be traversed. The relatively high level handle 133 of the shovel 10 enables the user to comfortably accelerate forward the load of snow off the blade 120 while pushing down the handle 133, which enhances the throw distance of the snow trajectory. The larger wheel 170 with a higher axle 190 provides greater distance over which to accelerate and throw the load.

The wheel assembly 100, driving member 110, and shovel blade 120 are formed ergonomically to assist in picking up and releasing a large amount of material 160, such as sand, gravel or snow, generally aligned in the direction of motion, with less stress to the body of the operator, and especially to help prevent (or at least reduce) back stress or injury. As explained herein for various embodiments, a recoil assist is provided to the action of the operator of the wheeled shovel from a fulcrum area of the wheeled shovel to release the material in a brisk and efficient manner. During operation, a downward force applied to the wheeled shovel's handle can be translated or transferred through the axle/lever to briskly lift the shovel blade and its load, and causing the load to be thrown or propelled away from the shovel blade. The material can also be picked up and released while the wheel is stationary. Furthermore, the material can be throwingly released, or propelled, forward or sideways, as desired, while the wheel is stationary or in motion.

In the exemplary embodiment shown in FIG. 1, driving member 110 is formed of continuous metal tubing that is shaped to have a handle 133 in its upper portion 130, a fulcrum bearing area 145 in its middle portion 140, and an open frame 155 in its lower portion 150 to accept the blade 120. The handle 133 is extendable at 115 to permit length, height, and leverage adjustments, as will be described in more detail later for various embodiments. The fulcrum bearing area 145 comprises an opening in the middle portion 140 of the driving member 110, preferably capable of receiving a roller bearing (not shown). A portion 195 of the axle 190 of the wheel assembly 100 fits inside the fulcrum area 145 of the driving member 110. The attachment point at the fulcrum area 145 is designed to allow reconfiguration of the shovel 10 for user height, strength, and/or snow conditions. An attachment that can slide along the middle portion of the driving member 110 can be used to adjust the height of the handle for leverage as well as for ease of operation of the wheeled shovel 10. Aspects relating to the function of the fulcrum, attachments thereto, and exemplary ways of allowing for adjustable positioning of the fulcrum location are described and shown herein, such as the relationships of the fulcrum to the handle and the shovel for disposing of materials from the shovel blade in a brisk, and yet efficient and ergonomically advantageous manner.

In an aspect of the embodiment shown in FIG. 1, the driving member 110 is formed in a generally elongate U-shape, resembling a driving member, with an upper portion providing the handle 133, and a narrowed middle portion 140 with distal sides to accommodate the axle 190 of the wheel assembly 100. The distance between the relatively long legs (encompassing generally the middle portion 140) of the U-shaped driving member 110 is determined by braces 117, 119, and 157 formed judiciously between the legs so that the axle fits in the fulcrum areas 145. Any number of different ways can be employed to attach the axle of the wheel in the openings forming the fulcrum areas 145. For example, a quick release for bicycle wheels or screw-on knobs can be employed. Or, the axle, in the form of a tube having axle ends 195 with inside shoulders (not shown) can be snapped into openings (not shown) by gently spreading apart the middle portion 140 of the U-shaped driving member 110. These wheel mounting features are described in further detail for completeness. In some embodiments, the tubing material for the driving member 110 can be composed of hollow aluminum, or other metal tubing. Non-metal materials, such as plastics or composites, may also be used. In addition, some embodiments can be formed with a relatively wide frame of heavy gauge material, for example, for industrial application.

Figure 2:
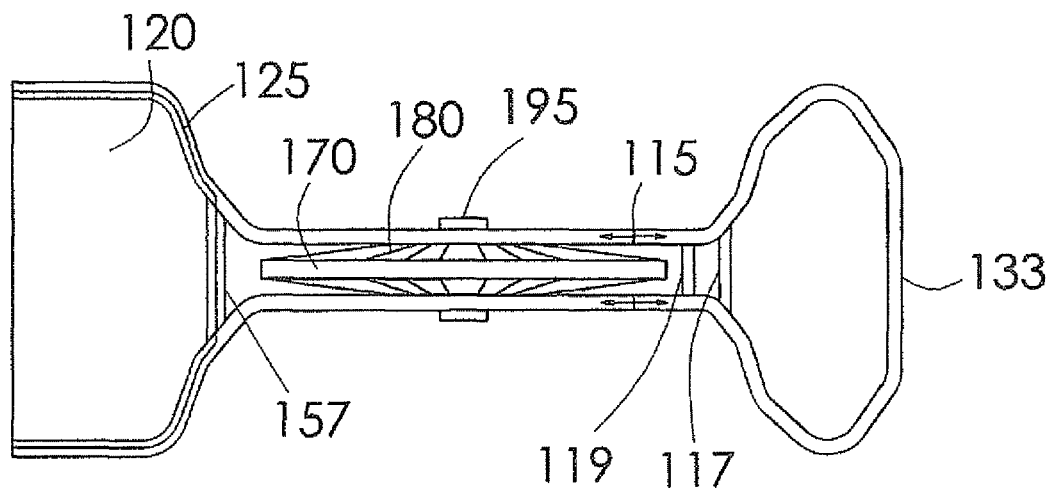
FIG. 2 is a top view of the wheeled shovel shown in FIG. 1 illustrating the shovel blade and relative placement of the wheel within the driving member according to an exemplary embodiment.

In another aspect of the illustrated embodiment, the wheel assembly 100 comprises a wheel 170, a rim 175, and spokes 180 which connect the axle 190 to the rim 175, as shown in FIG. 1 and in the top view of FIG. 2. Different types of wheels 170, including non-spoked solid wheels (e.g., solid circular disk (e.g., FIG. 75, etc.), tires with air-inflatable tube, tubeless air-inflatable tires, non-pneumatic airless tires, an extruded tire 4303 as shown in FIGS. 137 and 138, different treads, different widths, or a continuous web connecting the axle 190 to a rim 175, can also be used. Relatively narrow wheels 170, such as shown in FIG. 1, provide the advantage of not packing down snow, for example, when shoveling snow. The dimensions of the wheel 170 and the position of the handle 133 relative to the axle 190 of the wheel 170 are determined generally with respect to the position of the arms of a human body. By way of example, a relative position of the handle 133 with respect to a general body posture is shown in FIG. 3.

Figure 4:
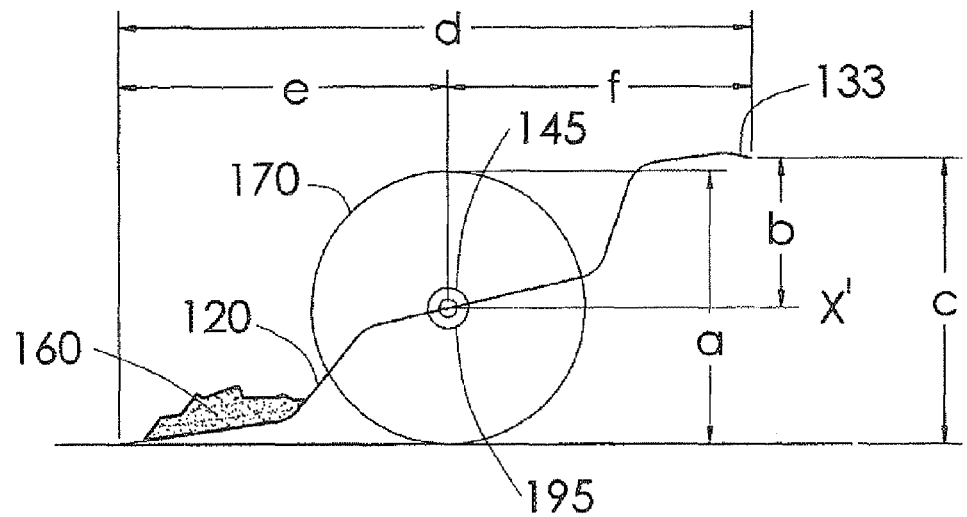
FIG. 4 is a schematic drawing of the wheeled shovel shown in FIG. 3 illustrating various dimensional relationships of the components of the wheeled shovel according to some embodiments.

In still another aspect of an embodiment shown in FIG. 4, the diameter of the wheel 170 can be between about thirty inches and about thirty-eight inches. In addition, the height of the handle 133 from a datum plane directly under the wheel 170, that is, from a ground datum x, can be between about thirty-eight inches to about fifty inches in one embodiment, or between about forty inches to about forty-five inches in another embodiment, or between about forty-eight inches and sixty inches in a further embodiment. One particular embodiment allows the handle height to be selectively adjusted by the operator between about forty inches and about forty-five inches.

The height of handle 133 from about the center of axle 190 is between about twenty-six inches and about thirty-two inches in one embodiment, or between about twenty-two inches and about thirty-two inches in another embodiment, or between about fifteen inches and nineteen inches in a further embodiment.

Figure 3:
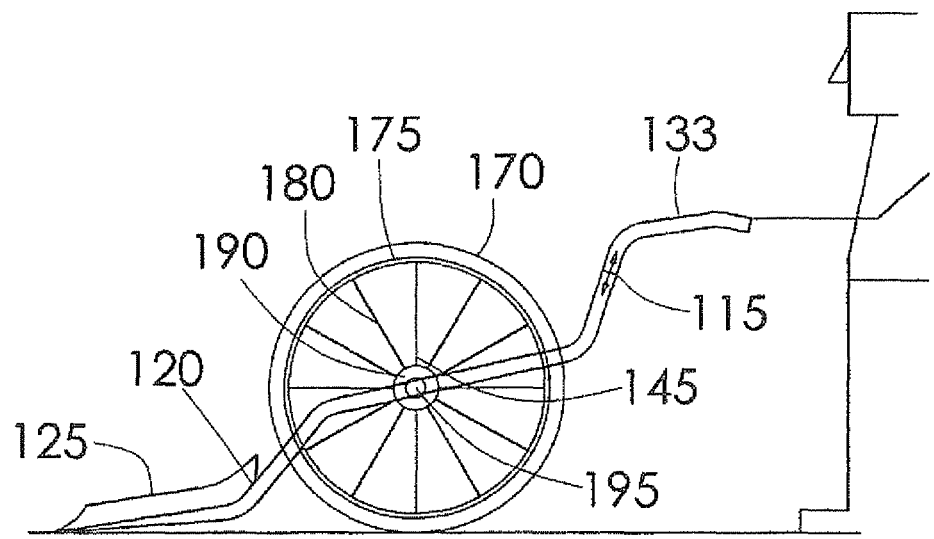
FIG. 3 is a side view of the wheeled shovel shown in FIG. 2 illustrating handle adjustability according to an exemplary embodiment.

In another aspect, further adjustment of the height of the handle 133 is provided by a telescoping means 115, such as a sliding hollow outer tube over an inner tube as shown in FIG. 3, which helps ensure better ergonomic comfort for the user. The overall length d of the wheeled shovel from the handle to the tip of the shovel blade is between about sixty-two inches to about seventy inches in some embodiments, or between about sixty-six inches to about eighty-eight inches in other embodiments, or between about seventy-five inches to about seventy-eight inches in further embodiments, or between about sixty-six inches to seventy-eight inches in additional embodiments, or is about seventy-two inches in alternative embodiments. The overall length d may also be extendable to about one hundred inches.

Distance e from the tip of the shovel blade 120 to the fulcrum area 145 near the center of the wheel assembly 100 is between about thirty-two inches and about forty-six inches in one embodiment. In various embodiments, the distance f from the fulcrum area to the tip of the handle 133 shown in FIG. 4 can be varied, depending upon the operator's preference. In one particular embodiment, a plurality of axle attachment points are provided on the axle bracket that allows the distance f from the fulcrum area to the tip of the handle 133 to be varied from about thirty-six inches to about forty-four inches. Accordingly, this embodiment allows about eight inches of variance in the axle connection or leverage point. The distance f may be adjusted, for example, to make it easier to pick up and lift a load, balance the load on the wheeled shovel 10 more evenly for ease of transport to a location, and/or to gain more leverage in shoving the load from the wheeled shovel 10 at the location of interest. The dimensions set forth in this paragraph (as are all dimensions set forth herein) are mere examples and can be varied.

FIG. 19 illustrates an exemplary embodiment having two straight (or relatively straight) portion(s) 400 (only one portion shown) comprising a driving member 110 having a handle end 133 and a shovel blade 120. The driving member 110 is supported on each side of the driving member 110 configuration by angled bracket(s) 405 (FIG. 19 only shows one bracket) having an internal angle $\psi$ of about eighty degrees to about one hundred degrees. Lower portion 410 of angled bracket(s) 405 is positioned to form an angle $\psi''$ of about one hundred ten degrees to about one hundred sixty-five degrees (in one embodiment), or about one hundred twenty degrees to about one hundred forty degrees (in another embodiment) with lower driving member 110 portion 410 in contact with the shovel blade 120. An upper portion 415 of angled bracket(s) 405 is positioned to form an internal angle $\psi'$ of about eighty degrees to about one hundred forty degrees in one embodiment, or about ninety degrees to about one hundred thirty degrees in another embodiment. The size of the wheel 170 and where the angled bracket(s) 405 attach to the straight driving member may alter these angles. The angle measurements set forth in this paragraph (as are all dimensions set forth herein) are mere examples and can be varied.

FIG. 19 further illustrates a notched element 205 for permitting the driving member 110 to be moved horizontally in respect of the axle 420 of the wheel 430. FIG. 20 illustrates the upward position of the driving member 110 and shovel blade 120 when force is applied to handle 133 in a downward motion. FIGS. 19 and 20 show (in phantom line projection) a comparison between a large wheel embodiment 425 and a smaller wheel embodiment 430. As can be seen, a much smaller wheel can be employed to effectuate loading and unloading of the material on shovel blade 120, allowing for a more compact device and easier storage. In some embodiments, the wheel 425 has a diameter of about thirty-six inches or about thirty inches. In other embodiments, the wheel diameter is between about twenty-four inches and about forty inches. In yet other embodiments, the wheel diameter is between about twenty inches and about twenty-seven inches. The dimensions set forth in this paragraph (as are all dimensions set forth herein) are mere examples and can be varied.

In a further aspect of the embodiment shown in FIGS. 19 and 20, the combined driving member 110, shovel blade 120, and bracket 405 sub-assembly can be readily disassembled from the wheel 430 and stored separately. Alternatively, only the driving member 110 and the shovel blade 120 sub-assembly may be disassembled from the bracket 405 and stored separately from the bracket 405 and the wheel 430. The driving member 110 may be attached to the bracket 405 in any number of ways, including quick release clamps, wing-nuts (not shown in FIG. 20), combination thereof, etc. The attachment of the bracket 405 to the wheel 430 can also be affected by nuts or bolts, or quick release mechanisms to notched element 205.

The diameter of the smaller wheels may be from about twenty inches to about twenty-seven inches in some embodiments. These dimensions, however, are mere examples and can be varied.

Furthermore, as will be discussed below and by example in FIGS. 21 through 74, various embodiments of a wheeled shovel can be assembled from a kit comprising the various components. Such a kit can utilize, at least in part, releasable fasteners that provide for the complete or partial disassembly of a wheeled shovel to provide for storage or shipment of the wheeled shovel in a compact and space efficient manner.

Figure 5:
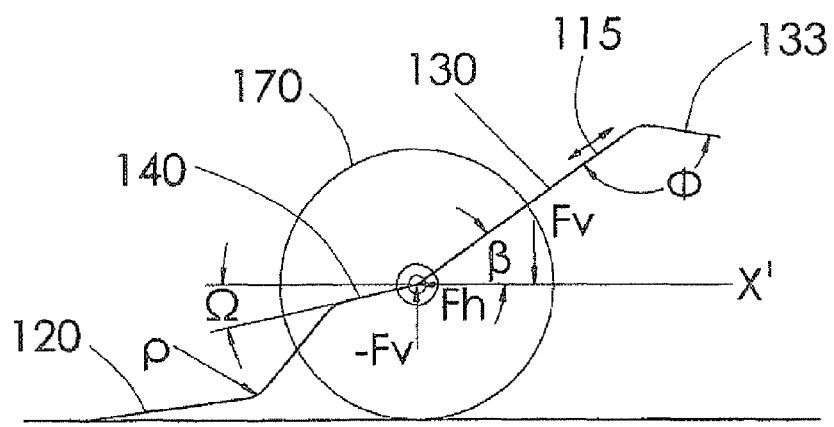
FIG. 5 is a schematic drawing of the wheeled shovel shown in FIG. 3 illustrating various forces acting at a fulcrum of the wheeled shovel according to an exemplary embodiment.

The relationship between the wheel diameter, overall shovel length, frame shape, blade angle of attack, and shovel handle height can determine the ease with which snow may be shoveled. For example, the positioning of the handle generally between the operator's chest and waist (as shown in FIG. 3) (which may vary depending on the height of the operator and conditions, such as depth of snow, clearing snow on a hill, etc.) assists in pushing the accumulated snow or other material that is being shoveled. A ratio greater than one-to-one (1:1) between the length of the driving member and the height of the handle provides the ease with which a blade full of snow can be lifted as the handle is lowered. Conversely, a ratio less than one-to-one (1:1) can aid in the throwing of snow or other materials, such as when the wheeled shovel is being used by a stronger user and/or with lighter snow. In various embodiments, this leverage ratio can be varied by varying the point at which the driving member connects to the axle, and/or by adjustably changing the length of the handle in some embodiments. As disclosed herein, various embodiments allow handle length to be adjusted by selectively changing the handle's attachment location to the frame and/or changing the handle's orientation by rotating the handle one hundred eighty degrees. Furthermore, differently shaped driving members, such as shown in FIGS. 4 and 5, may contribute differently to the efficiency of the shovel. A driving member having a generally "S-shaped" profile is shown in FIG. 6, and will be described in more detail later in regard to some exemplary embodiments.

In addition to the ergonomic advantages, embodiments provide enhanced functional performance through a judicious use of a fulcrum line formed at about the central portion of the wheel assembly shown in FIG. 5. Line x' passing through the center of the fulcrum area 145 parallel to the ground datum line x forms the fulcrum line. A force F applied to the fulcrum through an action at the handle 133 can be resolved into a horizontal component Fh and a downward vertical component Fv, as shown in FIG. 5. With no substantial resistance to the horizontal component $F_h$, the wheel rolls to the left, in accordance with the direction of the applied force F shown in FIG. 5, while the ground under the wheel reacts to the downward component Fv giving rise to an upward recoil reaction –Fv by the wheel. A brisk and mostly downward action on the handle 133, using arm and/or body weight, for example, produces a recoil assist to the throwing power. The magnitudes of the force component vectors Fh and Fv are determined substantially by angle β and the magnitude of the transmittal force F. Angle Ω contributes to the throwing power. Furthermore, the shovel blade 120 can be formed in different configurations to assist in efficient release of material 160 from the shovel blade 120. For example, the shovel blade 120 can have a bottom portion with a relatively large radius of curvature ρ, resembling a scoop, for easy sliding of material from the shovel blade, as well as for keeping the material from sliding backwards and spilling off the shovel blade. In addition, some embodiments include the shovel blade 120 being configured in combination with the frame's shape such that the shovel blade 120 has a relatively high angle of attack higher than the angle of repose for snow, as described herein. For example, the shovel blade 120 can have a curvature, and the frame can have a generally S-shaped curvature with a forward portion extending forward and then bending down more sharply to provide a shovel blade angle of attack of about forty-six degrees (although other suitable angles of attack are also possible). The relatively sharp angle of attack enables better throwing as it imparts to the snow a combination of a forward-and-up-throw. In various embodiments, the shovel blade also includes a relatively short curved portion at the bottom or leading edge of the shovel blade. With this curved portion, the shovel blade angle where the blade touches the ground is fairly shallow. This fairly shallow angle reduces friction between the blade and the ground, and also helps reduce the likelihood of the blade catching on stone edges, etc. These various parameters set forth in this paragraph can be set to values that are commensurate with the ergonomic and functional requirements for a particular use or application of a wheeled shovel.

FIG. 12 shows a shovel blade 245 having a load carrying inner surface 260 having arced side walls 250 tapering downwardly to about nothing at about the leading edge portion 255 of the shovel blade 245 (both side walls 250 are tapered). In the embodiment shown in FIG. 13, the shovel blade 245 is arced in side view 265 so as to form an angle 270 between its upper and lower portion. The shovel blade's walls 250 (e.g., rearward and side wall portions, etc.) can also allow more snow (or other materials) to be carried and retained on the shovel blade 245, such as while rolling the wheeled shovel across a relatively rough surface. In addition, some embodiments include the shovel blade 245 being configured in combination with the frame's shape such that the shovel blade 245 has a relatively high angle of attack higher than the angle of repose for snow, as described herein. For example, the shovel blade 245 can have a curvature, and the frame can have a generally S-shaped curvature with a forward portion extending forward and then bending down more sharply to provide the shovel blade with a relatively sharp angle of attack of about forty-six degrees (although other suitable angles of attack are also possible). In various embodiments, the shovel blade also includes a relatively short curved portion at the bottom or leading edge of the shovel blade. With this curved portion, the shovel blade angle where the blade touches the ground is fairly shallow. This fairly shallow angle reduces friction between the blade and the ground, and also helps reduce the likelihood of the blade catching on stone edges, etc.

Figure 6:
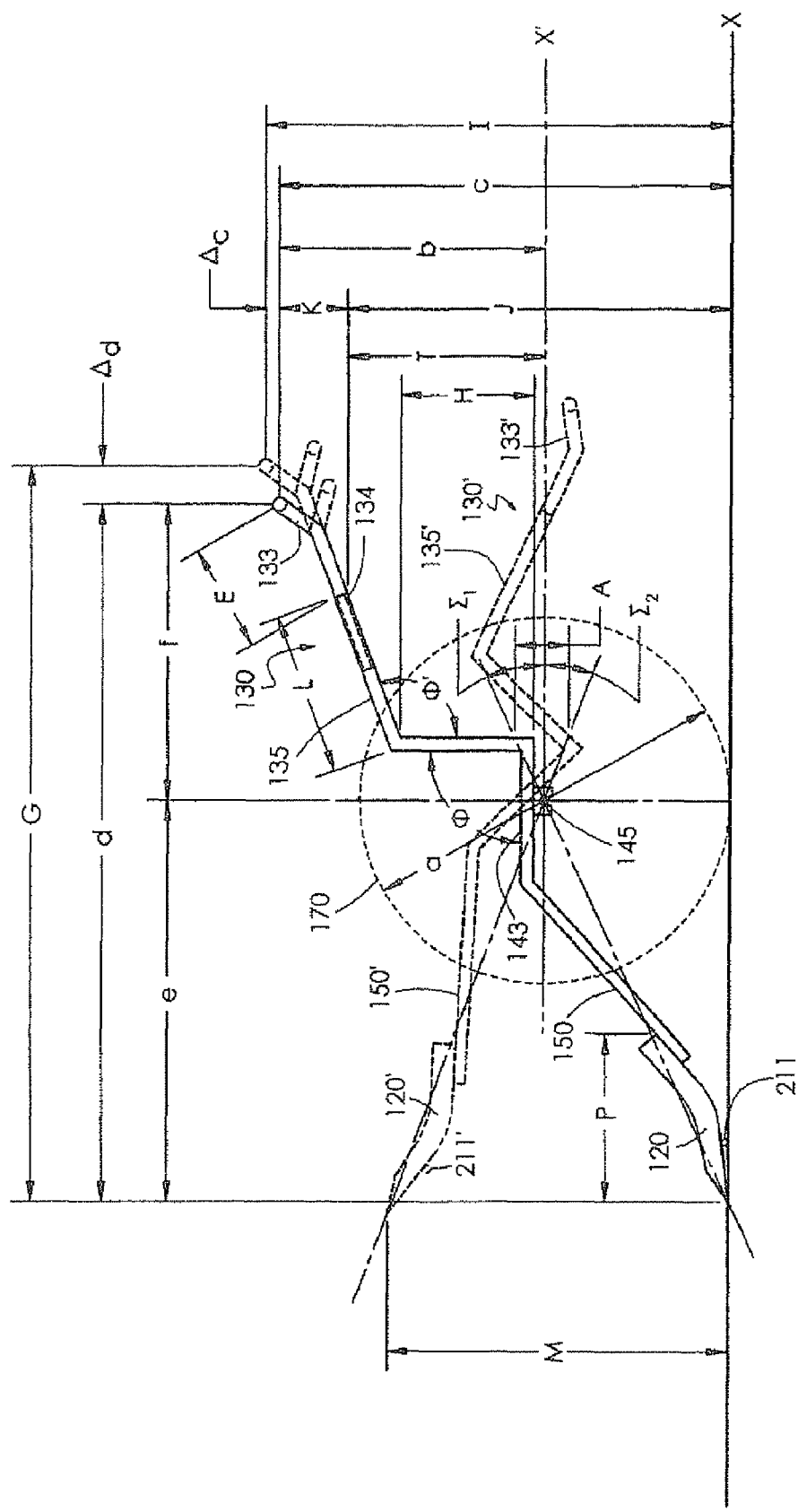
FIG. 6 is a schematic drawing of a wheeled shovel including a driving member having a generally S-shaped middle portion and a handle that is rotatable and slidably extendable according to an exemplary embodiment.

FIG. 6 illustrates another embodiment with similar characters and numerals referring to similar parts throughout the several views. The side-view of the driving member 110 shown in FIG. 6 has an upper portion 130, middle portion and a lower portion 150. The driving member 110 is attached to the wheel 170 (shown in phantom) at its axle (not shown) in a notch or opening of a slidable sleeve 143. The sleeve 143 can be slid (in the direction of either one of the arrows shown in the FIG. 6) over portion 150 of the driving member 110 to change the position of fulcrum 145, and to change the effective leverage length f and the "throw arm" e. The embodiment shown in FIG. 21 includes axle brackets or receivers, which are shown by way of example as two notched elements 205 having four notches or slots 210 that allow the operator to selectively adjust the length of the throw arm e.

With reference back to FIG. 6, the throw can be accomplished by pushing handle 133 in a generally downward direction to the phantom position 133'. As the handle 133 is being pushed in a generally downward direction, the wheeled shovel can also be moving forward (see, for example, the two different positions of the wheeled shovel shown in FIG. 13b). In FIG. 6, the primed reference numerals, namely, 130', 135', 150' and 120' show the components in a position following the downward motion of the handle 133 of the driving member 110. Various different mechanisms can be used to adjust the fulcrum point to achieve the desired leverage for throwing the load off the shovel.

In FIGS. 11a, 11b, 11c, there are shown side views of a driving member 110 having an adjustable length notched element 205, for example a bar, at about a middle portion of the driving member 110. The notched element 205 includes one or more notches 210, which allow the fulcrum point to be changed without changing (or at least reducing the amount of change or only insignificantly changing) the height of the handle above a plane positioned at the bottom of the wheel necessary to effectuate the same applied force-to-load displaced ratio, without changing (or at least reducing the amount of change or only insignificantly changing) the length of the driving member 110 portion above the middle portion and/or without changing (or at least reducing the amount of change or only insignificantly changing) the length of the driving member 110 portion below the middle portion.

In various embodiments, the notched element 205 is attached to a generally flat or horizontal portion of the driving member 110. Accordingly, by selectively changing the particular notches into which the axle is engaged, the user can change the leverage/gearing ratio, the position of fulcrum 145, and effective leverage length f relative to the throw arm without also changing (or only insignificantly changing) the handle height relative to the surface on which the wheeled shovel is being supported. In some embodiments, however, the leverage ratio can also be varied by adjustably changing the length of the handle, such as by selectively changing the handle's attachment location to the frame and/or changing the handle's orientation by rotating the handle one hundred eighty degrees.

In other embodiments, the notches or openings 210 can be integrally formed (e.g., drilled, etc.) directly into the driving member 110. In such alternate embodiments, the wheeled shovel would not then include the notched element 205 that is separately attached to the driving member.

The notches 210 may be provided in any suitable number (i.e., one or more) and/or in various shapes and sizes such as rectangular, square, circular, angled, L-shaped, etc. Angled slots may be used to reduce the inclination of the wheel in respect to the notched element 205 to permit better fixation in various embodiments. L-shaped slots may be used, for example, to obtain positive locking of the axle within the slots.

By changing the notch 210 associated with the axle (e.g., the axle sitting in one of the notches 210), the leverage changes even if the structure, height and/or length of the driving member 110 does not change. In some embodiments, the notched element 205 may further be configured such that repositioning along the notched element 205 among the notches 210 can cause a change in the angle of the shovel blade with respect to the ground, such as a change from shape 215 to shape 220 (as shown in broken lines in FIG. 11a). In the embodiment shown in FIG. 11a, the driving member 110 is shown having a handle section 133, a "curved" middle section having an upper elbow 225, a lower elbow 230, a middle elbow 235, a linear section 240, and a shovel blade having a shape 215 and a shape 220.

FIGS. 11b and 11c illustrate other embodiments of a notched element 205 that may be employed (only a portion of the driving member is shown in FIGS. 11b and 11c). In the embodiment shown in FIG. 11b, the notched element 205 includes angled notches 210' that allow for improved holding of the driving member to the axle as the driving member is moved back and forth. In the embodiment shown in FIG. 11c, the notched element 205 comprises openings 210" in the form of holes. Attachment through the holes 210" further enhances the holding of the driving member to the axle as the driving member is moved back and forth. Additionally, the notched element 205 may be formed having a flat planar structure or having a three dimensional structure such as including one or more of a right angle portion, a U-shaped portion, a C-shaped portion, an enclosed portion forming a cavity, each of which may be coupled, at least in part, around a portion of the upper driving member portion and/or the lower driving member portion to provide additional structural support to the frame or driving member.

Another aspect of an embodiment involves a substantially "S-curved" section forming the middle portion 140 of the driving member 110 as shown in FIG. 6. The substantially "S-curve" (including the substantially straight section in the middle portion of the curve) helps improve gearing/leveraging in order to enhance the acceleration of the blade 120 and throwing of the load faster, higher, and farther from the shovel. The "S" shape is formed to have the lower curve with subtending angle $\phi$. As shown in FIG. 6, the angle $\phi$ of the lower portion of the "S-curve" and the angle $\phi'$ of the upper portion are generally between about eighty degrees and about ninety degrees, though it will be appreciated that other angles may also be used. In one embodiment (not shown), with unanticipated leverage ability, the included angle $\phi'$ is between about eighty degrees to about one hundred twenty degrees, or more advantageously between about eighty degrees to about one hundred degrees in another embodiment, and between about eighty degrees to about ninety degrees in a further embodiment. The angle $\phi$ is between about one hundred ten degrees to about one hundred sixty-five degrees in one embodiment, or about one hundred twenty degrees to about one hundred fifty five degrees in another embodiment. In such cases, the upper angle $\phi'$ with the lower angle $\phi$ provide for a top handle section that can be relatively straight and horizontal. This may enhance performance, for example, by allowing a straight section that allows for ease in handle-length extension without necessarily the need to significantly change handle height as compared to other configurations. It may also allow the user to exert greater force without unduly increasing the friction of the shovel with the ground as compared to other configurations.

With continued reference to FIG. 6, as handle 133 is lowered, the elbow of the lower portion of the "S-curve" travels a distance A through arcs $\Sigma 1$ and $\Sigma 2$. The straight portion of the S-curve traverses the arcs $\Delta 1$ and $\Delta 2$. As the handle 133 is lowered, the "S-curve" starts moving downward and the handle 133 thus only needs to be lowered an amount equal to T in order to lift the shovel blade 120 to height M in new position 120'. It is an aspect that, as the middle portion 140 comprising the "S-curve" (including the straight section) is positioned closer to the fulcrum area 145, the magnitude of A and leverage ratio M/T (the ratio of blade lift to handle movement) are varied accordingly. The length H of the straight section of the "S-curve" can be greater than A so that throughout the entire range of handle motion, the desired leverage (based on axle attachment point) or "gearing", is maintained as the blade 120 is raised and lowered. Thus, for improved operation (e.g., comfortably, and without bending on the part of the shovel operator), the maximum travel T of the handle 133 can be T>H>A, $\Delta 1 \approx \Delta 2$, and $\Sigma 1 \approx \Sigma 2$.

In another aspect, the handle 133 shown in FIG. 6 has a shank 134, which slidably and rotatably fits inside hollow sleeve section 135. The handle 133 can be pulled out, pushed in, and/or rotated in order to find the most ergonomic position for shoving, picking up, and throwing a load from the shovel. The shank 134 can be slid to any one of various continuous positions along sleeve 135 by utilizing friction-hold against the inside surface of the hollow sleeve 135. In various embodiments, the wheeled shovel includes pins (or other mechanical fastening devices, etc.) configured to engage holes disposed along the length of the sleeve 135. In one embodiment, the length E along the handle 133 is between about twelve inches to about eighteen inches, and length L along section 135 is between about sixteen inches to about twenty-four inches. Alternative lengths can also be used. In one embodiment, the overall length d of the shovel apparatus can be increased by $\Delta d$, preferably between about six inches to about twelve inches, while the overall height c can be increased by $\Delta c$, preferably between about four inches and about eight inches. Accordingly, this can provide an overall length G between about eighty-four inches and about one hundred inches in one embodiment, or about eighty-four inches to about ninety-six inches in another embodiment, and an overall height I between about forty inches and about sixty-six inches in one embodiment, or about forty-two inches to about sixty inches in another embodiment. With these dimensions, the shovel blade 120 can be comfortably raised to a height between about thirty-six inches to about forty-four inches, providing a full range of motion and "follow through" to enhance throwing ability. The dimensions set forth in this paragraph (as are all dimensions set forth herein) are mere examples and can be varied.

Figure 9:
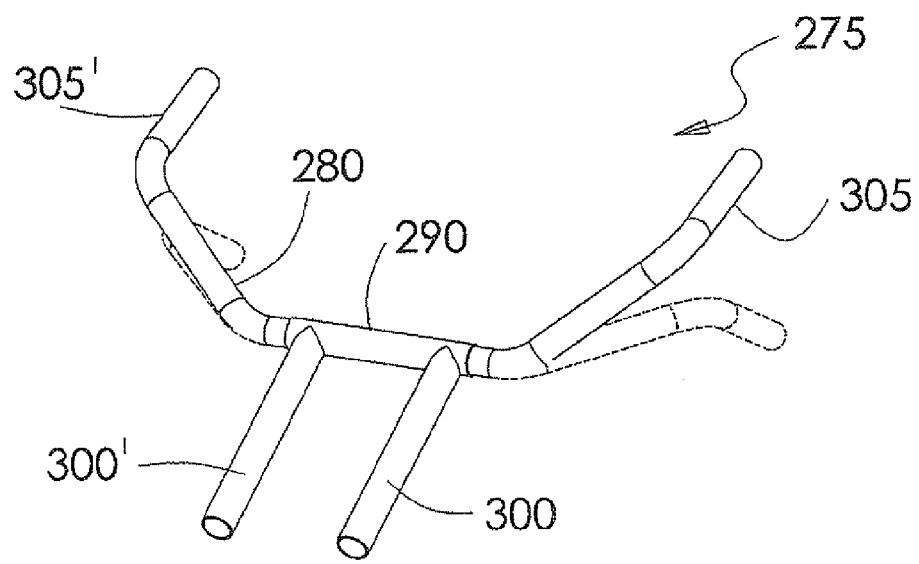
FIG. 9 is an upper view of an adjustable handle assembly according to an exemplary embodiment.

FIG. 9 illustrates a handle assembly 275 wherein a generally "U-shaped" handle bar 280 is housed in its middle part in cross housing 290 supported by two support bars 300, 300'. The handle bar 280 is shown to be moveable within the cross housing 290, which in one embodiment comprises a tubular housing. The handle bar 280 is also shown to comprise hand grips 305, 305'

Figure 10:
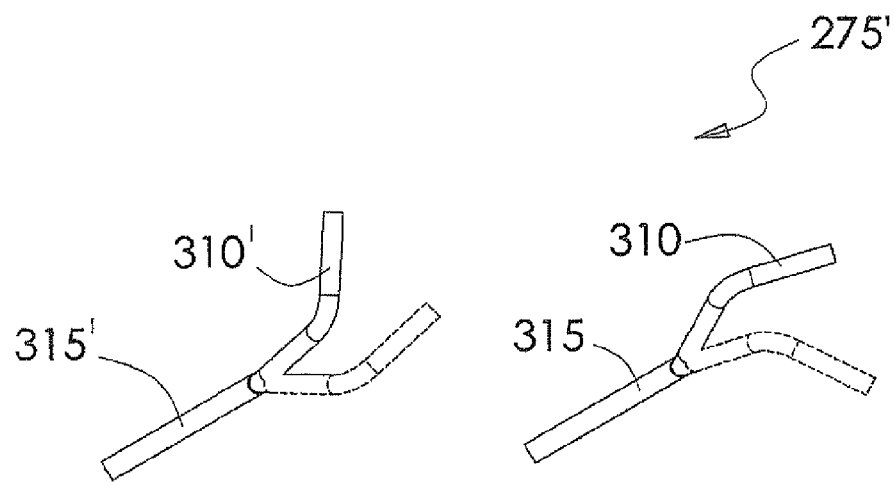
FIG. 10 is a perspective view illustrating a handle assembly including an adjustable handle element capable of three hundred sixty degree fixed rotation according to an exemplary embodiment.

FIG. 10 illustrates another embodiment of a handle assembly 275' in which adjustable handle elements 310, 310' are inserted into open tubular handles 315, 315'. FIG. 10 illustrates two configurations for the handle elements 310, 310'. The handle elements 310, 310' can provide friction to the inner walls of the open tubular handles 315, 315' and can permit sliding of the adjustable handle elements 310, 310' within the open tubular handles 315, 315' to allow for three hundred sixty degree movement. The open tubular handle elements 315, 315' may be covered with a covering (not shown) for aesthetic reasons and/or for easier gripping.

FIG. 17A illustrates a perspective view of a handle assembly embodiment 350. As shown, this embodiment includes an attachment plate 355. The attachment plate 355 may be, for example, welded or attached in some other fashion to the driving member 387. Attachment plate 355 includes a plurality of attachment conduits 360 (shown as holes in FIG. 17A) positioned for engagement with corresponding attachment conduits 360 (also shown as holes in FIG. 17A) associated with the handle 370. The handle 370 is shown to comprise a horizontal bar 375, which may be tubular in configuration. The handle 370 is shown generally T-shaped, although other shapes and configurations are also possible for the handle 370. Dimensionally, the horizontal bar 375 can have a width from end to end of about twenty-four inches to about twenty-six inches. This relatively wide handle can provide for ease and better control during operation of the wheeled shovel. The dimensions set forth in this paragraph (as are all dimensions set forth herein) are mere examples and can be varied.

The handle 370 is shown fixed to a bent plate portion 380. The lower portion of the bent plate portion 380 includes attachment conduits 360, which can be to the corresponding conduit 360 in the attachment plate 355 by way of a fastener 385 (e.g., bolt, etc.). The bend in the bent plate portion 380 allows the handle 370 to be flipped over and installed upside down to change handle height (this aspect can also be incorporated into any one or more of the other various embodiments disclosed herein).

The different attachment conduits allow the handle height to be set at different heights. Accordingly, in this particular embodiment, the three different pairs of mounting openings 360 (any one pair or more of which can be used to mount the handle 370) in combination with the ability of the handle 370 to be reversibly mounted to the frame (in either the orientation shown in FIGS. 17 and 18, or in an orientation in which the handle 370 is flipped over and mounted to the underside of the frame) provides six different handle settings that the operator can choose. Alternatively, the operator may also choose to use all three pairs of mounting openings 360 with fasteners 385, for example, to further secure the handle 370 to the frame. In other embodiments, more or less than three pairs of mounting openings can be provided to decrease or increase the number of available handle settings. For example, another embodiment includes four pairs of mounting openings such that the operator can select from among eight possible handle settings. Other embodiments can include the handle assembly being formed from one or more tubular members. In such embodiments, the tubular handle can be flipped over, then slidably inserted into the frame member (or the handle can slidably receive the frame member), and secured to the frame member (e.g., with mechanical fasteners, etc.), thereby allowing the user to select from amongst various combinations of handle lengths and heights.

FIG. 17B shows another handle assembly embodiment wherein the end of the driving member is adapted to include an expanded open attachment end 387. As shown, the attachment end 387 includes a top attachment plate 355' with attachment conduits 360 (shown as holes), a bottom plate (not shown) opposed to the top attachment plate 355' (the bottom plate also preferably constituting an attachment plate with attachment conduits), and an open end configured to permit the bent portion of handle 370 to fit between the top attachment plate 355' and the bottom plate. One or more (preferably all in some embodiments) attachment conduits in top attachment plate 355', in the bent portion of handle 370, and in the bottom attachment plate (not shown) are preferably matched to allow a fastener 385 (e.g., a bolt, etc.) to course through each. The fastener 385 may lock the attachment through other attachments such as a nut 362, etc.

FIG. 18 illustrates a perspective view of another adjustable handle assembly embodiment 390. This particular illustrated embodiment also includes a handle 370. The handle 370 includes a horizontal bar 375 affixed to a bent plate portion 380 having a lower portion comprising attachment conduits 360'. Unlike the embodiments shown in FIGS. 17A and 17B and rather than attachment plate 355, corresponding conduits 360 are found in the driving member portions 387. The conduit(s) 360' can be attached to the corresponding conduit(s) 360 in the driving member 387 by way of a fastener 385, for example a bolt, etc. Alternatively, other embodiments attach the handle 370 to the driving member portion 387 by slotted sections such that the handle 370 and driving member portion 387 can be relatively securely attached to one another without fasteners (not shown).

Figure 7:
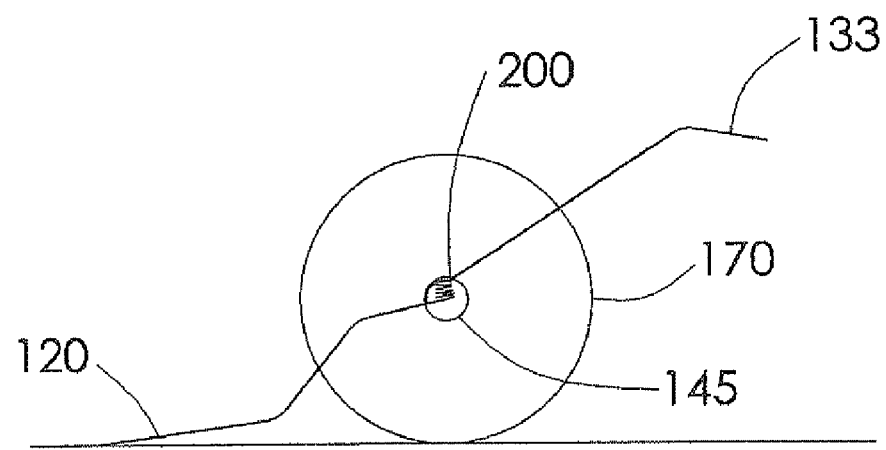
FIG. 7 is a schematic drawing of a wheeled shovel having springs for assisting in propelling materials from the shovel blade according to an exemplary embodiment.

In another aspect, a plurality of springs 200 (only one spring is shown in FIG. 7) can be utilized to provide an enhanced recoil reaction at the fulcrum line. This can be useful, for example, when the tire used for the wheel 170 is not as flexible as, for example, bicycle tires with pneumatic or air-inflatable tube. In FIG. 7, the axle 190 is adapted to receive one spring at each of the two respective ends 195 of the axle 190, which acts as a fulcrum and transmits a recoil reaction to the shovel blade 120 from an action applied at the axle 190. Accordingly, a generally downward force applied to the handle 133 can be translated or transferred through the axle/lever to briskly lift the shovel blade 120 and its load, and causing the load to be thrown or propelled away from the shovel blade 120. Alternative embodiments include other means (besides or in addition to springs) for producing recoil reactions to the shovel blade in response to an action applied at the handle, as described herein.

In still another aspect, rollers 211 can be positioned under the shovel blade 120. The rollers 211 can help keep the shovel blade 120 off the ground, such as a gravel-covered driveway or other rough surface. In which case, the rollers 211 can help to avoid or reduce the extent of the shovel blade 120 catching on brick/stone edges or digging up gravel from the surface over which the wheeled shovel is traveling generally forward, for example, while plowing snow. In various embodiments, the rollers 211 can provide this benefit without the user having to exert downward force on the shovel handle, thus allowing the user to push larger and heavier loads of snow (or other materials) with less effort.

Figure 8:
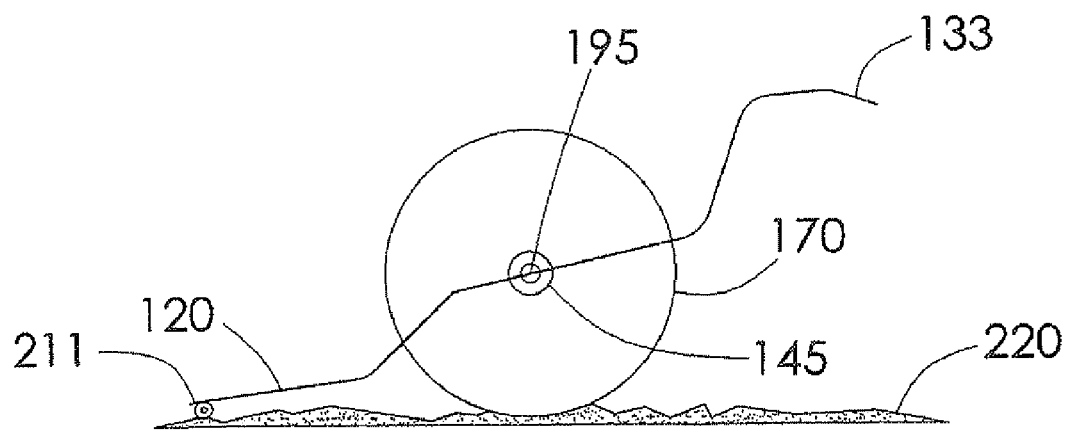
FIG. 8 is a schematic drawing of a wheeled shovel having blade rollers for easing travel of the blade over rough ground, such as a gravel-covered surface, according to an exemplary embodiment.

The rollers 211 can also be configured (e.g., shaped, sized, positioned, formed of certain material(s), etc.) to help reduce friction with the ground, especially as more load accumulates on the shovel blade 120 while the shovel is being pushed forward to pick up more material, such as snow, from the ground. This can help ease the shovel in traversing over a rough ground surface 220, such as a gravel-covered driveway, as shown in FIG. 8. FIG. 6 also illustrates rollers 211 where the primed numeral corresponds to the position of the rollers 211 when the shovel blade 120 is elevated. With further reference to FIG. 6, the shovel blade 120 to which the rollers 211 can be attached has a lateral dimension P between about fifteen inches to about eighteen inches in one embodiment. Again, however, the dimensions set forth in this paragraph (as are all dimensions set forth herein) are mere examples and can be varied.

As an alternative or in addition to rollers, other embodiments include "shoes" formed of a relatively hard material (e.g., plastic, etc.) that are positioned under the shovel blade to help keep the shovel blade off the ground, such as a gravel-covered driveway or other rough surface. In some embodiments, the shoes are also configured (e.g., shaped, sized, positioned, formed of certain material(s), etc.) to also reduce friction with the ground, especially as more load accumulates on the shovel blade while the shovel is being pushed forward to pick up more material, such as snow, from the ground.

The shoes can also help to avoid or reduce the extent of the shovel blade digging up gravel or catching on brick or stone edges while the wheeled shovel is being moved generally forward, for example, while plowing snow. In various embodiments, the shoes can provide this benefit without the user having to exert downward force on the shovel handle, thus allowing the user to push larger and heavier loads of snow (or other materials) with less effort.

FIGS. 14 and 15 illustrate embodiments of a frame portion 320. As shown, each illustrated frame portion 320 includes attachment ends 330, 330' at which a shovel blade may be attached to the driving member. An attachment plate 325 is provided that includes a plurality of attachment portions 335, for example, to allow attachment of a shovel blade or other optional accessories (e.g., rollers, shoes, etc.). In the illustrated embodiments of FIGS. 14 and 15, the attachment portions 335 are holes through which affixing devices, such as bolts, etc. may be placed. The manner in which the shovel blade 120 is attached may or may not entail components of and/or the load surface of the shovel blade 120.

In the embodiment shown in FIGS. 15 and 16, the attachment plate 325 is shown having a horizontal planar portion 340 and an angled planar portion 345. The angle formed between these portions 340 and 345 may be about one hundred twenty degrees to about one hundred seventy degrees in one embodiment, or about one hundred thirty degrees to about one hundred fifty degrees in another embodiment. Using an angle within these exemplary ranges gives strength to resist bending of the plate. The angled plane portion 345, when not affixed to the shovel blade, can also allow a flexing and recoil of the shovel blade that aids in loading and unloading of a load from the shovel blade.

In other embodiments, a wheeled shovel can be assembled from a kit. As one example, a kit for assembling a wheeled shovel includes a frame having an upper portion with an upper elbow, a middle portion, and a lower portion with a lower elbow. The kit also includes a wheel and an axle adapted for rotating the wheel generally about a center axis and for releasable attachment of the wheel to the middle portion of the frame. The frame is adapted to receive the releasable attachment of the axle. A blade is configured for attachment to the lower portion of the frame.

In another example, a kit for assembling a wheeled shovel is packaged in a storage container. The kit generally includes an upper tubular frame section having an upper elbow and a handle mounting. The kit also includes a lower tubular frame section having a lower elbow and a blade mounting. In some alternative embodiments, however, the blade can be mounted or attached directly to the frame without any mounting plate (e.g., FIG. 108, etc.).

Continuing with a description of this particular example, a connecting frame section is dimensioned and adapted for positioning at least partially within the tubular upper frame section and the tubular lower frame section. A plurality of frame fasteners is provided for coupling the connecting frame section to the upper frame section and to the lower frame section. The kit further includes a wheel including a mounting hub, and an axle adapted to be positioned at least partially within the mounting hub for rotatably mounting the wheel. When the wheeled shovel is fully assembled, the axle is capable of transmitting a recoil reaction in response to an action applied at the axle. During operation of one of the wheeled shovels, a downward force applied to the handle can be translated or transferred through the axle/lever to briskly lift the shovel blade and its load, and causing the load to be thrown or propelled away from the shovel blade.

In addition, the kit includes a handle and a plurality of handle fasteners for coupling the handle to the handle mounting. The kit also includes a blade, and a plurality of blade fasteners for coupling the blade to the blade mounting. Again, however, some alternative embodiments have the blade mounted or attached directly to the frame without any mounting plate (e.g., FIG. 108, etc.).

An axle receiver or bracket defines a plurality of axle receiving cavities along a length of the axle receiver. The cavities are configured to receive one of two end portions of the axle. A quick release fastener can be used for releasably connecting the axle to at least one of the axle receiving cavities. In some alternative embodiments, however, the axle can be mounted or attached directly to the frame without a separate axle receiver or bracket. For example, the axle can be attached by way of notches or openings integrally formed (e.g., drilled, etc.) directly into the driving member or frame.

Other aspects relate to methods that generally include receiving such a kit, and assembling the components within the kit into a wheeled shovel.

FIG. 21 illustrates one exemplary embodiment of a kit 2100 for assembling a wheeled shovel. As shown, the kit 2100 includes a variety of unassembled components that can be shipped and/or stored and from which a wheeled shovel can be assembled. The kit 2100 includes a handle 370 having a horizontal bar 375 and a bent plat portion 380. The bent plate portion 380 can include a plurality of mounting holes 2102.

An upper frame portion 2104 includes two generally parallel tubular members 2106A, 2106B. The tubular members 2106A, 2106B are coupled to one another at an upper end portion 387 by an attachment plate 355. The tubular members 2106A and 2106B can have one or more shaped elbows or angles along their length as described above.

The attachment plate 355 can be coupled to each tubular member 2106A, 2106B by welding, fastener attachment, combinations thereof, and/or other common method of coupling, to form a yoke-shaped upper frame portion 2104. In other embodiments, the upper frame portion may be formed to integrally include the attachment plate 355. In which case, the attachment plate 355 would not need to be separately attached to the tubular members 2106A, 2106B. Additionally, or alternatively, the upper frame portion may be formed to integrally include the handle 370 such that the handle 370 would not necessarily need to be separately attached to the upper frame portion. In other embodiments, the tubular members 2106A, 2106B can be separate components that are attached via one or more fasteners.

As shown in FIG. 21, the attachment plate 355 includes a plurality of attachment conduits or holes 360 configured to cooperate with the handle mounting holes 2102. Additionally, the kit can also include a plurality of handle fasteners (not shown in FIG. 21, but exemplary handle fasteners are shown in FIG. 17A). Exemplary handle fasteners can include wide range of fasteners, such as bolts and a variety of nuts or other locking members including washers.

With continued reference to FIG. 21, a lower frame portion 2108 includes two generally parallel tubular members 2110A, 2110B. The tubular members 2110A, 2110B are coupled to one another at a blade attachment end portion 330 by a blade attachment plate 325. The lower frame portion 2108 can have one or more shaped elbows or angles along their length as described above.

As shown in FIGS. 15, 16, and 23, the blade attachment plate 325 can be substantially flat or can include an angled plane portion 345. In some embodiments, the blade attachment plate 325 may be a separate kit component. In other embodiments such as is shown in FIG. 21, the blade attachment plate 325 can be coupled to each generally parallel tubular member 2110A, 2110B by welding, fastener attachment, or other common method of mechanical coupling. In further embodiments, the lower frame portion may be formed to integrally include the blade attachment plate 325. In which case, the blade attachment plate 325 would not need to be separately attached to the tubular members 2110A, 2110B. In still other embodiments, the two parallel frame tubes 2110A, 2110B can be separate components that are attached via one or more fasteners. Alternative embodiments (e.g., FIG. 108, etc.) include the tubular members being attached directly to the blade without a blade attachment plate.

The kit 2100 may also include one or more connection members 2112 that can aid in the mechanical coupling of the upper frame portion 2104 to the lower frame portion 2108. As shown in FIG. 21, there are two connection members 2112 each configured for positioning or insertion at least partially into or onto end portions of the upper frame portion 2104 and the lower frame portion 2108. Other embodiments, however, can include a connection member 2112 that can partially wrap around or enclose the upper frame portion 2104 and the lower frame portion 2108. Yet other embodiments do not include connection members 2112, such as the embodiments shown in FIGS. 26 through 44. For example, FIGS. 26 through 34 illustrate an embodiment in which the lower frame members 2613A, 2613B are sized to fit into cavities defined by the open end portions of the tubular members 2606A, 2606B, and then be fastened to one another with fasteners 2614 positioned within corresponding holes of the frame members 2606A, 2606B, 2613A, 2613B.

In the particular illustrated embodiment in FIG. 21, each connection members 2112 is configured (e.g., sized, shaped, etc.) to fit at least partially into cavities defined by the open end portions of the tubular members 2106A, 2106B, 2110A, 2110B. The connection members 2112 and the tubular members 2106A, 2106B, 2110A, 2110B have corresponding fastener hole patterns for receiving fasteners 2114. The fasteners 2114 can include any type of mechanical fastener including bolts with nuts and washers, etc.

The kit may also include one or more axle receivers, which are shown by way of example as two notched elements 205 in FIGS. 21 and 23. As shown in FIGS. 21 and 23, each notched element 205 includes four notches or slots 210 spaced apart along a length of the notched element 205. Alternatively, other types of axle receivers and/or axle receivers having more or less axle receiving cavities and/or other types of axle receiving cavities can be used, such as the axle receivers shown in FIGS. 11a, 11b, and 11c. For example, another embodiment of a kit includes one or more axle receivers having one or more mounting holes as shown in FIG. 11c. A further embodiment of a kit includes one or more axle receivers having one or more angled notches as shown in FIG. 11b. Additionally, a kit may include one or more axle receivers having a flat planar structure or having a three dimensional structure such as including one or more of a right angle portion, a U-shaped portion, a C-shaped portion, an enclosed portion forming a cavity, each of which may be coupled, at least in part, around a portion of the upper frame portion and/or the lower frame portion to provide additional structural support to the frame or driving member. In yet other embodiments, the notches or openings can be integrally formed (e.g., drilled, etc.) directly into the driving member or frame, in which case, the wheeled shovel would not then include an axle plate or receiver that is separately attached to the driving member or frame. In addition, the notches 210 may be provided in any suitable number (i.e., one or more) and/or in various shapes and sizes such as rectangular, square, circular, angled, L-shaped, etc. Angled slots may be used to reduce the inclination of the wheel in respect to the notched element 205 to permit better fixation in various embodiments. L-shaped slots may be used, for example, to obtain positive locking of the axle within the slots. In some alternative embodiments, however, the axle can be mounted or attached directly to the frame without a separate axle receiver or bracket. For example, the axle can be attached by way of notches or openings integrally formed (e.g., drilled, etc.) directly into the driving member or frame.

With continued reference to FIG. 21, the kit 2100 includes a blade 120, a wheel 170 having a hub 2115, an axle 190, one or more axle fasteners 2116, and one or more blade fasteners (not shown). The blade 120 includes fixtures for attaching the blade 120 to the lower frame portion 2108. This can include an attachment plate mounting fixture 2118, which, in turn, can include one or more mounting holes 2120 for receiving blade fasteners.

The blade 120 includes a leading edge portion 255 to which can be attached a wear strip 2122. The blade 120 and the wear strip 2122 can be provided as separate components in the kit 2100. Or, the wear strip 2122 may be pre-attached to the blade 120, and/or be replaceable as needed.

The axle 190 can be mounted within the hub 2115. Alternatively, the axle 190 can be provided as a separate component which must be placed within the hub 2115 by the user.

The axle 190 can include two end portions 195 each configured for engagement with one of the axle fasteners 2116. The axle 190 can also include bearings and/or an outer friction-reducing surface, such as a friction-reducing tape or plastic for engaging an inner portion of the hub 2115. The axle fasteners 2116 can include a wing nut or other suitable fasteners that can be used to releasably couple and uncouple from axle end portions 195 to the axle receivers 205. In other embodiments, the kit includes quick release fasteners (not shown), such as those associated with releasable attachment of a bicycle wheel to a bicycle, screw-on knobs, etc. In such embodiments, these quick release fasteners can be thus used to couple and uncouple the axle 190 to/from the axle receivers 205.

In some embodiments, a kit for a wheeled shovel can be configured for packaging within a relatively small or compact shipping box or container. For example, FIG. 22 illustrates a kit for assembling a wheeled shovel packaged within a container 2200 according to one exemplary embodiment. The container 2200 can be any type of container and can include a box, such as a cardboard box, having a height of HB, a width of WB, and a depth of DB. In one embodiment, the container 2200 is a cardboard box having a height HB of about thirty-five inches, a width WB of about thirty-five inches, and a depth DB of about six inches or about seven inches. In another embodiment, the container 2200 is a cardboard box having a height HB of about thirty-six inches, a width WB of about thirty-six inches, and a depth DB of about nine inches or about ten inches. For illustration purposes, the container 2200 is shown enclosing the wheel, the handle, the blade, the upper frame portion, and the lower frame portion. In some embodiments, these kit components are typically the larger components required for packaging. Additional kit components can also be enclosed in container 2200 even though they are not illustrated as such in FIG. 22.

In some embodiments, the kit may include at least one wheel with a multi-piece configuration that allows the wheel to be broken down into two or more pieces, for example, to allow packaging within a smaller container. In one particular embodiment, a wheel includes two semi-circular portions removably attachable to each other. Accordingly, the two semi-circular portions can be separated or detached from each other, for example, to allow for packaging within a smaller container. But when the user wants to use the wheeled shovel, the two semi-circular portions can be attached to each other to thereby define a circular wheel.

FIG. 23 illustrates a frame 2300 assembled from a wheeled shovel kit according to one exemplary embodiment. The frame 2300 can be assembled from components of a wheel shovel kit, such as kit 2100. The frame connection member 2112 has been positioned or inserted at least partially into the open end portions of the tubular members 2106A, 2106B of the upper frame portion 2104 and into the open end portions of the tubular members 2110A, 2110B of the lower frame portion 2108.

Two axle receivers 205 having cavities 210 (or more notches 210 in this illustrated embodiment) have been assembled on the inner portions of the tubular members 2106A, 2106B, 2110A, 2110B. A plurality of fasteners 2114, shown as a bolt with washers and a nut, have been inserted into corresponding holes on the frame tubular members 2106A, 2106B, 2110A, 2110B, the axle receivers 210, and the connection members 2112 (not shown in FIG. 23 as the connection members 2112 have been placed within the frame tubular members 2106A, 2106B, 2110A, 2110B). The assembled frame 2300 is now ready for the attachment of a handle, blade, wheel, and axle.

FIG. 24 illustrates an exemplary upper frame section 2104 and a handle 2402 for assembly of a handle and frame section 2400 from a wheeled shovel kit according to another exemplary embodiment. As shown in FIG. 24, the upper frame section 2104 includes an open attachment end 387, such as the end portions of a tube. The handle 2402 is formed from an open tube having end portions 2404. The handle's end portions 2404 are configured for coupling to the upper frame section 2104 by positioning of the handle end portions 2402 respectively within cavities defined by the open end portions of the frame tubular members at the open end portion 387. Alternatively, the handle end portions 2404 can define cavities for receiving therein end portions of the frame tubular members. In yet other embodiments, other suitable means of attachment can be employed for attaching the handle 2402 to the upper frame section 2104.

The handle end portions 2404 can also be fixed into the coupling with the open attachment end 387 by a fastener such as shown, by way of example, as a bolt 2406 with a wing nut 2408, and a washer 2410. Other fasteners may also be utilized.

FIG. 25 illustrates an exemplary attachment of the blade 120 to the lower frame portion 2108. The lower frame 2108 is illustrated as including a blade attachment plate 325 having a plurality of holes 335. In this illustrated embodiment, the attachment plate 325 is fixedly coupled to the lower frame portion 2108. Also illustrated is a separate blade attachment plate 325' having an angled portion 345 that can be added between a back portion or surface of blade 120 and the lower frame portion 2108 as illustrated by arrow A. The blade 120 can be attached using fasteners 2502. As shown by way of example, the fasteners 2502 can include a plurality of nuts, washers, and bolts that are configured (e.g., sized, shaped, etc.) for insertion into the holes 2120 of the blade 120 and holes 335 of the blade attachment plate 325, 325'.

FIGS. 26 through 34 illustrate another embodiment of a wheeled shovel 2600, which may be assembled from a wheeled shovel kit. Alternatively, the wheeled shovel 2600 may be provided to the user fully assembled.

As shown in FIG. 26, the wheeled shovel 2600 includes a frame 2609, a blade 2620, and a handle 2670. The wheeled shovel 2600 also includes a wheel 2671, a rim 2675, and spokes 2680 which connect an axle 2690 to the rim 2675.

The frame 2609 includes an upper frame element 2604 coupled to a lower frame element 2608 at least partially by fasteners 2614. The upper frame element 2604 includes upper frame members 2606A and 2606B. The lower frame element 2608 includes lower frame members 2613A, 2613B. The lower frame members 2613A, 2613B are sized such that their upper end portions can be positioned within cavities defined by the open end portions of the upper frame members 2606A, 2606B. Alternatively, the upper frame members 2606A, 2606B could be sized to be positioned within cavities defined by the open end portions of the lower frame members 2613A, 2613B.

The frame members 2606A, 2606B, 2613A, 2613B have corresponding fastener hole patterns for receiving fasteners 2614. After the end portions of the lower frame members 2613A, 2613B have been positioned within the end portions of the upper frame members 2606A, 2606B (or vice versa depending on the particular application), the fasteners 2614 can be positioned within the fastener holes to fasten the frame members to one another. The fasteners 2614 can include any type of mechanical fastener including bolts with nuts and washers, etc.

In this particular embodiment as shown in FIG. 29, an attachment plate 2655 connects the upper frame tubular members 2606A and 2606B to one another. In some embodiments, the attachment plate 2655 can provide additional strength and rigidity to the frame 2609.

The attachment plate 2655 may be, for example, welded or attached in some other fashion between the frame members 2606A and 2606B. The attachment plate 2655 includes a plurality of attachment conduits (shown as holes in FIG. 17A) positioned for engagement with corresponding attachment conduits or holes on the mounting plate 2688 associated with the handle 2670. Accordingly, the handle 2670 can be attached to the upper frame portion 2687 by the attachment plate 2655 and fasteners 2685. The fasteners 2685 can include any of a wide range of fasteners, such as bolts and a variety of nuts or other locking members including washers.

The handle 2670 is shown to generally T-shaped. Alternatively, other shapes and configurations are also possible for the handle 2670.

As shown in FIG. 27, the wheeled shovel 2600 includes two axle receivers 2605 having notches or openings 2610. The axle receivers 2605 are attached to the upper and lower frame elements 2604 and 2608 by fasteners 2614. The fasteners 2614 can include any of a wide range of fasteners, such as bolts and a variety of nuts or other locking members including washers.

The axle 2690 is engaged with notches 2610 of the axle receivers 2605. The axle 2690 comprises a rod releasably attached to the axle receivers 2605 by one or more fasteners 2616. The fasteners 2616 can include any of a wide range of fasteners, such as bolts and a variety of nuts or other locking members including washers. In the illustrated embodiment of FIG. 32, the fasteners 2616 comprise two wing nuts (or other suitable fastening device) threadedly engaged to threaded end portions of the axle 2690. One or more nylon tubes may also be positioned generally about the rod of the axle 2690.

In this particular embodiment, the axle receivers 2605 are attached to a generally flat or horizontal portion of the wheeled shovel 2600. Accordingly, the notches 2610 allow the operator to selectively adjust the position of the fulcrum, change the leverage/gearing ratio, and effective leverage length f relative to the throw arm without also changing (or only insignificantly changing) the handle height relative to the surface on which the wheeled shovel is being supported.

In other embodiments, the notches or openings 2610 can be integrally formed (e.g., drilled, etc.) directly into the frame 2609. In such alternate embodiments, the wheeled shovel would not then include a notched element 2605 that is separately attached to the frame 2609. The notches 2610 may be provided in any suitable number (i.e., one or more) and/or in various shapes and sizes such as rectangular, square, circular, angled, L-shaped, etc. Angled slots may be used to reduce the inclination of the wheel in respect to the notched element 2605 to permit better fixation in various embodiments. L-shaped slots may be used, for example, to obtain positive locking of the axle within the slots.

The blade 2620 is attached to the lower frame element 2608 by way of a blade attachment plate 2625 and fasteners 2602. In some embodiments, the attachment plate 2625 and/or blade 2620 can provide additional strength and rigidity to the frame 2609.

The fasteners 2602 can include any of a wide range of fasteners, such as bolts and a variety of nuts or other locking members including washers. Alternatively means may also be used to attach the shovel blade 2620 to the lower frame element 2608 with and without the attachment plate 2625, including welding, adhesive bonding, mechanical fasteners, combinations thereof, etc.

In other embodiments, the lower frame element 2608 may be formed to integrally include the blade attachment plate 2625 such that the blade attachment plate 2625 would not need to be separately attached to the lower frame element 2608. In further embodiments, the shovel blade 2620 may be formed to integrally include the blade attachment plate 2625 such that the blade attachment plate 2625 would not need to be separately attached to the shovel blade 2620. In other embodiments, the shovel blade 2620 may be attached directly to the lower frame element 2608 without a blade attachment plate 2625. In yet other embodiments, the lower frame element 2608 may be formed to integrally include the shovel blade 2620 such that the shovel blade 2620 would not necessarily need to be separately attached to the lower frame element 2608.

A wear strip 2622 is attached to a lower surface of the leading edge portion 2624 of the blade 2620 by fasteners 2626. In various embodiments, one or more replacement wear strips may also be provided.

FIGS. 35 through 43 illustrate another embodiment of a wheeled shovel 3500, which may be assembled from a wheeled shovel kit as shown in FIGS. 44 through 73. Alternatively, the wheeled shovel 3500 may be provided to the user fully assembled.

As shown in FIGS. 35 and 44, the wheeled shovel 3500 includes a frame 3509, a blade 3520, and a handle 3570. The wheeled shovel 3500 also includes a wheel 3571, a rim 3575, and spokes 3580 connecting the axle 3590 to the rim 3575.

The frame 3509 includes an upper frame element 3504 coupled to a lower frame element 3508 (FIGS. 55 through 57) at least partially by fasteners 3514 (FIGS. 35 and 45).

The upper frame element 3504 includes upper frame members 3506A and 3506B (FIGS. 45 and 50 through 54). The lower frame element 3508 includes lower frame elements 3513A, 3513B (FIGS. 45 and 56 through 57). In the illustrated embodiment, the upper and lower frame members are generally tubular or hollow. This, in turn, may help to reduce the weight of the wheeled shovel. As shown in FIG. 44, end caps or plugs 3507 can be positioned within the open ends of the upper frame members, for example, to thereby seal the open ends and prevent the ingress of liquids (e.g., water, etc.), foreign objects and debris into the frame members. In other embodiments, however, the upper frame members and/or the lower frame members (or portions thereof) may be solid or built-up, for example, to reinforce or increase the strength of the frame 3509.

As shown in FIG. 45, the lower frame members 3513A, 3513B are sized such that their upper end portions can be positioned within cavities defined by the open end portions of the upper frame members 3506A, 3506B. Alternatively, the upper frame members 3506A, 3506B could be sized to be positioned within cavities defined by the open end portions of the lower frame members 3513A, 3513B.

The frame members 3506A, 3506B, 3513A, 3513B have corresponding fastener hole patterns for receiving fasteners 3514. After the end portions of the lower frame members 3513A, 3513B have been positioned within the end portions of the upper frame members 3506A, 3506B (or vice versa depending on the particular application), the fasteners 3514 can be positioned within the fastener holes to fasten the frame members to one another. The fasteners 3514 can include any type of mechanical fastener including bolts with nuts and washers, etc. In the illustrated embodiment in FIG. 45, the fasteners 3514 comprise bolts and nuts that are threaded onto the bolts.

As shown in FIGS. 36 and 44 through 46, the wheeled shovel 3500 includes two axle receivers or plates 3505 having notches or openings 3510. The axle receivers 3505 are attached to inner sides of the upper and lower frame elements 3504 and 3508 by the same fasteners 3514 that are used to couple the upper and lower frame members 3506 and 3513 to one another. As shown in FIGS. 45, 64, and 65, the axle receivers 3505 include generally rectangular openings 3512 for receiving the fasteners 3514 therethrough.

Alternatively, the axle receivers 3505 may instead be attached using other fasteners besides the fasteners 3514, and/or the axle receivers 3505 could be attached to the outer sides of the upper and lower frame elements 3504 and 3508. In other embodiments, the axle receivers 3505 can include non-rectangular openings for receiving fasteners. In further embodiments, the frame 3509 may be formed to integrally include the axle receivers 3505. In which case, the axle receivers 3505 would not need to be separately attached to the frame 3509 by fasteners 3514.

With reference to FIGS. 35, 38, and 44, the end portions of the axle 3590 can be engaged within notches 3510 of the axle receivers 3505. The axle 3590 can be releasably attached to the axle receivers 3505 by one or more fasteners 3516. The fasteners 3516 can include any of a wide range of fasteners, such as bolts and a variety of nuts or other locking members including washers. In the illustrated embodiment of FIG. 36, the fasteners 3514 comprise knobs threaded onto threaded end portions of the axle 3590. One or more washers and/or spacers 3517 (e.g., nylon spacers, etc.) can also be used as shown in FIG. 44.

In this particular embodiment, the axle receivers 3505 are attached to a generally flat or horizontal portion of the wheeled shovel 3500. More specifically, this particular embodiment includes a frame or driving member having a generally "S-shaped" profile with a generally flat or horizontal middle portion to which the axle receivers 3505 can be attached. Accordingly, the notches 3510 allow the operator to selectively adjust the position of the fulcrum, change the leverage/gearing ratio, and effective leverage length f relative to the throw arm without also changing (or only insignificantly changing) the handle height relative to the surface on which the wheeled shovel is being supported.

In other embodiments, the notches or openings 3510 can be integrally formed (e.g., drilled, etc.) directly into the frame 3509. In such alternate embodiments, the wheeled shovel would not then include a notched element 3505 that is separately attached to the frame 3509.

The notches or other openings 3510 may be provided in any suitable number (i.e., one or more) and/or in various shapes and sizes such as rectangular, square, circular, angled, L-shaped, etc. Angled slots may be used to reduce the inclination of the wheel in respect to the notched element 3505 to permit better fixation in various embodiments. L-shaped slots may be used, for example, to obtain positive locking of the axle within the slots.

As shown in FIGS. 35 and 36, the handle 3570 is attached to an upper end 3587 of the frame 3509. In this particular embodiment, however, there is no separate attachment plate or cross plate (e.g., attachment plate 355 as shown in FIGS. 21 and 23) connecting the upper frame members 3506A and 3506B (FIGS. 36 and 44) to one another. Instead, the handle 3570 itself can provide the connectivity between the upper frame tubular members 3506A and 3506B. As shown in FIGS. 36 and 44, the handle 3570 includes a plate member 3555 integrally or monolithically formed with the handle 3570 as a single component structure. In some embodiments, the plate member 3555 can be configured so as to provide additional strength and rigidity to the frame 3509.

The plate member 3555 includes a plurality of attachment conduits or holes 3557 configured to cooperate with mounting holes 3560 on the upper frame members 3506A and 3506B. The handle 3570 can be attached to the frame members 3506A, 3506B by fasteners 3585 and/or welding. In the illustrated embodiment, the fasteners 3585 comprise bolts, washers, and nuts. Alternatively, the fasteners 3585 can include any of other suitable fasteners. In addition, the frame members 3506A, 3506B can also be attached to the handle 3570 in other ways, including welding, adhesive bonding, etc. In yet other embodiments, the handle 3570 and frame members 3506A, 3506B may be integrally formed such that the frame members 3506A, 3506B are not separately attached to the handle 3570.

In various embodiments, having the handle 3570 provide the connectivity between the frame members 3506A and 3506B (thus allowing for the elimination of the separate attachment plate 355) can help simplify the manufacture, assembly (e.g., less operations and fastening steps), and also provide manufacturing cost savings.

In addition, the handle 3570 can be attached to the frame 3509 with the plate 3555 attached to the topside of the frame 3509, as shown in FIGS. 36 and 44. Alternatively, the handle 3570 could instead be flipped over and attached to the frame 3509 with the plate 3555 being attached to the underside of the frame members 3506A, 3506B, thus further changing the handle height depending on the particular bend or curvature in the handle plate 3555. Further adjustment options to the handle height are also available. For example, the handle plate 3555 can be oriented as shown in FIG. 36 but be attached to the underside of the frame members 3506A, 3506B. Or, for example, the handle plate 3555 can be flipped over and then attached to the topside of the frame 3509.

The handle 3570 is shown to generally T-shaped. Alternatively, other shapes and configurations are also possible for the handle 3570.

In addition, and as shown in FIG. 44, the handle 3570 is also generally tubular or hollow, which, in turn, helps reduce the weight of the wheeled shovel. End caps or plugs 3569 may be positioned within the open ends of the handle 3570, for example, to seal the open ends and prevent the ingress of liquids (e.g., water, etc.), foreign objects and debris into the frame members. In other embodiments, however, the handle 3570 may be solid, for example, to reinforce or increase the strength of the handle 3570.

Also shown in FIGS. 36 and 44, hand grips 3572 are provided on the handle 3570. These grips 3572 can make it more comfortable and easier for the user to maintain a good grip onto the handle 3570. Various materials can be used for the grips 3572. In one particular embodiment, a foam material is used for the grips 3572. In another embodiment, a molded material is used for the grip 3572.

As shown in FIGS. 38, 41, and 44, the blade 3520 is attached to the lower frame element 3508 by way of a blade attachment plate 3525 and fasteners 3502. The blade attachment plate 3525, in turn, can also be attached to the lower frame element 3508 by the same fasteners 3502. In some embodiments, the attachment plate 3525 and/or blade 3520 can be configured for providing additional strength and rigidity to the frame 3609.

The fasteners 3502 can include any of a wide range of fasteners, such as bolts and a variety of nuts or other locking members including washers. In the illustrated embodiment of FIG. 44, the fasteners 3502 comprise bolts, washers, and nuts. Alternative means may be used to attach the shovel blade 3520 to the lower frame element 3520 with and without the attachment plate 3525, including welding, adhesive bonding, mechanical fasteners, combinations thereof, etc.

In other embodiments, the lower frame element 3508 may be formed to integrally include the blade attachment plate 3525 such that the blade attachment plate 3525 would not need to be separately attached to the lower frame members 3513A, 3513B. In further embodiments, the shovel blade 3520 may be formed to integrally include the blade attachment plate 3525 such that the blade attachment plate 3525 would not need to be separately attached to the shovel blade 3520. In still further embodiments, the lower frame element 3508 may be formed to integrally include the shovel blade 3520 such that the shovel blade 3520 would not necessarily need to be separately attached to the lower frame element 3508.

A wear strip 3522 is attached to a lower surface of the leading edge portion 3524 of the shovel blade 3520 by fasteners 3526. The fasteners 3526 can include any of a wide range of fasteners, such as bolts and a variety of nuts or other locking members including washers. In various embodiments, one or more replacement wear strips may also be provided. In yet other embodiments, the shovel blade 3520 may be formed to integrally include the wear strip 3522. In which case, the wear strip 3522 would not need to be separately attached to the shovel blade 3520 by fasteners 3526.

As shown in FIGS. 38, 39, and 44, the wheeled shovel 3500 can include a wheel bracket assembly 3501 attached to a bottom portion of the shovel blade 3520. The assembly 3502 includes wheels or rollers 3511, which can help make it easier for the wheeled shovel 3500 to traverse over rough ground, such as a gravel-covered driveway without digging up or scraping the gravel, etc. The rollers 3511 can also reduce friction with the ground, especially as more load or weight accumulates on the shovel blade 3520 while the shovel is being pushed forward to pick up more material from the ground.

In the illustrated embodiment, the wheeled shovel 3500 includes two wheels 3511, although other embodiments include more or less than two wheels. As an alternative or in addition to wheels, other embodiments include "shoes" formed of a relatively hard material (e.g., plastic, etc.) that are positioned under the shovel blade to help keep the shovel blade off the ground, such as a gravel-covered driveway or other rough surface. In some embodiments, the shoes are also configured (e.g., shaped, sized, positioned, formed of certain material(s), etc.) to also reduce friction with the ground, especially as more load accumulates on the shovel blade while the shovel is being pushed forward to pick up more material, such as snow, from the ground.

As shown in FIGS. 44, 73, and 74, the wheel bracket assembly 3501 includes a bracket 3581, two wheels 3511, and an axle 3582. The axle 3582 is positioned within generally opposed openings 3583 defined through the bracket 3581. The wheels 3511 are supported at opposite ends of the axle 3582, and maintained thereon by press on retaining nuts 3584, although other suitable fasteners can be used.

In one particular embodiment, the wheels 3511 are formed from plastic, and the bracket 3581 and axle 3582 can be formed from steel. Alternatively, other materials can be used for any of the various components shown and described herein depending, for example, on the particular application.

The wheel bracket assembly 3501 can be attached to the wheeled shovel by one or more fasteners 3579. In the illustrated embodiment, the fasteners 3579 comprise a carriage bolt positioned through generally opposed openings 3586 defined through the bracket 3581, a nut threaded onto the bolt, and a knob with a hexagonally-shaped recess (or other suitably shaped recess) positioned over the nut. Alternatively, other suitable fasteners can be used.

As shown in FIG. 38, a chipper plate 3556 can be attached to a bottom portion of the shovel blade 3520. The chipper plate 3556 can be configured (e.g., sized, shaped, positioned relative to the shovel blade 3520) to extend outwardly in front of the leading edge portion 3524 of the shovel blade 3520. Accordingly, the chipper plate 3556 can be used to chip or break ice, well-packed snow, or other materials as the wheeled shovel 3500 is moved generally forwardly.

FIGS. 44 and 69 through 72 illustrate one embodiment of a chipper plate assembly 3588. As shown, the chipper plate assembly 3588 includes the chipper plate 3556 and legs 3589. Each leg 3589 defines an opening 3591.

The chipper plate assembly 3588 can be attached to the wheeled shovel by one or more fasteners 3592. In the illustrated embodiment shown in FIG. 68, the fasteners 3592 comprise a carriage bolt positioned through the generally opposed openings 3591 defined by the legs 3589, a nut threaded onto the bolt, and a knob with a hexagonally-shaped recess (or other suitably shaped recess) positioned over the nut. Alternatively, other suitable fasteners can be used.

In other embodiments, the wheeled shovel 3500 may not include one or more of the optional accessories described above, such as one or more of the grips 3572, rollers or wheels 3511, chipper plate 3556, and/or wear strip 3522.

Various exemplary embodiments disclosed herein can be adaptable for various enhancements and improvements in useful ways. For example, a shovel blade and/or frame may be designed with a more flexible material (e.g., polyester, nylon, polyethylene, etc.) to enhance the ability to throw the shovel load. Some embodiments include a blade with sufficient flexibility for providing a spring-like effect akin to a trampoline or diving board as the blade flexes back to its original shape from a bent shape as it accelerates to unload the load. Some embodiments also (or alternatively) include a frame with sufficient flexibility for providing a spring-like effect akin to a trampoline or diving board as the frame flexes back to its original shape from a bent shape as it accelerates to unload the load. A comparable effect may be obtained by attaching the shovel blade to the shovel driving member with a spring-loaded hinge (not shown) that enhances the throwing capacity of the wheeled shovel.

Some embodiments can include a shovel blade with rearward and side wall portions that allow the shovel blade to pick up and retain liquid-like substances, such as snow slush. The shovel blade's rearward and side wall portions can also allow more snow (or other materials) to be carried and retained on the shovel blade, such as while rolling the wheeled shovel across a relatively rough surface. As another example, some embodiments can include a shovel blade or fork with tines, for example, to dig into and pick up mulch (or other materials).

In another aspect, a wheeled shovel has a frame or driving member, such as a yoke, that is made to fold at about the fulcrum area where a quick release wheel is mounted and removed readily for ease of transporting the wheeled shovel. As an alternative, a driving member may include two halves attached to each other at about the fulcrum area. It will also be understood that a plurality of wheels of various widths can be used instead of a single wheel as disclosed herein. Further, the apparatus can be motorized to pick up, transport, and/or propel a load of material from a wheeled shovel. Also, motor energy can be utilized to store energy in a spring or in another energy storing device, which in turn can be used on demand to assist in pushing and/or throwing a load from the shovel blade. Additionally, various wheeled shovel kits and packaging shown herein can provide cost effective space storage and shipment of an unassembled wheeled shovel that can be relatively easily assembled, disassembled, or partially disassembled in a fairly short time.

FIG. 75 illustrates an exemplary embodiment of a wheeled shovel 3600 embodying one or more aspects of the present disclosure. As shown, the wheeled shovel 3600 includes a wheel assembly 3602 having at least one wheel 3604. The wheeled shovel 3600 also includes a driving member, frame, or yoke 3606. A handle 3608 is disposed at an upper end portion of the driving member 3606. A shovel blade 3610 is disposed at a lower end portion of the driving member 3606.

In this particular embodiment, the driving member 3606 includes openings 3612 integrally formed (e.g., drilled, cut, machined, etc.) in a generally flat or horizontal portion of the driving member 3606. In other embodiments, the openings can be formed by way of a discrete component (e.g., axle plate, etc.) that is separately attached to the driving member 106. Accordingly, by selectively changing the particular openings 3612 in which to engage an axle of the wheel assembly 3602, a user can change the leverage/gearing ratio, the position of fulcrum, and effective leverage length relative to the throw arm without also changing (or only insignificantly changing) the handle height relative to the surface on which the wheeled shovel 3600 is being supported. In some embodiments, the leverage ratio can also be varied by adjustably changing the length of the handle, such as by selectively changing the handle's attachment location to the frame and/or by changing the handle's orientation by rotating the handle one hundred eighty degrees.

A wide variety of ways can be employed to attach an axle of the wheel assembly 3602 in the openings 3612. For example, a quick release for bicycle wheels or screw-on knobs can be employed. Or, the axle, in the form of a tube having axle ends with inside shoulders (not shown) can be snapped into openings (not shown) by gently spreading apart the middle portion of the driving member 3606.

With further reference to FIG. 75, the driving member 3606 also includes openings integrally formed (e.g., drilled, etc.) therein for receiving fasteners 3621 (e.g., screws, bolt and nut assemblies, rivets, combinations thereof, etc.). As shown, the fasteners 3621 releasably attach two frame members to each other. Accordingly, these frame members can be detached from each other, for example, to facilitate shipping and/or storage of the wheeled shovel 3600. Alternative embodiments can include a wheeled shovel with one or more fastener holes having different configurations (e.g., shape, size, location, more or less fastener holes, etc.) and/or with different types of fastening devices than what is shown in FIG. 75. Alternative means (e.g., welding, etc.) can also be employed for attaching the two frame members to each other. In still further embodiments, the two frame members may comprise a single component, thereby eliminating the need for the fasteners 3621 and fastener holes.

With continued reference to FIG. 75, the wheel 3604 and the blade 3610 are positioned relative to the driving member 3606 in a manner such that the blade 3610 rests on the ground in its normal position. An operator uses the handle 3608 to move the shovel 3610 in any direction by rolling the wheel 3604 on the ground. The operator also uses the handle 3608 to guide the shovel 3600 in shoving into the blade 3610 material lying along the blade's path. The operator then lifts the shovel blade 3610 off the ground to pick up a load of material, followed by further lifting to balance the load at a comfortable walking posture. The operator then moves generally forward to the desired destination. At the desired destination and while continuing to move generally forward, the operator then presses on the handle 3608 with a quick downward body and/or arm motion to propel the load away from the shovel 3600. The operator can dispose of the material straight ahead by directing the shovel 3600 in the direction of the motion of the wheeled shovel 3600. Alternatively, the operator can also dispose of the material generally to the side of the wheeled shovel 3600 by angling slightly to the sides while keeping the shovel generally upright. In which case, the operator would direct or steer the shovel (with the wheel generally upright) to point at least partially to the side as the handle is pushed downwardly (or just prior thereto) so that when the load is lifted and thrown the load will project to the side out of the path of shoveling. Plus, a user can also lean into the turns while using the wheeled shovel 3600, for example, to further enhance maneuverability similar to the manner in which a bicycle rider can lean into turns.

The relatively large wheel assembly 3602 can allow a user to lift the blade 3610 and snow thereon above the unshoveled snow height such that the blade 3610 can travel over the unshoveled snow or other rough surface without hitting, pushing through, or compressing (or with relatively little compression) unshoveled areas to be traversed. In some embodiments, the wheel is also relatively narrow, which, in turn, can reduce the amount of compression of the unshoveled areas as the wheeled shovel 3600 is rolled across those unshoveled areas.

The relatively high handle 3608 of the shovel 3600 enables the user to comfortably accelerate forward the load of snow off the blade 3610 while pushing down the handle 3608, which enhances the throw distance of the snow trajectory. The larger wheel 3604 with a higher axle can also provide greater distance over which to accelerate and throw the load. The larger wheel 3604, the S-shaped frame, and shovel blade angle of attack can cooperatively work together for throwing the load a great distance. The larger wheel 3604 can also facilitate carrying the snow, if needed, above deep snow and enable the wheel 3604 to more easily roll over steps, curbs, snow piles, etc. with less tipping action.

The wheel assembly 3602, driving member 3606, and shovel blade 3610 are preferably formed ergonomically to assist in picking up and releasing a large amount of material, such as sand, gravel or snow, generally aligned in the direction of motion, with less stress to the body of the operator, and especially to help prevent (or at least reduce) back stress or injury. During operation, a downward force applied to the wheeled shovel's handle 3608 can be translated or transferred through the axle/lever to briskly lift the shovel blade 3610 and its load, and causing the load to be thrown or propelled away from the shovel blade 3610. The material can be thrown or propelled forward or sideways, as desired, while the wheel 3604 is in motion.

In the illustrated embodiment of FIG. 75, the driving member 3606 is formed of continuous metal tubing. Alternatively, other suitable materials can be used for the driving member 3606. In some embodiments, the tubing material for the driving member 3606 can be formed from hollow aluminum, or other metal tubing. Non-metal materials, such as plastics or composites, may also be used.

In the illustrated embodiment, the wheel assembly 3602 comprises a wheel 3604 that includes a generally solid circular disc without any spokes. Alternatively, the wheel assembly 3602 may also include a rim and spokes connecting the axle to the rim, different treads, widths or a continuous web connecting the axle to a rim. Moreover, the wheel assembly 3602 can include a tire with an air-inflatable tube, a tubeless air-inflatable tire, a non-pneumatic airless tire, an extruded tire 4303 as shown in FIGS. 137 and 138, etc. Some embodiments include a relatively narrow wheel, which can provide the advantage of not packing down snow, for example, when shoveling snow (e.g., a narrower wheel can more easily cut through the snow with less resistance, etc.). The dimensions of the wheel 3604 and the position of the handle 3608 relative to the wheel's axle can be determined generally with respect to the position of the arms of a human body.

In some embodiments, the diameter of the wheel 3604 can be between about thirty inches and about thirty-eight inches. In addition, the height of the handle 3608 from a datum plane directly under the wheel 3604, that is, from a ground datum, can be between about thirty-eight inches to about fifty inches in one embodiment, or between about forty inches to about forty-five inches in another embodiment, or between about forty-eight inches and sixty inches in a further embodiment.

One particular embodiment allows the handle height to be selectively adjusted by the operator between about forty inches and about forty-five inches. In various embodiments, the height of handle 3608 from about the center of axle can be between about twenty-six inches and about thirty-two inches in one embodiment, or between about twenty-two inches and about thirty-two inches in another embodiment, or between about fifteen inches and nineteen inches in a further embodiment. In various embodiments, the overall length of the wheeled shovel 3600 can be between about sixty-two inches to about seventy inches in some embodiments, or between about sixty-six inches to about eighty-eight inches in other embodiments, or between about seventy-five inches to about seventy-eight inches in further embodiments, or between about sixty-six inches to seventy-eight inches in additional embodiments, or is about seventy-two inches in alternative embodiments.

In various embodiments, a distance from the tip of the shovel blade 3610 to a fulcrum area near the center of the wheel assembly 3602 can be between about thirty-two inches and about forty-six inches in one embodiment. In various embodiments, the distance from the fulcrum area to the tip of the handle 3608 can be varied, depending upon the operator's preference. In one particular embodiment, a plurality of axle attachment points via openings 3612 are provided by the driving member 3606 that allows the distance from the fulcrum area to the tip of the handle 3608 to be varied from about thirty-six inches to about forty-four inches. Accordingly, this embodiment allows about eight inches of variance in the axle connection or leverage point. This distance may be adjusted, for example, to make it easier to pick up and lift a load, balance the load on the wheeled shovel 3600 more evenly for ease of transport to a location, and/or to gain more leverage in shoving the load from the wheeled shovel 3600 at the location of interest. Conversely, the distance may be adjusted or geared down with less leverage to aid in the throwing of snow or other materials with the wheeled shovel 3600. The dimensions provided in the above paragraphs (as are all dimensions set forth herein) are mere examples provided for purposes of illustration only, as a wheeled shovel can be configured with different dimensions depending, for example, on the particular application and/or user of the wheeled shovel.

The relationship between the wheel diameter, overall shovel length, frame shape, blade angle of attack, and shovel handle height can determine the ease with which snow may be shoveled. For example, the positioning of the handle 3608 generally between the operator's chest and waist (which may vary depending on the height of the operator and conditions, such as depth of snow, clearing snow on a hill, etc.) can assist in pushing the accumulated snow or other material that is being shoveled. The higher handle position can also give greater acceleration range for throwing the snow. A ratio greater than one-to-one (1:1) between the length of the driving member 3606 and the height of the handle 3608 can provide the ease with which a blade 3610 full of snow can be lifted as the handle 3608 is lowered. Conversely, a ratio less than one-to-one (1:1) can aid in the throwing of snow or other materials, such as when the wheeled shovel 3600 is being used by a stronger user and/or with lighter snow. This leverage ratio can be varied by varying the point (e.g., which set of openings 3612) at which the driving member 3606 connects to the axle of the wheel 3604. In some embodiments, the leverage ratio can also be varied by adjustably changing the length of the handle, such as by selectively changing the handle's attachment location to the frame and/or by changing the handle's orientation by rotating the handle one hundred eighty degrees. Furthermore, differently shaped driving members can also contribute differently to the efficiency of the shovel.

FIGS. 76 through 85 illustrate an exemplary embodiment of a wheeled shovel 3700 embodying one or more aspects of the present disclosure. As shown, the wheeled shovel 3700 includes a wheel assembly 3702 having at least one wheel 3704. The wheeled shovel 3700 also includes a driving member, frame, or yoke 3706. A handle 3708 is disposed at an upper end portion of the driving member 3706. A shovel blade 3710 is disposed at a lower end portion of the driving member 3706.

As shown in FIG. 76, the handle 3708 generally includes a single formed or bent piece of tubular material attached to the frame members 3707A and 3707B via mechanical fasteners. In other embodiments, alternative means (e.g., welding, adhesives, etc.) can be employed for attaching the handle 3708 and/or other handle configurations are also possible.

In this particular embodiment, the driving member 3706 includes openings 3712 integrally formed (e.g., drilled, etc.) in a generally flat or horizontal portion of the driving member 3706. In other embodiments, the openings can be formed by way of a discrete component (e.g., axle plate, etc.) that is separately attached to the driving member 3706. Accordingly, by selectively changing the particular openings 3712 in which to engage an axle of the wheel assembly 3702, a user can change the leverage/gearing ratio, the position of the fulcrum, and effective leverage length relative to the throw arm without also changing (or only insignificantly changing) the handle height relative to the surface on which the wheeled shovel 3700 is being supported. In some embodiments, the leverage ratio can also be varied by adjustably changing the length of the handle, such as by selectively changing the handle's attachment location to the frame and/or by changing the handle's orientation by rotating the handle one hundred eighty degrees.

A wide variety of ways can be employed to attach an axle of the wheel assembly 3702 in the openings 3712. For example, a quick release for bicycle wheels or screw-on knobs can be employed. Or, the axle, in the form of a tube having axle ends with inside shoulders (not shown) can be snapped into openings by gently spreading apart the middle portion of the driving member 3706. In addition, other embodiments can include a wheeled shovel with more or less openings 3712 and/or openings 3712 having different configurations (e.g., shapes, sizes, locations, etc.) than what is shown in FIG. 76.

With further reference to FIG. 76, the driving member 3706 also includes openings integrally formed (e.g., drilled, etc.) therein for receiving fasteners 3721 (e.g., screws, bolt and nut assemblies, rivets, combinations thereof, etc.). As shown, the fasteners 3721 releasably attach two frame members to each other. Accordingly, these frame members can be detached from each other, for example, to facilitate shipping and/or storage of the wheeled shovel 3700. Alternative embodiments can include a wheeled shovel with one or more fastener holes having different configurations (e.g., shape, size, location, more or less fastener holes, etc.) and/or with different types of fastening devices than what is shown in FIG. 76. Alternative means (e.g., welding, etc.) can also be employed for attaching the two frame members to each other. In still further embodiments, the two frame members may comprise a single component, thereby eliminating the need for the fasteners 3721 and fastener holes.

With continued reference to FIGS. 76 through 85, the wheel 3704 and the blade 3710 are positioned relative to the driving member 3706 in a manner such that the blade 3710 rests on the ground in its normal position. An operator uses the handle 3708 to move the shovel 3700 in any direction by rolling the wheel 3704 on the ground. The operator also uses the handle 3708 to guide the shovel 3700 in shoving into the blade 3710 material lying along the blade's path. The operator then lifts the shovel blade 3710 off the ground to pick up a load of material, followed by further lifting to balance the load at a comfortable walking posture. The operator then moves generally forward to the desired destination. At the desired destination and while continuing to move generally forward, the operator then presses on the handle 3708 with a quick downward body and/or arm motion to propel the load away from the shovel 3700. The operator can dispose of the material straight ahead by directing the shovel 3700 in the direction of the motion of the wheeled shovel 3700. Alternatively, the operator can also dispose of the material generally to the side of the wheeled shovel by angling slightly to the sides while keeping the shovel 3700 generally upright. In which case, the operator would direct or steer the shovel 3700 (with the wheel generally upright) to point at least partially to the side as the handle is pushed downwardly (or just prior thereto) so that when the load is lifted and thrown the load will project to the side out of the path of shoveling. Plus, a user can also lean into the turns while using the wheeled shovel 3700, for example, to further enhance maneuverability similar to the manner in which a bicycle rider can lean into turns.

The relatively large wheel assembly 3702 can allow a user to lift the blade 3710 and snow thereon above the unshoveled snow height such that the blade 3710 can travel over the unshoveled snow or other rough surface without hitting, pushing through, or compressing (or with relatively little compression) unshoveled areas to be traversed. In some embodiments, the wheel is also relatively narrow, which, in turn, can reduce the amount of compression of the unshoveled areas as the wheeled shovel 3700 is rolled across those unshoveled areas.

The relatively high handle 3708 of the shovel 3700 can enable the user to comfortably accelerate forward the load of snow off the blade 3710 while pushing down the handle 3708, which enhances the throw distance of the snow trajectory. The larger wheel 3704 with a higher axle can also provide greater distance over which to accelerate and throw the load. The larger wheel 3704, the frame's S-shape, and shovel blade angle of attack can cooperatively work together for throwing the load a great distance. The larger wheel 3704 can also facilitate carrying the snow, if needed, above deep snow and enable the wheel 3704 to more easily roll over steps, curbs, snow piles, etc. with less tipping action.

The wheel assembly 3702, driving member 3706, and shovel blade 3710 are preferably formed ergonomically to assist in picking up and releasing a large amount of material, such as sand, gravel or snow, generally aligned in the direction of motion, with less stress to the body of the operator, and especially to help prevent (or at least reduce) back stress or injury. During operation, a downward force applied to the wheeled shovel's handle 3708 can be translated or transferred through the axle/lever to briskly lift the shovel blade 3710 and its load, and causing the load to be thrown or propelled away from the shovel blade 3710. The material can be thrown or propelled forward or sideways, as desired, while the wheel 3704 is in motion.

In the illustrated embodiment of FIGS. 76 through 85, the driving member 3706 is formed of continuous metal tubing. Alternatively, other suitable materials can be used for the driving member 3706. In some embodiments, the tubing material for the driving member 3706 can be formed from hollow aluminum, or other metal tubing. Non-metal materials, such as plastics or composites, may also be used.

In the illustrated embodiment, the wheel assembly 3702 comprises a wheel 3704. Depending on the particular application, the wheel assembly 3702 may also include a rim and spokes connecting the axle to the rim. Different types of wheels 3704 can be used, including non-spoked solid wheels (e.g., solid disk wheel/rim, etc.), different treads, widths or a continuous web connecting the axle to a rim. Moreover, the wheel assembly 3702 can include a tire with an air-inflatable tube, a tubeless air-inflatable tire, a non-pneumatic airless tire, an extruded tire 4303 as shown in FIGS. 137 and 138, etc. Some embodiments include a relatively narrow wheel, which can provide the advantage of not packing down snow, for example, when shoveling snow (e.g., a narrower wheel can more easily cut through the snow with less resistance, etc.). The dimensions of the wheel 3704 and the position of the handle 3708 relative to the wheel's axle can be determined generally with respect to the position of the arms of a human body.

In some embodiments, the diameter of the wheel 3704 can be between about thirty inches and about thirty-eight inches. In addition, the height of the handle 3708 from a datum plane directly under the wheel 3704, that is, from a ground datum, can be between about thirty-eight inches to about fifty inches in one embodiment, or between about forty inches to about forty-five inches in another embodiment, or between about forty-eight inches and sixty inches in a further embodiment. One particular embodiment allows the handle height to be selectively adjusted by the operator between about forty inches and about forty-five inches. In various embodiments, the height of handle 3708 from about the center of axle can be between about twenty-six inches and about thirty-two inches in one embodiment, or between about twenty-two inches and about thirty-two inches in another embodiment, or between about fifteen inches and nineteen inches in a further embodiment.

In various embodiments, the overall length of the wheeled shovel 3700 can be between about sixty-two inches to about seventy inches in some embodiments, or between about sixty-six inches to about eighty-eight inches in other embodiments, or between about seventy-five inches to about seventy-eight inches in further embodiments, or between about sixty-six inches to seventy-eight inches in additional embodiments, or is about seventy-two inches in alternative embodiments.

In various embodiments, a distance from the tip of the shovel blade 3710 to a fulcrum area near the center of the wheel assembly 3702 can be between about thirty-two inches and about forty-six inches in one embodiment. In various embodiments, the distance from the fulcrum area to the tip of the handle 3708 can be varied, depending upon the operator's preference. In one particular embodiment, a plurality of axle attachment points via openings 3712 are provided by the driving member 3706 that allows the distance from the fulcrum area to the tip of the handle 3708 to be varied from about thirty-six inches to about forty-four inches. Accordingly, this embodiment allows about eight inches of variance in the axle connection or leverage point. This distance may be adjusted, for example, to make it easier to pick up and lift a load, balance the load on the wheeled shovel 3700 more evenly for ease of transport to a location, and/or to gain more leverage in shoving the load from the wheeled shovel 3700 at the location of interest. Conversely, the distance may be adjusted or geared down with less leverage to aid in the throwing of snow or other materials with the wheeled shovel 3700. The dimensions provided in the above paragraphs (as are all dimensions set forth herein) are mere examples provided for purposes of illustration only, as a wheeled shovel can be configured with different dimensions depending, for example, on the particular application and/or user of the wheeled shovel.

The relationship between the wheel diameter, overall shovel length, frame shape, blade angle of attack, and shovel handle height can determine the ease with which snow may be shoveled. For example, the positioning of the handle 3708 generally between the operator's chest and waist (which may vary depending on the height of the operator and conditions, such as depth of snow, clearing snow on a hill, etc.) can assist in pushing the accumulated snow or other material that is being shoveled. The higher handle position can also give greater acceleration range for throwing the snow. A ratio greater than one-to-one (1:1) between the length of the driving member 3706 and the height of the handle 3708 can provide the ease with which a blade 3710 full of snow can be lifted as the handle 3608 is lowered. Conversely, a ratio less than one-to-one (1:1) can aid in the throwing of snow or other materials, such as when the wheeled shovel 3700 is being used by a stronger user and/or with lighter snow. This leverage ratio can be varied by varying the point (e.g., which set of openings 3712) at which the driving member 3706 connects to the axle of the wheel 3704. In some embodiments, the leverage ratio can also be varied by adjustably changing the length of the handle, such as by selectively changing the handle's attachment location to the frame and/or by changing the handle's orientation by rotating the handle one hundred eighty degrees. Furthermore, differently shaped driving members can also contribute differently to the efficiency of the shovel.

FIGS. 86 through 95 illustrate an exemplary embodiment of a wheeled shovel 3800 embodying one or more aspects of the present disclosure. As shown, the wheeled shovel 3800 includes a wheel assembly 3802 having at least one wheel 3804. The wheeled shovel 3800 also includes a driving member, frame, or yoke 3806. A handle 3808 is disposed at an upper end portion of the driving member 3806. A shovel blade 3810 is disposed at a lower end portion of the driving member 3806.

As shown in FIG. 86, the handle 3808 generally includes two pieces 3808A and 3808B attached to frame members 3807A and 3807B. While the illustrated embodiment shows the handle pieces 3808A, 3808B attached to the frame members 3807A, 3807B via mechanical fasteners, other suitable means (e.g., welding, adhesives, etc.) can be employed and/or other handle configurations are possible for alternative embodiments.

In this particular embodiment, the driving member 3806 includes openings 3812 integrally formed (e.g., drilled, etc.) in a generally flat or horizontal portion of the driving member 3806. In other embodiments, the openings can be formed by way of a discrete component (e.g., axle plate, etc.) that is separately attached to the driving member 3806. Accordingly, by selectively changing the particular openings 3812 in which to engage an axle of the wheel assembly 3802, a user can change the leverage/gearing ratio, the position of the fulcrum, and effective leverage length relative to the throw arm without also changing (or only insignificantly changing) the handle height relative to the surface on which the wheeled shovel 3800 is being supported. In some embodiments, the leverage ratio can also be varied by adjustably changing the length of the handle, such as by selectively changing the handle's attachment location to the frame and/or by changing the handle's orientation by rotating the handle one hundred eighty degrees.

A wide variety of ways can be employed to attach an axle of the wheel assembly 3802 in the openings 3812. For example, a quick release for bicycle wheels or screw-on knobs can be employed. Or, the axle, in the form of a tube having axle ends with inside shoulders (not shown) can be snapped into openings by gently spreading apart the middle portion of the driving member 3806. In addition, other embodiments can include a wheeled shovel with more or less openings 3812 and/or openings 3812 having different configurations (e.g., shapes, sizes, locations, etc.) than what is shown in FIG. 86.

With further reference to FIG. 86, the driving member 3806 also includes openings integrally formed (e.g., drilled, etc.) therein for receiving fasteners 3821 (e.g., screws, bolt and nut assemblies, rivets, combinations thereof, etc.). As shown, the fasteners 3821 releasably attach two frame members to each other. Accordingly, these frame members can be detached from each other, for example, to facilitate shipping and/or storage of the wheeled shovel 3800. Alternative embodiments can include a wheeled shovel with one or more fastener holes having different configurations (e.g., shape, size, location, more or less fastener holes, etc.) and/or with different types of fastening devices than what is shown in FIG. 86. Alternative means (e.g., welding, etc.) can also be employed for attaching the two frame members to each other. In still further embodiments, the two frame members may comprise a single component, thereby eliminating the need for the fasteners 3821 and fastener holes.

With continued reference to FIGS. 86 through 95, the wheel 3804 and the blade 3810 are positioned relative to the driving member 3806 in a manner such that the blade 3810 rests on the ground in its normal position. An operator uses the handle 3808 to move the shovel 3800 in any direction by rolling the wheel 3804 on the ground. The operator also uses the handle 3808 to guide the shovel 3800 in shoving into the blade 3810 material lying along the blade's path. The operator then lifts the shovel blade 3810 off the ground to pick up a load of material, followed by further lifting to balance the load at a comfortable walking posture. The operator then moves generally forward to the desired destination. At the desired destination and while continuing to move generally forward, the operator then presses on the handle 3808 with a quick downward body and/or arm motion to propel the load away from the shovel 3800. The operator can dispose of the material straight ahead by directing the shovel 3800 in the direction of the motion of the wheeled shovel 3800. Alternatively, the operator can also dispose of the material generally to the side of the wheeled shovel by angling slightly to the sides while keeping the shovel 3800 generally upright. In which case, the operator would direct or steer the shovel (with the wheel generally upright) to point at least partially to the side as the handle is pushed downwardly (or just prior thereto) so that when the load is lifted and thrown the load will project to the side out of the path of shoveling. Plus, a user can also lean into the turns while using the wheeled shovel 3800, for example, to further enhance maneuverability similar to the manner in which a bicycle rider can lean into turns.

The relatively large wheel assembly 3802 can allow a user to lift the blade 3810 and snow thereon above the unshoveled snow height such that the blade 3810 can travel over the unshoveled snow or other rough surface without hitting, pushing through, or compressing (or with relatively little compression) unshoveled areas to be traversed. In some embodiments, the wheel is also relatively narrow, which, in turn, can reduce the amount of compression of the unshoveled areas as the wheeled shovel 3800 is rolled across those unshoveled areas.

The relatively high handle 3808 of the shovel 3800 can enable the user to comfortably accelerate forward the load of snow off the blade 3810 while pushing down the handle 3808, which enhances the throw distance of the snow trajectory. The larger wheel 3804 with a higher axle can also provide greater distance over which to accelerate and throw the load. The larger wheel 3804, the frame's S-shape, and shovel blade angle of attack can cooperatively work together for throwing the load a great distance. The larger wheel 3804 can also facilitate carrying the snow, if needed, above deep snow and enable the wheel 3804 to more easily roll over steps, curbs, snow piles, etc. with less tipping action.

The wheel assembly 3802, driving member 3806, and shovel blade 3810 are preferably formed ergonomically to assist in picking up and releasing a large amount of material, such as sand, gravel or snow, generally aligned in the direction of motion, with less stress to the body of the operator, and especially to help prevent (or at least reduce) back stress or injury. During operation, a downward force applied to the wheeled shovel's handle 3808 can be translated or transferred through the axle/lever to briskly lift the shovel blade 3810 and its load, and causing the load to be thrown or propelled away from the shovel blade 3810. The material can be thrown or propelled forward or sideways, as desired, while the wheel 3804 is in motion.

In the illustrated embodiment of FIGS. 86 through 95, the driving member 3806 is formed of continuous metal tubing. Alternatively, other suitable materials can be used for the driving member 3806. In some embodiments, the tubing material for the driving member 3806 can be formed from hollow aluminum, or other metal tubing. Non-metal materials, such as plastics or composites, may also be used.

In the illustrated embodiment, the wheel assembly 3802 comprises a wheel 3804. Depending on the particular application, the wheel assembly 3802 may also include a rim and spokes connecting the axle to the rim. Different types of wheels 3804 can be used, including non-spoked solid wheels (e.g., solid disk wheel/rim, etc.), different treads, widths or a continuous web connecting the axle to a rim. Moreover, the wheel assembly 3802 can include a tire with an air-inflatable tube, a tubeless air-inflatable tire, a non-pneumatic airless tire, an extruded tire 4303 as shown in FIGS. 137 and 138, etc. Some embodiments include a relatively narrow wheel, which can provide the advantage of not packing down snow, for example, when shoveling snow (e.g., a narrower wheel can more easily cut through the snow with less resistance, etc.). The dimensions of the wheel 3804 and the position of the handle 3808 relative to the wheel's axle can be determined generally with respect to the position of the arms of a human body.

In some embodiments, the diameter of the wheel 3804 can be between about thirty inches and about thirty-eight inches. In addition, the height of the handle 3808 from a datum plane directly under the wheel 3804, that is, from a ground datum, can be between about thirty-eight inches to about fifty inches in one embodiment, or between about forty inches to about forty-five inches in another embodiment, or between about forty-eight inches and sixty inches in a further embodiment.

One particular embodiment allows the handle height to be selectively adjusted by the operator between about forty inches and about forty-five inches. In various embodiments, the height of the handle 3808 from about the center of the axle can be between about twenty-six inches and about thirty-two inches in one embodiment, or between about twenty-two inches and about thirty-two inches in another embodiment, or between about fifteen inches and nineteen inches in a further embodiment.

In various embodiments, the overall length of the wheeled shovel 3800 can be between about sixty-two inches to about seventy inches in some embodiments, or between about sixty-six inches to about eighty-eight inches in other embodiments, or between about seventy-five inches to about seventy-eight inches in further embodiments, or between about sixty-six inches to seventy-eight inches in additional embodiments, or is about seventy-two inches in alternative embodiments.

In various embodiments, a distance from the tip of the shovel blade 3810 to a fulcrum area near the center of the wheel assembly 3802 can be between about thirty-two inches and about forty-six inches in one embodiment. In various embodiments, the distance from the fulcrum area to the tip of the handle 3808 can be varied, depending upon the operator's preference. In one particular embodiment, a plurality of axle attachment points via openings 3812 are provided by the driving member 3806 that allows the distance from the fulcrum area to the tip of the handle 3808 to be varied from about thirty-six inches to about forty-four inches. Accordingly, this embodiment allows about eight inches of variance in the axle connection or leverage point. This distance may be adjusted, for example, to make it easier to pick up and lift a load, balance the load on the wheeled shovel 3800 more evenly for ease of transport to a location, and/or to gain more leverage in shoving the load from the wheeled shovel 3800 at the location of interest. Conversely, the distance may be adjusted or geared down with less leverage to aid in the throwing of snow or other materials with the wheeled shovel 3800. The dimensions provided in the above paragraphs (as are all dimensions set forth herein) are mere examples provided for purposes of illustration only, as a wheeled shovel can be configured with different dimensions depending, for example, on the particular application and/or user of the wheeled shovel.

The relationship between the wheel diameter, overall shovel length, frame shape, blade angle of attack, and shovel handle height can determine the ease with which snow may be shoveled. For example, the positioning of the handle 3808 generally between the operator's chest and waist (which may vary depending on the height of the operator and conditions, such as depth of snow, clearing snow on a hill, etc.) can assist in pushing the accumulated snow or other material that is being shoveled. The higher handle position can also give greater acceleration range for throwing the snow. A ratio greater than one-to-one (1:1) between the length of the driving member 3806 and the height of the handle 3808 can provide the ease with which a blade 3810 full of snow can be lifted as the handle 3808 is lowered. Conversely, a ratio less than one-to-one (1:1) can aid in the throwing of snow or other materials, such as when the wheeled shovel 3800 is being used by a stronger user and/or with lighter snow. This leverage ratio can be varied by varying the point (e.g., which set of openings 3812) at which the driving member 3806 connects to the axle of the wheel 3804. In some embodiments, the leverage ratio can also be varied by adjustably changing the length of the handle, such as by selectively changing the handle's attachment location to the frame and/or by changing the handle's orientation by rotating the handle one hundred eighty degrees. Furthermore, differently shaped driving members can also contribute differently to the efficiency of the shovel.

FIGS. 96 through 105 illustrate an exemplary embodiment of a wheeled shovel 3900 embodying one or more aspects of the present disclosure. As shown, the wheeled shovel 3900 includes a wheel assembly 3902 having at least one wheel 3904. The wheeled shovel 3900 also includes a driving member, frame, or yoke 3906. A handle 3908 is disposed at an upper end portion of the driving member 3906. A shovel blade 3910 is disposed at a lower end portion of the driving member 3906.

As shown in FIG. 96, the handle 3908 generally includes two pieces 3908A and 3908B attached to frame members 3907A and 3907B. While the illustrated embodiment shows the handle pieces 3908A, 3908B attached to the frame members 3907A, 3907B via mechanical fasteners, other suitable means (e.g., welding, adhesives, etc.) can be employed and/or other handle configurations are possible for alternative embodiments.

In this particular embodiment, the driving member 3906 includes openings 3912 integrally formed (e.g., drilled, etc.) in a generally flat or horizontal portion of the driving member 3906. In other embodiments, the openings can be formed by way of a discrete component (e.g., axle plate, etc.) that is separately attached to the driving member 3906. Accordingly, by selectively changing the particular openings 3912 in which to engage an axle of the wheel assembly 3902, a user can change the leverage/gearing ratio, the position of the fulcrum, and effective leverage length relative to the throw arm without also changing (or only insignificantly changing) the handle height relative to the surface on which the wheeled shovel 3900 is being supported. In some embodiments, the leverage ratio can also be varied by adjustably changing the length of the handle, such as by selectively changing the handle's attachment location to the frame and/or by changing the handle's orientation by rotating the handle one hundred eighty degrees.

A wide variety of ways can be employed to attach an axle of the wheel assembly 3902 in the openings 3912. For example, a quick release for bicycle wheels or screw-on knobs can be employed. Or, the axle, in the form of a tube having axle ends with inside shoulders (not shown) can be snapped into openings by gently spreading apart the middle portion of the driving member 3906.

With continued reference to FIGS. 96 through 105, the wheel 3904 and the blade 3910 are positioned relative to the driving member 3906 in a manner such that the blade 3910 rests on the ground in its normal position. An operator uses the handle 3908 to move the shovel 3900 in any direction by rolling the wheel 3904 on the ground. The operator also uses the handle 3908 to guide the shovel 3900 in shoving into the blade 3910 material lying along the blade's path. The operator then lifts the shovel blade 3910 off the ground to pick up a load of material, followed by further lifting to balance the load at a comfortable walking posture. The operator then moves generally forward to the desired destination. At the desired destination and while continuing to move generally forward, the operator then presses on the handle 3908 with a quick downward body and/or arm motion to propel the load away from the shovel 3900. The operator can dispose of the material straight ahead by directing the shovel 3900 in the direction of the motion of the wheeled shovel 3900. Alternatively, the operator can also dispose of the material generally to the side of the wheeled shovel by angling slightly to the sides while keeping the shovel 3900 generally upright. In which case, the operator would direct or steer the shovel 3900 (with the wheel generally upright) to point at least partially to the side as the handle is pushed downwardly (or just prior thereto) so that when the load is lifted and thrown the load will project to the side out of the path of shoveling. Plus, a user can also lean into the turns while using the wheeled shovel 3900, for example, to further enhance maneuverability similar to the manner in which a bicycle rider can lean into turns.

The relatively large wheel assembly 3902 can allow a user to lift the blade 3910 and snow thereon above the unshoveled snow height such that the blade 3910 can travel over the unshoveled snow or other rough surface without hitting, pushing through, or compressing (or with relatively little compression) unshoveled areas to be traversed. In some embodiments, the wheel is also relatively narrow, which, in turn, can reduce the amount of compression of the unshoveled areas as the wheeled shovel 3900 is rolled across those unshoveled areas.

The relatively high handle 3908 of the shovel 3900 can enable the user to comfortably accelerate forward the load of snow off the blade 3910 while pushing down the handle 3908, which enhances the throw distance of the snow trajectory. The larger wheel 3904 with a higher axle can also provide greater distance over which to accelerate and throw the load. The larger wheel 3904, the frame's S-shape, and shovel blade angle of attack can cooperatively work together for throwing the load a great distance. The larger wheel 3904 can also facilitate carrying the snow, if needed, above deep snow and enable the wheel 3904 to more easily roll over steps, curbs, snow piles, etc. with less tipping action.

The wheel assembly 3902, driving member 3906, and shovel blade 3910 are preferably formed ergonomically to assist in picking up and releasing a large amount of material, such as sand, gravel or snow, generally aligned in the direction of motion, with less stress to the body of the operator, and especially to help prevent (or at least reduce) back stress or injury. During operation, a downward force applied to the wheeled shovel's handle 3908 can be translated or transferred through the axle/lever to briskly lift the shovel blade 3910 and its load, and causing the load to be thrown or propelled away from the shovel blade 3910. The material can be thrown or propelled forward or sideways, as desired, while the wheel 3904 is in motion.

In the illustrated embodiment of FIGS. 96 through 105, the driving member 3906 is formed of continuous metal tubing. Alternatively, other suitable materials can be used for the driving member 3906. In some embodiments, the tubing material for the driving member 3906 can be formed from hollow aluminum, or other metal tubing. Non-metal materials, such as plastics or composites, may also be used.

In the illustrated embodiment, the wheel assembly 3902 comprises a wheel 3904. Depending on the particular application, the wheel assembly 3902 may also include a rim and spokes connecting the axle to the rim. Different types of wheels 3904 can be used, including non-spoked solid wheels (e.g., solid disk wheel/rim, etc.), different treads, widths or a continuous web connecting the axle to a rim. Moreover, the wheel assembly 3902 can include a tire with an air-inflatable tube, a tubeless air-inflatable tire, a non-pneumatic airless tire, an extruded tire 4303 as shown in FIGS. 137 and 138, etc. Some embodiments include a relatively narrow wheel, which can provide the advantage of not packing down snow, for example, when shoveling snow (e.g., a narrower wheel can more easily cut through the snow with less resistance, etc.). The dimensions of the wheel 3904 and the position of the handle 3908 relative to the wheel's axle can be determined generally with respect to the position of the arms of a human body.

In some embodiments, the diameter of the wheel 3904 can be between about thirty inches and about thirty-eight inches. In addition, the height of the handle 3908 from a datum plane directly under the wheel 3904, that is, from a ground datum, can be between about thirty-eight inches to about fifty inches in one embodiment, or between about forty inches to about forty-five inches in another embodiment, or between about forty-eight inches and sixty inches in a further embodiment.

One particular embodiment allows the handle height to be selectively adjusted by the operator between about forty inches and about forty-five inches. In various embodiments, the height of the handle 3908 from about the center of the axle can be between about twenty-six inches and about thirty-two inches in one embodiment, or between about twenty-two inches and about thirty-two inches in another embodiment, or between about fifteen inches and nineteen inches in a further embodiment.

In various embodiments, the overall length of the wheeled shovel 3900 can be between about sixty-two inches to about seventy inches in some embodiments, or between about sixty-six inches to about eighty-eight inches in other embodiments, or between about seventy-five inches to about seventy-eight inches in further embodiments, or between about sixty-six inches to seventy-eight inches in additional embodiments, or is about seventy-two inches in alternative embodiments.

In various embodiments, a distance from the tip of the shovel blade 3910 to a fulcrum area near the center of the wheel assembly 3902 can be between about thirty-two inches and about forty-six inches in one embodiment. In various embodiments, the distance from the fulcrum area to the tip of the handle 3908 can be varied, depending upon the operator's preference. In one particular embodiment, a plurality of axle attachment points via openings 3912 are provided by the driving member 3906 that allows the distance from the fulcrum area to the tip of the handle 3908 to be varied from about thirty-six inches to about forty-four inches. Accordingly, this embodiment allows about eight inches of variance in the axle connection or leverage point. This distance may be adjusted, for example, to make it easier to pick up and lift a load, balance the load on the wheeled shovel 3900 more evenly for ease of transport to a location, and/or to gain more leverage in shoving the load from the wheeled shovel 3900 at the location of interest. Conversely, the distance may be adjusted or geared down with less leverage to aid in the throwing of snow or other materials with the wheeled shovel 3900. The dimensions provided in the above paragraphs (as are all dimensions set forth herein) are mere examples provided for purposes of illustration only, as a wheeled shovel can be configured with different dimensions depending, for example, on the particular application and/or user of the wheeled shovel.

The relationship between the wheel diameter, overall shovel length, frame shape, blade angle of attack, and shovel handle height can determine the ease with which snow may be shoveled. For example, the positioning of the handle 3908 generally between the operator's chest and waist (which may vary depending on the height of the operator and conditions, such as depth of snow, clearing snow on a hill, etc.) can assist in pushing the accumulated snow or other material that is being shoveled. The higher handle position can also give greater acceleration range for throwing the snow. A ratio greater than one-to-one (1:1) between the length of the driving member 3906 and the height of the handle 3908 can provide the ease with which a blade 3910 full of snow can be lifted as the handle 3908 is lowered. Conversely, a ratio less than one-to-one (1:1) can aid in the throwing of snow or other materials, such as when the wheeled shovel 3900 is being used by a stronger user and/or with lighter snow. This leverage ratio can be varied by varying the point (e.g., which set of openings 3912) at which the driving member 3906 connects to the axle of the wheel 3904. In some embodiments, the leverage ratio can also be varied by adjustably changing the length of the handle, such as by selectively changing the handle's attachment location to the frame and/or by changing the handle's orientation by rotating the handle one hundred eighty degrees. Furthermore, differently shaped driving members can also contribute differently to the efficiency of the shovel.

FIGS. 106 through 112 illustrate another exemplary embodiment of a wheeled shovel 4000 embodying one or more aspects of the present disclosure. As shown in FIG. 106, the wheeled shovel 4000 includes a wheel assembly 4002 having at least one wheel 4004. The wheeled shovel 4000 also includes a driving member, frame, or yoke 4006. A handle 4008 is disposed at an upper end portion of the driving member 4006. A shovel blade 4010 is disposed at a lower end portion of the driving member 4006.

In the particular embodiment shown in the FIG. 108, the shovel blade 4010 is attached (e.g., via mechanical fasteners, etc.) to a lower generally J-shaped end portion of the driving member 4006. In some embodiments, the J-shaped end portion can be configured for providing additional strength and rigidity to the driving member 4006. By using the J-shaped end portion instead of a shovel blade mounting plate in some embodiments, the elimination of a shovel blade mounting plate can allow for reductions in the overall number of parts, amount of material needed, and/or number of steps for assembling the wheeled shovel.

The handle 4008 generally includes two pieces 4008A and 4008B attached to generally opposite sides of an upper frame member 4007. While the illustrated embodiment shows the handle pieces 4008A, 4008B attached to the upper frame member 4007 via mechanical fasteners, other suitable means (e.g., welding, adhesives, etc.) can be employed and/or other handle configurations are possible for alternative embodiments.

In this particular embodiment, two frame linking members 4040 (also shown in FIGS. 113 through 119) are used to generally link or connect the upper frame member 4007 to a lower frame member 4009. In the particular embodiment shown in FIG. 106, the linking members 4040 connect the upper frame member 4007 to the lower frame member 4009 without any overlapping of the frame members 4007, 4009.

The linking members 4040 includes holes 4042 for receiving mechanical fasteners (e.g., nut and bolt assemblies, etc.) for attaching the linking members 4040 to the corresponding frame members 4007 and 4009. While this particular embodiment attaches the linking members 4040 to the respective frame members 4007 and 4009 via mechanical fasteners, other suitable means (e.g., welding, adhesives, etc.) can be employed.

As shown by FIGS. 110 through 112, the linking members 4040 allow the upper frame member 4007 (with the handle 4008 attached thereto) to be folded or closed upon the lower frame member 4009. For example, FIG. 110 illustrates the wheeled shovel 4000 in a closed or folded configuration in which the handle 4008 is in front of the shovel blade 4010. As another example, FIGS. 111 and 112 illustrates the wheeled shovel 4000 in a closed or folded configuration in which the handle 4008 is behind the shovel blade 4010.

The folded or closed configuration can be used, for example, to facilitate storage or shipment of the wheeled shovel 4000, for example, because less storage space or smaller packaging will be needed for the folded wheeled shovel 4000. When a user wants to use the wheeled shovel 4000, the user can then unfold the shovel by pivoting the upper frame member 4007 relative to the lower frame member 4009, whereby the linking members 4040 are moved into the configuration shown in FIG. 118 and the handle 4008 of the wheeled shovel 4000 is returned to the position shown in FIG. 106. In some embodiments, the wheel 4004 can also be removed, for example, to facilitate storage and/or packaging of the wheeled shovel 4000. Additional embodiments can also include a two-piece wheel comprising two semi-circular portions removably attachable to each other. In such embodiments, the two semi-circular portions can be separated or detached from each other, for example, to allow for packaging within a smaller container. But when the user wants to use the wheeled shovel, the two semi-circular portions can be attached to each other to thereby define a circular wheel.

FIGS. 113 through 116 illustrate exemplary quick release connectors 4048, 4050 and pins 4052, 4054 respectively. As shown, both connectors 4048, 4050 and pins 4052, 4054 are generally used for engaging the frame linking members 4040 to one another. In addition, the connector 4050 and pin 4054 is also used for attaching the wheel assembly 4002 to the driving member 4006, as can be seen by FIGS. 113 through 116. In addition, the connector 4048 and pin 4052 is used for engaging and holding the frame linking members 4040 in their unfolded or open position as shown in FIG. 113. Alternatively, other suitable devices and means can be employed for engaging the frame linking members 4040 to one another and/or for attaching the wheel assembly 4002 to the driving member 4006.

To allow for relative pivotal movement of the frame linking members 4040 from the open/unfolded configuration shown in FIGS. 106 and 118 to the folded/closed configuration shown in FIGS. 110 through 112 and 119, the pin 4052 (FIG. 113) is removed from the opening at the end portion of the rod portion 4049 of the connector 4048. Then, the connector 4048 can be removed from the openings 4044. The linking members 4040 can now be pivoted relative to one another to their folded configuration (FIGS. 110 through 113) in which the upper drive member 4007 (and handle 4008 attached thereto) is positioned adjacent the lower drive member 4009. Accordingly, the folded wheeled shovel 4000 can have a fairly compact folded configuration, which may, for example, facilitate storage and/or shipment of the wheeled shovel 4000. In some embodiments, the wheeled shovel 4000 can have an even more compact folded configuration by removing the wheel 4004 in the exemplary manner described below.

When a user wants to use (and thus unfold) the wheeled shovel 4000, the user can pivot the upper frame member 4007 relative to the lower frame member 4009, whereby the linking members 4040 are moved from the configuration shown in FIG. 119 to the configuration shown in FIG. 118. The user can then insert the rod portion 4049 of the connector 4048 through the holes 4044 of the frame linking members 4040. The pin 4052 (FIG. 113) can then be inserted into the opening through the end portion of the connector 4048 to thereby retain the connector 4048 within the openings 4044 of the frame linking members 4040.

In addition, the exemplary quick release connector 4050 and pin 4054 also allows the wheel 4004 to be readily removed from the wheeled shovel 4000, for example, to facilitate storage and/or shipment of the disassembled wheeled shovel 4000. To remove the wheel 4004, the user first removes the pin 4054 from the opening 4059 (FIG. 114) at the end portion of the connector 4050. The connector 4050 can then be removed from the opening at the wheel axle and openings 4046 of the frame linking members 4040, thereby releasing the wheel 4004.

The wheel 4004 can also be readily reattached by inserting the rod portion 4051 of the connector 4050 through the openings 4046 of the frame linking members 4040 and the opening at the wheel axle. The pin 4054 (FIG. 113) can then be inserted into the opening 4059 through the end portion of the connector 4050 to thereby retain the connector 4050 within the opening at the wheel axle and openings 4046 of the frame linking members 4040. These exemplary aspects of the present disclosure relating to the folding features of the wheeled shovel 4000 can also be implemented with any of the other exemplary wheeled shovel embodiments disclosed herein.

In various embodiments, a frame linking member 4040 can be integrally or monolithically formed as a single component. For example, FIG. 120 illustrates an exemplary plan view of a piece of material that can be used for making a frame linking member 4040. In this particular embodiment, a frame linking member 4040 can be formed by stamping (or other suitable method, such as drilling, etc.) in a piece of material holes 4042, 4044, and 4046. After the holes 4042, 4044, 4046 are formed, the material may then be folded about the fold lines 4043 to form a frame linking member 4040. Alternatively, the folding can be performed prior to forming all of the holes 4042, 4044, 4046. Even though a frame linking member 4040 can be formed integrally in this example, such is not required for all embodiments. Alternative configurations (e.g., shapes, sizes, etc.), materials, and manufacturing methods (e.g., drawing, etc.) can be used for making a frame linking member 4040.

A wide range of materials can be used for frame linking members 4040. In one exemplary embodiment, the frame linking members 4040 are formed from ten or eleven gauge galvanized steel, although other suitable materials can be used in other embodiments. In some embodiments, the linking members 4040 are formed from a material having a heavier gauge than the material used for the frame 4006, for example, to provide structurally reinforcement to the frame 4006. Using a material for the linking members 4040 that is a heavier gauge material than that of the frame 4006 can thus allow a lighter and less costly material to be used for the frame 4006 without compromising the structural capabilities of the wheeled shovel 4000. In alternative embodiments, however, a relatively heavy gauge material can also be used for the frame, such as when the wheeled shovel is for a stronger user.

With reference back to FIG. 106, the wheel 4004 and the blade 4010 are positioned relative to the driving member 4006 in a manner such that the blade 4010 rests on the ground in its normal position. An operator uses the handle 4008 to move the shovel 4000 in any direction by rolling the wheel 4004 on the ground. The operator also uses the handle 4008 to guide the shovel 4000 in shoving into the blade 4010 material lying along the blade's path. The operator then lifts the shovel blade 4010 off the ground to pick up a load of material, followed by further lifting to balance the load at a comfortable walking posture. The operator then moves generally forward to the desired destination. At the desired destination and while continuing to move generally forward, the operator then presses on the handle 4008 with a quick downward body and/or arm motion to propel the load away from the shovel 4000. The operator can dispose of the material straight ahead by directing the shovel 4000 in the direction of the motion of the wheeled shovel 4000. Alternatively, the operator can also dispose of the material generally to the side of the wheeled shovel by angling slightly to the sides while keeping the shovel 4000 generally upright. In which case, the operator would direct or steer the shovel 4000 (with the wheel generally upright) to point at least partially to the side as the handle is pushed downwardly (or just prior thereto) so that when the load is lifted and thrown the load will project to the side out of the path of shoveling. Plus, a user can also lean into the turns while using the wheeled shovel 4000, for example, to further enhance maneuverability similar to the manner in which a bicycle rider can lean into turns.

The relatively large wheel assembly 4002 can allow a user to lift the blade 4010 and snow thereon above the unshoveled snow height such that the blade 4010 can travel over the unshoveled snow or other rough surface without hitting, pushing through, or compressing (or with relatively little compression) unshoveled areas to be traversed. In some embodiments, the wheel is also relatively narrow, which, in turn, can reduce the amount of compression of the unshoveled areas as the wheeled shovel 4000 is rolled across those unshoveled areas.

The relatively high handle 4008 of the shovel 4000 can enable the user to comfortably accelerate forward the load of snow off the blade 4010 while pushing down the handle 4008, which enhances the throw distance of the snow trajectory. The larger wheel 4004 with a higher axle can also provide greater distance over which to accelerate and throw the load. The larger wheel 4004 can also facilitate carrying the snow, if needed, above deep snow and enable the wheel 4004 to more easily roll over steps, curbs, snow piles, etc.

The wheel assembly 4002, driving member 4006, and shovel blade 4010 are preferably formed ergonomically to assist in picking up and releasing a large amount of material, such as sand, gravel or snow, generally aligned in the direction of motion, with less stress to the body of the operator, and especially to help prevent (or at least reduce) back stress or injury. During operation, a downward force applied to the wheeled shovel's handle 4008 can be translated or transferred through the axle/lever to briskly lift the shovel blade 4010 and its load, and causing the load to be thrown or propelled away from the shovel blade 4010. The material can be thrown or propelled forward or sideways, as desired, while the wheel 4004 is in motion.

In the illustrated embodiment of FIG. 106, the driving member 4006 is formed of continuous metal tubing. Alternatively, other suitable materials can be used for the driving member 4006. In some embodiments, the tubing material for the driving member 4006 can be formed from hollow aluminum, or other metal tubing. Non-metal materials, such as plastics or composites, may also be used.

As shown in FIGS. 106 and 109, the frame 4006 is disposed generally along only one side of the wheel 4004. One end of the wheel axle is coupled to the frame 4006 in a cantilevered type mounting arrangement. The frame 4006 is configured so as to generally curve about the wheel 4004, for example, such that the wheel 4004 is cantilevered and/or aligned generally with a center of gravity for the frame 4006. In such embodiments, the linking members 4040 can be configured for providing sufficient structural support and strength to allow for the cantilevered mounting arrangement of the axle and hub to the frame 4006.

In the illustrated embodiment, the wheel assembly 4002 comprises the wheel 4004. Depending on the particular application, the wheel assembly 4002 may also include a rim and spokes connecting the axle to the rim. Different types of wheels 4004 can be used, including non-spoked solid wheels (e.g., solid disk wheel/rim, etc.), different treads, widths or a continuous web connecting the axle to a rim. Moreover, the wheel assembly 4002 can include a tire with an air-inflatable tube, a tubeless air-inflatable tire, a non-pneumatic airless tire, an extruded tire 4303 as shown in FIGS. 137 and 138, etc. Some embodiments include a relatively narrow wheel, which can provide the advantage of not packing down snow, for example, when shoveling snow (e.g., a narrower wheel can more easily cut through the snow with less resistance, etc.). The dimensions of the wheel 4004 and the position of the handle 4008 relative to the wheel's axle can be determined generally with respect to the position of the arms of a human body.

In some embodiments, the diameter of the wheel 4004 can be between about thirty inches and about thirty-eight inches. In addition, the height of the handle 4008 from a datum plane directly under the wheel 4004, that is, from a ground datum, can be between about thirty-eight inches to about fifty inches in one embodiment, or between about forty inches to about forty-five inches in another embodiment, or between about forty-eight inches and sixty inches in a further embodiment.

In various embodiments, the height of handle 4008 from about the center of axle can be between about twenty-six inches and about thirty-two inches in one embodiment, or between about twenty-two inches and about thirty-two inches in another embodiment, or between about fifteen inches and nineteen inches in a further embodiment.

In various embodiments, the overall length of the wheeled shovel 4000 can be between about sixty-two inches to about seventy inches in some embodiments, or between about sixty-six inches to about eighty-eight inches in other embodiments, or between about seventy-five inches to about seventy-eight inches in further embodiments, or between about sixty-six inches to seventy-eight inches in additional embodiments, or is about seventy-two inches in alternative embodiments.

In various embodiments, a distance from the tip of the shovel blade 4010 to a fulcrum area near the center of the wheel assembly 4002 can be between about thirty-two inches and about forty-six inches in one embodiment. The dimensions provided in the above paragraphs (as are all dimensions set forth herein) are mere examples provided for purposes of illustration only, as a wheeled shovel can be configured with different dimensions depending, for example, on the particular application and/or user of the wheeled shovel.

The relationship between the wheel diameter, overall shovel length, frame shape, blade angle of attack, and shovel handle height can determine the ease with which snow may be shoveled. For example, the positioning of the handle 4008 generally between the operator's chest and waist (which may vary depending on the height of the operator and conditions, such as depth of snow, clearing snow on a hill, etc.) can assist in pushing the accumulated snow or other material that is being shoveled. The higher handle position can also give greater acceleration range for throwing the snow. A ratio greater than one-to-one (1:1) between the length of the driving member 4006 and the height of the handle 4008 can provide the ease with which a blade 4010 full of snow can be lifted as the handle 4008 is lowered. Conversely, a ratio less than one-to-one (1:1) can aid in the throwing of snow or other materials, such as when the wheeled shovel 4000 is being used by a stronger user and/or with lighter snow. Furthermore, differently shaped driving members can also contribute differently to the efficiency of the shovel.

FIGS. 121 through 132 illustrate another exemplary embodiment of a wheeled shovel 4100 embodying one or more aspects of the present disclosure. As shown in FIG. 121, the wheeled shovel 4100 includes a wheel assembly 4102 having at least one wheel 4104. The wheeled shovel 4100 also includes a driving member, frame, or yoke 4106. A handle 4108 is disposed at an upper end portion of the driving member 4106. A shovel blade 4110 is disposed at a lower end portion of the driving member 4106.

In the particular embodiment shown in the FIG. 123, the shovel blade 4110 is attached (e.g., via mechanical fasteners, etc.) to a lower generally J-shaped end portion of the driving member 4106. In some embodiments, the J-shaped end portion can be configured for providing additional strength and rigidity to the driving member 4106. By using the J-shaped end portion instead of a shovel blade mounting plate in some embodiments, the elimination of a shovel blade mounting plate can allow for reductions in the overall number of parts, amount of material needed, and/or number of steps for assembling the wheeled shovel.

The handle 4108 generally includes two pieces 4108A and 4108B attached to generally opposite sides of an upper frame member 4107. While the illustrated embodiment shows the handle pieces 4108A, 4108B attached to the upper frame member 4107 via mechanical fasteners, other suitable means (e.g., welding, adhesives, etc.) can be employed and/or other handle configurations are possible for alternative embodiments.

As shown in FIGS. 130 and 134, this embodiment includes two frame linking members 4140 that generally link or connect the upper frame member 4107 to a lower frame member 4109. In the particular embodiment shown in FIG. 130, the linking members 4140 connect the upper frame member 4107 to the lower frame member 4109 without any overlapping of the frame members 4107, 4109.

The linking members 4140 include holes 4142 for receiving mechanical fasteners (e.g., nut and bolt assemblies, etc.) for attaching the linking members 4040 to the corresponding frame members 4107 and 4109. While this particular embodiment attaches the linking members 4140 to the respective frame members 4107 and 4109 via mechanical fasteners, other suitable means (e.g., welding, adhesives, etc.) can be employed.

As shown in FIGS. 131 and 132, the linking members 4140 allow the upper frame member 4107 (with the handle 4108 attached thereto) to be folded or closed upon the lower frame member 4109. For example, FIG. 131 illustrates the wheeled shovel 4100 in a closed or folded configuration. The folded or closed configuration can be used, for example, to facilitate storage or shipment of the wheeled shovel 4100, for example, because less storage space or smaller packaging will be needed for the folded wheeled shovel 4100. When a user wants to use the wheeled shovel 4100, the user can then unfold the shovel by pivoting the upper frame member 4107 relative to the lower frame member 4109, whereby the linking members 4140 and the handle 4108 of the wheeled shovel 4100 are returned to the position shown in FIG. 121.

FIG. 134 illustrates exemplary quick release connectors 4148, 4150 and a pin 4154. As shown, the connectors 4048, 4050 and pin 4154 are generally used for engaging the frame linking members 4140 to one another. In addition, the connector 4150 and pin 4154 is also used for attaching the wheel assembly 4102 to the driving member 4106. Alternatively, other suitable devices and means can be employed for engaging the frame linking members 4040 to one another and/or for attaching the wheel assembly 4102 to the driving member 4106.

To allow for relative pivotal movement of the frame linking members 4140 from the open/unfolded configuration (FIGS. 121 through 130) to the folded/closed configuration (FIG. 131), the connector 4148 (FIG. 134) is removed. Then, the linking members 4140 can be pivoted relative to one another to their folded configuration (FIG. 131). Accordingly, the folded wheeled shovel 4100 can have a fairly compact folded configuration, which may, for example, facilitate storage and/or shipment of the wheeled shovel 4100. In some embodiments, the wheel 4104 can also be removed, for example, to facilitate storage and/or packaging of the wheeled shovel 4100. Additional embodiments can also include a two-piece wheel comprising two semi-circular portions removably attachable to each other. In such embodiments, the two semi-circular portions can be separated or detached from each other, for example, to allow for packaging within a smaller container. But when the user wants to use the wheeled shovel, the two semi-circular portions can be attached to each other to thereby define a circular wheel.

When a user wants to use (and thus unfold) the wheeled shovel 4100, the user can pivot the upper frame member 4107 relative to the lower frame member 4109, whereby the linking members 4140 are moved from the configuration shown in FIG. 131 to the configuration shown in FIG. 134. The user can then insert the rod portion of the connector 4148 through holes of the frame linking members 4140. A pin can then be inserted into an opening through the end portion of the connector 4148 to retain the connector 4148 within the openings of the frame linking members 4140.

In addition, the exemplary quick release connector 4150 and pin 4154 also allows the wheel 4104 to be readily removed from the wheeled shovel 4100, for example, to facilitate storage and/or shipment of the disassembled wheeled shovel 4100. To remove the wheel 4104, the user first removes the pin 4154. The connector 4150 can then be removed from the opening at the wheel axle and openings of the frame linking members 4140, thereby releasing the wheel 4104.

The wheel 4104 can also be readily reattached by inserting the rod portion 4151 of the connector 4150 through the openings of the frame linking members 4140 and the opening at the wheel axle. The pin 4154 can then be inserted into the opening through the end portion of the connector 4150 to thereby retain the connector 4150 within the opening at the wheel axle and openings of the frame linking members 4140. These exemplary aspects relating to the folding and collapsibility of the wheeled shovel 4100 can also be implemented with any one or more of the other exemplary wheeled shovel embodiments disclosed herein.

With reference back to FIG. 121, the wheel 4104 and the blade 4110 are positioned relative to the driving member 4106 in a manner such that the blade 4110 rests on the ground in its normal position. An operator uses the handle 4108 to move the shovel 4100 in any direction by rolling the wheel 4104 on the ground. The operator also uses the handle 4108 to guide the shovel 4100 in shoving into the blade 4110 material lying along the blade's path. The operator then lifts the shovel blade 4110 off the ground to pick up a load of material, followed by further lifting to balance the load at a comfortable walking posture. The operator then moves generally forward to the desired destination. At the desired destination and while continuing to move generally forward, the operator then presses on the handle 4108 with a quick downward body and/or arm motion to propel the load away from the shovel 4100. The operator can dispose of the material straight ahead by directing the shovel 4100 in the direction of the motion of the wheeled shovel 4100. Alternatively, the operator can also dispose of the material generally to the side of the wheeled shovel by angling slightly to the sides while keeping the shovel 4100 generally upright. In which case, the operator would direct or steer the shovel 4100 (with the wheel generally upright) to point at least partially to the side as the handle is pushed downwardly (or just prior thereto) so that when the load is lifted and thrown the load will project to the side out of the path of shoveling. Plus, a user can also lean into the turns while using the wheeled shovel 4100, for example, to further enhance maneuverability similar to the manner in which a bicycle rider can lean into turns.

The relatively large wheel assembly 4102 can allow a user to lift the blade 4110 and snow thereon above the unshoveled snow height such that the blade 4110 can travel over the unshoveled snow or other rough surface without hitting, pushing through, or compressing (or with relatively little compression) unshoveled areas to be traversed. In some embodiments, the wheel is also relatively narrow, which, in turn, can reduce the amount of compression of the unshoveled areas as the wheeled shovel 4100 is rolled across those unshoveled areas.

The relatively high handle 4108 of the shovel 4100 can enable the user to comfortably accelerate forward the load of snow off the blade 4110 while pushing down the handle 4108, which enhances the throw distance of the snow trajectory. The larger wheel 4104 with a higher axle can also provide greater distance over which to accelerate and throw the load. The larger wheel 4104 can also facilitate carrying the snow, if needed, above deep snow and enable the wheel 4104 to more easily roll over steps, curbs, snow piles, etc.

The wheel assembly 4102, driving member 4106, and shovel blade 4110 are preferably formed ergonomically to assist in picking up and releasing a large amount of material, such as sand, gravel or snow, generally aligned in the direction of motion, with less stress to the body of the operator, and especially to help prevent (or at least reduce) back stress or injury. During operation, a downward force applied to the wheeled shovel's handle 4108 can be translated or transferred through the axle/lever to briskly lift the shovel blade 4110 and its load, and causing the load to be thrown or propelled away from the shovel blade 4110. The material can be thrown or propelled forward or sideways, as desired, while the wheel 4104 is in motion.

In the illustrated embodiment of FIGS. 121 through 132, the driving member 4106 is formed of metal tubing. Alternatively, other suitable materials can be used for the driving member 4106. In some embodiments, the tubing material for the driving member 4106 can be formed from hollow aluminum, or other metal tubing. Non-metal materials, such as plastics or composites, may also be used.

As shown in FIGS. 121 and 125, the frame 4106 is disposed generally along only one side of the wheel 4104. One end of the wheel axle is coupled to the frame 4106 in a cantilevered type mounting arrangement. The frame 4106 is configured so as to generally curve about the wheel 4104, for example, such that the wheel 4104 is cantilevered and/or aligned generally with a center of gravity for the frame 4106. In such embodiments, the linking members 4140 can be configured for providing sufficient structural support and strength to allow for the cantilevered mounting arrangement of the axle and hub to the frame 4106.

A wide range of materials can be used for frame linking members 4140. In one exemplary embodiment, the frame linking members 4140 are formed from ten or eleven gauge galvanized steel, although other suitable materials can be used in other embodiments. In some embodiments, the linking members 4140 are formed from a material having a heavier gauge than the material used for the frame 4106, for example, to provide structural reinforcement to the frame 4106. Using a material for the linking members 4140 that is a heavier gauge material than that of the frame 4106 can thus allow a lighter and less costly material to be used for the frame 4104 without compromising the structural capabilities of the wheeled shovel 4100. In alternative embodiments, however, a relatively heavy gauge material can also be used for the frame, such as when the wheeled shovel is for a stronger user.

In the illustrated embodiment, the wheel assembly 4102 comprises a wheel 4104. Depending on the particular application, the wheel assembly 4102 may also include a rim and spokes connecting the axle to the rim. Different types of wheels 4104 can be used, including non-spoked solid wheels (e.g., solid disk wheel/rim, etc.), different treads, widths or a continuous web connecting the axle to a rim. Moreover, the wheel assembly 4102 can include a tire with an air-inflatable tube, a tubeless air-inflatable tire, a non-pneumatic airless tire, an extruded tire 4303 as shown in FIGS. 137 and 138, etc. Some embodiments include a relatively narrow wheel, which can provide the advantage of not packing down snow, for example, when shoveling snow (e.g., a narrower wheel can more easily cut through the snow with less resistance, etc.). The dimensions of the wheel 4104 and the position of the handle 4108 relative to the wheel's axle can be determined generally with respect to the position of the arms of a human body.

In some embodiments, the diameter of the wheel 4104 can be between about thirty inches and about thirty-eight inches. In addition, the height of the handle 4108 from a datum plane directly under the wheel 4104, that is, from a ground datum, can be between about thirty-eight inches to about fifty inches in one embodiment, or between about forty inches to about forty-five inches in another embodiment, or between about forty-eight inches and sixty inches in a further embodiment.

In various embodiments, the height of handle 4108 from about the center of axle can be between about twenty-six inches and about thirty-two inches in one embodiment, or between about twenty-two inches and about thirty-two inches in another embodiment, or between about fifteen inches and nineteen inches in a further embodiment.

In various embodiments, the overall length of the wheeled shovel 4100 can be between about sixty-two inches to about seventy inches in some embodiments, or between about sixty-six inches to about eighty-eight inches in other embodiments, or between about seventy-five inches to about seventy-eight inches in further embodiments, or between about sixty-six inches to seventy-eight inches in additional embodiments, or is about seventy-two inches in alternative embodiments.

In various embodiments, a distance from the tip of the shovel blade 4110 to a fulcrum area near the center of the wheel assembly 4102 can be between about thirty-two inches and about forty-six inches in one embodiment. The dimensions provided in the above paragraphs (as are all dimensions set forth herein) are mere examples provided for purposes of illustration only, as a wheeled shovel can be configured with different dimensions depending, for example, on the particular application and/or user of the wheeled shovel.

The relationship between the wheel diameter, overall shovel length, frame shape, blade angle of attack, and shovel handle height can determine the ease with which snow may be shoveled. For example, the positioning of the handle 4108 generally between the operator's chest and waist (which may vary depending on the height of the operator and conditions, such as depth of snow, clearing snow on a hill, etc.) can assist in pushing the accumulated snow or other material that is being shoveled. A ratio greater than one-to-one (1:1) between the length of the driving member 4106 and the height of the handle 4108 can provide the ease with which a blade 4110 full of snow can be lifted as the handle 4108 is lowered. Conversely, a ratio less than one-to-one (1:1) can aid in the throwing of snow or other materials, such as when the wheeled shovel 4100 is being used by a stronger user and/or with lighter snow. Furthermore, differently shaped driving members can also contribute differently to the efficiency of the shovel.

FIG. 133 illustrates another exemplary embodiment of a wheeled shovel 4200 embodying one or more aspects of the present disclosure. As shown in FIG. 133, the wheeled shovel 4200 includes a driving member, frame, or yoke 4206 with greater foldability or collapsibility than the wheeled shovel 4100 shown in FIGS. 121 through 132. In FIG. 132, the wheeled shovel's open, ready-for-use configuration is designated as 4106A, and closed, folded, or collapsed configuration is designated as 4106B. Similarly, FIG. 133 shows the wheeled shovel 4200 in an open, ready-for-use configuration 4206A and a closed, folded, or collapsed configuration 4206B.

Various embodiments provide a wheeled shovel operable as a manually-driven snow throwing device with one or more significant advantages. The wheeled shovel is configured such that it can throw snow off the area being cleared, to the top of, or over, snow that may have accumulated at the edges of the area being cleared. In some embodiments, the particular geometry of a wheeled shovel has been carefully configured and tailored for this specific purpose. Advantageously, the wheeled shovel can be used for throwing snow to the top of or over adjacent snow instead of having to carry that snow to another location.

The geometry of a wheeled shovel can be derived from the user's anatomy and most effective motion, from a good starting and finishing position for the throwing action. In one example, a starting handle height was selected to be somewhat above the normal user's waist but below the user's chest, such as about forty inches. The finish handle height (after completing the throwing motion) was selected to be somewhat above the normal user's knee, such as about twenty inches. During the throwing action for this particular wheeled shovel embodiment, the handle would move forward horizontally about eighteen inches.

The wheeled shovel horizontal distances can be set up around a one-to-one leverage ratio with a bit of adjustment in either direction to allow for users of different strengths. As disclosed herein, some embodiments allow the user to selectively adjust the leverage ratio by varying the point at which the driving member connects to the wheel axle and/or by adjustably changing the handle length (e.g., by selectively changing the handle's attachment location to the frame and/or by changing the handle's orientation by rotating the handle one hundred eighty degrees, etc.).

The relatively equal balancing of a one-to-one leverage ratio can be advantageous. By comparison, it would be difficult to raise the snow with a wheeled shovel configured with too high of a leverage ratio, such as where the horizontal distance separating the wheel axle from the load on the shovel blade is more than three times greater than the horizontal distance separating the handle from the wheel axle. Conversely, a wheeled shovel configured with too low of a leverage ratio (e.g., 0.30, etc.) would provide too little shovel blade travel and too little acceleration of the snow during the throwing motion, making it very difficult to throw the snow any significant distance.

In one particular embodiment, the wheeled shovel is configured to allow for selective adjustment to the horizontal distance separating the handle from the wheel axle, and the horizontal distance separating the wheel axle from the center of gravity of the load on the shovel blade. This adjustment can be accomplished by selectively attaching the wheel to the frame or driving member at different mounting locations as disclosed herein for various embodiments, such as the exemplary embodiments shown in FIGS. 11, 26, 35, 75, 76, 86, 96 FIG. 26, etc.).

In one particular example, a wheeled shovel is configured with four different options for attaching the wheel to the frame or driving member, such that the wheeled shovel has the following dimensions. When the wheel is mounted at a first mounting location such that the wheel is in the most rearward available wheel position, the horizontal distance separating the handle from the wheel axle is about 22.8 inches. The horizontal distance separating the shovel blade load from the axle is about 33.2 inches. Accordingly, the leverage ratio is about 1.46 when the wheel is mounted at the first mounting location.

When the wheel is mounted at a second mounting location, the horizontal distance separating the handle from the wheel axle is about 25.7 inches. The horizontal distance separating the shovel blade load from the axle is about 30.3 inches. Accordingly, the leverage ratio is about 1.18 when the wheel is mounted at the second mounting location.

When the wheel is mounted at a third mounting location, the horizontal distance separating the handle from the wheel axle is about 28.5 inches. The horizontal distance separating the shovel blade load from the axle is about 27.5 about inches. Accordingly, the leverage ratio is about 0.96 when the wheel is mounted at the third mounting location.

When the wheel is mounted at a fourth mounting location such that the wheel is in a most forward available wheel position, the horizontal distance separating the handle from the wheel axle is 31.4 inches. The horizontal distance separating the shovel blade load from the axle is 24.6 inches. Accordingly, the leverage ratio is 0.78 when the wheel is mounted at the fourth mounting location.

Other aspects relate to the particular configuration (e.g., shape, size, angle of attack, etc.) of a shovel blade in combination with frame shape. Snow reacts as a granular material. The sides of a pile of a granular material will form an angle with the ground known as the angle of repose. A steeper pile will tip or slide down to this angle. The angle of repose for snow varies with the temperature and moisture content of the snow. For example, slushy snow can have an angle of repose of about fifteen degrees, while cold dry snow can have an angle of repose of about fifty degrees. On average, the angle of repose for snow is about thirty-two degrees.

This angle of repose value also relates to snow on a slanted surface. If the angle of the slanted surface equals the angle of repose, then the snow will slide down the slanted surface. This is why avalanches become more common as the slope of the terrain tends toward the angle of repose for the snow.

If the angle of a shovel blade relative to a normal to the acceleration of the shovel exceeds the angle of repose, the snow will slide in the shovel. The end result is that forward acceleration of the snow is reduced such that the snow is thrown more vertically with less distance, and in some cases thrown generally straight up or back—a scenario not conducive to clearing an area of snow.

In order to further illustrate these aspects, a mathematical analysis will now be provided as to how the geometry, sizing, and dimensions were determined for some exemplary embodiments. This analysis is provided for purposes of illustration only and not for purposes of limitation. In this analysis, the values Q and Qh respectively represent the vertical and horizontal distances the shovel blade moves for the given input distance as shown in FIG. 136.

---

If a throwing motion takes 0.5 seconds from start to finish, the vertical and horizontal components of the average acceleration can be determined.

$t := .5$ $$accelvert := \frac{2 \cdot Q(17.5, 23)}{t^2} \quad accelhoriz := \frac{2 \cdot Qh(17.5, 23)}{t^2}$$

using production values of 35 inch diameter wheel and 23 inch horizontal distance $accelvert = 150.68 \qquad accelhoriz = 263.583$ inches per second squared $grav := 9.8 \cdot \frac{100}{2.54} \qquad grav = 385.827$ inches per second squared The angle of the acceleration to the ground is- $$accelang := atan\left(\frac{accelvert + grav}{accelhoriz}\right) \cdot \frac{180}{\pi}$$

$accelang = 63.835$ degrees

---

The angle of rotation of the entire wheeled shovel, and thus the shovel blade have been determined by the function a(r,D). Accordingly, evaluating for the frame size:

$$a(17.5, 23) \cdot \frac{180}{\pi} = 39.914$$

Accordingly, various embodiments include a wheeled shovel with a frame and a shovel blade configured such that the shovel blade has an angle of attack of about 46 degrees. FIG. 139 illustrates an example of a shovel blade having an angle of attack of 46 degrees. For example, the frame can have a generally S-shaped curvature with a forward portion extending forward and then bending down more sharply to provide a relatively sharp shovel blade sharp angle of attack of about forty-six degrees. By angling the shovel blade at its start position half of the rotation angle forward of perpendicular to the angle of acceleration (so that at the finish it is rotated half the angle back) the angle of the shovel to the perpendicular is minimized and stays below the average angle of repose. The resultant angle of attack is 46 degrees.

Other embodiments include a wheeled shovel configured to provide a shovel blade angle of attack of about forty-five degrees. Alternatively, other wheeled shovels can be configured with a shovel blade angle of attack that is higher or lower than forty-five degrees.

This relatively sharp shovel blade angle of attack can enable better throwing as it imparts to the snow a combination of a forward-and-up-throw. In various embodiments, the shovel blade also includes a relatively sharply upturned or curved portion at about the leading edge of the shovel blade. With this curved portion, the shovel blade angle where the blade touches the ground is fairly shallow. In some embodiments, the shovel blade can be provided with a relatively sharply upturned or curved portion such that the shovel blade's leading edge is generally parallel with the ground or other surface from which the shovel blade is removing snow. This, in turn, can reduce friction between the blade and the ground (or other surface), and can also help reduce the likelihood of the shovel blade catching on stone edges, etc.

In any one or more of the various embodiments of the wheeled shovel disclosed herein, the wheel assembly can include a wide variety of wheel types or configurations. Exemplary wheel types or configurations include spoked wheels with spokes connecting an axle to a rim, and non-spoked solid wheels in which a continuous or solid web connects the axle to a rim. In addition, different tire tread arrangements (e.g., tread shapes, sizes, etc.) can be used. Moreover, a wheel assembly can include a tire with an air-inflatable tube, tubeless air-inflatable tire, a non-pneumatic airless tire, an extruded tire, etc. By way of example, FIGS. 137 and 138 illustrate an exemplary extruded tire 4303 that can be used with a wheeled shovel according to exemplary embodiments. The extruded tire 4303 has treads 4397 formed by ridges and grooves extending circumferentially along the outer portion of the tire 4303. As shown in FIG. 138, the extruded tire 4303 also includes webs or flanges 4398 that cooperatively define a plurality of internal cavities or chambers 4399. Alternatively, other tire configurations are possible including non-extruded or extruded tire configurations with different tread arrangements and/or different internal constructions (e.g., more or less cavities or chambers, more or less webs or flanges, etc.).

As disclosed herein, various aspects relate to the geometry of a wheeled shovel where that geometry is defined and tailored so as to render the wheeled shovel as a particularly effective manual snow throwing device. In this regard, various wheeled shovel embodiments include one or more of the following features:
  a handle set a bit above the user's waist but below the user's chest (with some adjustability for different user heights); and/or
  a relatively one-to-one balanced leverage ratio of horizontal handle length to horizontal shovel length (with some adjustability for user strength); and/or
  a wheel diameter of at least about thirty-five inches (which is below a fifty inch diameter wheel for practical reasons, such as storage, shipping, manufacturing costs, etc., but above a thirty inch diameter wheel for improved throwing distance); and/or
  an S-shaped frame; and/or
  a shovel blade configured in combination with the frame shape such that the shovel blade angle of attack is relatively sharp (e.g., about forty-five degrees, about forty-six degrees, etc.) to thereby help keep the angle of the shovel blade relative to the angle of the acceleration less than the angle of repose of the snow within the shovel blade. As disclosed herein, snow on the shovel blade accelerates at a given angle based on the geometry of the wheeled shovel and user input. In some embodiments, this angle of acceleration for the snow is about 63.8 degrees relative to the ground, as the shovel blade rotates around an angle of about 39.9 degrees. Accordingly, some embodiments are specifically configured so as to keep the angle of the shovel blade relative to the angle of the acceleration less than the angle of repose of the snow on the shovel blade. To minimize (or at least reduce) the shovel blade's angle relative to the angle of the acceleration during the wheeled shovel's rotational motion, the wheeled shovel can be configured such that the shovel blade begins at about half of 39.9 degrees (or about 19.95 degrees) less than the angle of acceleration, and such that the shovel blade will have a finishing position that is about half of 39.9 degrees (or about 19.95 degrees) higher than the angle of acceleration at the conclusion of the throwing motion. For these particular embodiments, the shovel blade angle of attack relative to the ground is about forty-six degrees as shown in the figure above.

In some preferred embodiments, a wheeled shovel has a geometry in which the above-identified features are integrated or cooperatively configured so as to render the wheeled shovel as a very effective manual snow throwing device.

In various embodiments, a wheeled shovel is designed such that back pain can be avoided (or at least reduced) by allowing the use of body weight and leverage to lift and throw heavier loads (instead of relying on the user's muscle power alone for lifting and throwing the loads as is the case with most conventional shovels). Various wheeled shovel embodiments can allow snow or other materials to be shoveled with less effort and more rapidly than conventional snow shovels. As disclosed herein, some embodiments can provide these advantages by virtue of having a relatively large wheel on which the frame and shovel blade are attached, having a frame that is longer than most conventional shovels, and/or having a frame having bends or curves in such a manner as to enhance the leverage of the user to use body weight for pushing the handle downwardly while pushing the wheeled shovel forward to lift and propel the snow or other material forwardly and upwardly (e.g., throwing, etc.). The longer frame size can provide greater leverage for throwing snow, and the larger wheel diameter can provide a greater lifting height, easier rolling over rough terrain. Plus, attaching the frame at or near the wheel axle, the wheeled shovel can have greater maneuverability and ability to lift, accelerate, and throw loads while moving forward. This, in turn, can thereby enable much greater loads to be lifted and thrown (at generally greater heights and distances than when done with other shovel designs). This combination of design features can enable shoveling more snow and other materials with less effort and in significantly less time, and while also avoiding (or almost entirely avoiding) lower back strain from lifting.

In various embodiments, a wheeled shovel includes a main wheel that rolls in an exemplary manner similar to a bicycle wheel, but the wheel may be as large as three feet or more in diameter. The construction of the wheel can vary from spoked metal, molded spoked, plastic or other suitable materials, multi-piece construction (e.g., two removably attachable semi-circular sections for easier shipping and storage, etc.). The wheel may have a rubber tire that may or may not hold air pressure, but preferably compresses under a load.

Various shape designs are possible for the frame of a wheeled shovel. In some preferred embodiments, the frame shape is configured such that the shovel blade is in front of the wheel axle at a relatively short distance yet which still allows a relatively large blade size capable of contacting the shoveling surface at not too steep of an angle so as to not unduly increase friction when pushing the wheeled shovel. The frame shape disposed behind the wheel axle can be configured such that, after the handle is pressed downwardly to lift the shovel blade's load, the handle is not so low after the throw so as to be at an uncomfortable or awkward height for the user and/or make it difficult to bring to bear the user's body weight, steer or otherwise control the wheeled shovel.

To help accomplish this feature at least in part, various embodiments provide the frame shape with one or more bends or curves (e.g., S-shaped curve, etc.) for increasing the vertical positioning of the frame. Such bends or curves can also be configured so that the handle is closer to the user's center of gravity when the load is lifted, thereby providing an easier means to exert both forward and downward pressure on the handle. In some embodiments, the handle height is above user's waist (but below the user's chest), which helps ensure that there is sufficient downward force for keeping the shovel blade against the surface being shoveled as forward force is leveraged into both a forward and downward force while pushing the wheeled shovel forward.

By way of example, some embodiments of the wheeled shovel include a frame having first and second generally straight portions that cooperatively define a generally V-shaped profile. In such embodiments, the wheeled shovel can also include an axle mounting location at about the intersection of the first and second generally straight portions that cooperatively define the generally V-shaped profile. In some embodiments, the wheeled shovel may include a plurality of axle mounting locations at least one of which is at about the intersection of the first and second generally straight portions that cooperatively define the generally V-shaped profile. Alternatively, other axle mounting locations are also possible.

During use of an embodiment of a wheeled shovel, tire compression and flexing of the frame can enhance the ability to throw snow or other materials from the shovel blade. As the handle is pushed downwardly, the shovel blade accelerates causing the forward portion of the frame to flex in generally opposite direction in response to the shovel blade acceleration, and also causing the tire to compress all due to the force applied to the handle by the user. The frame and tire returning to their original or initial shapes can provide additional force and speed to the load being thrown. Depending on the particular application, sufficient shovel blade acceleration can cause the wheeled shovel to lift off the ground as the load is released or thrown from the blade.

In some embodiments, the attachment of the frame can be located at or near the wheel axle can also increase the strength and durability of the wheeled shovel.

Some embodiments may include under-blade wheels (or other low friction surfaces, such as gravel shoes, etc.) for increasing the ability to accumulate heavier loads with less forward force applied by the user. In such embodiments, under-blade wheels can be engaged when weighted and/or at the control of the user to lower or engage the wheels to reduce blade friction while pushing/accumulating snow or other material. Alternatively, this can be accomplished by constructing the under-blade wheels with springs (or other resilient biasing devices) that keep the shovel blade off the ground surface when desired by the user, and/or when greater force is applied to the shovel handle (such as when pushing a heavy load on the shovel blade. Another alternative for engaging under-blade wheels under load is to attach the blade to the frame with a spring-loaded hinge. The spring-loaded hinge could be configured to keep the blade aligned with the frame angle (relative to the ground, for example). But when under force from the frame (under load), the spring-loaded hinge could be configured to sufficiently flex to thereby reduce the shovel blade angle relative to the ground for bringing the under-blade wheels into contact with the ground.

In some embodiments, a plastic or other similar wear-resistant material strip can be attached under the shovel blade leading edge, for example, to reduce drag and resistance for the user when pushing the blade and accumulating snow or material.

Various embodiments allow for adjustability to the handle positioning, length, and/or height. This handle adjustability (and/or the adjustability of the wheel attachment to the frame in some embodiments) allows the wheeled shovel to accommodate various user heights and body types, as well as to enable the user to optimize (or at least improve) the biomechanics associated with the use of the wheeled shovel by tailoring and selectively adjusting the dimensions to the user. By way of example, some embodiments include a handle portion that is slidably extendable or retractable in a telescoping manner relative to the frame. Additionally, or alternatively, the handle can be removably attachable to the frame at one or more different attachments positions on the frame such that the handle's positioning, height, and/or length can be selectively changed depending on which particular attachment location is used for the handle. In various embodiments, the handle can also be configured to be attached to the frame in a first orientation or a second orientation by flipping the handle over. Additionally, or alternatively, some embodiments allow the handle to be attached to the topside or underside of the frame, which, in turn, can thus allow adjustability to the handle positioning, height, and/or length.

In some embodiments, a wheeled shovel may be configured with a flexible blade and/or a flexible wheel construction to enhance the ability to throw a load of material. For example, a shovel blade can be constructed with sufficient flexibility such that the blade flexes or bends as a load is accelerated, thereby creating an enhanced trampoline effect as the blade flexes back to its original shape. This can enhance the ability to throw a load of material for a given amount of force and speed applied to the handle. Or, for example, other embodiments may include springs built into the shovel blade for augmenting the throwing capacity of a wheeled shovel from the blade and frame flexing. The springs may compress when weighted and accelerated (under load), and then expand as the load begins to unload from the blade thereby increasing throwing capacity.

In some embodiments, a wheeled shovel includes a relatively long forward portion that reduces or generally avoids materials sliding off the rear of the shovel blade. With a longer frame size, the wheeled shovel can lift a load with the frame being lowered to a lesser angle and the blade being lifted to a lesser angle as compared to lifting that load to an equivalent height with a wheeled shovel having a shorter frame size.

Some embodiments include a frame with a double or mirrored tube design that can allow the frame to be attached and positioned generally directly over the wheel axle (and center of mass). This, in turn, can allow the wheeled shovel to be more evenly balanced and more easily controlled (for various combinations of lifting, throwing and turning). With the two-tube design, the frame has a wide configuration which can improve maneuverability, control and stability, and allow for more easier loading and maneuvering without tipping, especially with much heavier load capacity.

Some embodiments can include quick release wheel axle attachment to an axle plate or bracket. Such exemplary mounting methods can help increase frame strength, for example, by eliminating the need to cut into the frame for attaching the wheel. The axle plate or bracket can also help strengthen the frame by providing additional material (e.g., metal, etc.) to the frame at a location (e.g., axle, leverage point, etc.) where there will likely be relatively high stresses.

In such embodiments, the quick release attachment method may enable relatively quick wheel removal, for example, to allow for a relatively quick conversion of the wheeled shovel to a wheel-less shovel and/or for facilitating storage and/or shipping. In addition, a wheeled shovel may have a multi-piece construction such that the wheeled shovel can be broken down into several pieces for ease of shipping and/or storage. By way of example only, some embodiments include a detachable wheel and detachable shovel blade. In further embodiments, the frame may also be broken down into sub-components or be collapsible, foldable, or telescopic to a more compact configuration. As another example, a wheel may have a two-piece construction, where the wheel can be split into two semi-circular halves and later reassembled.

In some embodiments, a wheeled shovel may include one or more braces or bridges connecting to two or more frame components (e.g., tubes, etc.). These braces or bridges may, for example, provide more rigidity against twist when steering and maneuvering the wheeled shovel.

Accordingly, various wheeled shovels disclosed herein can throw snow a fairly large distance with less input force. In order to further illustrate this aspect, a description will be provided of the mathematical analysis used to create the exemplary line graph shown in FIG. 135 of the distance snow was thrown versus input force for a particular embodiment of a wheeled shovel shown in FIG. 136 where the dimensions are in inches (i.e., 40 inches, 20 inches, and 18 inches). Also shown in FIG. 136, Q and Qh respectively represent the vertical and horizontal distances the shovel blade moves for the given input distance.

The following analysis was performed to determine the distance thrown as a function of a varying input force, which results from a varying input time (tvar).

$$\text{accelvertvar}(tvar) := \frac{2 \cdot Q(17.5, 23)}{tvar^2}$$

$$\text{accelhorizvar}(tvar) := \frac{2 \cdot Qh(17.5, 23)}{tvar^2}$$

Using v = at the components of velocity at the end of the motion can be calculatedvvert(tvar) := tvar · accelvertvar(tvar)
vhoriz(tvar) := tvar · accelhorizvar(tvar)
At this point it becomes a parabolic motion problem.
Time to apogee. Solve v = v initial-at $$tap(tvar) := \frac{vvert(tvar)}{grav}$$

Dist1(tvar) := tap (tvar) · vhoriz(tvar)

$$Height1(tvar) := \frac{1}{2} \cdot grav \cdot tap(tvar)^2$$

$$tfall(tvar) := \sqrt{\frac{2 \cdot (Height1(tvar) + Q(17.5, 23))}{grav}}$$

Dist2(tvar) := vhoriz(tvar) · tfall(tvar)
TotalThrow(tvar) := Qh(17.5, 23) + Dist1(tvar) + Dist2(tvar) in inches
Need weight of snow-snow density is 7 to 12% of water when first fallen, say 9.5 av.

$$snowdensity := 1 \cdot \frac{2.54^3}{1} \cdot \frac{1}{1000} \cdot \frac{2.2}{1} \cdot .095$$

snowdensity = 3.425 × 10⁻³ pound per cubic inch
shovelplanarea := .375 square inches
snowdepthinshovel := 8 inches
snowweight := shovelplanarea · snowdepthinshovel · snowdensity
snowweight = 10.275 pounds $$snowmass := \frac{snoweight}{2.2} kilograms$$

Horizontal component of force- $$fhoriz(tvar) := smowmass \cdot accelhorizvar(tvar) \cdot \frac{2.54}{100} \cdot .2248 \text{ in pounds}$$

$$fvert(tvar) := snowmass \cdot \left[(accelvertvar(tvar) + grav) \cdot \frac{2.54}{100}\right] \cdot .2248 \text{ in pounds}$$

$$f\_input\_total(tvar) := \sqrt{fvert(tvar)^2 + fhoriz(tvar)^2} \text{ in pounds}$$

In the above equations, the mass and rotational inertia of the wheeled shovel were disregarded for purposes of simplifying the analysis.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order or performance. It is also to be understood that additional or alternative steps may be employed.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A wheeled shovel comprising:
   a wheel assembly having an axle and a wheel;
   a frame having an upper portion, a lower portion, and a middle portion disposed generally between upper and lower portions of the frame, the middle portion adjacent the axle such that the axle is operable as a fulcrum or pivot point about which the frame can pivot;
   a handle disposed at about the upper portion of the frame; and a shovel blade disposed at about the lower portion of the frame which said frame lower portion is lower than the axle when the shovel blade and wheel are on the same horizontal surface;

the wheel assembly, frame, handle, and shovel blade cooperatively configured with a leverage ratio so as to enable a user to lift and carry a load of snow on the shovel blade and to accelerate and throw the snow generally upwardly and forwardly away from the shovel blade in response to a sufficient force applied to the handle for pivoting the frame relative to the axle with a recoil generated through the fulcrum and the axle operable as the pivot point.

2. A wheeled shovel according to claim 1, wherein the wheeled shovel comprises at a plurality of handle attachment configurations and a plurality of axle mounting locations, for selectively adjusting the leverage ratio of the wheeled shovel.

3. A wheeled shovel according to claim 1, wherein the wheel has an outer diameter of at least about thirty-three inches, whereby the larger outer diameter wheel provides the wheeled shovel with greater lifting height.

4. A wheeled shovel according to claim 1, wherein the middle portion includes first and second generally straight portions cooperatively defining a generally V-shape profile, and wherein the second generally straight portion is generally horizontal when the shovel blade is lowered to the horizontal surface supporting the wheeled shovel.

5. A wheeled shovel according to claim 1, wherein the upper portion of the frame is curved such that the curved upper portion and the middle portion cooperatively define a generally S-shape profile.

6. A wheeled shovel according to claim 1, wherein the middle portion includes first and second generally straight portions cooperatively defining a generally V-shape profile, and wherein the wheeled shovel is configured with the axle having longitudinal adjustability relative to the second generally straight portion of the frame that allows selective adjustment to the axle longitudinal positioning without substantially changing the axle height relative to a horizontal surface supporting the wheeled shovel.

7. A wheeled shovel according to claim 1, further comprising means for selectively adjusting the axle longitudinal positioning without substantially changing the axle height relative to a horizontal surface supporting the wheeled shovel.

8. A wheeled shovel according to claim 1, further comprising at least one axle receiver having a plurality of axle receiving cavities, the axle receiving cavities providing a plurality of different mounting locations for the axle relative to the frame.

9. A wheeled shovel according to claim 1, wherein the handle position is adjustable through an extendable and rotatable connection to the frame such that the handle can be slidably pulled out, slidably pushed in, and rotated relative to the frame for attachment to the frame at two or more different handle positions, whereby the extendable and rotatable connection allows selective adjustment of at least one or more of the handle height, handle length, and leverage ratio of the wheeled shovel, and, thereby, allows tailoring of the wheeled shovel for a particular user or conditions.

10. A wheeled shovel according to claim 9, wherein the extendable and rotatable connection allows the handle to be attached to the frame in at least a first handle orientation or a second handle orientation rotated one hundred eighty degrees from the first handle orientation.

11. A wheeled shovel according to claim 1, wherein the handle is adjustable through a telescoping slidable connection to the frame such that the handle can be slidably extended or slidably retracted relative to the frame for attachment to the frame at two or more different handle positions, whereby the telescoping slidable connection allows selectively adjustment to at least one or more of the handle height, handle length, and leverage ratio of the wheeled shovel, and, thereby, allows tailoring of the wheeled shovel for a particular user or conditions.

12. A wheeled shovel according to claim 1, wherein the handle is adjustable through a rotatable connection to the frame such that the handle can be rotated relative to the frame and attached to the frame in at least a first handle orientation or a second handle orientation rotated one hundred eighty degrees from the first handle orientation, whereby the rotatable connection allows selective adjustment to at least one or more of the handle positioning and leverage ratio of the wheeled shovel, and, thereby, allows tailoring of the wheeled shovel for a particular user or conditions.

13. A wheeled shovel according to claim 1, further comprising means for selectively attaching the handle to the frame at two or more different handle positions.

14. A wheeled shovel according to claim 1, wherein the middle portion includes first and second generally straight portions cooperatively defining a generally V-shape profile, and wherein the axle location is at about the intersection of the first and second generally straight portions that cooperatively define the generally V-shape profile.

15. A wheeled shovel according to claim 1, wherein the middle portion includes first and second generally straight portions cooperatively defining a generally V-shape profile, and wherein the wheeled shovel includes a plurality of axle mounting locations at least one of which is at about the intersection of the first and second generally straight portions that cooperatively define the generally V-shape profile.

16. A method of using the wheeled shovel according to claim 1, the method comprising applying a sufficient force to the handle to thereby pivot the frame relative to the axle and throw snow generally upwardly and forwardly away from the shovel blade.

17. A wheeled shovel according to claim 1, wherein the middle portion is attached to the axle, and wherein the middle portion has a generally "S-shape" defined by a lower portion included angle $\phi$ and an upper portion included angle $\phi'$, wherein the lower portion included angle $\phi$ is between about eighty degrees and one hundred sixty five degrees, and wherein the upper portion included angle is $\phi'$ is between about eighty degrees and one hundred twenty degrees.

18. A wheeled shovel according to claim 1, wherein the handle is generally T-shape, and wherein the handle is attached to the frame with a bent attachment plate.

19. A wheeled shovel according to claim 1, wherein the wheeled shovel is configured such that the leverage ratio can be adjusted.

20. A wheeled shovel according to claim 1, wherein the axle is higher than the blade attachment location when the shovel blade and wheel are on the same horizontal surface.

21. A wheeled shovel according to claim 1, wherein the axle is higher than the shovel blade when the shovel blade and wheel are on the same horizontal surface.

22. A wheeled shovel comprising:
a wheel assembly having an axle and a wheel;
a frame having an upper portion, a lower portion, and a middle portion disposed generally between upper and lower portions of the frame, the middle portion adjacent the axle such that the axle is operable as a fulcrum about which the frame can pivot;

a handle disposed at about the upper portion of the frame; and a shovel blade disposed at about the lower portion of the frame which said frame lower portion is lower than the axle when the shovel blade and wheel are on the same horizontal surface;

the wheel assembly, frame, handle, and shovel blade cooperatively configured so as to enable the wheeled shovel to throw snow generally upwardly and forwardly away from the shovel blade in response to a sufficient force applied to the handle for pivoting the frame relative to the axle with a recoil generated through the fulcrum at the axle;

wherein the axle comprises a tubular body having two end portions with at least one spring at each said end portion of the tubular body, whereby the springs are compressed when the handle is pushed generally downwards such that the compression of the springs provides a recoil action.

* * * * *

UNITED STATES PATENT AND TRADEMARK OFFICE
CERTIFICATE OF CORRECTION

| | | |
|---|---|---|
| PATENT NO. | : 8,136,268 B2 | |
| APPLICATION NO. | : 12/728884 | |
| DATED | : March 20, 2012 | |
| INVENTOR(S) | : Mark Noonan | |

It is certified that error appears in the above-identified patent and that said Letters Patent is hereby corrected as shown below:

CLAIM 2
Column 2, line 14: delete "at" after "wheeled shovel comprises" and before "a plurality of handle attachment"

Signed and Sealed this
Twelfth Day of June, 2012

David J. Kappos
*Director of the United States Patent and Trademark Office*